(12) United States Patent
Kishine et al.

(10) Patent No.: US 8,259,210 B2
(45) Date of Patent: Sep. 4, 2012

(54) IMAGING LENS AND IMAGING SYSTEM

(75) Inventors: Yasunobu Kishine, Saitama (JP);
Sumihiro Nishihata, Saitama (JP)

(73) Assignee: Fujifilm Corporation, Tokyo (JP)

( * ) Notice: Subject to any disclaimer, the term of this patent is extended or adjusted under 35 U.S.C. 154(b) by 86 days.

(21) Appl. No.: 13/017,085

(22) Filed: Jan. 31, 2011

(65) Prior Publication Data

US 2011/0211088 A1    Sep. 1, 2011

(30) Foreign Application Priority Data

Mar. 1, 2010 (JP) ................................. 2010-044249
Mar. 3, 2010 (JP) ................................. 2010-046663

(51) Int. Cl.
*H04N 5/225* (2006.01)
*G02B 27/64* (2006.01)

(52) U.S. Cl. ..................... 348/335; 348/208.11; 359/554

(58) Field of Classification Search ................. 348/335, 348/222.1, 208.99, 208.2, 208.8, 208.11; 359/554, 557, 746, 753, 766, 724, 717; 396/52, 396/55

See application file for complete search history.

(56) References Cited

U.S. PATENT DOCUMENTS

| 4,998,809 | A | * | 3/1991 | Tsuji et al. .................... 359/557 |
| 5,748,371 | A |   | 5/1998 | Cathey, Jr. et al. |
| 2009/0128655 | A1 |   | 5/2009 | Yoneyama |
| 2009/0128668 | A1 |   | 5/2009 | Yoneyama |
| 2010/0091123 | A1 | * | 4/2010 | Miyazaki et al. ........ 348/208.11 |
| 2012/0140104 | A1 | * | 6/2012 | Ozaki ........................... 348/335 |

FOREIGN PATENT DOCUMENTS

| JP | 2000-123168 | 4/2000 |
| JP | 3275010 | 2/2002 |

* cited by examiner

*Primary Examiner* — Aung S Moe
(74) *Attorney, Agent, or Firm* — Young & Thompson

(57) ABSTRACT

The spherical aberration of an imaging lens changes from an object side of image-plane base position Zo toward the other side thereof as a distance from optical axis Z1 increases, and formulas $0.02 < a/f < 0.10$ and $0.02 < b/f$ are satisfied. In an imaging apparatus to which the imaging lens is applied, a blur is corrected by performing contrast recovery processing on original image data obtained by imaging. In the formulas, a is the magnitude of spherical aberration from the image-plane base position Zo toward the object side thereof affecting a ray passing through a central part of the pupil of the imaging lens, and b is a sum of a maximum spherical aberration from the image plane base position Zo toward the object side thereof and a maximum spherical aberration from the image plane base position Zo toward the other side thereof, and f is the focal length of the imaging lens.

20 Claims, 238 Drawing Sheets

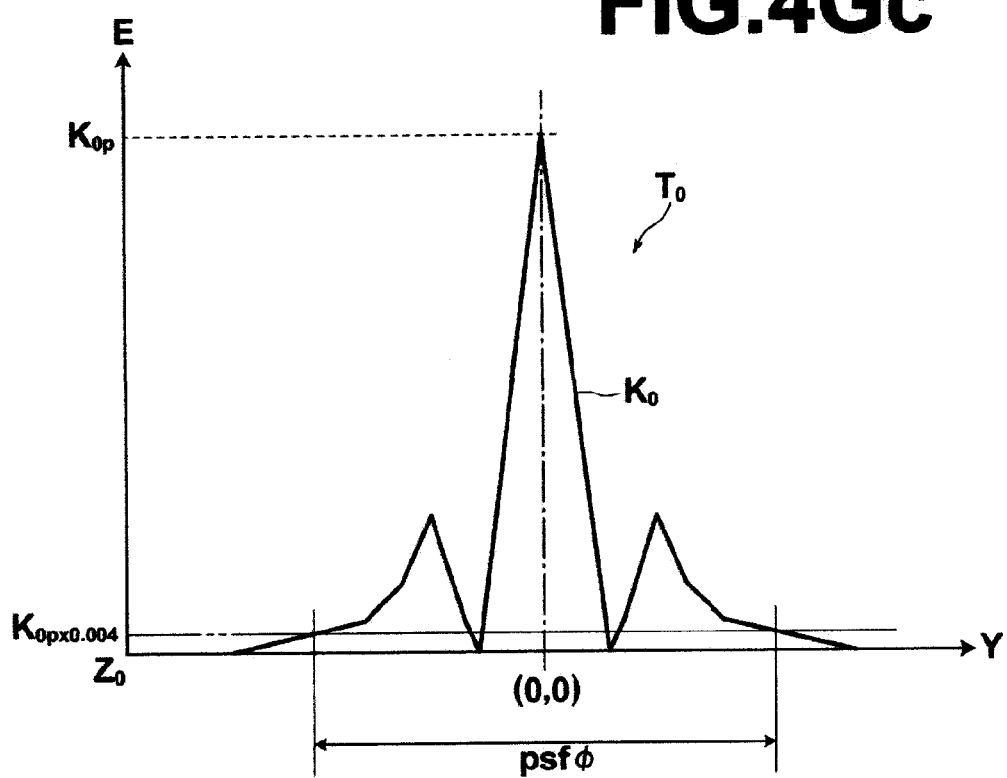

OPTICAL PATH DIAGRAM OF EXAMPLE 1

SPHERICAL ABERRATION (SINGLE COLOR) OF EXAMPLE 1
PUPIL RADIUS : 0.6507 MILLIMETERS

LOGITUDINAL ABERRATION

MOTO20091001
FRI JAN 8 2010
WAVELENGTHS : 0.546

MOTO . ZMX
CONFIGURATION 1 OF 5

FIG.5C
ASTIGMATISM (SINGLE COLOR) AND DISTORTION (SINGLE COLOR) OF EXAMPLE 1
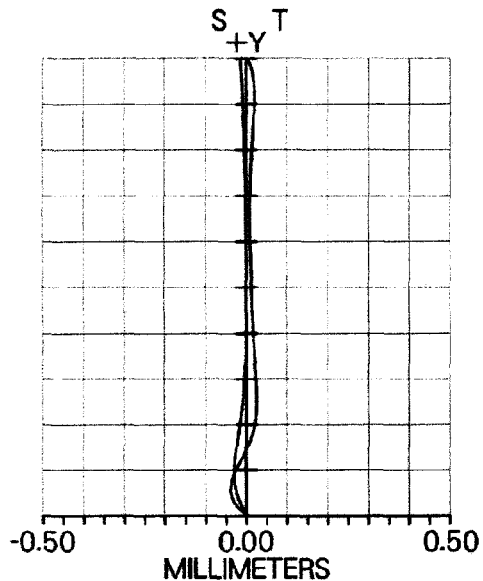
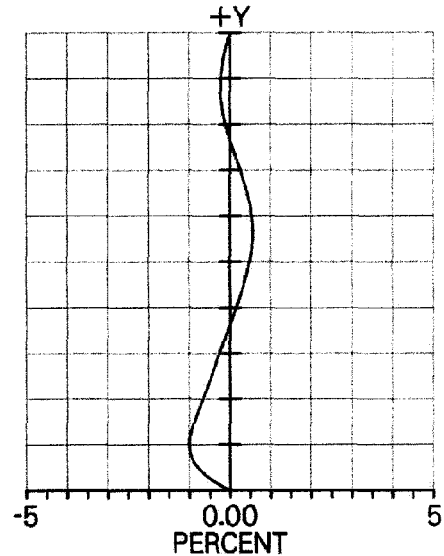
FIELD UNITS CHANGED TO FIELD ANGLE
FIELD CURVATURE / F-TAN(THETA) DISTORTION
MOTO20091001
FRI JAN 8 2010
MAXIMUM FIELD IS 31.251 DEGREES
WAVWLENGTH : 0.546
MOTO . ZMX
CONFIGURATION 1 OF 5

FIG.5D
COMA ABERRATION (SINGLE COLOR) OF EXAMPLE 1
IMA : 0.0000 MM
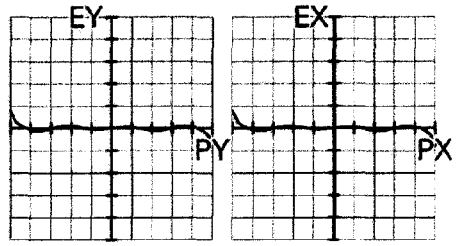
IMA : 1.5880 MM
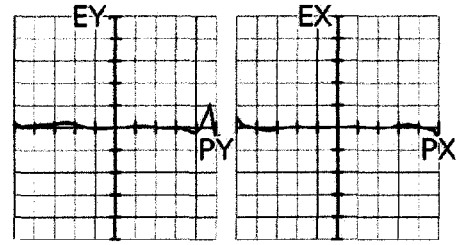
IMA : 2.2680 MM
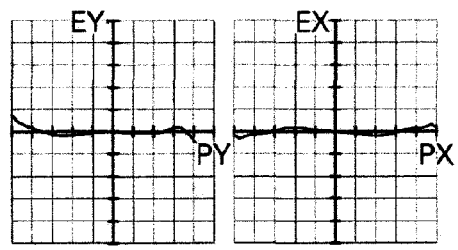
TRANSVERSE RAY FAN PLOT
MOTO20091001
FRI JAN 8 2010
MAXIMUM SCALE ; ±25.000 μM .
0.546
SURFACE : IMAGE
MOTO . ZMX
CONFIGURATION 1 OF 5

SPOT DIAGRAM (SINGLE COLOR) OF EXAMPLE 1

THROUGH FOCUS SPOT DIAGRAM

```
MOTO20091001
FRI JAN 8 2010 UNITS ARE μm.
FIELD      :     1       2       3
RMS RADIUS:    2.084   1.541   2.816
GEO RADIUS:    3.882   3.712   8.440             MOTO . ZMX
SCALE BAR :    400         REFERENCE : CHIEF RAY   CONFIGURATION 1 OF 5
```

FIG.5L
LIGHT INTENSITY DISTRIBUTION OF POINT IMAGE AND
BASE POINT IMAGE DIAMETER psfϕ OF EXAMPLE 1
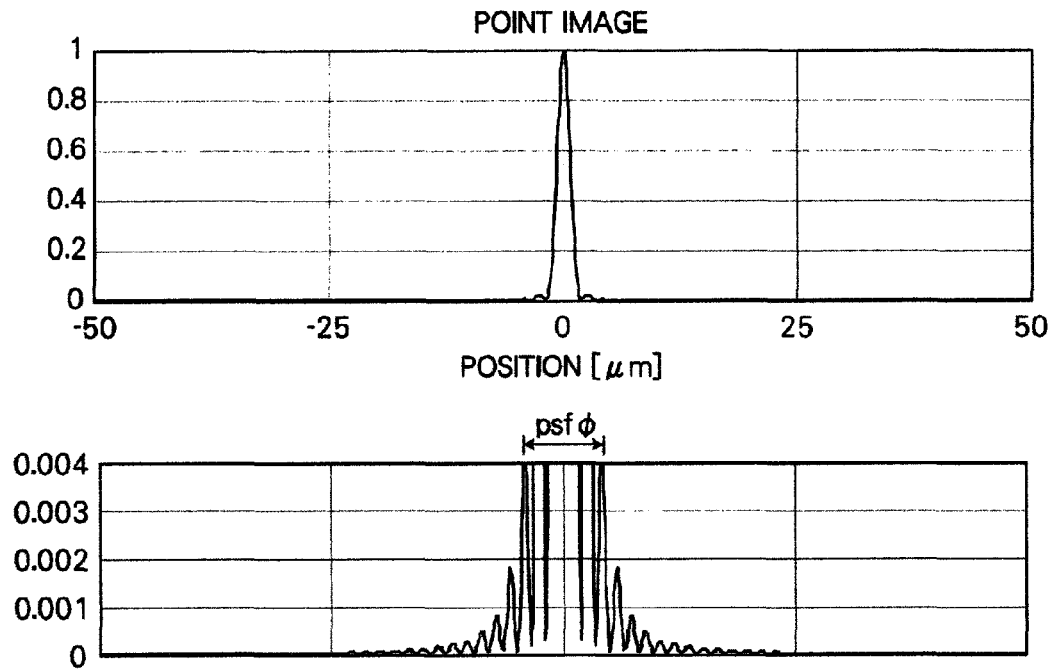
SPHERICAL ABERRATION OF EXAMPLE 1
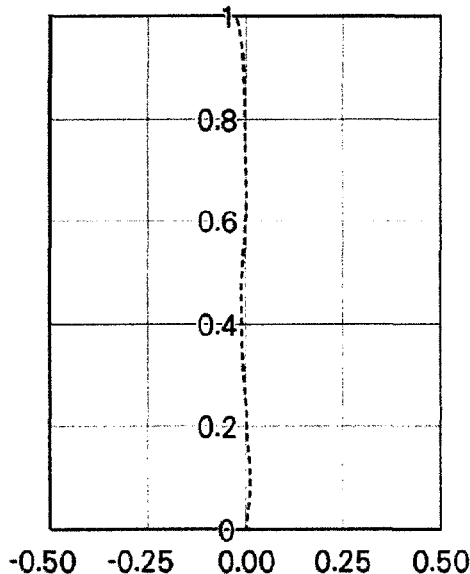
FIG.5M

OPTICAL PATH DIAGRAM OF EXAMPLE 2

SPHERICAL ABERRATION (SINGLE COLOR) OF EXAMPLE 2
PUPIL RADIUS : 0.6507 MILLIMETERS

LOGITUDINAL ABERRATION

TYPE_A_20091019
FRI JAN 8 2010
WAVELENGTHS : 0.546

A_091019 . ZMX
CONFIGURATION 1 OF 5

ASTIGMATISM (SINGLE COLOR) AND DISTORTION (SINGLE COLOR) OF EXAMPLE 2

FIELD UNITS CHANGED TO FIELD ANGLE
FIELD CURVATURE / F-TAN(THETA) DISTORTION
TYPE_A_20091019
FRI JAN 8 2010
MAXIMUM FIELD IS 31.191 DEGREES
WAVWLENGTH : 0.546

A_091019 . ZMX
CONFIGURATION 1 OF 5

SPOT DIAGRAM (SINGLE COLOR) OF EXAMPLE 2

THROUGH FOCUS SPOT DIAGRAM

```
TYPE_A_20091019
FRI JAN 8 2010 UNITS ARE μm.
FIELD     :    1       2       3
RMS RADIUS:  9.311   8.282   15.450
GEO RADIUS: 24.516  32.981   80.144              A_091019 . ZMX
SCALE BAR :   200           REFERENCE : CHIEF RAY   CONFIGURATION 1 OF 5
```

DEPTH MTF (179 LINE/mm) (SINGLE COLOR, AXIAL) OF EXAMPLE 2

DIFFRACTION THROUGH FOCUS MTF
TYPE_A_20091019
FRI JAN 8 2010
DATA FOR 0.5460 $\mu$m.  A_091019.ZMX
SPATIAL FREQUENCY : 179.0000 CYCLES PER MM.  CONFIGURATION 1 OF 5

FIG.6L
LIGHT INTENSITY DISTRIBUTION OF POINT IMAGE AND
BASE POINT IMAGE DIAMETER psfφ OF EXAMPLE 2
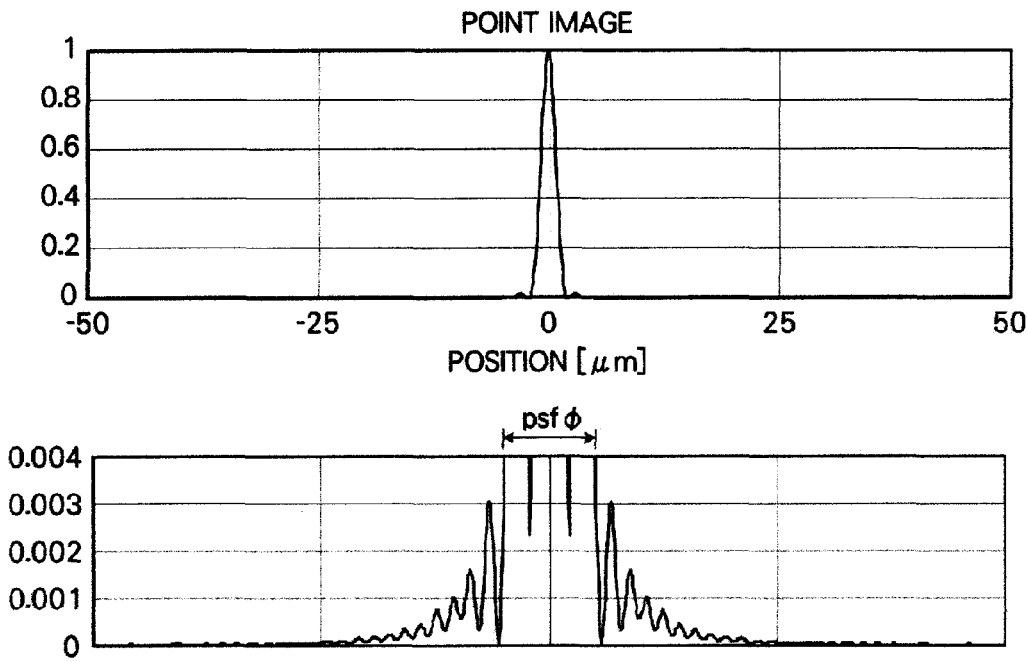
SPHERICAL ABERRATION OF EXAMPLE 2
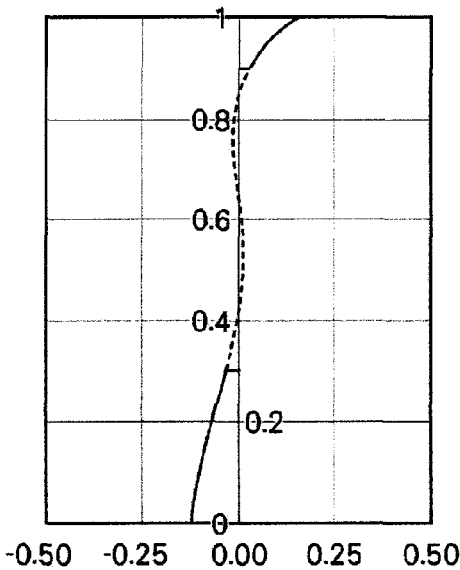
FIG.6M

OPTICAL PATH DIAGRAM OF EXAMPLE 3

SPHERICAL ABERRATION (SINGLE COLOR) OF EXAMPLE 3
PUPIL RADIUS : 0.6507 MILLIMETERS

LOGITUDINAL ABERRATION

TYPE_A_20091028
FRI JAN 8 2010
WAVELENGTHS : 0.546

A_091028 . ZMX
CONFIGURATION 1 OF 5

ASTIGMATISM (SINGLE COLOR) AND DISTORTION (SINGLE COLOR) OF EXAMPLE 3

FIELD UNITS CHANGED TO FIELD ANGLE
FIELD CURVATURE / F-TAN(THETA) DISTORTION
TYPE_A_20091028
FRI JAN 8 2010
MAXIMUM FIELD IS 31.080 DEGREES
WAVWLENGTH : 0.546

A_091028 . ZMX
CONFIGURATION 1 OF 5

COMA ABERRATION (SINGLE COLOR) OF EXAMPLE 3

TYPE_A_20091028
FRI JAN 8 2010
MAXIMUM SCALE ; ±25.000 μM .
0.546

SURFACE : IMAGE

A_091028 . ZMX
CONFIGURATION 1 OF 5

SPOT DIAGRAM (SINGLE COLOR) OF EXAMPLE 3

THROUGH FOCUS SPOT DIAGRAM

TYPE_A_20091028
FRI JAN 8 2010 UNITS ARE μm.
FIELD        :      1       2       3
RMS RADIUS:  6.518   10.758  16.256
GEO RADIUS:  13.288  47.908  73.103          A_091028 . ZMX
SCALE BAR :   200          REFERENCE : CHIEF RAY   CONFIGURATION 1 OF 5

DEPTH MTF (90 LINE/mm) (SINGLE COLOR, AXIAL) OF EXAMPLE 3

FIG. 7L
LIGHT INTENSITY DISTRIBUTION OF POINT IMAGE AND
BASE POINT IMAGE DIAMETER psfφ OF EXAMPLE 3
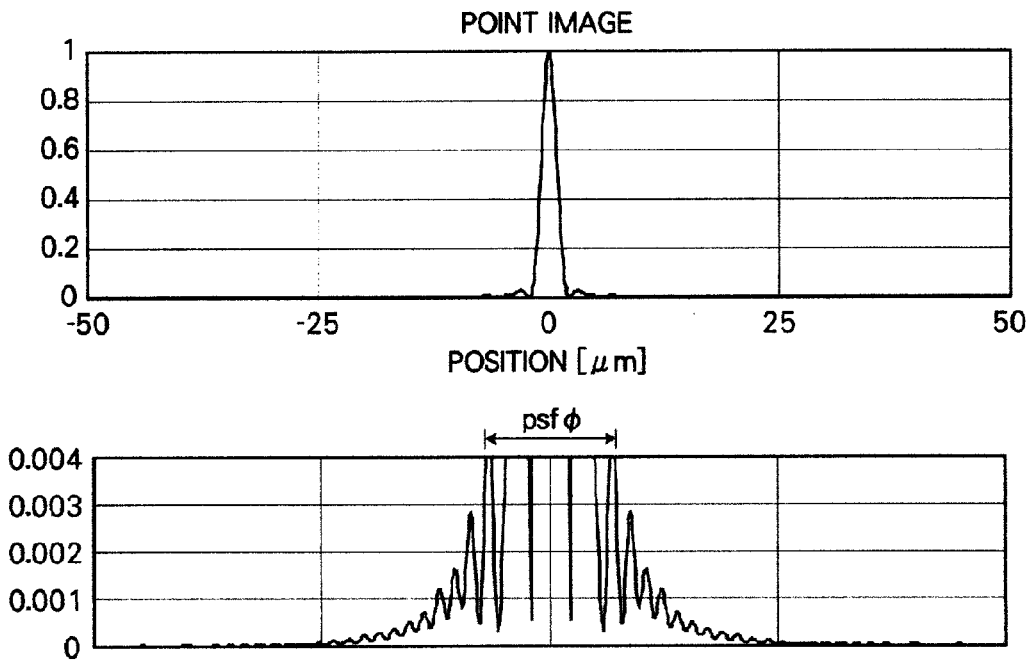
SPHERICAL ABERRATION OF EXAMPLE 3
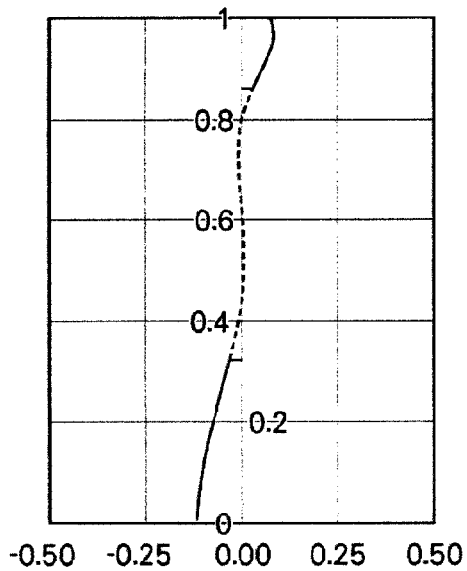
FIG. 7M

OPTICAL PATH DIAGRAM OF EXAMPLE 4

SPHERICAL ABERRATION (SINGLE COLOR) OF EXAMPLE 4
PUPIL RADIUS : 0.6507 MILLIMETERS

LOGITUDINAL ABERRATION

TYPE_A_20091028
FRI JAN 8 2010
WAVELENGTHS : 0.546

A_091028A . ZMX
CONFIGURATION 1 OF 5

ASTIGMATISM (SINGLE COLOR) AND DISTORTION (SINGLE COLOR) OF EXAMPLE 4

FIELD UNITS CHANGED TO FIELD ANGLE
FIELD CURVATURE / F-TAN(THETA) DISTORTION
TYPE_A_20091028
FRI JAN 8 2010
MAXIMUM FIELD IS 31.958 DEGREES         A_091028A . ZMX
WAVWLENGTH : 0.546                       CONFIGURATION 1 OF 5

COMA ABERRATION (SINGLE COLOR) OF EXAMPLE 4

TRANSVERSE RAY FAN PLOT

TYPE_A_20091028
FRI JAN 8 2010
MAXIMUM SCALE ; ±25.000 μM .
0.546

SURFACE : IMAGE

A_091028A . ZMX
CONFIGURATION 1 OF 5

DEPTH MTF (90 LINE/mm) (SINGLE COLOR) OF EXAMPLE 4

DIFFRACTION THROUGH FOCUS MTF
TYPE_A_20091028
FRI JAN 8 2010
DATA FOR 0.5460 µm.  A_091028A.ZMX
SPATIAL FREQUENCY : 90.0000 CYCLES PER MM.  CONFIGURATION 1 OF 5

LIGHT INTENSITY DISTRIBUTION OF POINT IMAGE AND
BASE POINT IMAGE DIAMETER psfφ OF EXAMPLE 4
FIG.8L
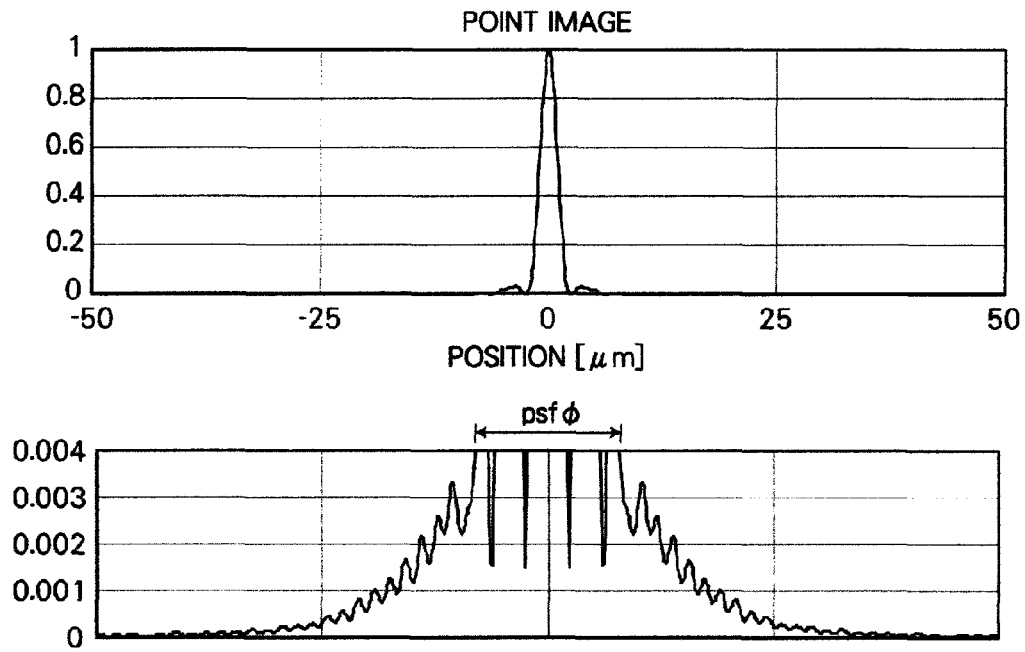
SPHERICAL ABERRATION OF EXAMPLE 4
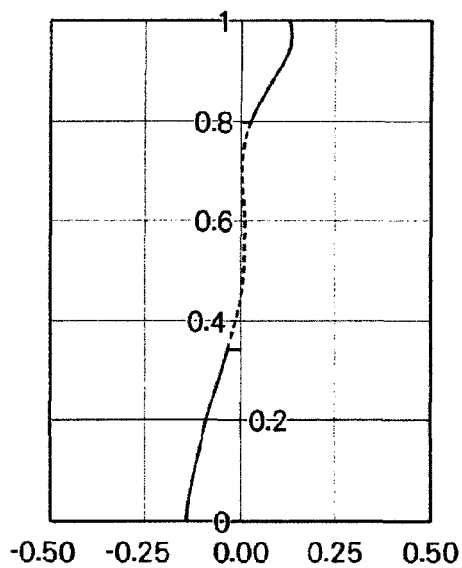
FIG.8M

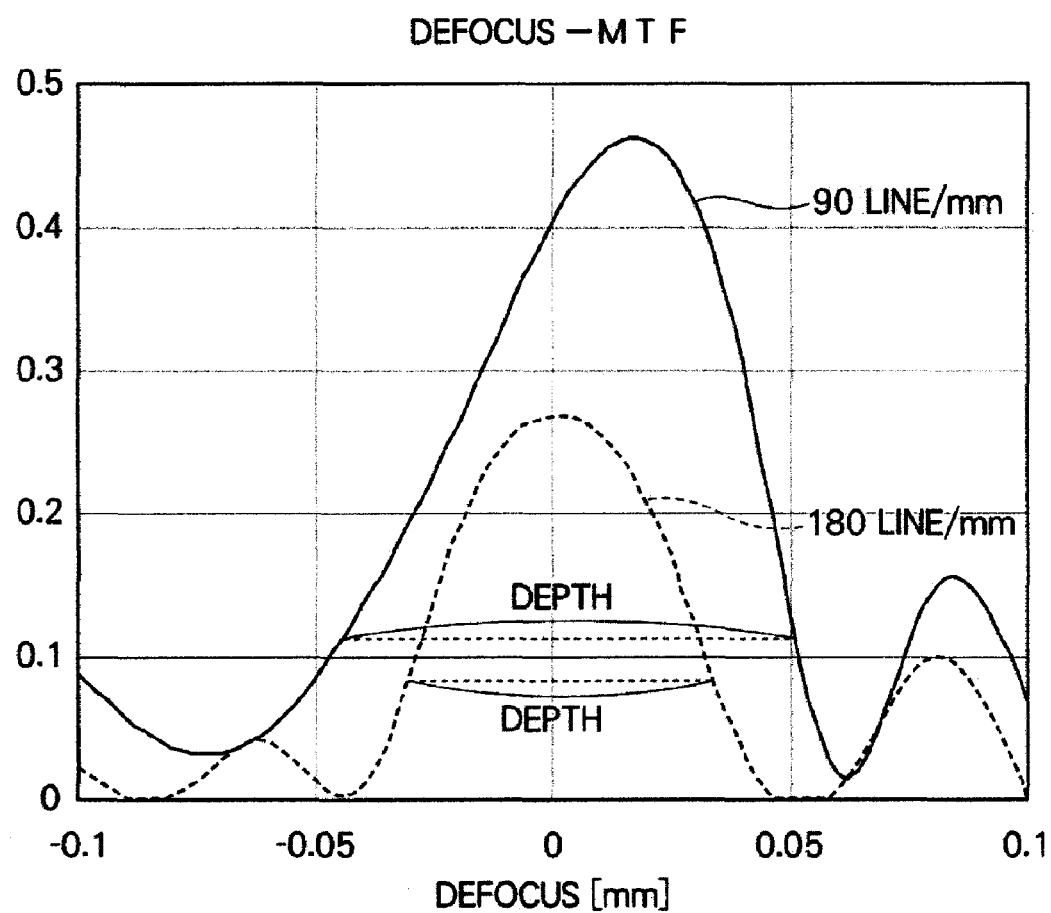

OPTICAL PATH DIAGRAM OF EXAMPLE 5

SPHERICAL ABERRATION (SINGLE COLOR) OF EXAMPLE 5
PUPIL RADIUS : 0.6507 MILLIMETERS

LOGITUDINAL ABERRATION

TYPE_A_20091028
FRI JAN 8 2010
WAVELENGTHS : 0.546

A_091028B . ZMX
CONFIGURATION 1 OF 5

FIG.9C
ASTIGMATISM (SINGLE COLOR) AND DISTORTION (SINGLE COLOR) OF EXAMPLE 5
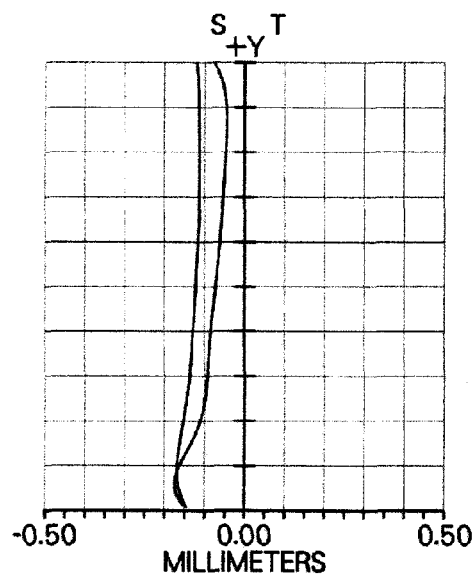
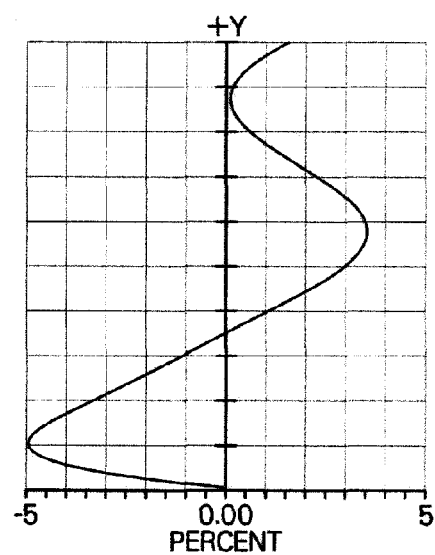
FIELD UNITS CHANGED TO FIELD ANGLE
      FIELD CURVATURE / F-TAN(THETA) DISTORTION
TYPE_A_20091028
FRI JAN 8 2010
MAXIMUM FIELD IS 31.939 DEGREES            A_091028B . ZMX
WAVWLENGTH : 0.546                         CONFIGURATION 1 OF 5

COMA ABERRATION (SINGLE COLOR) OF EXAMPLE 5

TRANSVERSE RAY FAN PLOT

TYPE_A_20091028
FRI JAN 8 2010
MAXIMUM SCALE ; ±25.000 μM.
0.546

SURFACE : IMAGE

A_091028B . ZMX
CONFIGURATION 1 OF 5

SPOT DIAGRAM (SINGLE COLOR) OF EXAMPLE 5

THROUGH FOCUS SPOT DIAGRAM
TYPE_A_20091028
FRI JAN 8 2010 UNITS ARE µm.
FIELD       :       1        2         3
RMS RADIUS:  10.009   19.389    23.681
GEO RADIUS:  18.939  103.546   109.043        A_091028B . ZMX
SCALE BAR :    200           REFERENCE : CHIEF RAY   CONFIGURATION 1 OF 5

DEPTH MTF (90 LINE/mm) (SINGLE COLOR, AXIAL) OF EXAMPLE 5

DIFFRACTION THROUGH FOCUS MTF
TYPE_A_20091028
FRI JAN 8 2010
DATA FOR 0.5460 μm.  A_091028B . ZMX
SPATIAL FREQUENCY : 90.0000 CYCLES PER MM .   CONFIGURATION 1 OF 5

LIGHT INTENSITY DISTRIBUTION OF POINT IMAGE AND
BASE POINT IMAGE DIAMETER psfφ OF EXAMPLE 5
FIG.9L
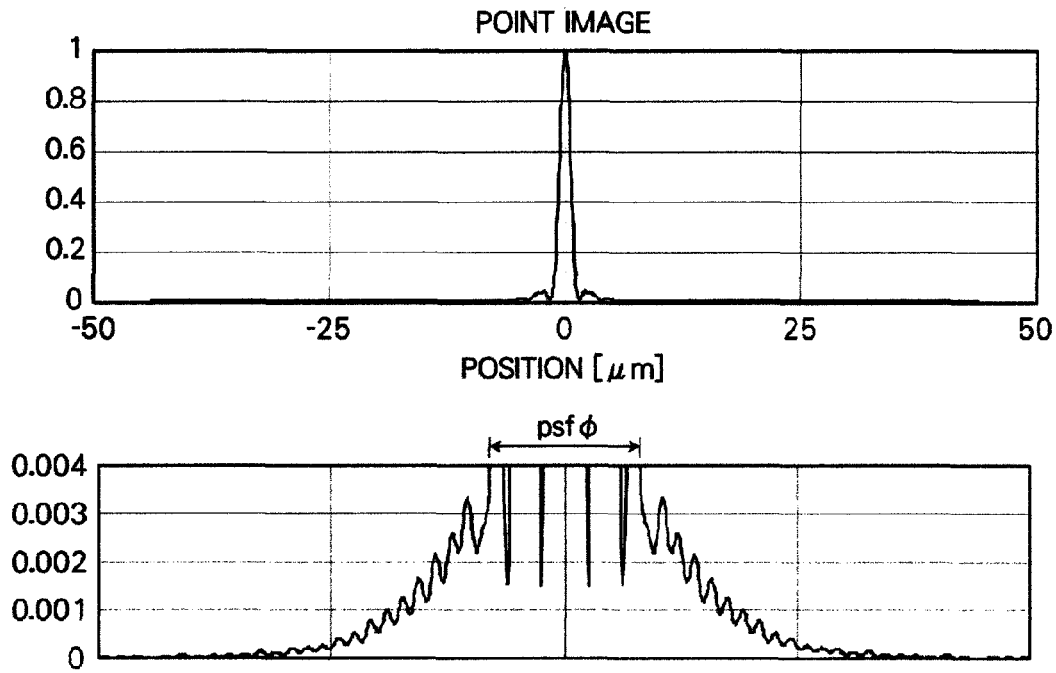
SPHERICAL ABERRATION OF EXAMPLE 5
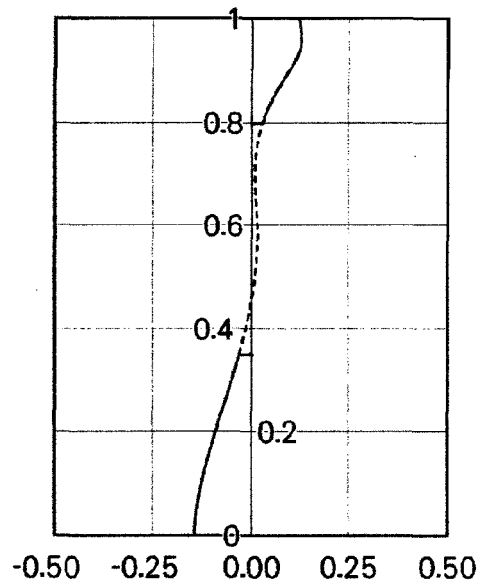
FIG.9M

OPTICAL PATH DIAGRAM OF EXAMPLE 6

SPHERICAL ABERRATION (SINGLE COLOR) OF EXAMPLE 6
PUPIL RADIUS : 0.6507 MILLIMETERS

LOGITUDINAL ABERRATION

TYPE_A_20091028
FRI JAN 8 2010
WAVELENGTHS : 0.546

A_091028C . ZMX
CONFIGURATION 1 OF 5

ASTIGMATISM (SINGLE COLOR) AND DISTORTION (SINGLE COLOR) OF EXAMPLE 6

FIELD UNITS CHANGED TO FIELD ANGLE
    FIELD CURVATURE / F-TAN(THETA) DISTORTION
TYPE_A_20091028
FRI JAN 8 2010
MAXIMUM FIELD IS 31.969 DEGREES            A_091028C . ZMX
WAVWLENGTH : 0.546                         CONFIGURATION 1 OF 5

COMA ABERRATION (SINGLE COLOR) OF EXAMPLE 6

TRANSVERSE RAY FAN PLOT

TYPE_A_20091028
FRI JAN 8 2010
MAXIMUM SCALE ; ±25.000 μM .
0.546

SURFACE : IMAGE

A_091028C . ZMX
CONFIGURATION 1 OF 5

DEPTH MTF (179 LINE/mm) (SINGLE COLOR, AXIAL) OF EXAMPLE 6

DIFFRACTION THROUGH FOCUS MTF
TYPE_A_20091028
FRI JAN 8 2010
DATA FOR 0.5460 μm.                                                   A_091028C.ZMX
SPATIAL FREQUENCY : 179.0000 CYCLES PER MM.   CONFIGURATION 1 OF 5

DEPTH MTF (90 LINE/mm) (SINGLE COLOR) OF EXAMPLE 6

DEPTH MTF (179 LINE/mm) (SINGLE COLOR) OF EXAMPLE 6

DIFFRACTION THROUGH FOCUS MTF
TYPE_A_20091028
FRI JAN 8 2010
DATA FOR 0.5460 μm.  A_091028C.ZMX
SPATIAL FREQUENCY : 179.0000 CYCLES PER MM.  CONFIGURATION 1 OF 5

LIGHT INTENSITY DISTRIBUTION OF POINT IMAGE AND
BASE POINT IMAGE DIAMETER psf φ OF EXAMPLE 6

SPHERICAL ABERRATION OF EXAMPLE 6

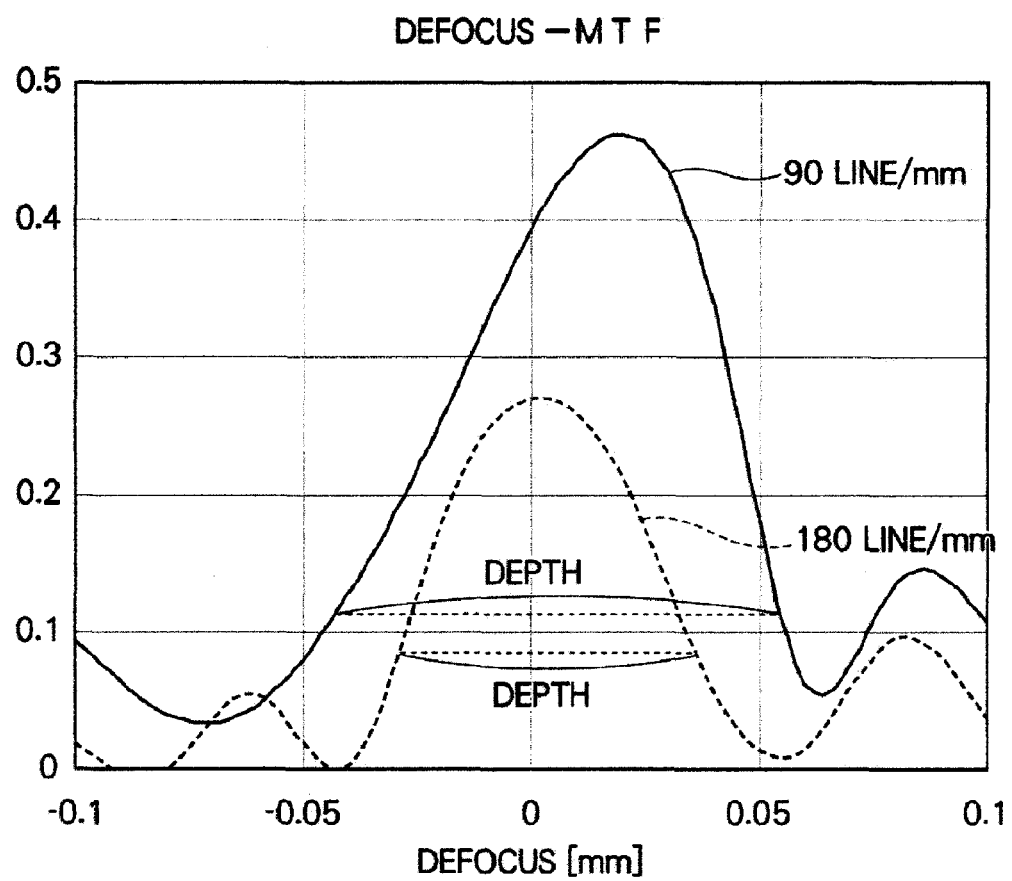

OPTICAL PATH DIAGRAM OF EXAMPLE 7

SPHERICAL ABERRATION (SINGLE COLOR) OF EXAMPLE 7
PUPIL RADIUS : 0.6507 MILLIMETERS

LOGITUDINAL ABERRATION

TYPE_B_20091019
FRI JAN 8 2010
WAVELENGTHS : 0.546

B_091019 . ZMX
CONFIGURATION 1 OF 5

ASTIGMATISM (SINGLE COLOR) AND DISTORTION (SINGLE COLOR) OF EXAMPLE 7

FIELD UNITS CHANGED TO FIELD ANGLE
FIELD CURVATURE / F-TAN(THETA) DISTORTION
TYPE_D_20091019
FRI JAN 8 2010
MAXIMUM FIELD IS 31.169 DEGREES
WAVWLENGTH : 0.546

B_091019 . ZMX
CONFIGURATION 1 OF 5

COMA ABERRATION (SINGLE COLOR) OF EXAMPLE 7

TRANSVERSE RAY FAN PLOT

TYPE_D_20091019
FRI JAN 8 2010
MAXIMUM SCALE ; ±25.000 μM .
0.546

SURFACE : IMAGE

B_091019 . ZMX
CONFIGURATION 1 OF 5

SPOT DIAGRAM (SINGLE COLOR) OF EXAMPLE 7

THROUGH FOCUS SPOT DIAGRAM
TYPE_D_20091019
FRI JAN 8 2010 UNITS ARE $\mu$m.
FIELD        :      1        2        3
RMS RADIUS:  11.193    13.422    12.495
GEO RADIUS:  29.353    55.756    50.349          B_091019.ZMX
SCALE BAR :    200         REFERENCE : CHIEF RAY    CONFIGURATION 1 OF 5

DEPTH MTF (90 LINE/mm) (SINGLE COLOR, AXIAL) OF EXAMPLE 7

FIG. 11L
LIGHT INTENSITY DISTRIBUTION OF POINT IMAGE AND
BASE POINT IMAGE DIAMETER psfφ OF EXAMPLE 7
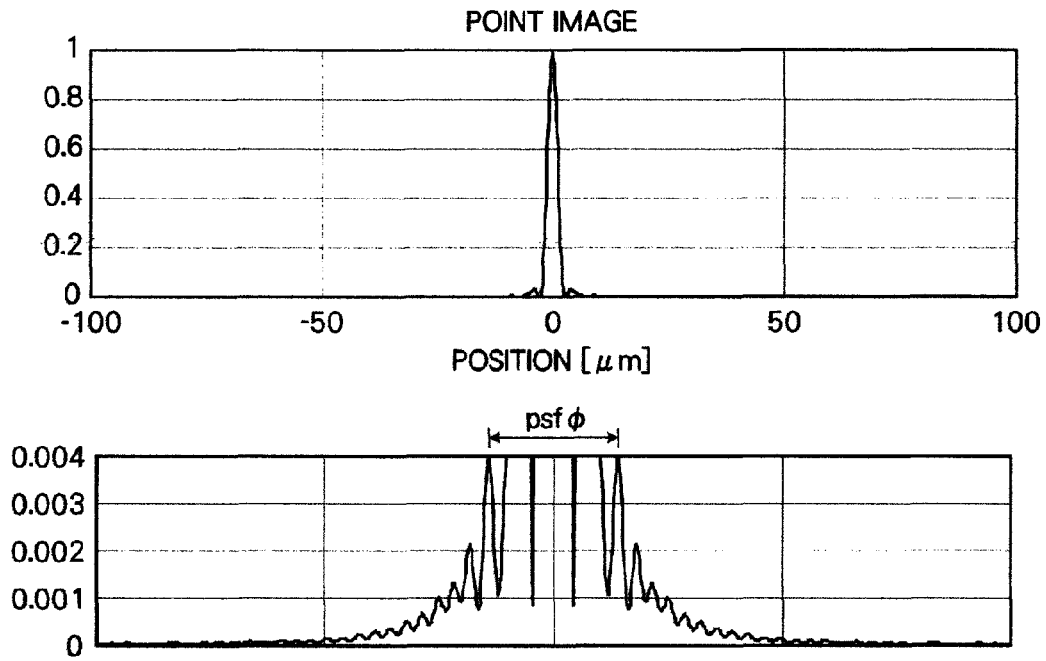
SPHERICAL ABERRATION OF EXAMPLE 7
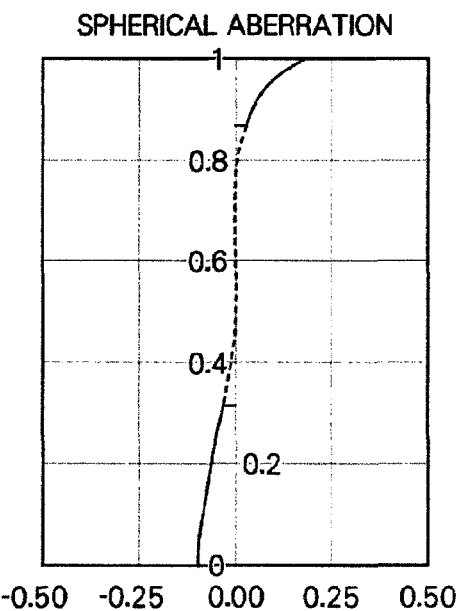
FIG. 11M

OPTICAL PATH DIAGRAM OF EXAMPLE 8

SPHERICAL ABERRATION (SINGLE COLOR) OF EXAMPLE 8
PUPIL RADIUS : 0.6507 MILLIMETERS

LOGITUDINAL ABERRATION

TYPE_D_20091019
FRI JAN 8 2010
WAVELENGTHS : 0.546

B_091019A . ZMX
CONFIGURATION 1 OF 5

ASTIGMATISM (SINGLE COLOR) AND DISTORTION (SINGLE COLOR) OF EXAMPLE 8

FIELD UNITS CHANGED TO FIELD ANGLE
      FIELD CURVATURE / F-TAN(THETA) DISTORTION
TYPE_D_20091019
FRI JAN 8 2010
MAXIMUM FIELD IS 31.168 DEGREES          B_091019A.ZMX
WAVWLENGTH : 0.546                     CONFIGURATION 1 OF 5

COMA ABERRATION (SINGLE COLOR) OF EXAMPLE 8

TRANSVERSE RAY FAN PLOT

TYPE_D_20091019
FRI JAN 8 2010
MAXIMUM SCALE ; ±25.000 μM.
0.546

SURFACE : IMAGE

B_091019A . ZMX
CONFIGURATION 1 OF 5

DEPTH MTF (90 LINE/mm) (SINGLE COLOR, AXIAL) OF EXAMPLE 8

DIFFRACTION THROUGH FOCUS MTF
TYPE_D_20091019
FRI JAN 8 2010
DATA FOR 0.5460 μm.
SPATIAL FREQUENCY : 90.0000 CYCLES PER MM.
B_091019A . ZMX
CONFIGURATION 1 OF 5

DEPTH MTF (179 LINE/mm) (SINGLE COLOR, AXIAL) OF EXAMPLE 8

DIFFRACTION THROUGH FOCUS MTF
TYPE_D_20091019
FRI JAN 8 2010
DATA FOR 0.5460 μm.                              B_091019A.ZMX
SPATIAL FREQUENCY : 179.0000 CYCLES PER MM.   CONFIGURATION 1 OF 5

LIGHT INTENSITY DISTRIBUTION OF POINT IMAGE AND BASE POINT IMAGE DIAMETER psfφ OF EXAMPLE 8

SPHERICAL ABERRATION OF EXAMPLE 8

OPTICAL PATH DIAGRAM OF EXAMPLE 9

SPHERICAL ABERRATION (SINGLE COLOR) OF EXAMPLE 9
PUPIL RADIUS : 0.6507 MILLIMETERS

LOGITUDINAL ABERRATION

TYPE_C_20091019
FRI JAN 8 2010
WAVELENGTHS : 0.546

C_091019 . ZMX
CONFIGURATION 1 OF 5

ASTIGMATISM (SINGLE COLOR) AND DISTORTION (SINGLE COLOR) OF EXAMPLE 9

FIELD UNITS CHANGED TO FIELD ANGLE
FIELD CURVATURE / F-TAN(THETA) DISTORTION
TYPE_C_20091019
FRI JAN 8 2010
MAXIMUM FIELD IS 31.143 DEGREES
WAVWLENGTH : 0.546

C_091019 . ZMX
CONFIGURATION 1 OF 5

COMA ABERRATION (SINGLE COLOR) OF EXAMPLE 9

TRANSVERSE RAY FAN PLOT

TYPE_C_20091019
FRI JAN 8 2010
MAXIMUM SCALE ; ±25.000 μM.
0.546

SURFACE : IMAGE

C_091019 . ZMX
CONFIGURATION 1 OF 5

SPOT DIAGRAM (SINGLE COLOR) OF EXAMPLE 9

THROUGH FOCUS SPOT DIAGRAM
TYPE_C_20091019
FRI JAN 8 2010 UNITS ARE $\mu$m.
FIELD      :      1         2         3
RMS RADIUS: 11.281    10.859    12.687
GEO RADIUS: 24.314    30.139    37.340                C_091019 . ZMX
SCALE BAR  :  200         REFERENCE : CHIEF RAY    CONFIGURATION 1 OF 5

DEPTH MTF (179 LINE/mm) (SINGLE COLOR, AXIAL) OF EXAMPLE 9

DIFFRACTION THROUGH FOCUS MTF
TYPE_C_20091019
FRI JAN 8 2010
DATA FOR 0.5460 μm.          C_091019.ZMX
SPATIAL FREQUENCY : 179.0000 CYCLES PER MM.  CONFIGURATION 1 OF 5

DEPTH MTF (90 LINE/mm) (SINGLE COLOR) OF EXAMPLE 9

DIFFRACTION THROUGH FOCUS MTF
TYPE_C_20091019
FRI JAN 8 2010
DATA FOR 0.5460 μm.
SPATIAL FREQUENCY : 90.0000 CYCLES PER MM.
C_091019 . ZMX
CONFIGURATION 1 OF 5

DEPTH MTF (179 LINE/mm) (SINGLE COLOR) OF EXAMPLE 9

LIGHT INTENSITY DISTRIBUTION OF POINT IMAGE AND
BASE POINT IMAGE DIAMETER psfϕ OF EXAMPLE 9

SPHERICAL ABERRATION OF EXAMPLE 9

OPTICAL PATH DIAGRAM OF EXAMPLE 10

SPHERICAL ABERRATION (SINGLE COLOR) OF EXAMPLE 10
PUPIL RADIUS : 0.6507 MILLIMETERS

LOGITUDINAL ABERRATION

TYPE_D_20091019
FRI JAN 8 2010
WAVELENGTHS : 0.546

D_091019 . ZMX
CONFIGURATION 1 OF 5

ASTIGMATISM (SINGLE COLOR) AND DISTORTION (SINGLE COLOR) OF EXAMPLE 10

FIELD UNITS CHANGED TO FIELD ANGLE
FIELD CURVATURE / F-TAN(THETA) DISTORTION
TYPE_D_20091019
FRI JAN 8 2010
MAXIMUM FIELD IS 31.132 DEGREES
WAVWLENGTH : 0.546

D_091019 . ZMX
CONFIGURATION 1 OF 5

COMA ABERRATION (SINGLE COLOR) OF EXAMPLE 10

TRANSVERSE RAY FAN PLOT

TYPE_D_20091019
FRI JAN 8 2010
MAXIMUM SCALE ; ±25.000 μM.
0.546

SURFACE : IMAGE

D_091019 . ZMX
CONFIGURATION 1 OF 5

SPOT DIAGRAM (SINGLE COLOR) OF EXAMPLE 10

THROUGH FOCUS SPOT DIAGRAM
TYPE_D_20091019
FRI JAN 8 2010 UNITS ARE μm.
FIELD       :      1         2         3
RMS RADIUS:  15.253    16.114    23.461
GEO RADIUS:  42.368    81.749   138.840          D_091019.ZMX
SCALE BAR :  200           REFERENCE : CHIEF RAY   CONFIGURATION 1 OF 5

DEPTH MTF (90 LINE/mm) (SINGLE COLOR, AXIAL) OF EXAMPLE 10

DIFFRACTION THROUGH FOCUS MTF
TYPE_D_20091019
FRI JAN 8 2010
DATA FOR 0.5460 μm.                              D_091019.ZMX
SPATIAL FREQUENCY : 90.0000 CYCLES PER MM.   CONFIGURATION 1 OF 5

DEPTH MTF (179 LINE/mm) (SINGLE COLOR, AXIAL) OF EXAMPLE 10

DIFFRACTION THROUGH FOCUS MTF
TYPE_D_20091019
FRI JAN 8 2010
DATA FOR 0.5460 μm.  D_091019 . ZMX
SPATIAL FREQUENCY : 179.0000 CYCLES PER MM.  CONFIGURATION 1 OF 5

DEPTH MTF (90 LINE/mm) (SINGLE COLOR) OF EXAMPLE 10

DIFFRACTION THROUGH FOCUS MTF
TYPE_D_20091019
FRI JAN 8 2010
DATA FOR 0.5460 μm.                                      D_091019.ZMX
SPATIAL FREQUENCY : 90.0000 CYCLES PER MM.    CONFIGURATION 1 OF 5

FIG.14L
LIGHT INTENSITY DISTRIBUTION OF POINT IMAGE AND
BASE POINT IMAGE DIAMETER psfφ OF EXAMPLE 10
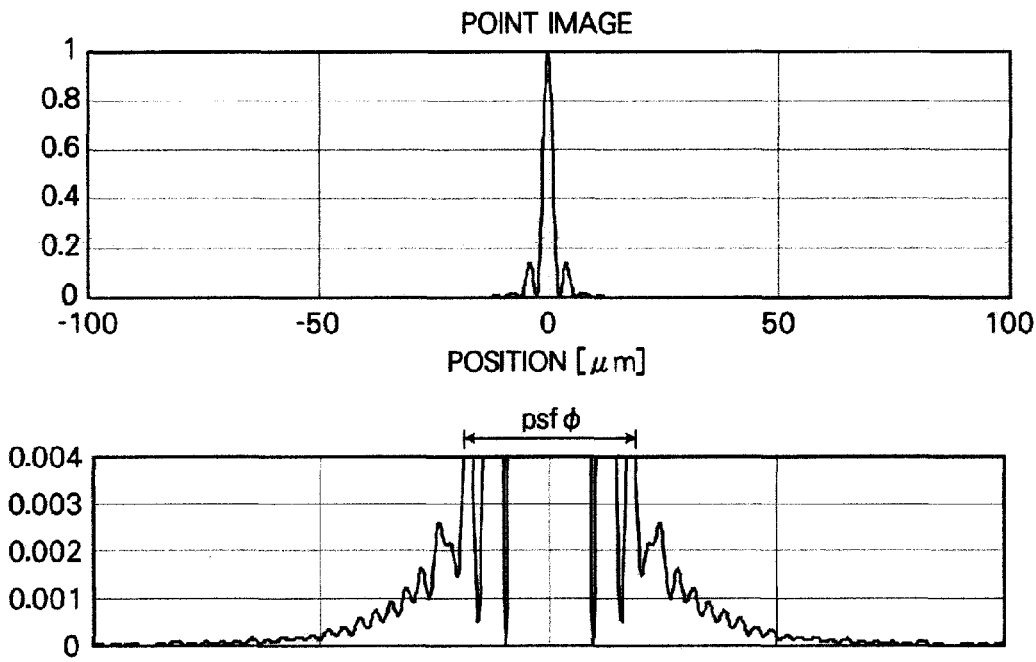
SPHERICAL ABERRATION OF EXAMPLE 10
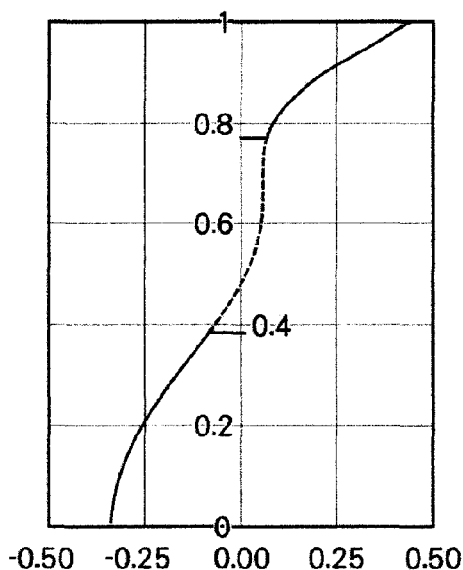
FIG.14M

OPTICAL PATH DIAGRAM OF EXAMPLE 11

SPHERICAL ABERRATION (SINGLE COLOR) OF EXAMPLE 11
PUPIL RADIUS : 0.6507 MILLIMETERS

LOGITUDINAL ABERRATION

MOTO20091015
FRI JAN 8 2010
WAVELENGTHS : 0.546

E_091019 . ZMX
CONFIGURATION 1 OF 5

ASTIGMATISM (SINGLE COLOR) AND DISTORTION (SINGLE COLOR) OF EXAMPLE 11

FIELD UNITS CHANGED TO FIELD ANGLE
FIELD CURVATURE / F-TAN(THETA) DISTORTION
MOTO20091015
FRI JAN 8 2010
MAXIMUM FIELD IS 31.252 DEGREES
WAVWLENGTH : 0.546

E_091019.ZMX
CONFIGURATION 1 OF 5

SPOT DIAGRAM (SINGLE COLOR) OF EXAMPLE 11

THROUGH FOCUS SPOT DIAGRAM

```
MOTO20091015
FRI JAN 8 2010  UNITS ARE μm.
FIELD      :      1       2       3
RMS RADIUS:   10.398  12.001  14.223
GEO RADIUS:   19.403  43.003  68.717        E_091019.ZMX
SCALE BAR :    200         REFERENCE : CHIEF RAY    CONFIGURATION 1 OF 5
```

DEPTH MTF (90 LINE/mm) (SINGLE COLOR) OF EXAMPLE 11

DIFFRACTION THROUGH FOCUS MTF

MOTO20091015
FRI JAN 8 2010
DATA FOR 0.5460 μm.   E_091019 . ZMX
SPATIAL FREQUENCY : 90.0000 CYCLES PER MM .   CONFIGURATION 1 OF 5

FIG. 15L
LIGHT INTENSITY DISTRIBUTION OF POINT IMAGE AND
BASE POINT IMAGE DIAMETER psfφ OF EXAMPLE 11
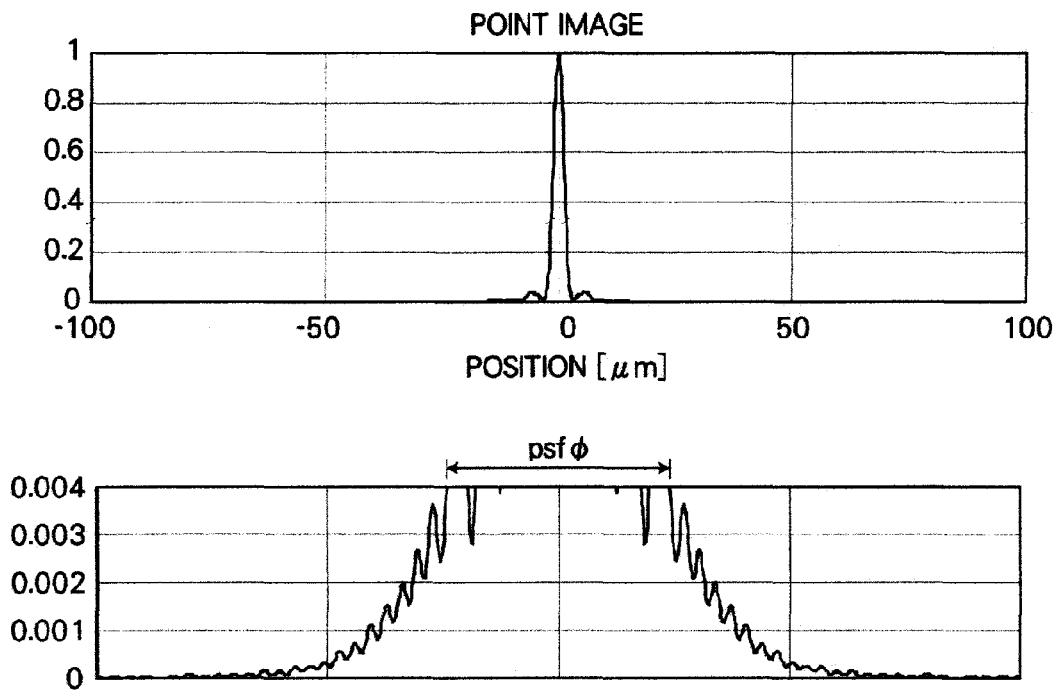
SPHERICAL ABERRATION OF EXAMPLE 11
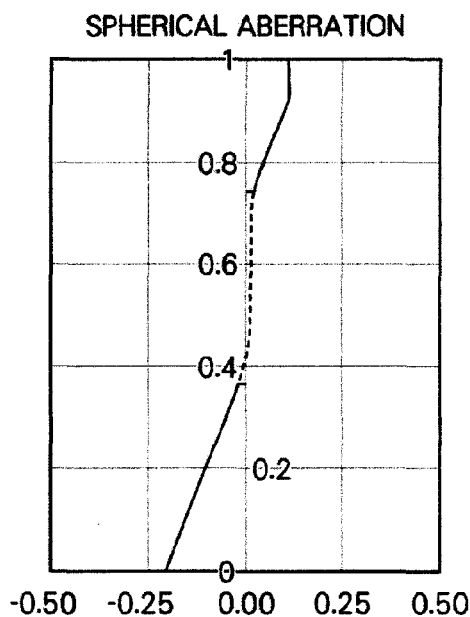
FIG. 15M

OPTICAL PATH DIAGRAM OF EXAMPLE 12

SPHERICAL ABERRATION (SINGLE COLOR) OF EXAMPLE 12
PUPIL RADIUS : 0.6507 MILLIMETERS

LOGITUDINAL ABERRATION

MOTO20091015
TUE JAN 12 2010
WAVELENGTHS : 0.546

E_091019A.ZMX
CONFIGURATION 1 OF 5

ASTIGMATISM (SINGLE COLOR) AND DISTORTION (SINGLE COLOR) OF EXAMPLE 12

FIELD UNITS CHANGED TO FIELD ANGLE
FIELD CURVATURE / F-TAN(THETA) DISTORTION
MOTO20091015
TUE JAN 12 2010
MAXIMUM FIELD IS 31.357 DEGREES
WAVWLENGTH : 0.546

E_091019A . ZMX
CONFIGURATION 1 OF 5

COMA ABERRATION (SINGLE COLOR) OF EXAMPLE 12

TRANSVERSE RAY FAN PLOT

MOTO20091015
TUE JAN 12 2010
MAXIMUM SCALE ; ±25.000 μM.
0.546

SURFACE : IMAGE

E_091019A . ZMX
CONFIGURATION 1 OF 5

SPATIAL FREQUENCY MTF (SINGLE COLOR, AXIAL) OF EXAMPLE 12

DEPTH MTF (90 LINE/mm) (SINGLE COLOR, AXIAL) OF EXAMPLE 12

DEPTH MTF (179 LINE/mm) (SINGLE COLOR, AXIAL) OF EXAMPLE 12

DIFFRACTION THROUGH FOCUS MTF

MOTO20091015
TUE JAN 12 2010
DATA FOR 0.5460 μm.
SPATIAL FREQUENCY : 179.0000 CYCLES PER MM.

E_091019A . ZMX
CONFIGURATION 1 OF 5

FIG.16L
LIGHT INTENSITY DISTRIBUTION OF POINT IMAGE AND
BASE POINT IMAGE DIAMETER psfφ OF EXAMPLE 12
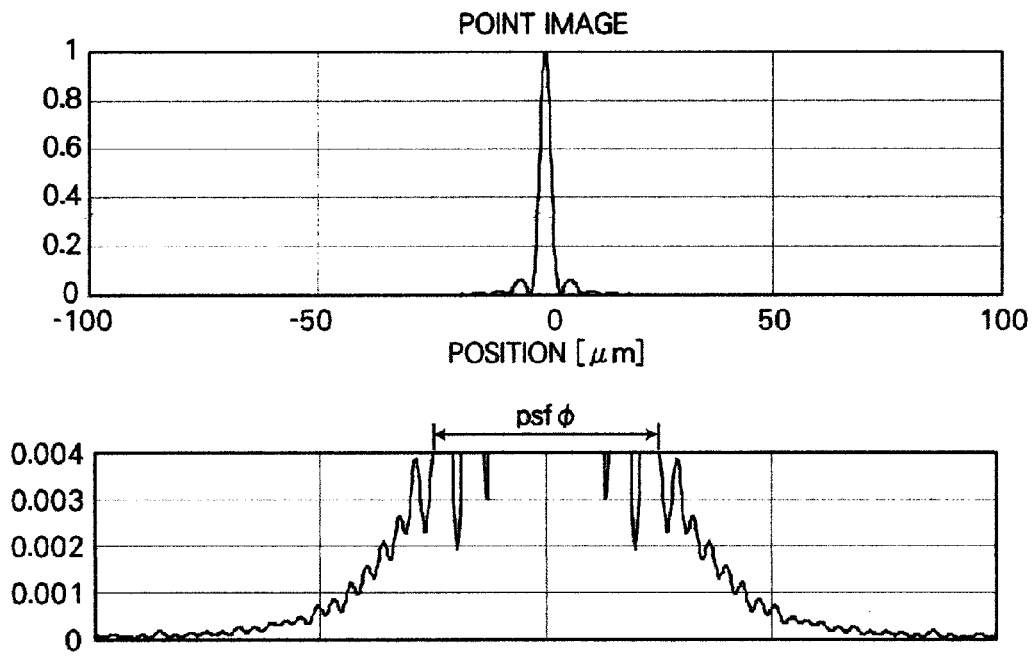
SPHERICAL ABERRATION OF EXAMPLE 12
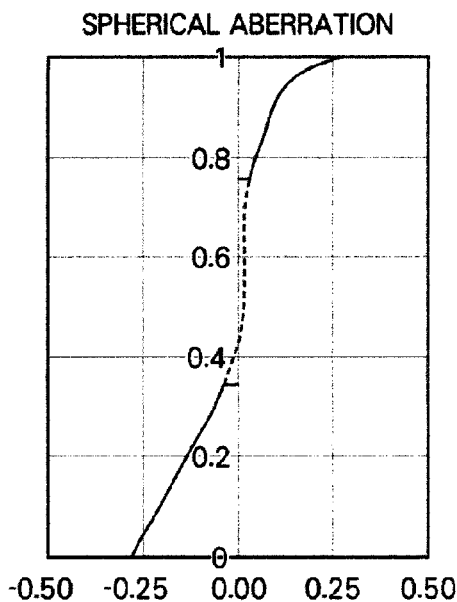
FIG.16M

OPTICAL PATH DIAGRAM OF EXAMPLE 13

SPHERICAL ABERRATION (SINGLE COLOR) OF EXAMPLE 13
PUPIL RADIUS : 0.6507 MILLIMETERS

LOGITUDINAL ABERRATION

MOTO20091007
TUE JAN 12 2010
WAVELENGTHS : 0.546

F_091007 . ZMX
CONFIGURATION 1 OF 5

ASTIGMATISM (SINGLE COLOR) AND DISTORTION (SINGLE COLOR) OF EXAMPLE 13

FIELD UNITS CHANGED TO FIELD ANGLE
FIELD CURVATURE / F-TAN(THETA) DISTORTION
MOTO20091007
TUE JAN 12 2010
MAXIMUM FIELD IS 31.442 DEGREES
WAVWLENGTH : 0.546

F_091007 . ZMX
CONFIGURATION 1 OF 5

COMA ABERRATION (SINGLE COLOR) OF EXAMPLE 13

TRANSVERSE RAY FAN PLOT

MOTO20091007
TUE JAN 12 2010
MAXIMUM SCALE ; ±25.000 μM.
0.546

SURFACE : IMAGE

F_091007 . ZMX
CONFIGURATION 1 OF 5

SPOT DIAGRAM (SINGLE COLOR) OF EXAMPLE 13

THROUGH FOCUS SPOT DIAGRAM

```
MOTO20091007
TUE JAN 12 2010 UNITS ARE μm.
FIELD    :      1       2       3
RMS RADIUS:  10.575  11.403  10.448
GEO RADIUS:  21.510  29.512  33.449          F_091007 . ZMX
SCALE BAR :    200          REFERENCE : CHIEF RAY   CONFIGURATION 1 OF 5
```

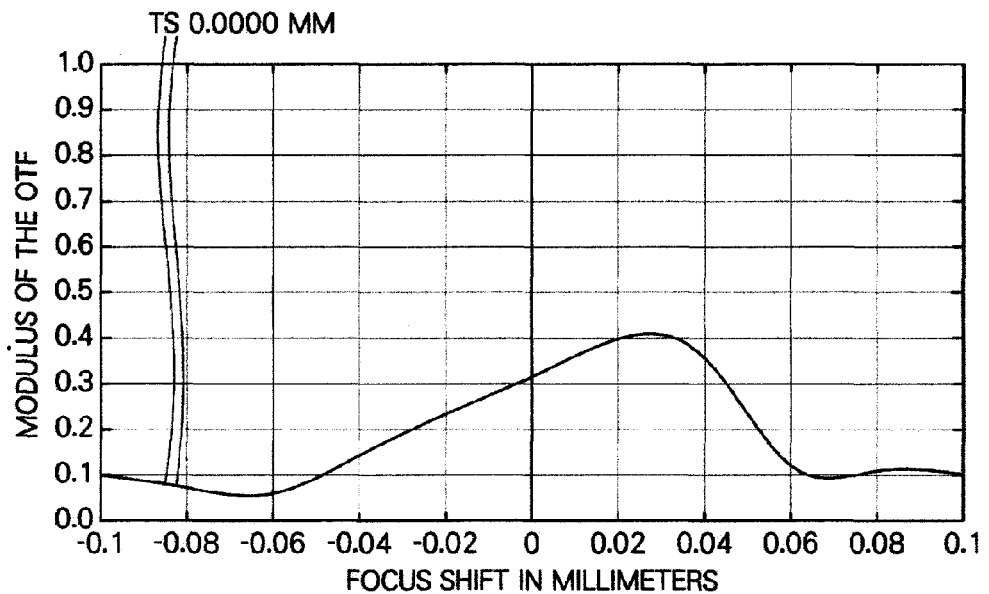

DEPTH MTF (90 LINE/mm) (SINGLE COLOR) OF EXAMPLE 13

DIFFRACTION THROUGH FOCUS MTF
MOTO20091007
TUE JAN 12 2010
DATA FOR 0.5460 μm.
SPATIAL FREQUENCY : 90.0000 CYCLES PER MM.
F_091007.ZMX
CONFIGURATION 1 OF 5

DEPTH MTF (179 LINE/mm) (SINGLE COLOR) OF EXAMPLE 13

DIFFRACTION THROUGH FOCUS MTF
MOTO20091007
TUE JAN 12 2010
DATA FOR 0.5460 μm.  F_091007.ZMX
SPATIAL FREQUENCY : 179.0000 CYCLES PER MM.  CONFIGURATION 1 OF 5

FIG.17L
LIGHT INTENSITY DISTRIBUTION OF POINT IMAGE AND
BASE POINT IMAGE DIAMETER psfφ OF EXAMPLE 13
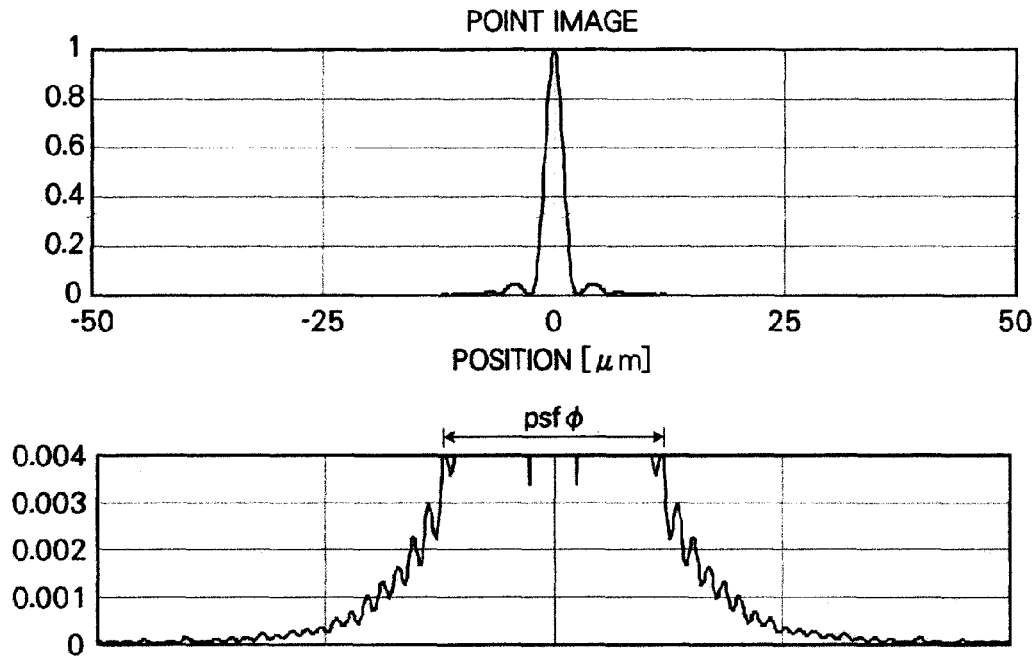
SPHERICAL ABERRATION OF EXAMPLE 13
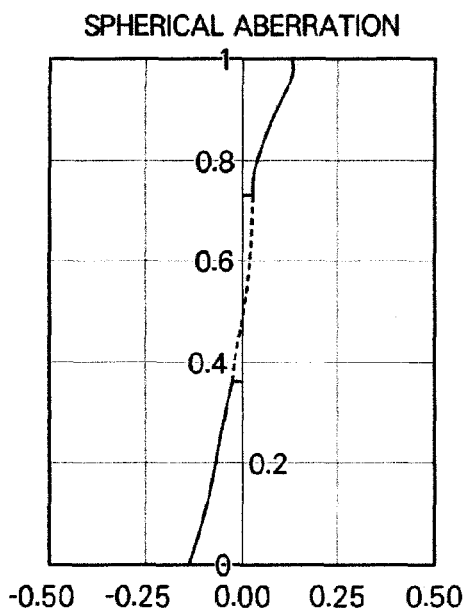
FIG.17M

OPTICAL PATH DIAGRAM OF EXAMPLE 14

SPHERICAL ABERRATION (SINGLE COLOR) OF EXAMPLE 14
PUPIL RADIUS : 0.6507 MILLIMETERS

LOGITUDINAL ABERRATION

MOTO20091014
TUE JAN 12 2010
WAVELENGTHS : 0.546

F_091014 . ZMX
CONFIGURATION 1 OF 5

ASTIGMATISM (SINGLE COLOR) AND DISTORTION (SINGLE COLOR) OF EXAMPLE 14

FIELD UNITS CHANGED TO FIELD ANGLE
FIELD CURVATURE / F-TAN(THETA) DISTORTION
MOTO20091014
TUE JAN 12 2010
MAXIMUM FIELD IS 31.193 DEGREES
WAVWLENGTH : 0.546

F_091014 . ZMX
CONFIGURATION 1 OF 5

COMA ABERRATION (SINGLE COLOR) OF EXAMPLE 14

TRANSVERSE RAY FAN PLOT

MOTO20091014
TUE JAN 12 2010
MAXIMUM SCALE ; ±25.000 μM .
0.546

SURFACE : IMAGE

F_091014 . ZMX
CONFIGURATION 1 OF 5

SPOT DIAGRAM (SINGLE COLOR) OF EXAMPLE 14

THROUGH FOCUS SPOT DIAGRAM
MOTO20091014
TUE JAN 12 2010 UNITS ARE μm.
FIELD      :      1        2        3
RMS RADIUS:  12.618   25.969   25.895
GEO RADIUS:  28.625  180.812  159.322         F_091014 . ZMX
SCALE BAR :    200         REFERENCE : CHIEF RAY   CONFIGURATION 1 OF 5

DEPTH MTF (90 LINE/mm) (SINGLE COLOR, AXIAL) OF EXAMPLE 14

DEPTH MTF (90 LINE/mm) (SINGLE COLOR) OF EXAMPLE 14

DIFFRACTION THROUGH FOCUS MTF
MOTO20091014
TUE JAN 12 2010
DATA FOR 0.5460 μm.
SPATIAL FREQUENCY : 90.0000 CYCLES PER MM.
F_091014.ZMX
CONFIGURATION 1 OF 5

DEPTH MTF (179 LINE/mm) (SINGLE COLOR) OF EXAMPLE 14

FIG. 18L
LIGHT INTENSITY DISTRIBUTION OF POINT IMAGE AND
BASE POINT IMAGE DIAMETER psfφ OF EXAMPLE 14
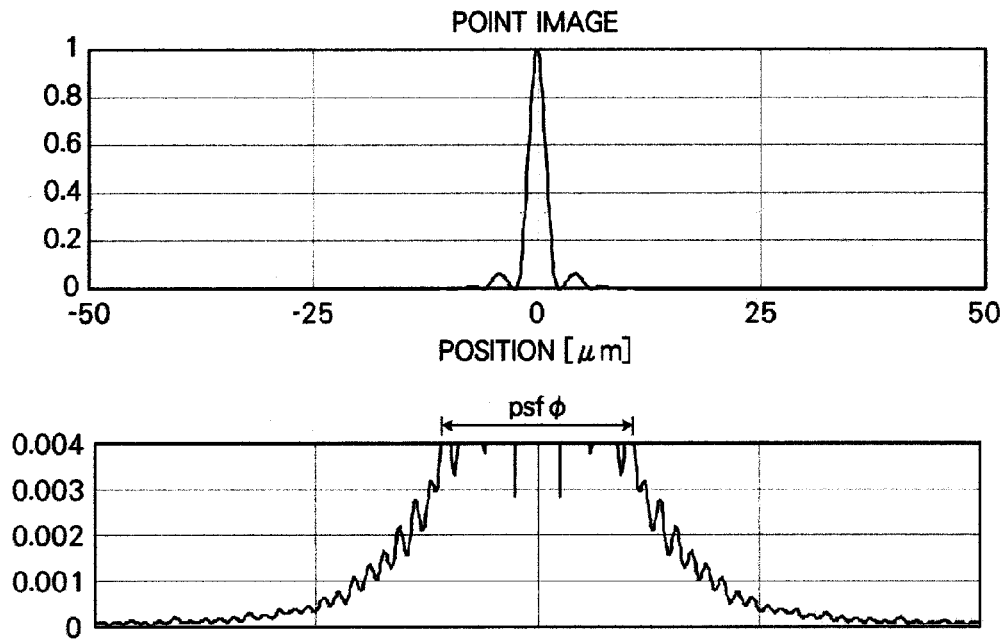
SPHERICAL ABERRATION OF EXAMPLE 14
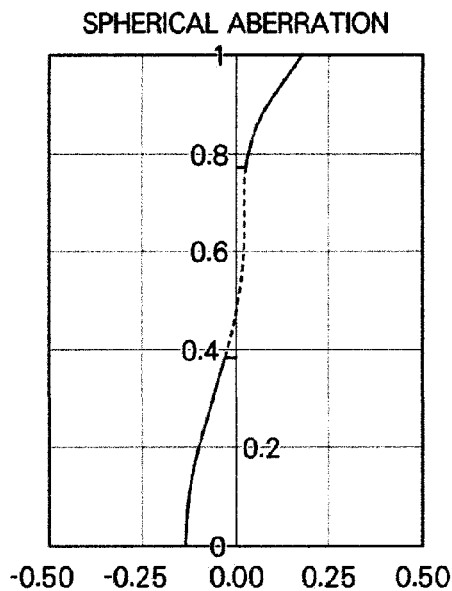
FIG. 18M

OPTICAL PATH DIAGRAM OF EXAMPLE 15

SPHERICAL ABERRATION (SINGLE COLOR) OF EXAMPLE 15
PUPIL RADIUS : 0.6507 MILLIMETERS

LOGITUDINAL ABERRATION

MOTO20091015
TUE JAN 12 2010
WAVELENGTHS : 0.546

F_091015 . ZMX
CONFIGURATION 1 OF 5

ASTIGMATISM (SINGLE COLOR) AND DISTORTION (SINGLE COLOR) OF EXAMPLE 15

FIELD UNITS CHANGED TO FIELD ANGLE
FIELD CURVATURE / F-TAN(THETA) DISTORTION
MOTO20091015
TUE JAN 12 2010
MAXIMUM FIELD IS 31.219 DEGREES
WAVWLENGTH : 0.546

F_091015 . ZMX
CONFIGURATION 1 OF 5

COMA ABERRATION (SINGLE COLOR) OF EXAMPLE 15

TRANSVERSE RAY FAN PLOT

MOTO20091015
TUE JAN 12 2010
MAXIMUM SCALE ; ±25.000 μM .
0.546

SURFACE : IMAGE

F_091015 . ZMX
CONFIGURATION 1 OF 5

SPOT DIAGRAM (SINGLE COLOR) OF EXAMPLE 15

SURFACE : IMA    <- DEFOCUS IN μm ->

THROUGH FOCUS SPOT DIAGRAM

```
MOTO20091015
TUE JAN 12 2010 UNITS ARE μm.
FIELD      :      1       2        3
RMS RADIUS: 13.854   11.668   17.164
GEO RADIUS: 32.890   41.097   82.146            F_091015 . ZMX
SCALE BAR :   200          REFERENCE : CHIEF RAY    CONFIGURATION 1 OF 5
```

SPATIAL FREQUENCY MTF (SINGLE COLOR, AXIAL) OF EXAMPLE 15

DIFFRACTION MTF

MOTO20091015
TUE JAN 12 2010
DATA FOR 0.5460 μm.
SURFACE : IMAGE

F_091015 . ZMX
CONFIGURATION 1 OF 5

FIG.19L
LIGHT INTENSITY DISTRIBUTION OF POINT IMAGE AND
BASE POINT IMAGE DIAMETER psfφ OF EXAMPLE 15
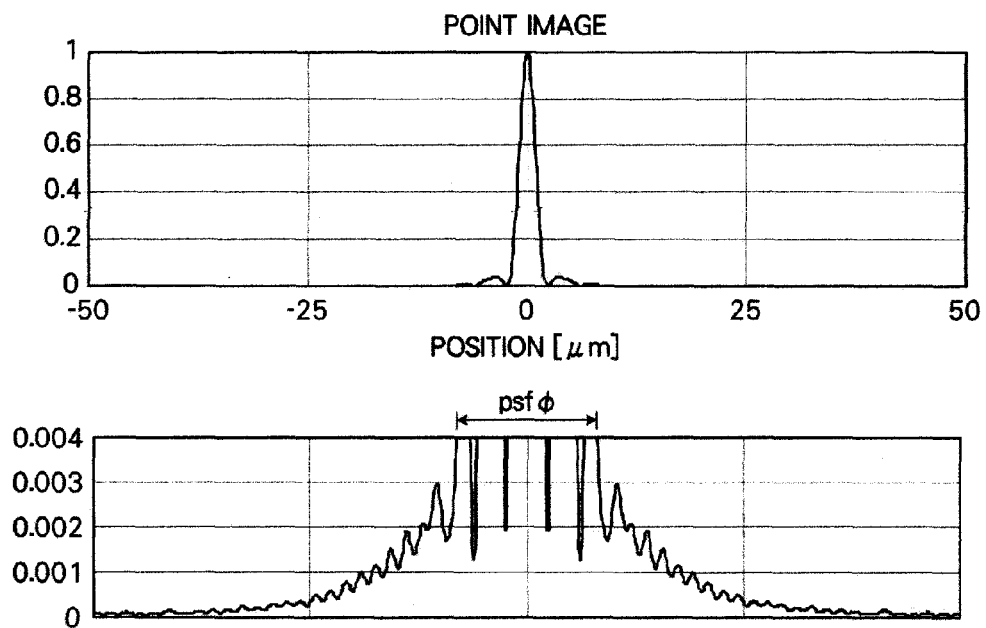
SPHERICAL ABERRATION OF EXAMPLE 15
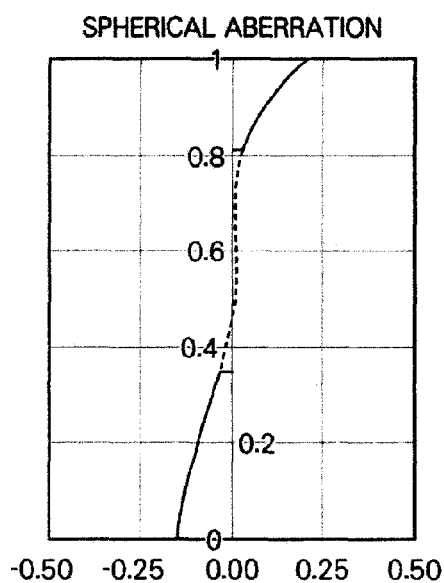
FIG.19M

OPTICAL PATH DIAGRAM OF EXAMPLE 16

SPHERICAL ABERRATION (SINGLE COLOR) OF EXAMPLE 16
PUPIL RADIUS : 0.6507 MILLIMETERS

LOGITUDINAL ABERRATION

TYPE_H_20091026
TUE JAN 12 2010
WAVELENGTHS : 0.546

OVI_091026 . ZMX
CONFIGURATION 1 OF 5

ASTIGMATISM (SINGLE COLOR) AND DISTORTION (SINGLE COLOR) OF EXAMPLE 16

FIELD UNITS CHANGED TO FIELD ANGLE
　　　　FIELD CURVATURE / F-TAN(THETA) DISTORTION
TYPE_H_20091026
TUE JAN 12 2010
MAXIMUM FIELD IS 30.926 DEGREES　　　　　　　OV1_091026 . ZMX
WAVWLENGTH : 0.546　　　　　　　　　　　　CONFIGURATION 1 OF 5

COMA ABERRATION (SINGLE COLOR) OF EXAMPLE 16

TRANSVERSE RAY FAN PLOT

TYPE_H_20091026
TUE JAN 12 2010
MAXIMUM SCALE ; ±25.000 μM.
0.546

SURFACE : IMAGE

OV1_091026 . ZMX
CONFIGURATION 1 OF 5

SPOT DIAGRAM (SINGLE COLOR) OF EXAMPLE 16

THROUGH FOCUS SPOT DIAGRAM

```
TYPE_H_20091026
TUE JAN 12 2010 UNITS ARE μm.
FIELD    :     1       2       3
RMS RADIUS: 14.994  48.862  45.365
GEO RADIUS: 27.636 155.275 184.146        OV1_091026.ZMX
SCALE BAR :   200         REFERENCE : CHIEF RAY   CONFIGURATION 1 OF 5
```

SPATIAL FREQUENCY MTF (SINGLE COLOR, AXIAL) OF EXAMPLE 16

DIFFRACTION MTF
TYPE_H_20091026
TUE JAN 12 2010
DATA FOR 0.5460 μm.
SURFACE : IMAGE

OV1_091026 . ZMX
CONFIGURATION 1 OF 5

DEPTH MTF (90 LINE/mm) (SINGLE COLOR, AXIAL) OF EXAMPLE 16

DEPTH MTF (179 LINE/mm) (SINGLE COLOR, AXIAL) OF EXAMPLE 16

DIFFRACTION THROUGH FOCUS MTF
TYPE_H_20091026
TUE JAN 12 2010
DATA FOR 0.5460 μm.　　　　　　　　　　　　OV1_091026 . ZMX
SPATIAL FREQUENCY : 179.0000 CYCLES PER MM.　CONFIGURATION 1 OF 5

DEPTH MTF (90 LINE/mm) (SINGLE COLOR) OF EXAMPLE 16

DIFFRACTION THROUGH FOCUS MTF
TYPE_H_20091026
TUE JAN 12 2010
DATA FOR 0.5460 μm.
SPATIAL FREQUENCY : 90.0000 CYCLES PER MM.
OV1_091026.ZMX
CONFIGURATION 1 OF 5

FIG.20L
LIGHT INTENSITY DISTRIBUTION OF POINT IMAGE AND
BASE POINT IMAGE DIAMETER psfφ OF EXAMPLE 16
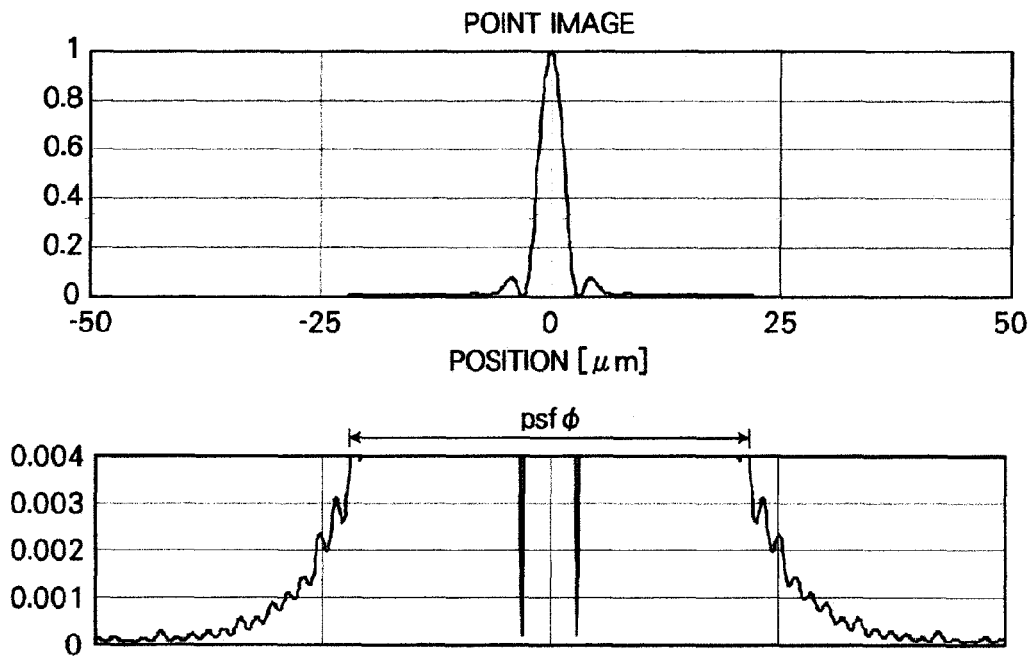
SPHERICAL ABERRATION OF EXAMPLE 16
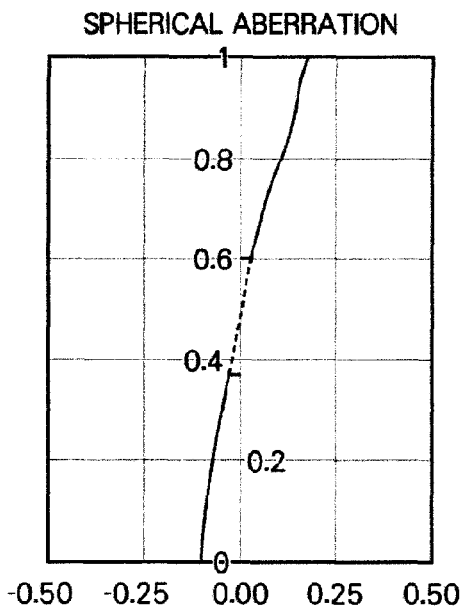
FIG.20M

OPTICAL PATH DIAGRAM OF EXAMPLE 17

SPHERICAL ABERRATION (SINGLE COLOR) OF EXAMPLE 17
PUPIL RADIUS : 0.6507 MILLIMETERS

LOGITUDINAL ABERRATION

UD1_091026
TUE JAN 12 2010
WAVELENGTHS : 0.546

UD1_091026 . ZMX
CONFIGURATION 1 OF 5

ASTIGMATISM (SINGLE COLOR) AND DISTORTION (SINGLE COLOR) OF EXAMPLE 17

FIELD UNITS CHANGED TO FIELD ANGLE
  FIELD CURVATURE / F-TAN(THETA) DISTORTION
UD1_091026
TUE JAN 12 2010
MAXIMUM FIELD IS 30.949 DEGREES
WAVWLENGTH : 0.546

UD1_091026 . ZMX
CONFIGURATION 1 OF 5

SPOT DIAGRAM (SINGLE COLOR) OF EXAMPLE 17

THROUGH FOCUS SPOT DIAGRAM

UD1_091026
TUE JAN 12 2010 UNITS ARE μm.
FIELD       :    1         2         3
RMS RADIUS:  13.361    12.017    9.691
GEO RADIUS:  35.353    46.367    39.736         UD1_091026 . ZMX
SCALE BAR :   200          REFERENCE : CHIEF RAY    CONFIGURATION 1 OF 5

DEPTH MTF (90 LINE/mm) (SINGLE COLOR, AXIAL) OF EXAMPLE 17

DIFFRACTION THROUGH FOCUS MTF
UD1_091026
TUE JAN 12 2010
DATA FOR 0.5460 μm.
SPATIAL FREQUENCY : 90.0000 CYCLES PER MM.
UD1_091026.ZMX
CONFIGURATION 1 OF 5

FIG.21L
LIGHT INTENSITY DISTRIBUTION OF POINT IMAGE AND
BASE POINT IMAGE DIAMETER psfφ OF EXAMPLE 17
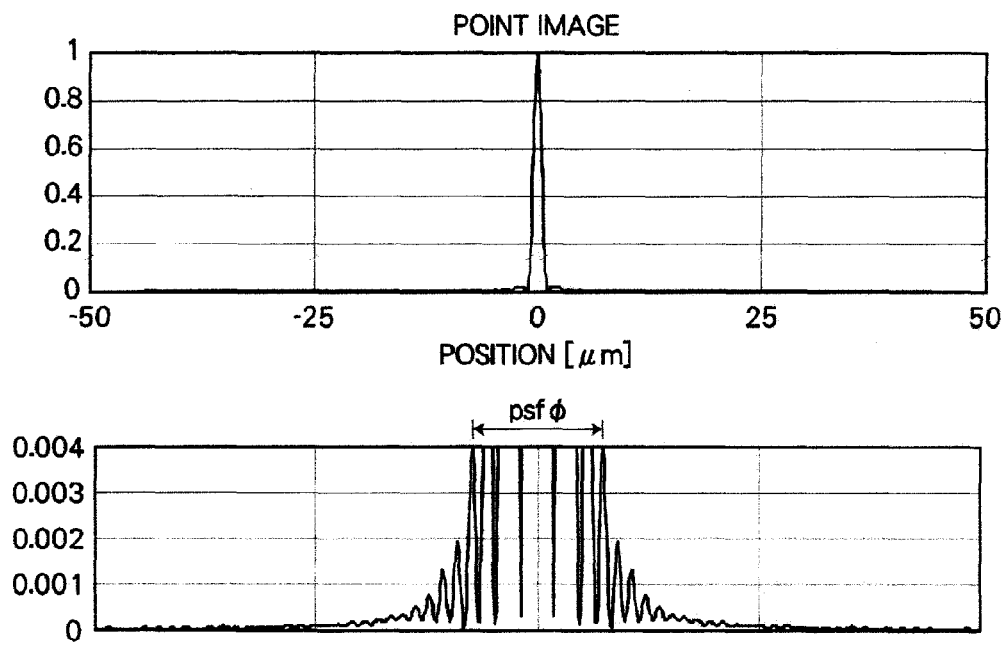
SPHERICAL ABERRATION OF EXAMPLE 17
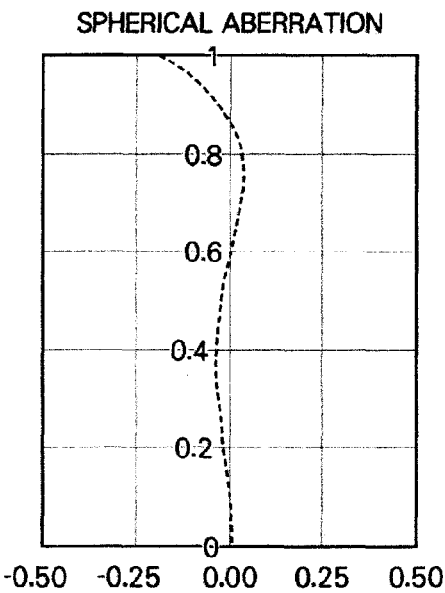
FIG.21M

OPTICAL PATH DIAGRAM OF EXAMPLE 18

SPHERICAL ABERRATION (SINGLE COLOR) OF EXAMPLE 18
PUPIL RADIUS : 0.9424 MILLIMETERS

LOGITUDINAL ABERRATION

UD1_091026
TUE JAN 12 2010
WAVELENGTHS : 0.546

TK2009_124569_1.ZMX
CONFIGURATION 1 OF 5

ASTIGMATISM (SINGLE COLOR) AND DISTORTION (SINGLE COLOR) OF EXAMPLE 18

FIELD UNITS CHANGED TO FIELD ANGLE
FIELD CURVATURE / F-TAN(THETA) DISTORTION
UD1_091026
TUE JAN 12 2010
MAXIMUM FIELD IS 22.330 DEGREES
WAVWLENGTH : 0.546

TK2009_124569_1 . ZMX
CONFIGURATION 1 OF 5

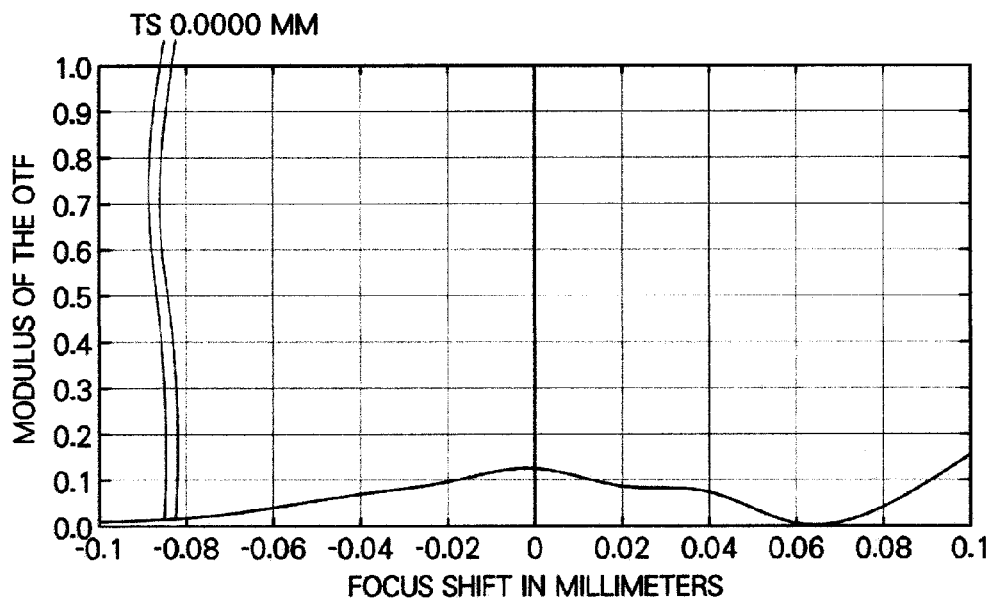

DEPTH MTF (90 LINE/mm) (SINGLE COLOR) OF EXAMPLE 18

FIG.22L
LIGHT INTENSITY DISTRIBUTION OF POINT IMAGE AND
BASE POINT IMAGE DIAMETER psfφ OF EXAMPLE 18
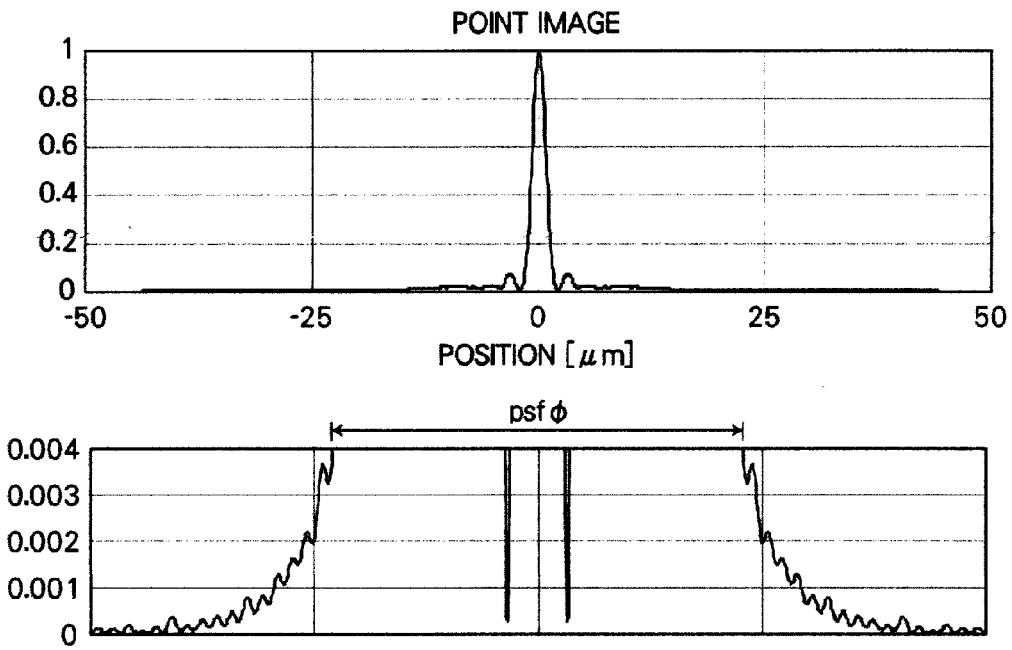
SPHERICAL ABERRATION OF EXAMPLE 18
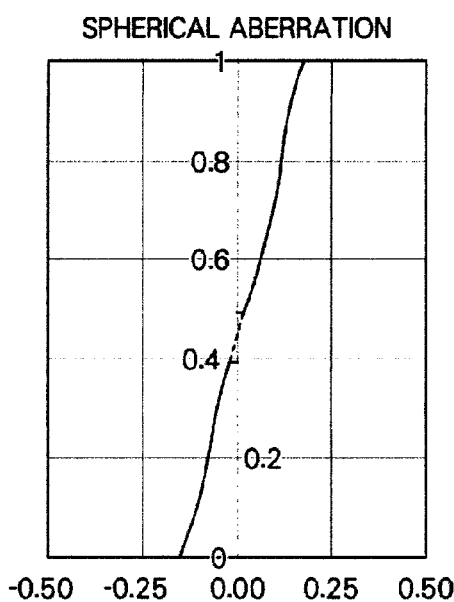
FIG.22M

OPTICAL PATH DIAGRAM OF EXAMPLE 19

SPHERICAL ABERRATION (SINGLE COLOR) OF EXAMPLE 19
PUPIL RADIUS : 0.6507 MILLIMETERS

LOGITUDINAL ABERRATION

TYPE_A_20091019
FRI JAN 8 2010
WAVELENGTHS : 0.546

G_100108C . ZMX
CONFIGURATION 1 OF 5

ASTIGMATISM (SINGLE COLOR) AND DISTORTION (SINGLE COLOR) OF EXAMPLE 19

FIELD UNITS CHANGED TO FIELD ANGLE
  FIELD CURVATURE / F-TAN(THETA) DISTORTION
TYPE_A_20091019
FRI JAN 8 2010
MAXIMUM FIELD IS 31.345 DEGREES          G_100108C . ZMX
WAVWLENGTH : 0.546                  CONFIGURATION 1 OF 5

COMA ABERRATION (SINGLE COLOR) OF EXAMPLE 19

TRANSVERSE RAY FAN PLOT

TYPE_A_20091019
FRI JAN 8 2010
MAXIMUM SCALE ; ±25.000 μM .
0.546

SURFACE : IMAGE

G_100108C . ZMX
CONFIGURATION 1 OF 5

SPOT DIAGRAM (SINGLE COLOR) OF EXAMPLE 19

THROUGH FOCUS SPOT DIAGRAM
TYPE_A_091019
TUE JAN 12 2010 UNITS ARE $\mu$m.
FIELD        :      1         2         3
RMS RADIUS:  19.801    21.165    18.248
GEO RADIUS:  47.646    72.794    67.634                G_1100108C.ZMX
SCALE BAR :   200            REFERENCE : CHIEF RAY     CONFIGURATION 1 OF 5

DEPTH MTF (179 LINE/mm) (SINGLE COLOR, AXIAL) OF EXAMPLE 19

DIFFRACTION THROUGH FOCUS MTF
TYPE_A_20091019
FRI JAN 8 2010
DATA FOR 0.5460 μm.    G_100108C.ZMX
SPATIAL FREQUENCY : 179.0000 CYCLES PER MM.    CONFIGURATION 1 OF 5

DEPTH MTF (90 LINE/mm) (SINGLE COLOR) OF EXAMPLE 19

DIFFRACTION THROUGH FOCUS MTF
TYPE_A_20091019
FRI JAN 8 2010
DATA FOR 0.5460 $\mu$m.
SPATIAL FREQUENCY : 90.0000 CYCLES PER MM.
G_100108C . ZMX
CONFIGURATION 1 OF 5

DEPTH MTF (179 LINE/mm) (SINGLE COLOR) OF EXAMPLE 19

DIFFRACTION THROUGH FOCUS MTF
TYPE_A_20091019
TRI JAN 8 2010
DATA FOR 0.5460 $\mu$m.    G_100108C.ZMX
SPATIAL FREQUENCY : 179.0000 CYCLES PER MM.    CONFIGURATION 1 OF 5

FIG.23L
LIGHT INTENSITY DISTRIBUTION OF POINT IMAGE AND
BASE POINT IMAGE DIAMETER psfφ OF EXAMPLE 19
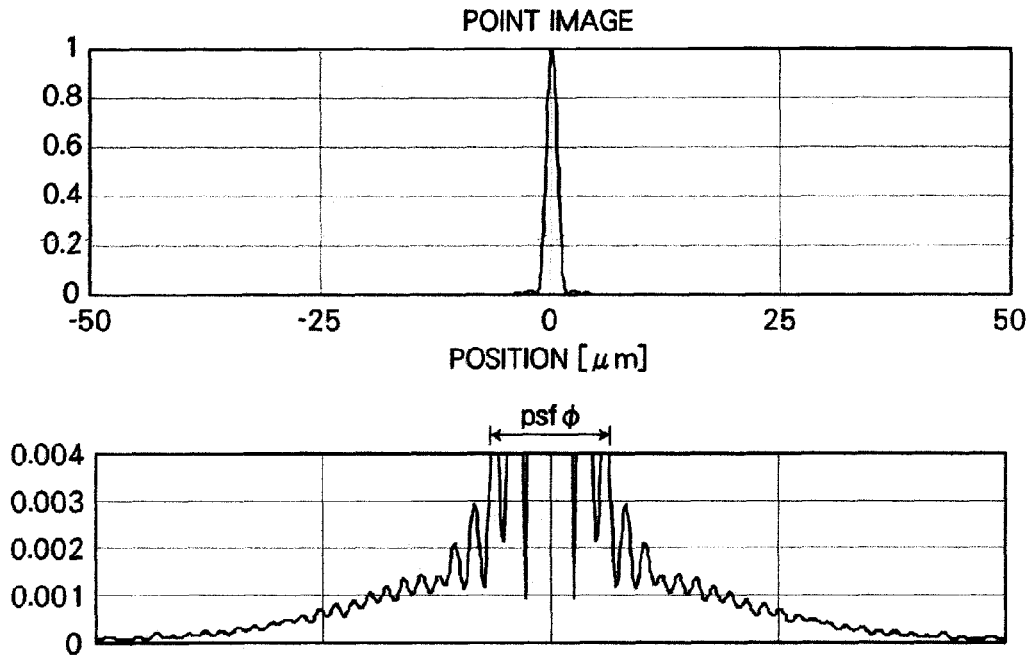
SPHERICAL ABERRATION OF EXAMPLE 19
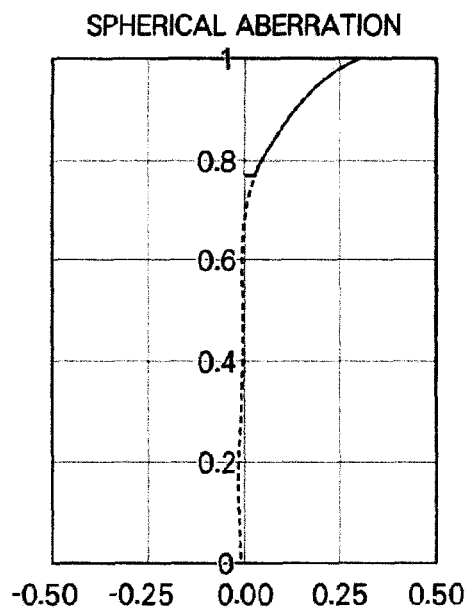
FIG.23M

IMAGING LENS AND IMAGING SYSTEM

BACKGROUND OF THE INVENTION

1. Field of the Invention

The present invention relates to an imaging lens and an imaging system. In particular, the present invention relates to an imaging lens used in an imaging apparatus that corrects blurs in an image by performing contrast recovery processing on original image data obtained by imaging, and an imaging system using the imaging lens.

2. Description of the Related Art

Conventionally, a technique of imaging an optical image through an imaging lens that is a depth-of-field extended optical system is known. In the technique, an original image in which a subject or subjects of photography are blurred for the entire distance of photography is obtained, and contrast recovery processing is performed on the original image to eliminate blurs in the original image. Specifically, a technique of increasing the contrast of the original image, thereby obtaining an image without blurs that is obtainable by a lens having a large depth of field is known. This type of lens is called as EDOF (Extended/Extension of Depth of Field/Focus) lens.

The contrast recovery processing corrects the original image obtained through the depth-of-field extended optical system. In the contrast recovery processing, a restoration filter the properties of which are opposite to the properties of blurs of images obtained by the depth-of-field extended optical system is applied to the original image. Consequently, the contrast of each subject arranged in a wide range of photography from a short distance to a long distance is increased (for example, the outline (edge) of the image becomes sharp and clear).

It is ideal that the depth-of-field extended optical system forms an optical image of a subject or subjects on an imaging plane in such a manner that a constant blur is given to the optical image, regardless of the distance of photography to the subject or subjects.

More specifically, the depth-of-field extended optical system forms point images on the imaging plane in such a manner that each of the point images representing a subject or subjects arranged at various photography distances is blurred at a constant degree (deteriorated point images having constant light intensity distribution), regardless of the distance of photography. Further, the contrast recovery processing is performed on an image obtained by imaging an optical image composed of the deteriorated point images having constant light intensity distribution (point scatter). The contrast recovery processing is performed on the image obtained by imaging the optical image so that an image composed of target point images (for example, point images having ideal light intensity distribution) is restored. The target point images have light intensity distribution that is a restoration target value of the deteriorated point images.

According to the technique as described above, it is possible to obtain a high contrast image in the entire area of the image (the depth of field of the image is extended) for a subject at any distance of photography without reducing the aperture of the imaging lens, in other words, without reducing a receiving light amount (please refer to Japanese Unexamined Patent Publication No. 2000-123168 (Patent Document 1), U.S. Patent Application Publication No. 20090128655 (Patent Document 2), U.S. Patent Application Publication No. 20090128668 (Patent Document 3), and Japanese Patent No. 3275010 (Patent Document 4).

As the contrast recovery processing, image restoration processing by Fourier transformation, edge enhancement processing, gamma correction processing, contrast enhancement processing, or the like is known to be adoptable, for example.

However, it is difficult to realize an ideal depth-of-field extended optical system that forms an optical image representing each point (each subject) to be photographed, as point images having constant light intensity distribution, regardless of the distance of photography.

Meanwhile, it is known that the depth of field of an optical system as it looks increases, as the spherical aberration of the optical system is increased. Therefore, the spherical aberration of an optical system may be simply increased so as to increase the depth of field as it looks, and the optical system may be used as a depth-of-field extended optical system.

However, when the spherical aberration of the optical system is increased, the diameter of a point image formed on an imaging plane increases as the spherical aberration increases. When a target point image is obtained by performing contrast recovery processing on the point image having a large diameter, more noise is included in the target point image as the diameter of the point image increases. Therefore, there is a problem that the amount of noise included in a blur recovery image composed of a multiplicity of target point images obtained by contrast recovery processing becomes large.

SUMMARY OF THE INVENTION

In view of the foregoing circumstances, it is an object of the present invention to provide an imaging lens that can increase the depth of field by performing contrast recovery processing on original image data obtained by imaging, while deterioration of the image quality of an image obtained by contrast recovery processing is suppressed. Further, it is another object of the present invention to provide an imaging system using the imaging lens.

A first imaging lens and a first imaging system according to the present invention will be described.

The first imaging lens of the present invention is an imaging lens used in an imaging apparatus that corrects a blur in an image by performing contrast recovery processing on original image data obtained by imaging, wherein the spherical aberration of the imaging lens changes from an object point side of an image plane base position toward the other side of the image plane base position as a distance from the optical axis of the imaging lens increases, and wherein the following formulas (1) and (2) are satisfied:

$$0.02 < a/f < 0.10 \quad (1); \text{ and}$$

$$0.02 < b/f \quad (2), \text{ where}$$

a: the magnitude of spherical aberration from the image plane base position toward the object point side thereof (maximum spherical aberration), the spherical aberration affecting a ray passing through a central part of the pupil of the imaging lens, b: a sum of a maximum spherical aberration from the image plane base position toward the object point side thereof and a maximum spherical aberration from the image plane base position toward the other side of the image plane base position, and f: the focal length of the imaging lens.

Specifically, the spherical aberration of the first imaging lens of the present invention is close to 10% of the focal length of the imaging lens at a central part of the pupil of the imaging lens, and the spherical aberration at the central part of the pupil is toward the front side (object point side, object side) of the image plane base position. Further, the imaging lens has spherical aberration toward the rear side of the image plane base position at positions away from the optical axis of the imaging lens. The first imaging lens of the present invention has spherical aberrations that are inconceivably large for ordinary lenses. Since the first imaging lens of the present invention has such large spherical aberrations, it is possible to suppress deterioration of the image quality of a blur-corrected image that has been obtained by performing contrast recovery processing on original image data obtained by imaging by using the imaging lens. Further, it is possible to extend the depth of field at the same time.

The contrast recovery processing is, for example, image restoration processing by Fourier transformation. The contrast recovery processing improves the sharpness of an image by enhancing the contrast of the image. More specifically, contrast recovery processing is performed, for example, in such a manner that the resolution of an image is recovered from 50 line/mm to 70 line/mm. As the contrast recovery processing, edge enhancement processing, gamma correction processing, contrast enhancement processing or the like may be adopted. Restoration processing using this kind of focal-depth extended optical system is described, in detail, in Patent Documents 1 through 4.

The central part of the pupil of the imaging lens is a region in which the spherical aberration is only toward the object point side of the image plane base position. The central part of the pupil of the imaging lens includes a region on the optical axis.

Further, when the radius of the pupil of the imaging lens is 1, it is desirable that the following formula (3) is satisfied:

$$0.1 < c < 1.0 \quad (3), \text{where}$$

c: a length of a region in a direction perpendicular to the optical axis, the region in which a deviation (shift amount) from the image plane base position by spherical aberration is less than or equal to $0.03 \times Fa/f$ (hereinafter, also referred to as spherical aberration minimum region), and Fa: the effective F-number of the imaging lens.

In other words, it is desirable that the imaging lens includes a region the spherical aberration of which is small in a predetermined range of the imaging lens in a direction perpendicular (orthogonal) to the optical axis, i.e., the direction of a height from the optical axis.

Further, it is desirable that the ratio of the area of the spherical aberration minimum region to the area of the entire region of the pupil of the imaging lens is greater than 0.20 and less than 0.75.

Further, it is desirable that the imaging lens satisfies all of the following formulas (4) through (6):

$$0.02 < a/f < 0.10 \quad (4);$$

$$0.02 < b/f < 0.2 \quad (5); \text{and}$$

$$0.1 < c < 0.6 \quad (6).$$

Further, it is desirable that the imaging lens satisfies the following formula (7):

$$0.30 < Yu < 0.90 \quad (7), \text{where}$$

Yu: the position of the spherical aberration minimum region in the direction perpendicular to the optical axis, in other words, the height of the spherical aberration minimum region from the optical axis. The formula (7) represents the range of the spherical aberration minimum region.

Further, it is desirable that the imaging lens satisfies the following formula (8):

$$3 < psf\phi/Fa < 15 \quad (8), \text{where}$$

psfφ: base point image diameter.

The image plane base position is a peak position of defocus MTF at ½ Nyquist spatial frequency of an imaging device that images an optical image formed through the imaging lens.

The ½ Nyquist spatial frequency is a spatial frequency when twice the pixel pitch of an imaging device that images an optical image formed through the imaging lens (two pixel pitch portion) corresponds to ½ cycle of the spatial frequency.

In examples that will be described later, Bayer pattern sensor (imaging device) of 1.4 μm pitch is assumed to be used for example. Therefore, the ½ Nyquist spatial frequency Nsω (½) of the sensor may be obtained by the following operation:

$$Ns\omega(½) = 1 \div 2 \div 1.4 \,\mu m \div 2 \approx 179 (\text{line/mm}).$$

When an imaging lens is used in an imaging apparatus that performs contrast recovery processing on original image data obtained by imaging to correct blurs in the image, it is general that the pixel pitch of an imaging device that is used in combination with the imaging lens is set in advance. However, when the pixel pitch of the imaging device that is used in combination with the imaging lens is not set in advance, the image plane base position may be regulated by the imaging lens alone.

Specifically, the image plane base position that is set by the imaging lens alone may be a peak position of defocus MTF at ¼ Nyquist spatial frequency of the imaging lens.

For example, when the imaging lens has F-number of 2.8 and design base wavelength of 587.6 nm, the ¼ Nyquist spatial frequency Nlω (¼) of the imaging lens may be obtained by the following formula:

$$Nl\omega(¼) = 1 \div 2.8 \div 587.6 \,nm \div 4 \approx 152(\text{line/mm}).$$

As described above, the sensor Nyquist spatial frequency is obtained by the formula:

Sensor Nyquist Spatial Frequency=1÷2÷Pixel Pitch.

Further, the lens Nyquist spatial frequency is obtained by the formula:

Lens Nyquist Spatial Frequency=1÷F-Number÷Wavelength.

When a ray comes from a point (object point) at a distance of photography at which the highest resolution should be obtained on the optical axis of the imaging lens, and passes through the imaging lens, a region (point image) of intersection at which the ray and a flat plane perpendicular to the optical axis cross each other is smallest or substantially smallest at the image plane base position. The image plane base position is a position of the flat plane perpendicular to the optical axis with respect to the direction of the optical axis.

Base point image diameter (psfφ) is the diameter of a point image formed at the image plane base position when a ray comes from a point (object point) at a distance of photography at which the highest resolution should be obtained on the optical axis of the imaging lens, and passes through the imaging lens.

Further, the direction perpendicular to the optical axis refers to a direction that is perpendicular (orthogonal) to the optical axis, in other words, the direction of the radius of the imaging lens. Further, a flat plane perpendicular to the optical axis refers to a flat plane (plane) that is perpendicular to the optical axis.

The imaging lens of the present invention may be an imaging lens comprising:

a first lens group composed of at least one lens, and which has positive power; and a second lens group composed of at least one lens, the first lens group and the second lens group being sequentially arranged from the object side of the imaging lens. Further, the most-image-side lens of the second lens group may have negative power on the optical axis thereof, and include a region in which negative power becomes weaker from an optical-axis-side of the region toward a peripheral side thereof.

Further, in the imaging lens, a first lens having positive power, a second lens having negative power, a third lens having positive power, and a fourth lens having negative power may be sequentially arranged from the object side of the imaging lens.

In the imaging lens, an image-plane-side surface of the fourth lens may be aspheric, and have an inflection point.

Alternatively, the image-plane-side surface of the fourth lens may be aspheric, and have an extreme point in a region other than the center of the optical axis.

A first imaging system of the present invention is an imaging system comprising:

a first imaging lens of the present invention;

an imaging device that images an optical image formed through the imaging lens; and an image processing means that performs contrast recovery processing on the original image data obtained by imaging the optical image by the imaging device, wherein the image processing means performs, as the contrast recovery processing, image restoration processing using Fourier transformation.

So far, the first imaging lens and the first imaging system of the present invention have been described.

Next, a second imaging lens and a second imaging system of the present invention will be described.

The second imaging lens of the present invention is an imaging lens used in an imaging apparatus that corrects a blur in an image by performing contrast recovery processing on original image data obtained by imaging, wherein the following formula (1') is satisfied:

$$0.015 < Zw \times Fa/f^2 < 0.030 \qquad (1'), \text{where}$$

Zw: common extended focal depth,

Fa: the effective F-number of the imaging lens, and f: the focal length of the imaging lens.

The contrast recovery processing is, for example, image restoration processing by Fourier transformation. The contrast recovery processing improves the sharpness of an image by enhancing the contrast of the image. More specifically, the contrast recovery processing is performed, for example, in such a manner that the resolution of an image is recovered from 50 line/mm to 70 line/mm. As the contrast recovery processing, edge enhancement processing, gamma correction processing, contrast enhancement processing or the like may also be adopted. Further, restoration processing using this kind of focal-depth extended optical system is described, in detail, in Patent Documents 1 through 4.

Specifically, the imaging lens of the present invention has a focal depth (common extended depth) that is inconceivably large for ordinary lenses. Since the imaging lens of the present invention has such large focal depth, it is possible to suppress deterioration of the image quality of a blur-corrected image obtained by performing contrast recovery processing on original image data that were obtained by imaging by using the imaging lens. Further, it is possible to extend the depth of field of the imaging lens at the same time.

The term "deterioration of the image quality" mainly refers to an increase of noise and an increase of artifact.

It is desirable that the imaging lens satisfies the following formula (2'):

$$0.015 < Zv4 \times Fa/f^2 < 0.035 \qquad (2'), \text{where,}$$

Zv4: ¼ Nyquist extended focal depth.

It is desirable that the imaging lens satisfies the following formula (3'):

$$0.011 < Zv2 \times Fa/f^2 < 0.030 \qquad (3'), \text{where}$$

Zv2: ½ Nyquist extended focal depth.

It is desirable that the imaging lens satisfies the following formula (4'):

$$Pi \times 7 \leq psf\phi \leq Pi \times 30 \qquad (4'), \text{where}$$

psfφ: base point image diameter, and

Pi: pixel pitch of an imaging device applied to the imaging apparatus.

It is desirable that the imaging lens is an imaging lens comprising:

a first lens group composed of at least one lens, and which has positive power; and a second lens group composed of at least one lens, the first lens group and the second lens group being sequentially arranged from the object side of the imaging lens. Further, it is desirable that the most-image-side lens of the second lens group has negative power on the optical axis thereof, and includes a region in which negative power becomes weaker from an optical-axis-side of the region toward a peripheral side thereof.

In the imaging lens, it is desirable that a first lens having positive power, a second lens having negative power, a third lens having positive power, and a fourth lens having negative power are sequentially arranged from the object side of the imaging lens.

Further, an image-plane-side surface of the fourth lens may be aspheric, and have an inflection point. Alternatively, the image-plane-side surface of the fourth lens may be aspheric, and have an extreme point in a region other than the center of the optical axis.

A second imaging system of the present invention is an imaging system comprising:

a second imaging lens of the present invention;

an imaging device that images an optical image formed through the imaging lens; and an image processing means that performs contrast recovery processing on the original image data obtained by imaging the optical image by the imaging device, wherein the image processing means performs, as the contrast recovery processing, image restoration processing using Fourier transformation.

The ¼ Nyquist extended focal depth relates to ¼ Nyquist spatial frequency, which will be described later. The ¼ Nyquist extended focal depth is a focal depth within the range of which an original image obtained through the imaging lens is recoverable by contrast recovering processing in such a manner that the image is practically usable or acceptable. The ¼ Nyquist extended focal depth is the extended focal depth of the imaging lens.

The ¼ Nyquist spatial frequency is a spatial frequency when four times the pixel pitch of an imaging device that images an optical image formed through the imaging lens (four pixel pitch portion) corresponds to ½ cycle of the spatial frequency.

The image that is practically usable or acceptable at ¼ Nyquist spatial frequency may be, for example, an image that has a contrast similar or equivalent to the contrast of an optical image formed through an image formation optical system, the MTF characteristic of which with respect to ¼ Nyquist spatial frequency is 0.2.

The image formation optical system is designed so that an optical image of a subject is accurately formed by reducing aberrations.

The ½ Nyquist extended focal depth relates to ½ Nyquist spatial frequency in a similar manner to the above descriptions. The ½ Nyquist extended focal depth is a focal depth within the range of which an original image obtained through the imaging lens is recoverable by contrast recovering processing in such a manner that the image is practically usable or acceptable. The ½ Nyquist extended focal depth is an extended focal depth of the imaging lens.

The ½ Nyquist spatial frequency is a spatial frequency when twice the pixel pitch of an imaging device that images an optical image formed through the imaging lens (two pixel pitch portion) corresponds to ½ cycle of the spatial frequency.

The image that is practically usable or acceptable at ½ Nyquist spatial frequency may be, for example, an image that has a contrast similar or equivalent to the contrast of an optical image formed through an image formation optical system, the MTF characteristic of which with respect to ½ Nyquist spatial frequency is 0.2, in a manner similar to the above case.

The common extended focal depth is a focal depth in the range of which the ¼ Nyquist extended focal depth of the imaging lens and the ½ Nyquist extended focal depth of the imaging lens overlap each other in the direction of the optical axis.

Base point image diameter (psfφ) is the diameter of a point image formed at the image plane base position when a ray comes from a point (object point) at a distance of photography at which the highest resolution should be obtained on the optical axis of the imaging lens, and passes through the imaging lens.

Further, the image plane base position is a peak position of defocus MTF at ½ Nyquist spatial frequency of an imaging device that images an optical image formed through the imaging lens.

The ½ Nyquist spatial frequency is a spatial frequency when twice the pixel pitch of an imaging device that images an optical image formed through the imaging lens (two pixel pitch portion) corresponds to ½ cycle of the spatial frequency.

In examples that will be described later, Bayer pattern sensor (imaging device) of 1.4 μm pitch is assumed to be used for example. Therefore, the ½ Nyquist spatial frequency $Ns\omega$ (½) of the sensor may be obtained by the following operation:

$$Ns\phi(½)=1\div 2\div 1.4 \mu m \div 2 \approx 179 (line/mm).$$

When an imaging lens is used in an imaging apparatus that performs contrast recovery processing on original image data obtained by imaging to correct blurs in the image, it is general that the pixel pitch of an imaging device that is used in combination with the imaging lens is set in advance. However, when the pixel pitch of the imaging device that is used in combination with the imaging lens is not set in advance, the image plane base position may be regulated by the imaging lens alone.

The image plane base position that is set by the imaging lens alone may be a peak position of defocus MTF at ¼ Nyquist spatial frequency of the imaging lens.

For example, when the imaging lens has F-number of 2.8 and design base wavelength of 587.6 nm, ¼ Nyquist spatial frequency $Nl\omega$(¼) of the imaging lens may be obtained by the following formula:

$$Nl\omega(¼)=1\div 2.8\div 587.6 nm \div 4 \approx 152 (line/mm).$$

As described above, the sensor Nyquist spatial frequency is obtained by the formula:

Sensor Nyquist Spatial Frequency=1÷2÷Pixel Pitch.

Further, the lens Nyquist spatial frequency is obtained by the formula:

Lens Nyquist Spatial Frequency=1÷F-Number÷Wavelength.

When a ray comes from a point (object point) at a distance of photography at which the highest resolution should be obtained on the optical axis of the imaging lens, and passes through the imaging lens, a region (point image) of intersection at which the ray and a flat plane perpendicular to the optical axis cross each other is smallest or substantially smallest at the image plane base position. The image plane base position is a position of the flat plane perpendicular to the optical axis with respect to the direction of the optical axis.

Ordinarily, the image plane base position is the same as a position at which an imaging plane of an imaging device for imaging an optical image of a subject formed through the imaging lens is placed.

The pixel pitch of an imaging device applied to an imaging apparatus is the pixel pitch of an imaging device that is used to obtain original image data by imaging an optical image formed through an imaging lens. When the imaging device includes pixels for red, pixels for green, pixels for blue and the like for respective colors, pixel pitches are set for respective colors.

So far, the second imaging lens and the second imaging system of the present invention have been described.

Next, advantageous effects of the first imaging lens and the first imaging system of the present invention will be described.

In the first imaging lens and the first imaging system of the present invention, in which contrast recovery processing is performed on original image data obtained by imaging by using the imaging lens to correct blurs in the image, it is possible to increase the depth of field, while the deterioration of the image quality is suppressed.

Specifically, the imaging lens that has the spherical aberrations as described above can condense, to the object point side of the image plane base position, a ray that comes from a far point (a subject located at long distance), which is a long photography distance, and that passes through the central part of the pupil of the imaging lens. Further, the imaging lens can condense, to the other side of the image plane base position (a side opposite to the object point side), a ray that comes from the far point and that passes through a peripheral part (a region close to the outer edge) of the pupil of the imaging lens. Further, the imaging lens can condense, to a position between the light condensing position on the object point side and the light condensing position on the other side, a ray that comes from the far point and that passes through a middle region between the central part and the peripheral part of the pupil of the imaging lens. Therefore, when the imaging plane is moved in the direction of the optical axis, it is possible to increase the distance of movement of the imaging plane in which blurs of an optical image formed on the imaging plane are regarded as being practically acceptable. In other words, it is possible to extend the focal depth. The focal depth that has been extended is referred to as extended focal depth.

In the range of the extended focal depth that is regarded as being practically acceptable, blurs are present in a blur image in such a manner that an image that is practically usable without any trouble is recoverable from the blur image by performing contrast recovery processing. Specifically, in the range of the extended focal depth, blurs are present in a blurred original image obtained by imaging an optical image formed through an imaging lens in such a manner that an image that has a contrast greater than or equal to a predetermined value is recoverable (sharpness is enhanced) (for example, a contrast similar or equivalent to the contrast of an optical image formed through an image formation optical system, the MTF characteristic of which is 0.2).

Therefore, when the imaging plane is arranged at a position included in both of an extended focal depth for a near point and an extended focal depth for a far point, it is possible to form both of an optical image of a near point and an optical image of a far point (blurred optical images that are regarded as being practically acceptable) on the imaging plane at the same time. Further, the blurs in the blurred optical image of the near point and the blurred optical image of the far point formed on the imaging plane are recovered by performing contrast recovery processing.

Specifically, even if point images formed on the imaging plane through the imaging lens of the present invention represent object points located at any positions within a wide photography target range from a near point to a far point, the imaging lens can suppress the sizes of the point images formed on the imaging plane in such a manner that the sizes are practically acceptable. Further, when contrast recovery processing is performed on original image data obtained by imaging the point images formed on the imaging plane, it is possible to correct the blurred original image by improving the contrast of the image, while mixture of noise into the corrected image is prevented (an image composed of a multiplicity of target point images is obtained). Accordingly, it is possible to increase and extend the depth of field of the imaging lens, while suppressing deterioration of the image quality of an image obtained by performing contrast recovery processing on original image data that have been obtained by imaging by using the imaging lens.

So far, the advantageous effects of the first imaging lens and the first imaging system of the present invention have been described.

Next, advantageous effects of the second imaging lens and the second imaging system of the present invention will be described.

In the second imaging lens and the second imaging system of the present invention, in which contrast recovery processing is performed on original image data obtained by imaging by using the imaging lens to correct blurs of the image, it is possible to extend (increase) the depth of field, while the deterioration of the image quality is suppressed.

The second imaging lens of the present invention is constructed in such a manner that when contrast recovery processing is performed on a blurred original image, an image having a predetermined value of contrast, and which is practically usable, is obtainable for both of ¼ Nyquist spatial frequency and ½ Nyquist spatial frequency, which are important in formation of an image. Therefore, it is possible to extend the depth of field of the imaging lens, while the deterioration of the image quality of an image generated by contrast recovery processing is suppressed.

Specifically, when an imaging plane on which an optical image is formed through the imaging lens is moved in the direction of the optical axis of the imaging lens, it is possible to extend the distance of movement (common extended focal depth) in the range of which blurs in the optical image formed on the imaging plane are regarded as being practically acceptable.

The range of the extended focal depth that is regarded as being practically acceptable is a range in which blurs are present in such a manner that an image that is practically usable without trouble is recoverable by performing contrast recovery processing. In other words, in the range of the extended focal depth, blurs are present in a blurred original image obtained by imaging an optical image formed through the imaging lens in such a manner that an image that has a contrast greater than or equal to a predetermined value is recoverable (sharpness is enhanced) (for example, a contrast similar or equivalent to the contrast of an optical image formed through an image formation optical system, the MTF characteristic of which is 0.2 for ½ Nyquist spatial frequency and ¼ Nyquist spatial frequency).

Therefore, when the imaging plane is arranged at a position included in both of the extended focal depth for a near point and the extended focal depth for a far point, it is possible to form both of an optical image of a near point and an optical image of a far point (blurred optical images that are regarded as being practically acceptable) at the same time. Further, the blurs in the blurred optical image of the near point and the blurred optical image of the far point, which are formed on the imaging plane, are corrected by performing contrast recovery processing.

Specifically, even if point images formed on the imaging plane through the imaging lens of the present invention represent object points located at any positions within a wide photography target range from a near point to a far point, the imaging lens can suppress the sizes of the point images formed on the imaging plane in such a manner that the sizes are practically acceptable. When contrast recovery processing is performed on original image data obtained by imaging the point images formed on the imaging plane, it is possible to correct the blurred original image by enhancing the contrast of the image, while mixture of noise into the corrected image is prevented (an image composed of a multiplicity of target point images is obtained). Accordingly, it is possible to extend the depth of field of the imaging lens, while suppressing deterioration of the image quality of an image obtained by performing contrast recovery processing on original image data that have been obtained by imaging by the imaging lens.

So far, the advantageous effects of the second imaging lens and the second imaging system of the present invention have been described.

BRIEF DESCRIPTION OF THE DRAWINGS

FIG. 4Ab is a diagram illustrating the optical paths of rays passing through the imaging lens of Reference Example 1;

FIG. 4Bb is a diagram illustrating the optical paths of rays passing through the imaging lens of Reference Example 2;

FIG. 4Cb is a diagram illustrating the optical paths of rays passing through the imaging lens of Reference Example 3;

FIG. 4Db is a diagram illustrating the optical paths of rays passing through the imaging lens of Reference Example 4;

FIG. 4Eb is a diagram illustrating the optical paths of rays passing through the imaging lens of Reference Example 5;

FIG. 4Gb is a diagram related to the imaging lens according to the second embodiment of the present invention, and illustrates a manner of obtaining a common extended focal depth from a ½ Nyquist extended focal depth and a ¼ Nyquist extended focal depth;

FIG. 4Gc is a diagram related to the imaging lens according to the second embodiment of the present invention, and illustrates a base point image diameter of a point image formed, through the imaging lens, at an image plane base position;

FIG. 5C is a diagram illustrating the astigmatism and distortion of the imaging lens of Example 1;

FIG. 5D is a diagram illustrating the coma aberrations of the imaging lens of Example 1;

FIG. 5I is a diagram illustrating spatial frequency MTF (plural incident heights) of the imaging lens of Example 1;

FIG. 5L is a diagram illustrating point images formed through the imaging lens of Example 1;

FIG. 5M is a diagram illustrating a spherical aberration minimum region in a spherical aberration curve of the imaging lens of Example 1;

FIG. 6L is a diagram illustrating point images formed through the imaging lens of Example 2;

FIG. 6M is a diagram illustrating a spherical aberration minimum region in a spherical aberration curve of the imaging lens of Example 2;

FIG. 7L is a diagram illustrating point images formed through the imaging lens of Example 3;

FIG. 7M is a diagram illustrating a spherical aberration minimum region in a spherical aberration curve of the imaging lens of Example 3;

FIG. 8L is a diagram illustrating point images formed through the imaging lens of Example 4;

FIG. 8M is a diagram illustrating a spherical aberration minimum region in a spherical aberration curve of the imaging lens of Example 4;

FIG. 8N is a diagram illustrating an extended focal depth in a depth MTF curve showing depth MTF of the imaging lens of Example 4;

FIG. 9C is a diagram illustrating the astigmatism and distortion of the imaging lens of Example 5;

FIG. 9L is a diagram illustrating point images formed through the imaging lens of Example 5;

FIG. 9M is a diagram illustrating a spherical aberration minimum region in a spherical aberration curve of the imaging lens of Example 5;

FIG. 10N is a diagram illustrating an extended focal depth in a depth MTF curve showing depth MTF of the imaging lens of Example 6;

FIG. 11L is a diagram illustrating point images formed through the imaging lens of Example 7;

FIG. 11M is a diagram illustrating a spherical aberration minimum region in a spherical aberration curve of the imaging lens of Example 7;

FIG. 12E is a spot diagram of the imaging lens of Example 8;

FIG. 12F is a diagram illustrating spatial frequency MTF (incident height=0) of the imaging lens of Example 8;

FIG. 12G is a diagram illustrating depth MTF (90 line/mm, incident height=0) of the imaging lens of Example 8;

FIG. 12H is a diagram illustrating depth MTF (179 line/mm, incident height=0) of the imaging lens of Example 8;

FIG. 12I is a diagram illustrating spatial frequency MTF (plural incident heights) of the imaging lens of Example 8;

FIG. 12J is a diagram illustrating depth MTF (90 line/mm, plural incident heights) of the imaging lens of Example 8;

FIG. 12K is a diagram illustrating depth MTF (179 line/mm, plural incident heights) of the imaging lens of Example 8;

FIG. 12L is a diagram illustrating point images formed through the imaging lens of Example 8;

FIG. 12M is a diagram illustrating a spherical aberration minimum region in a spherical aberration curve of the imaging lens of Example 8;

FIG. 12N is a diagram illustrating an extended focal depth in a depth MTF curve showing depth MTF of the imaging lens of Example 8;

FIG. 13A is a diagram illustrating the structure of an imaging lens of Example 9;

FIG. 13B is a diagram illustrating the spherical aberration of the imaging lens of Example 9;

Figure 13A:
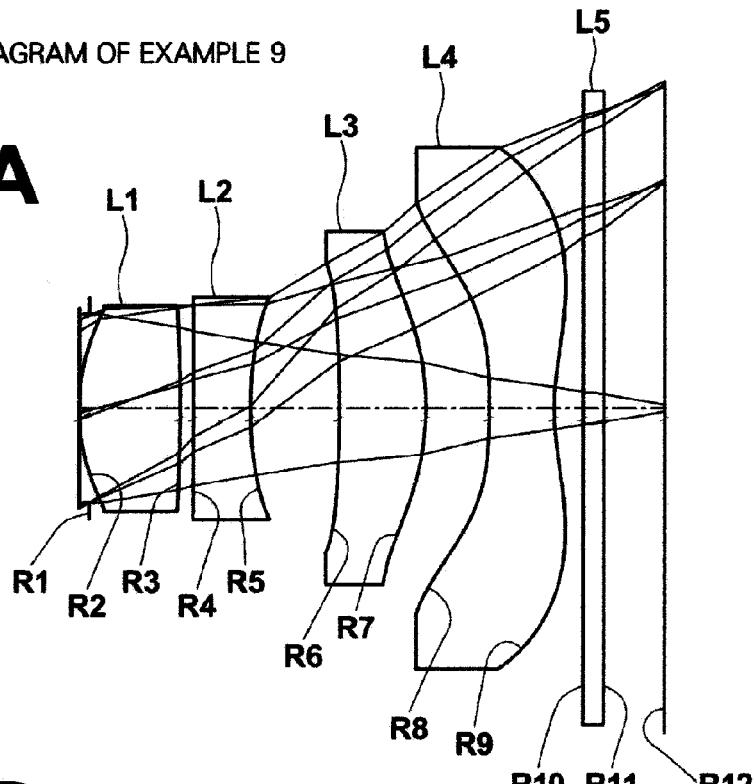
Figure 13B:
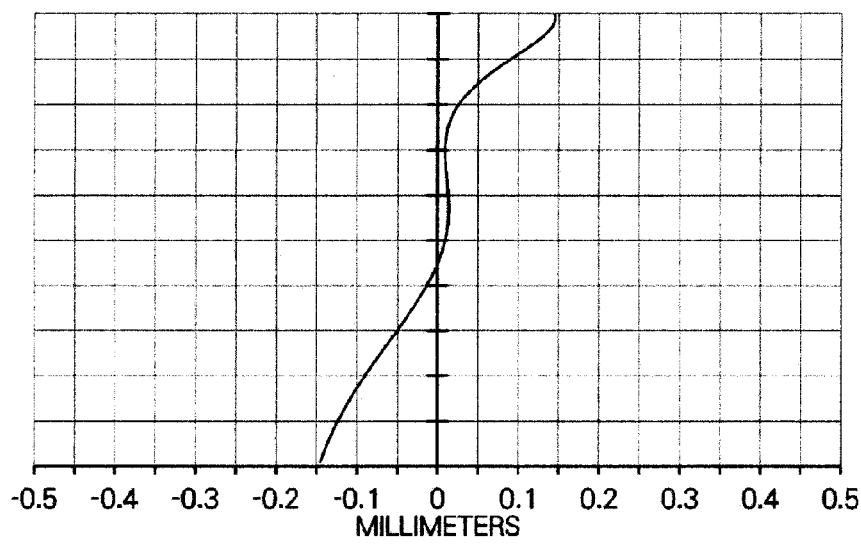
Figure 13C:
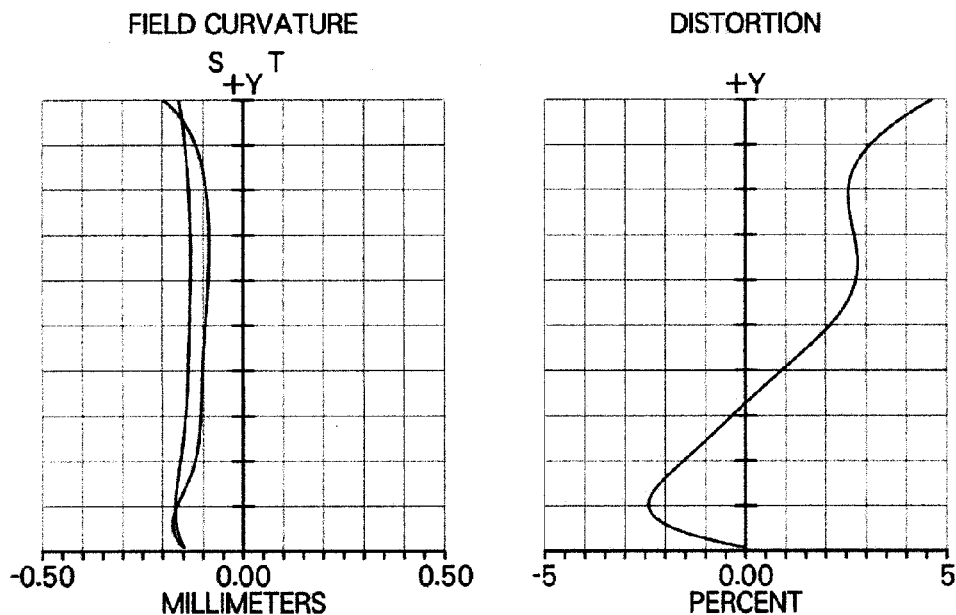
Figure 13D:
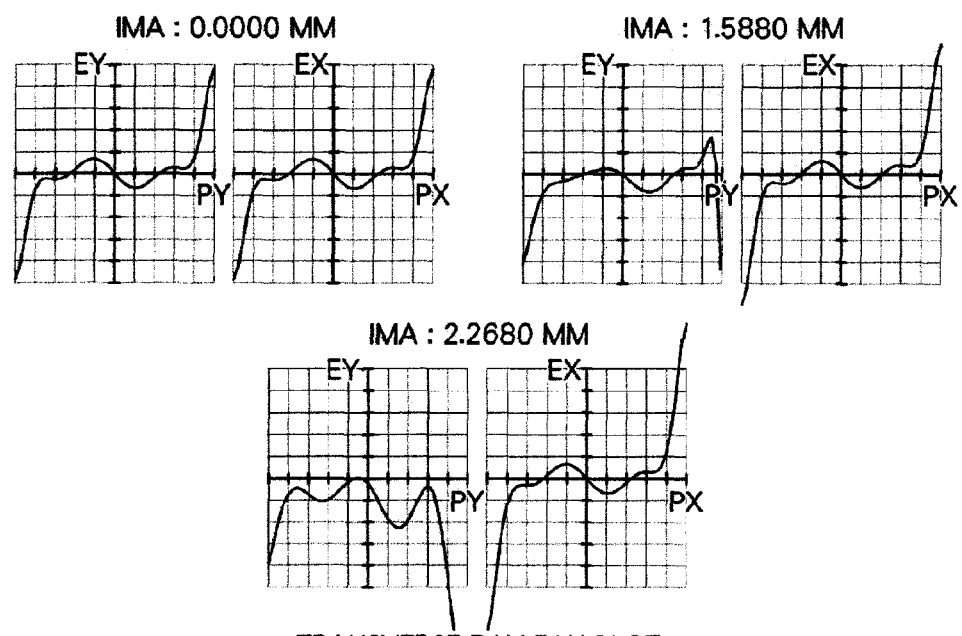
Figure 13E:
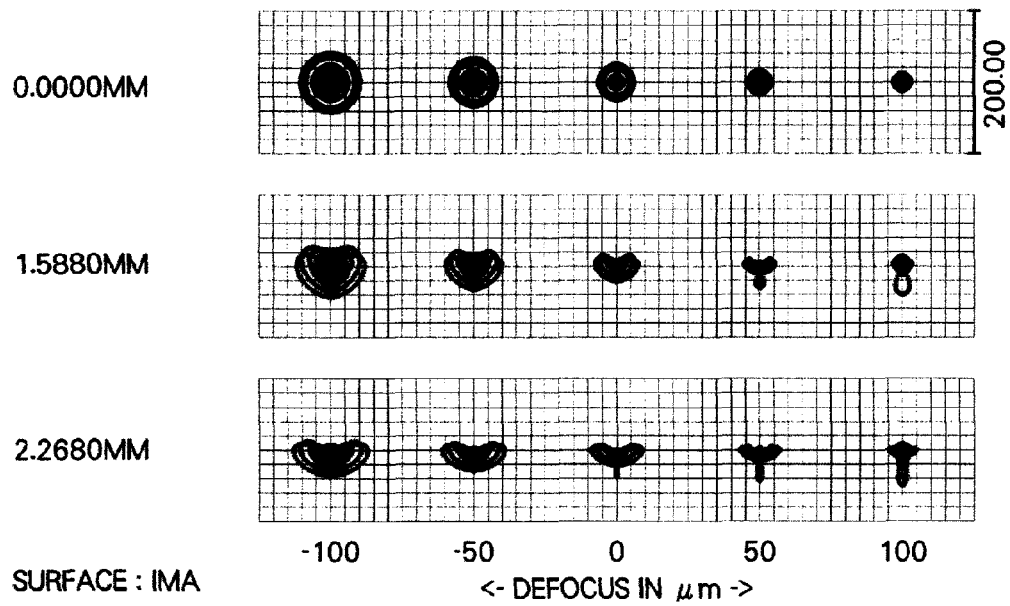
Figure 13F:
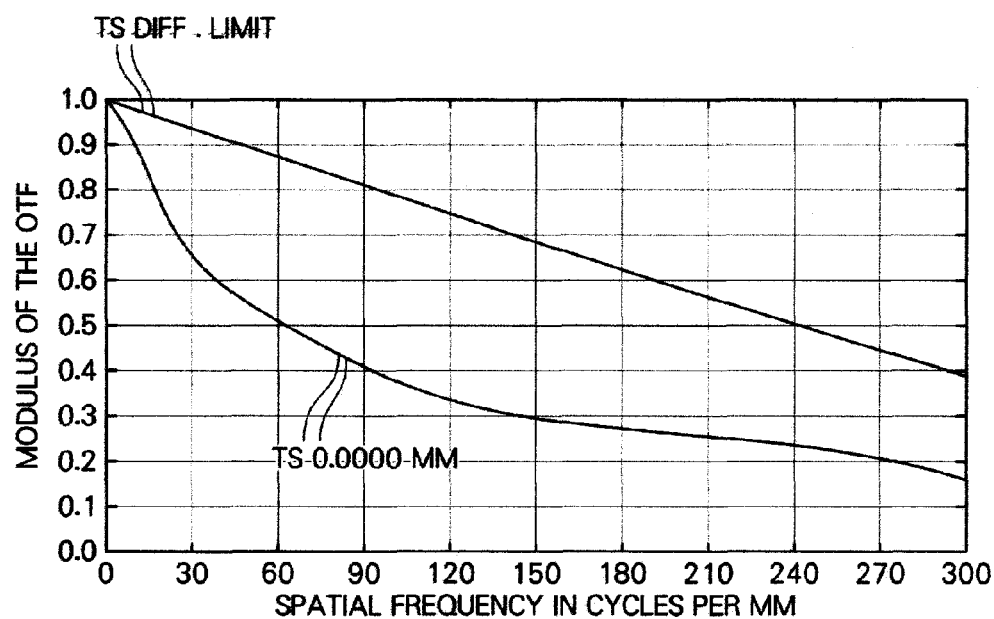
Figure 13G:
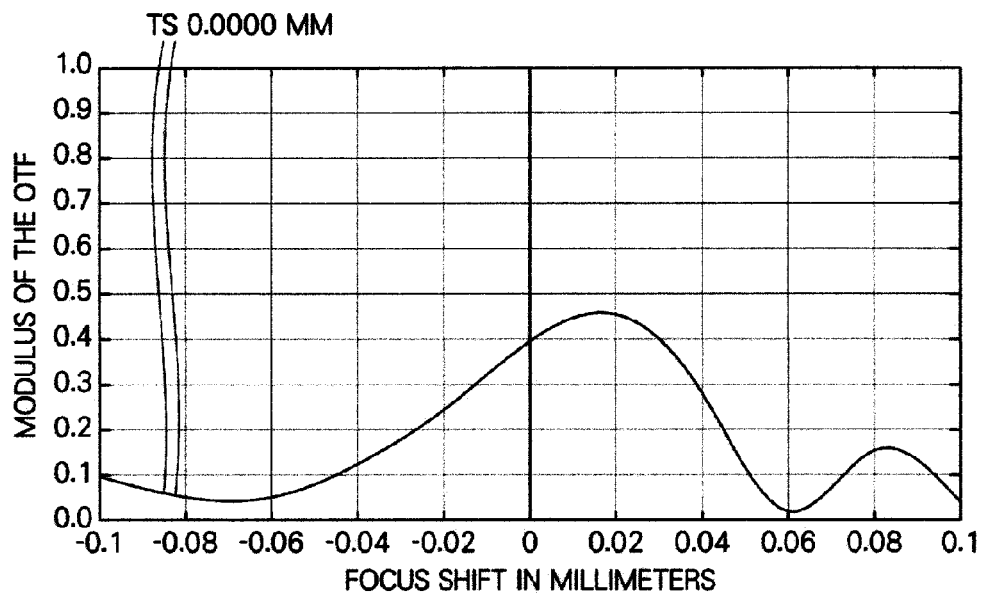
Figure 13H:
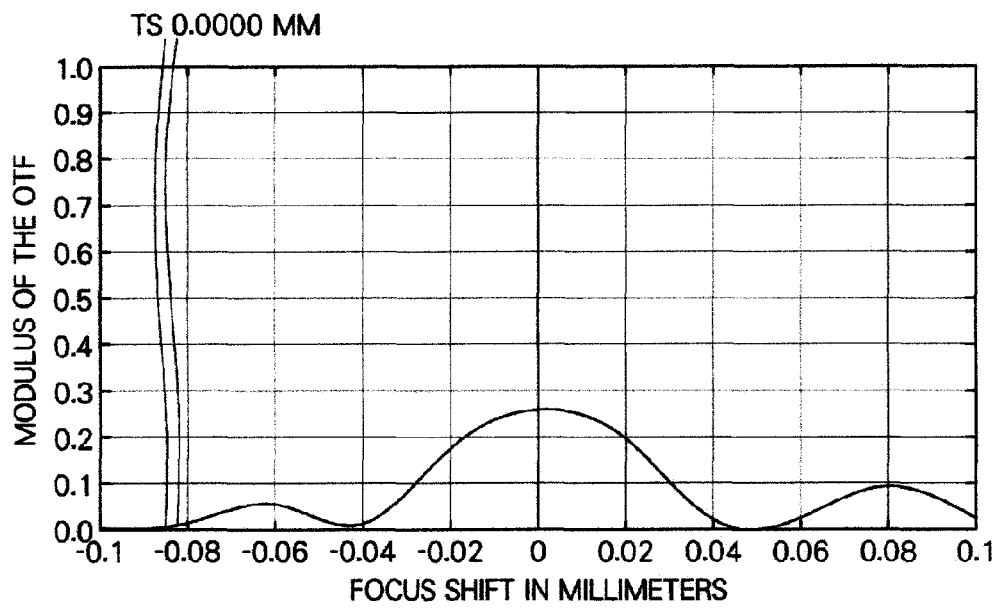
Figure 13I:
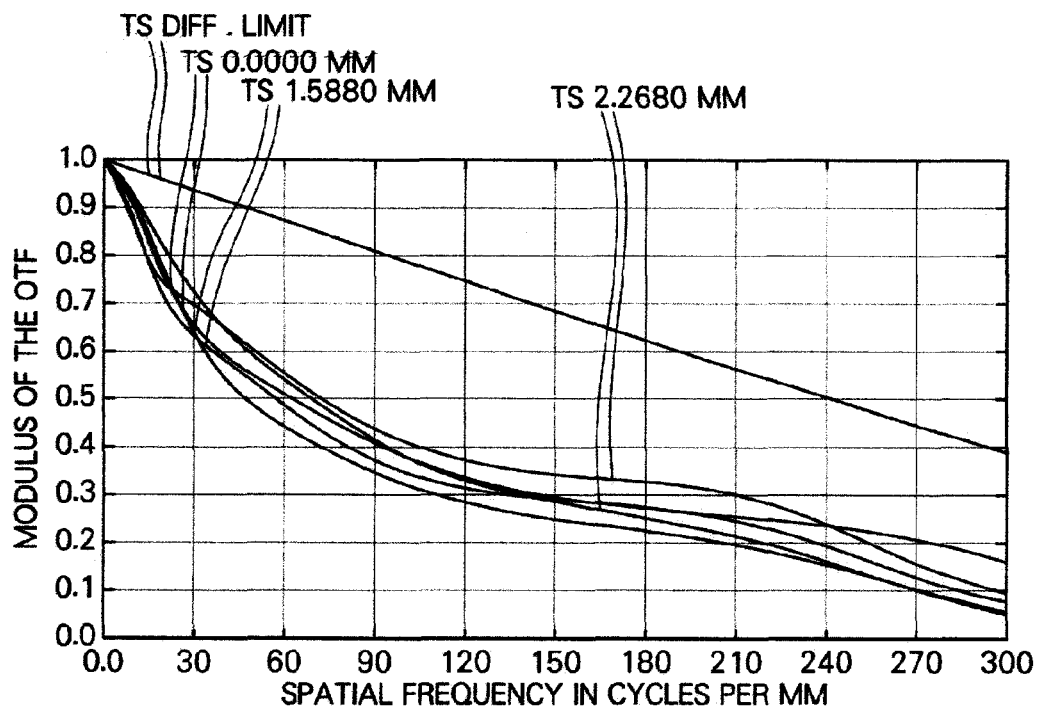
Figure 13J:
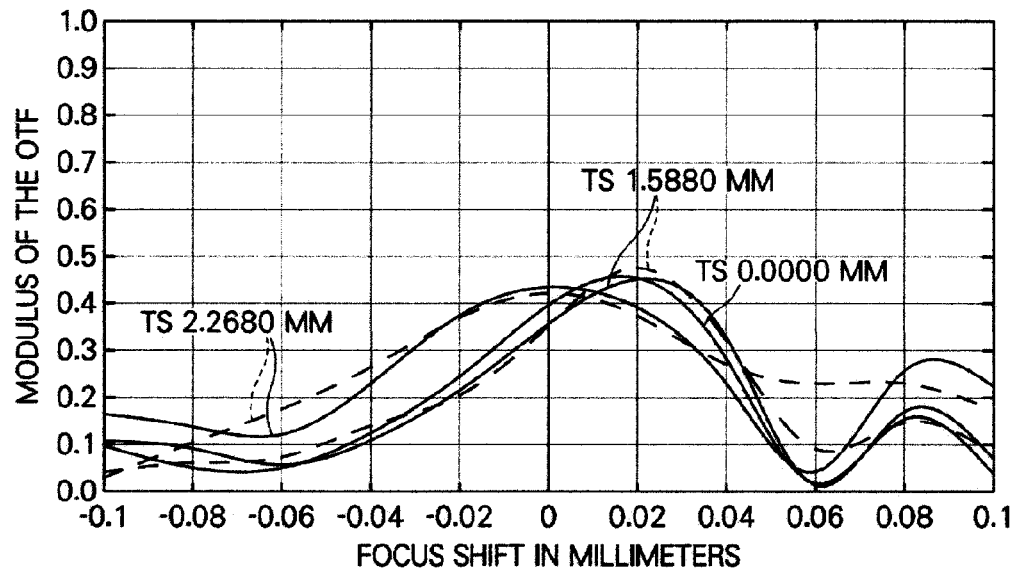
Figure 13K:
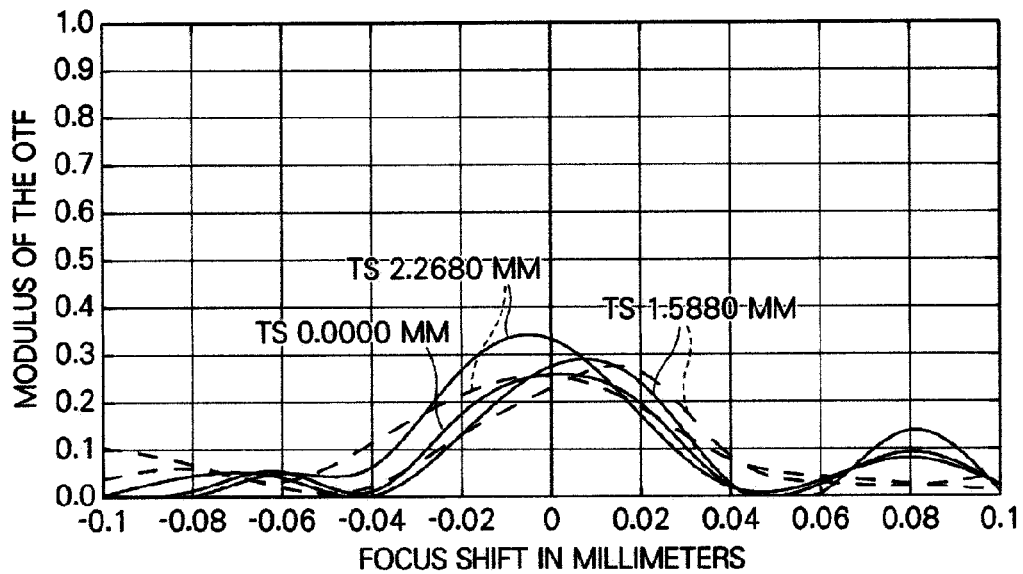
Figure 13L:
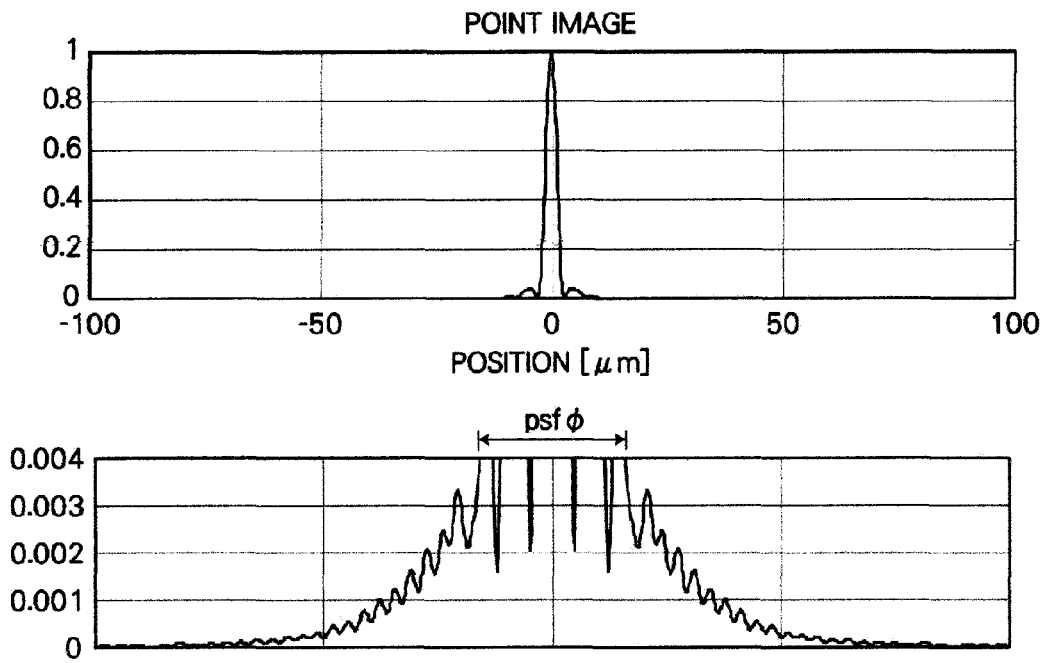
Figure 13M:
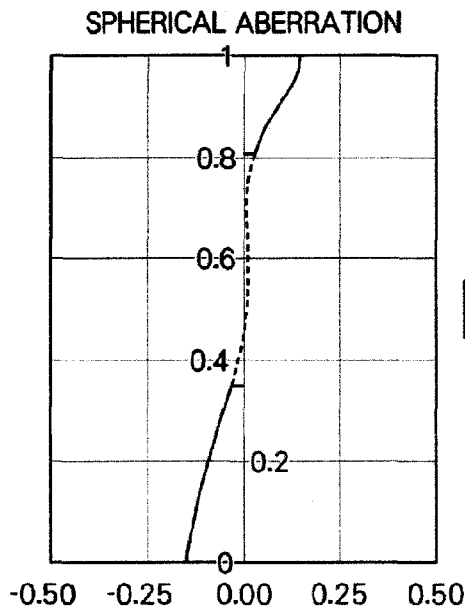
Figure 13N:
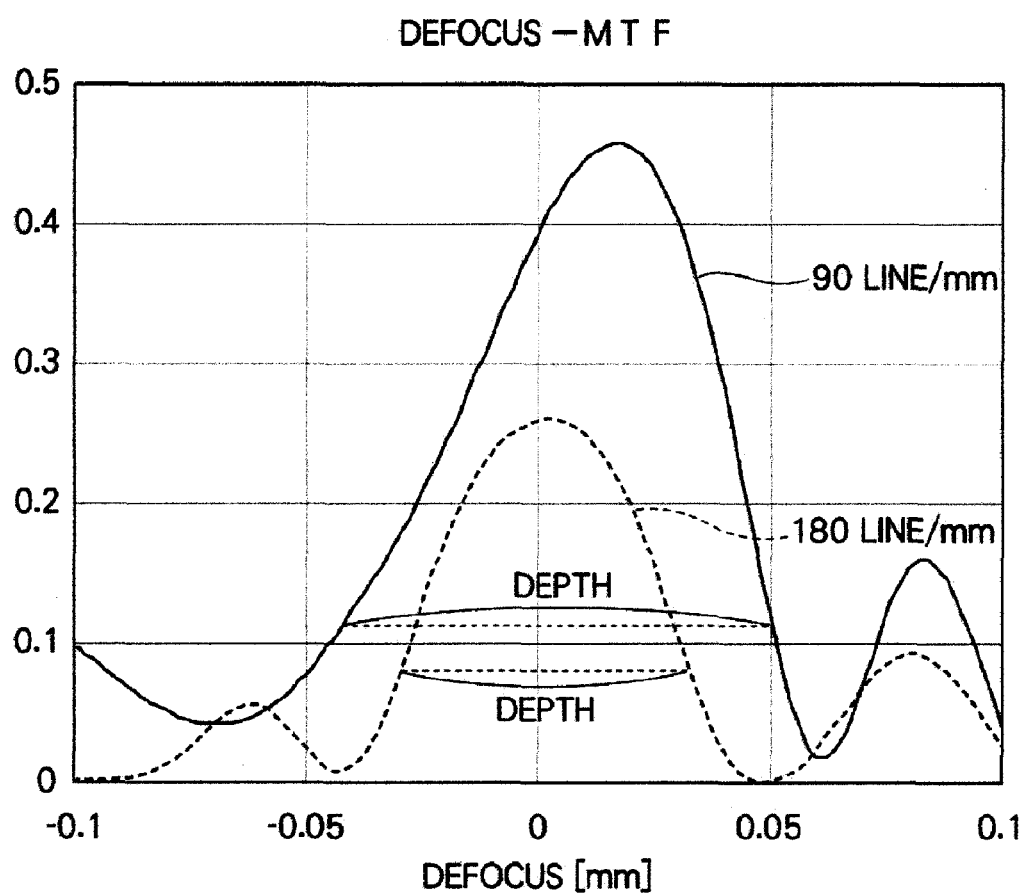
Figure 14A:
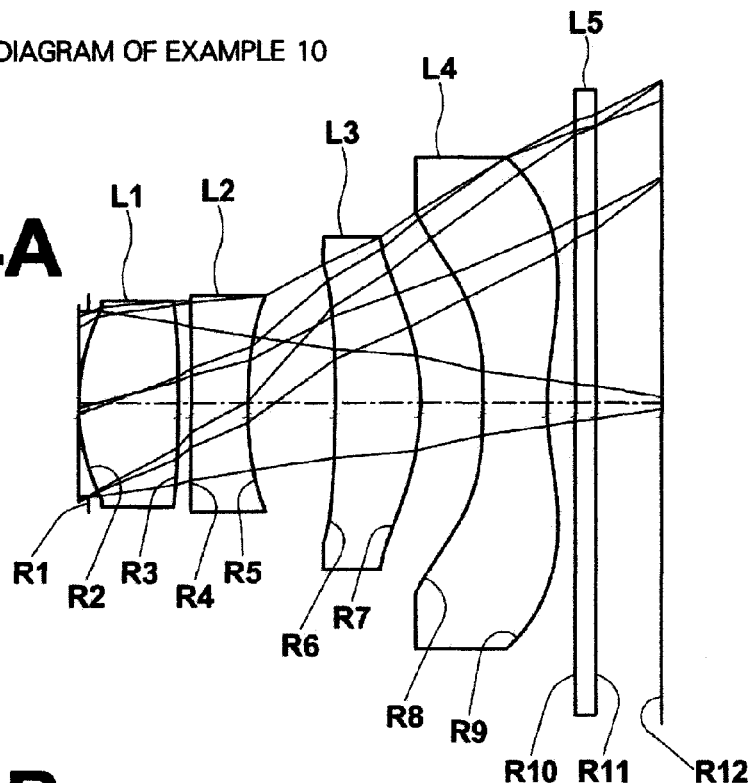
Figure 14B:
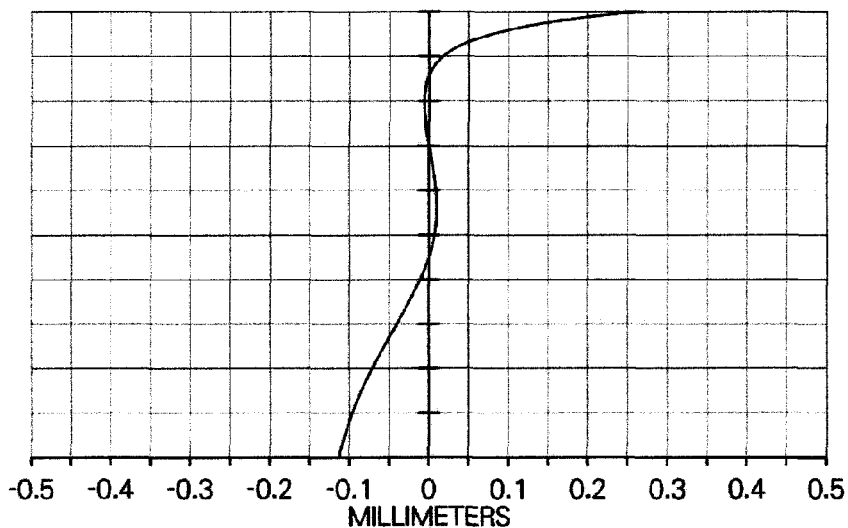
Figure 14C:
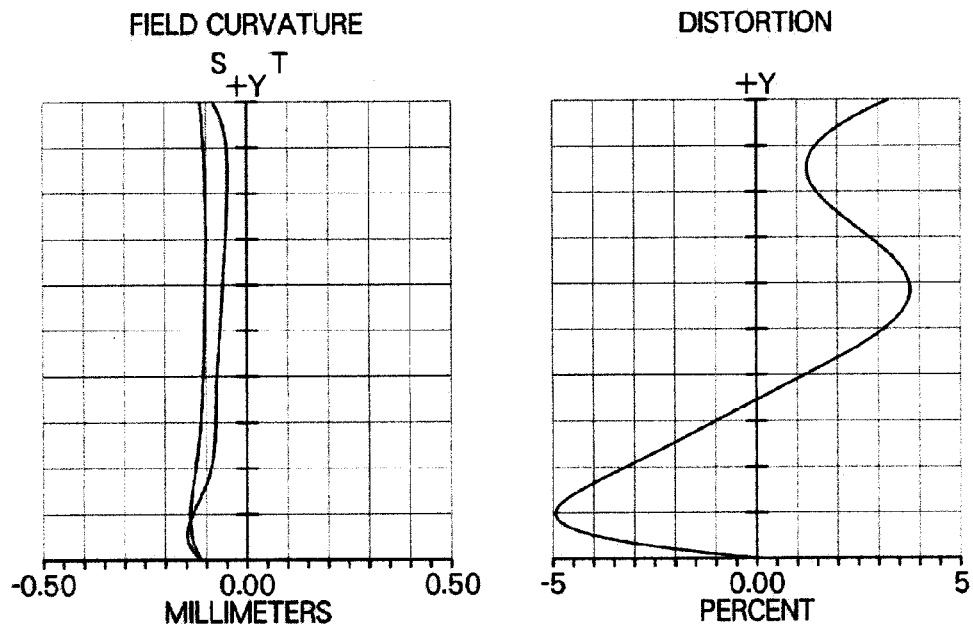
Figure 14D:
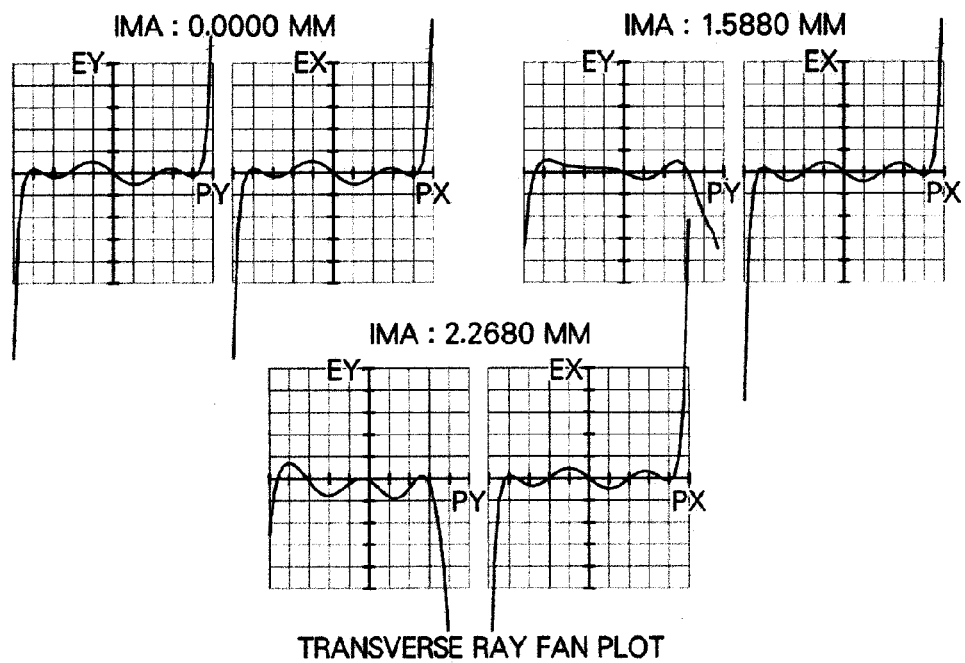
Figure 14E:
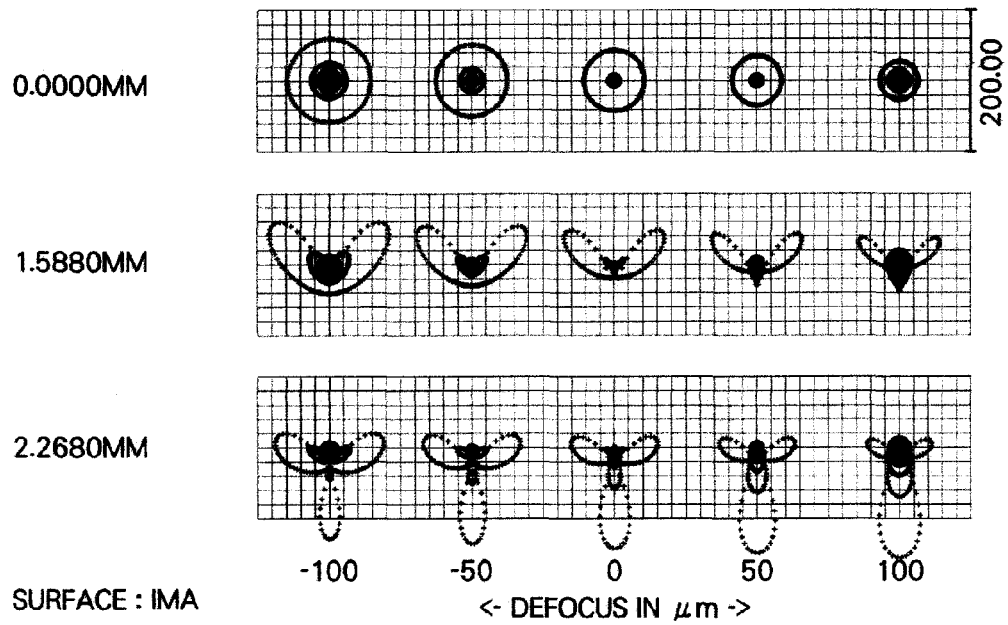
Figure 14F:
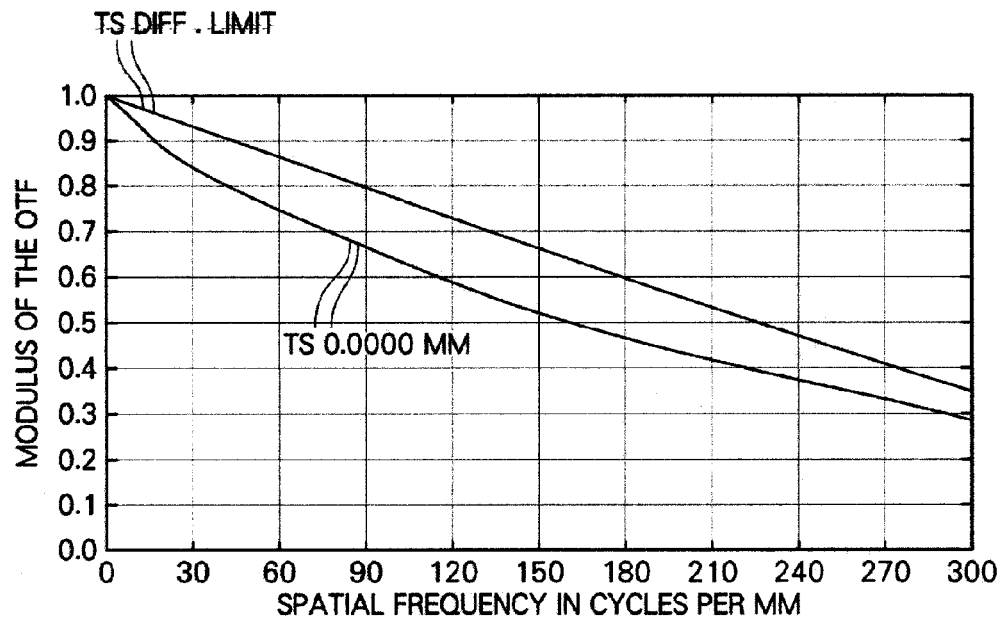
Figure 14G:
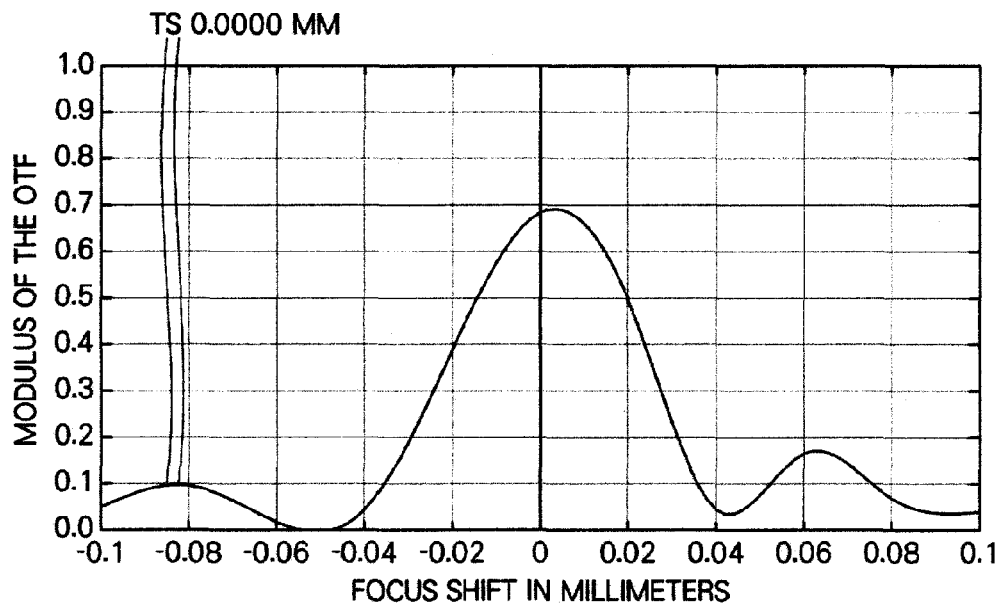
Figure 14H:
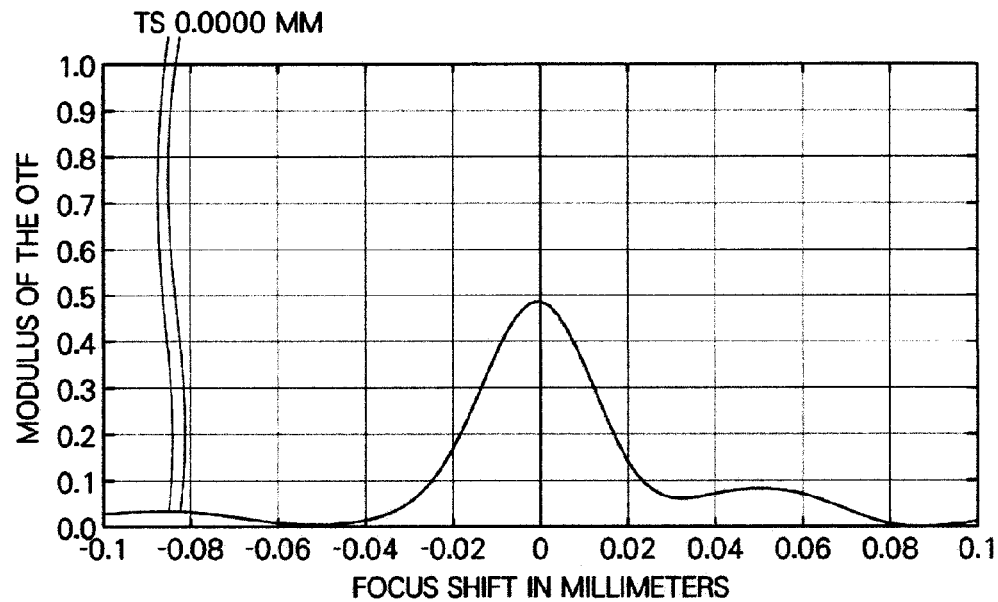
Figure 14I:
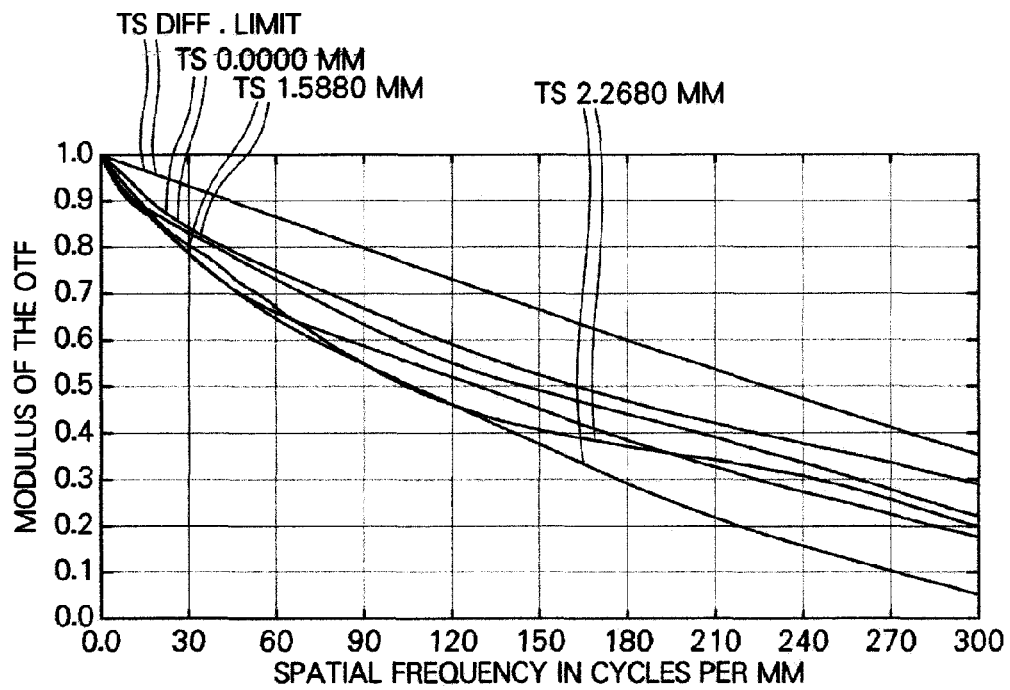
Figure 14J:
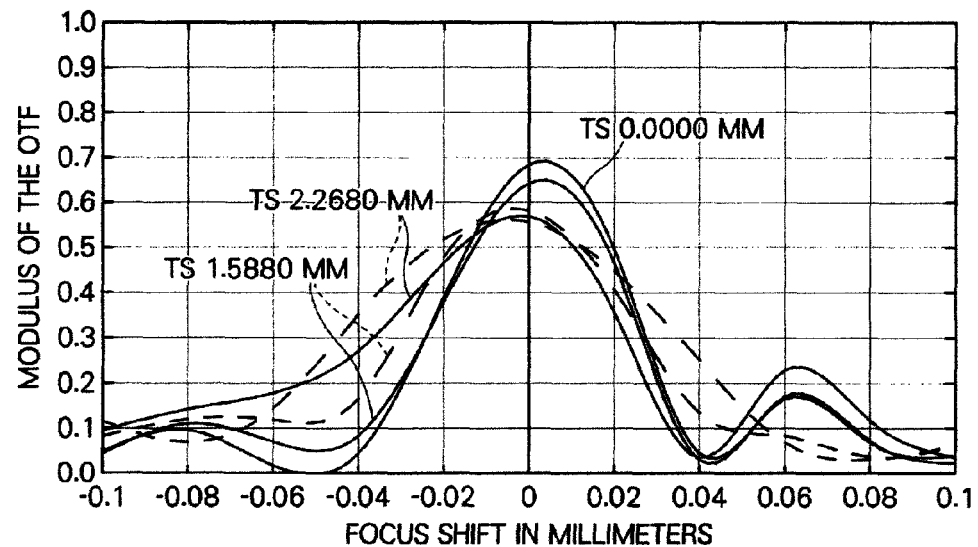
Figure 14K:
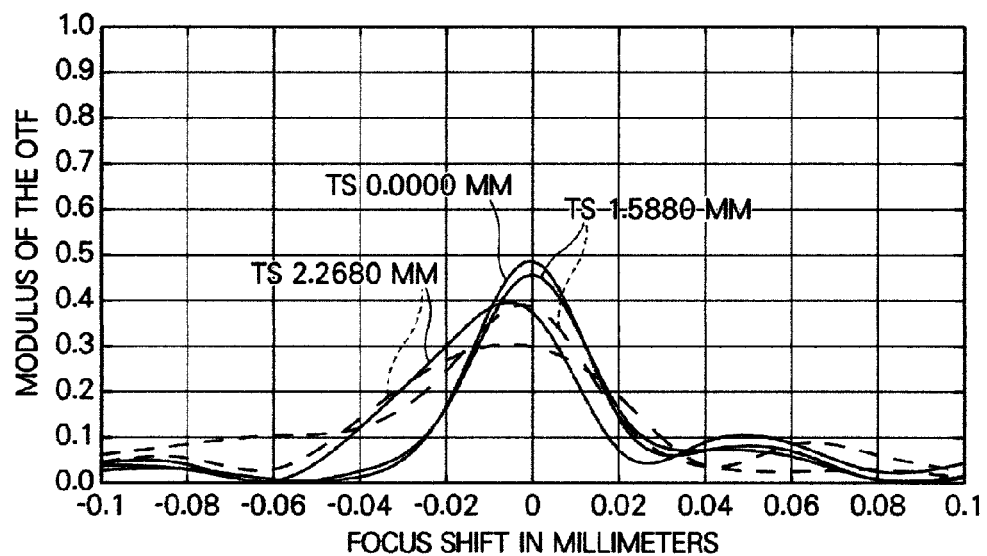
Figure 14N:
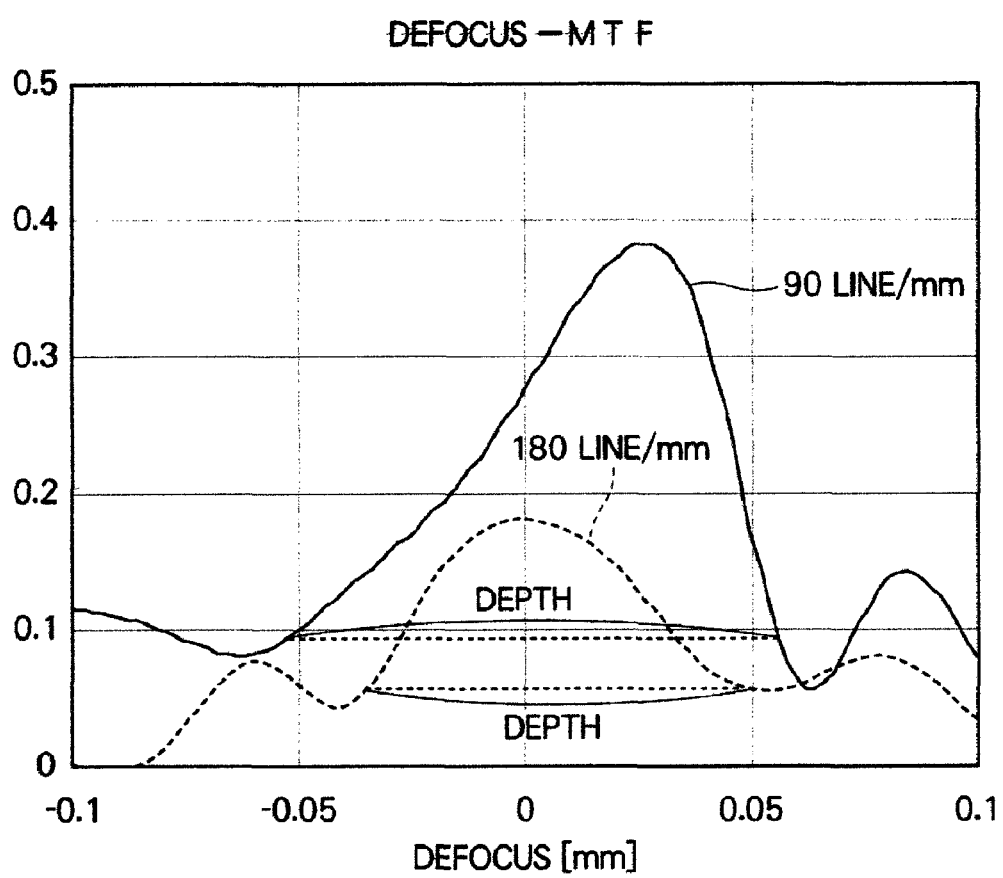
Figure 15A:
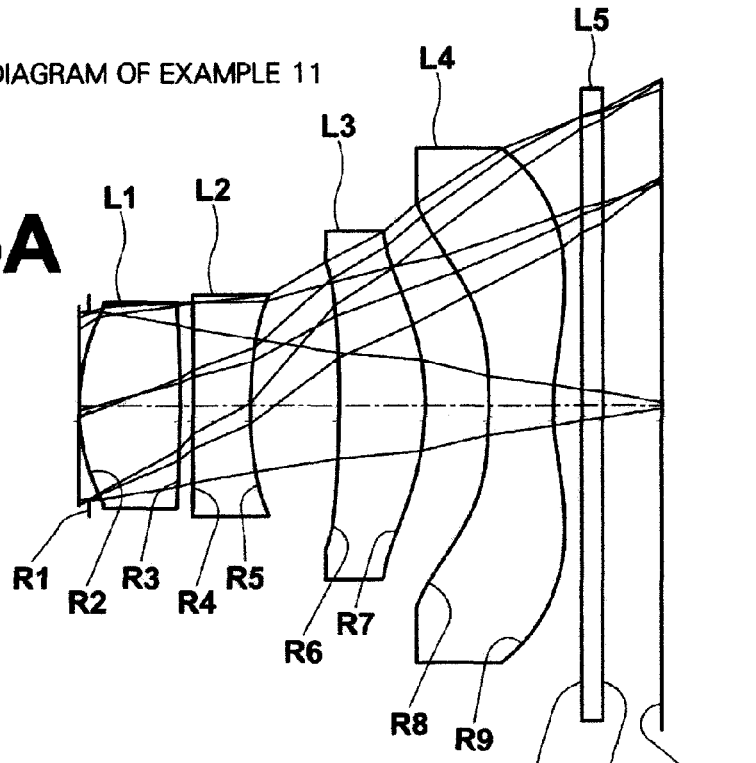
Figure 15B:
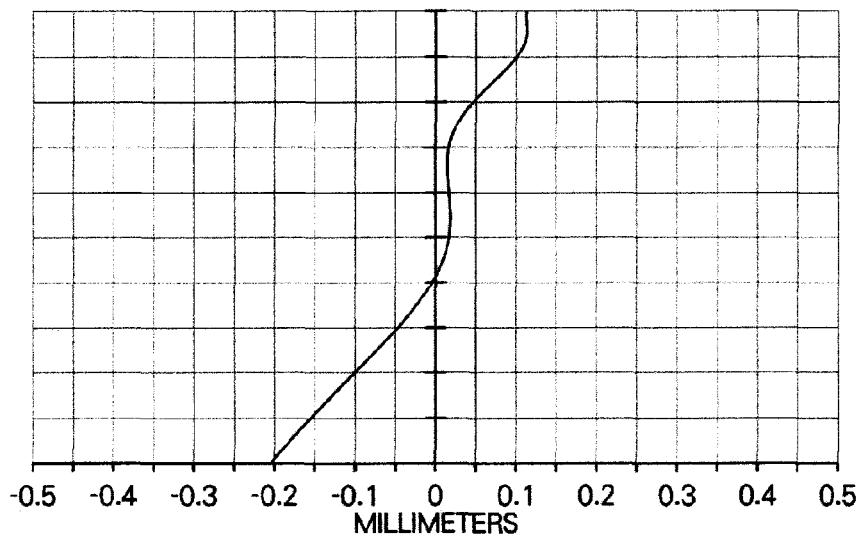
Figure 15C:
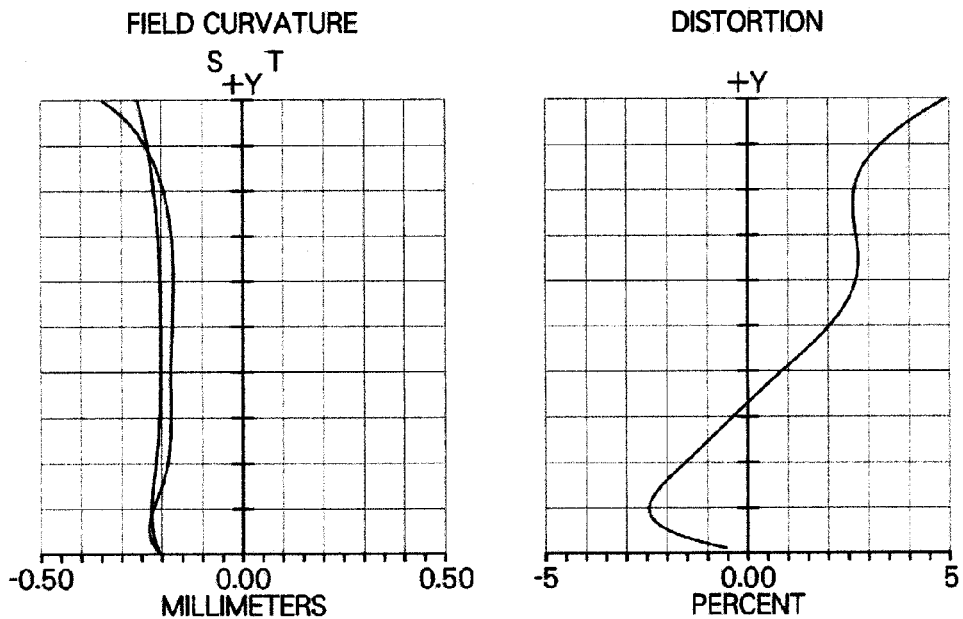
Figure 15D:
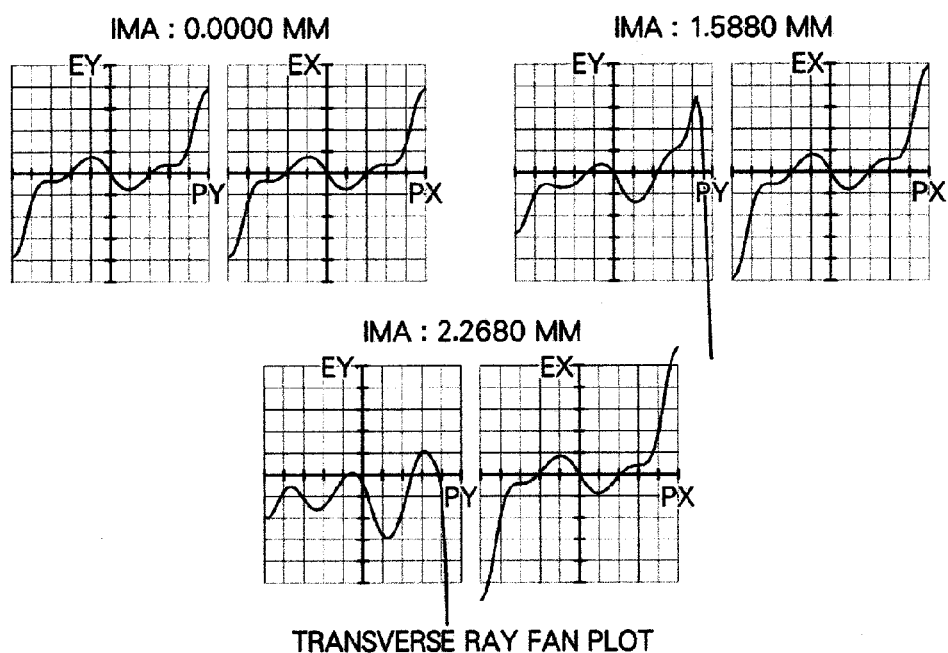
Figure 15E:
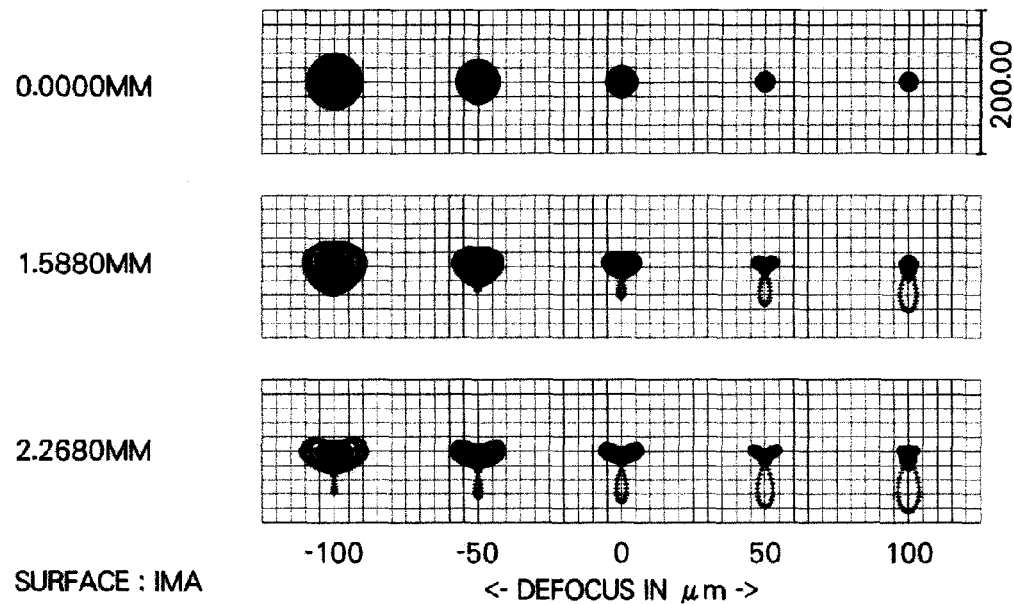
Figure 15F:
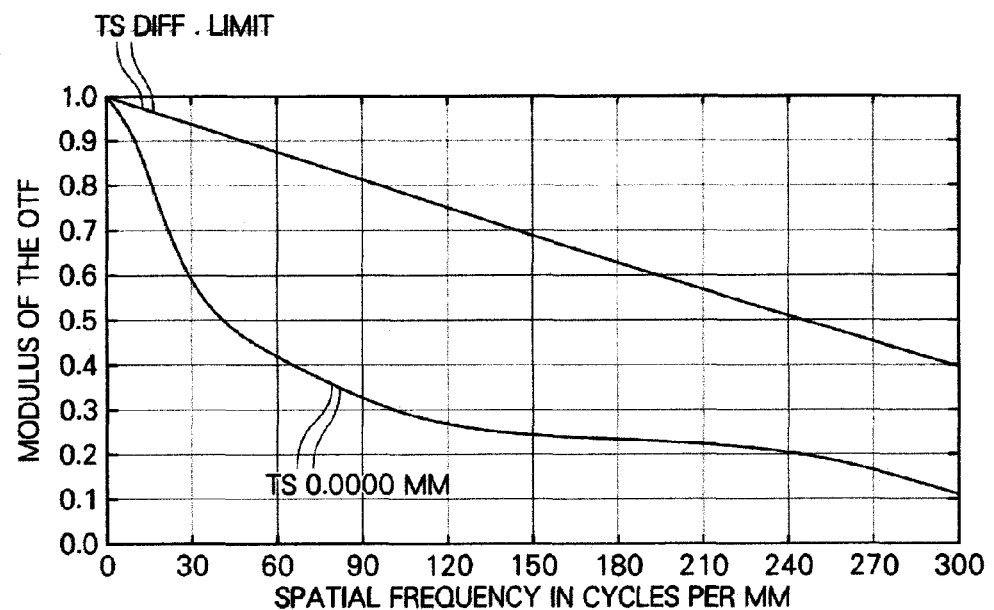
Figure 15G:
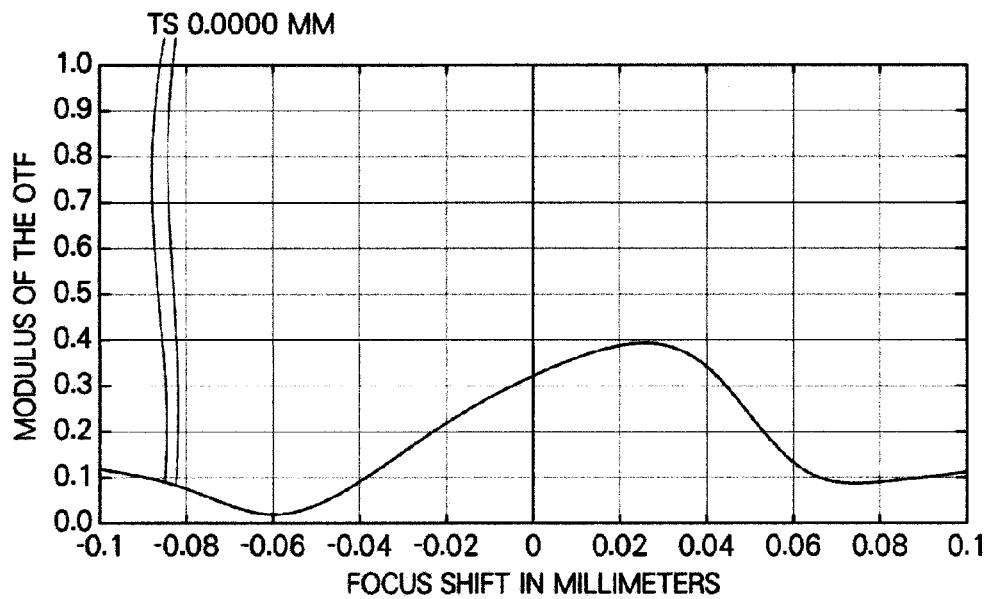
Figure 15H:
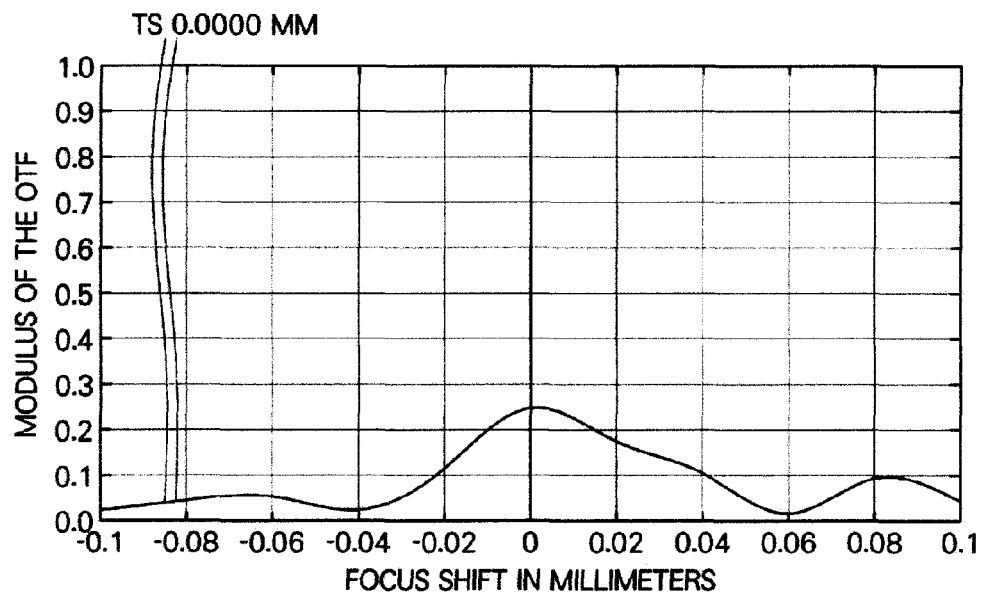
Figure 15I:
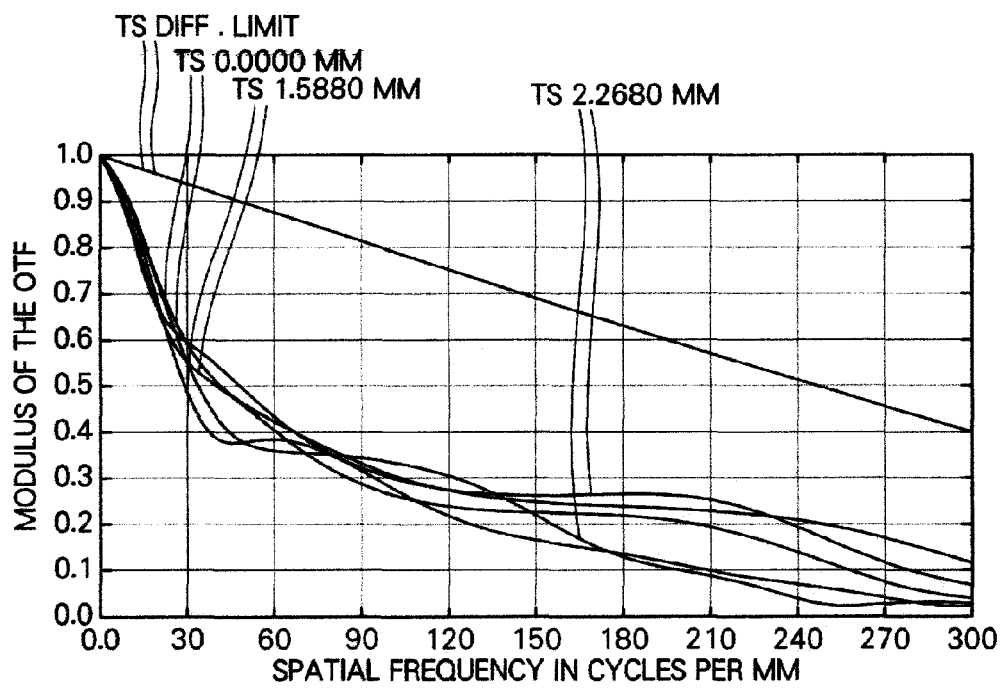
Figure 15J:
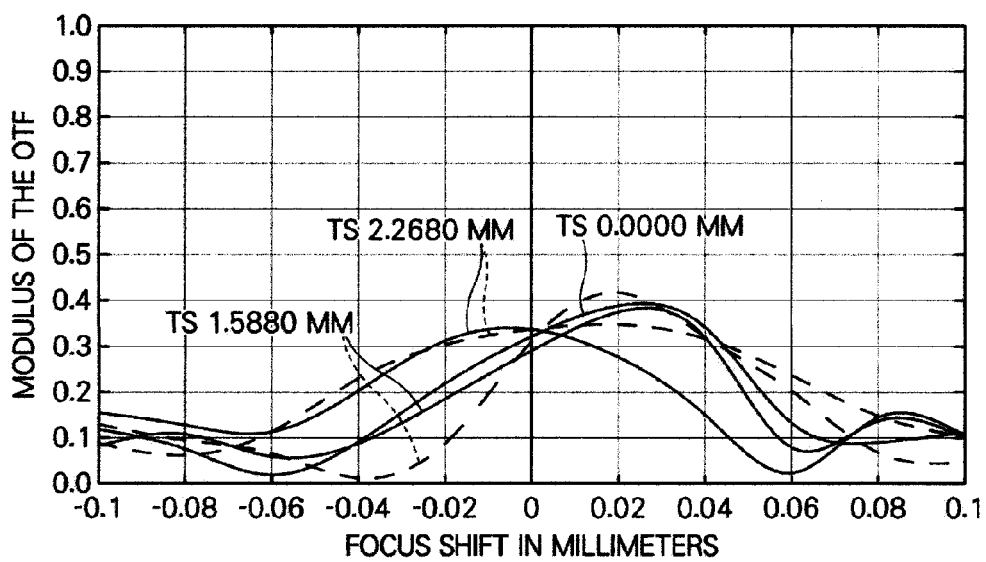
Figure 15K:
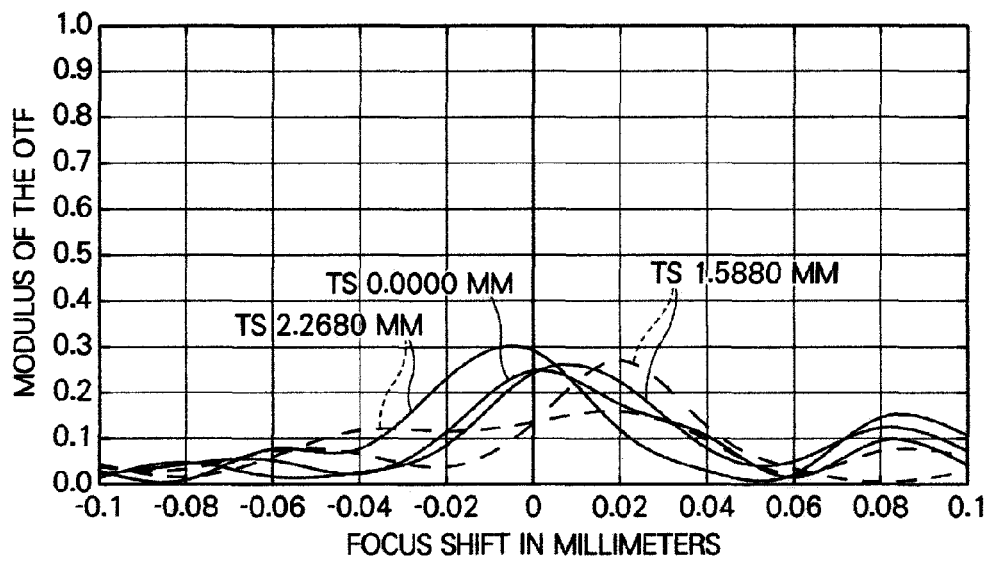
Figure 15N:
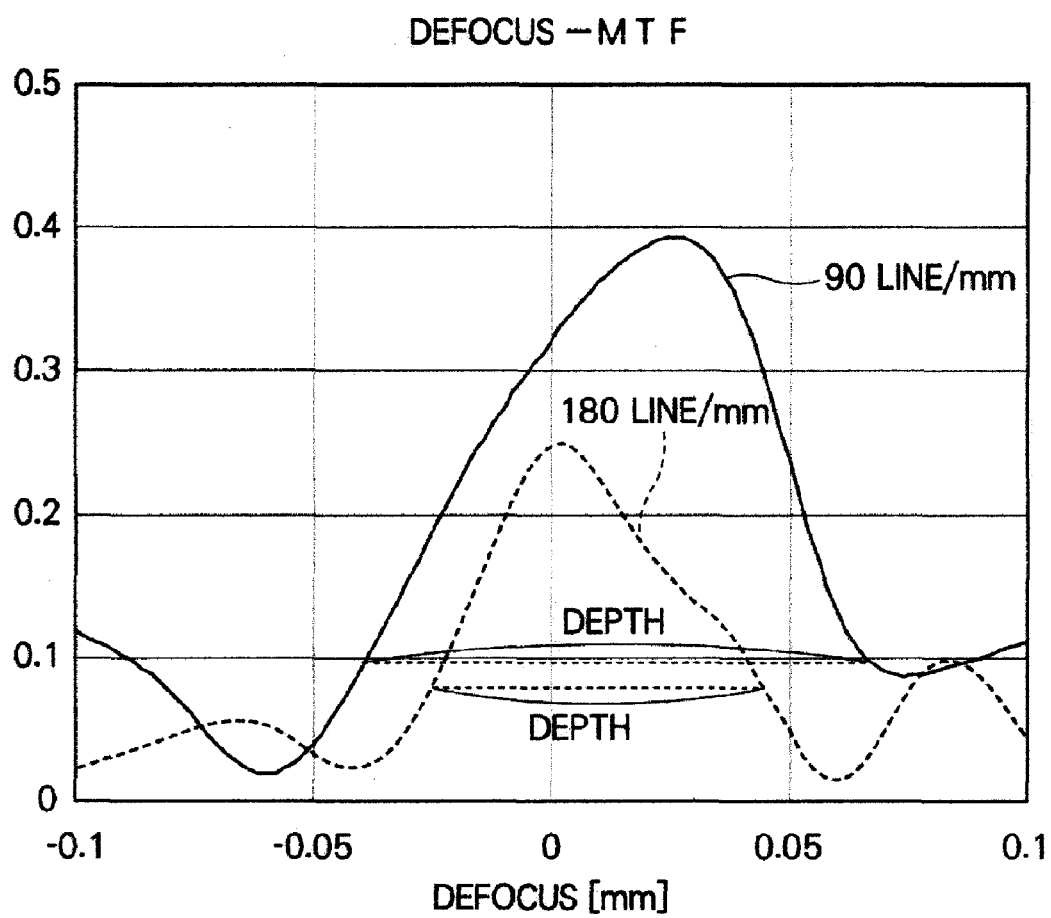
Figure 16A:
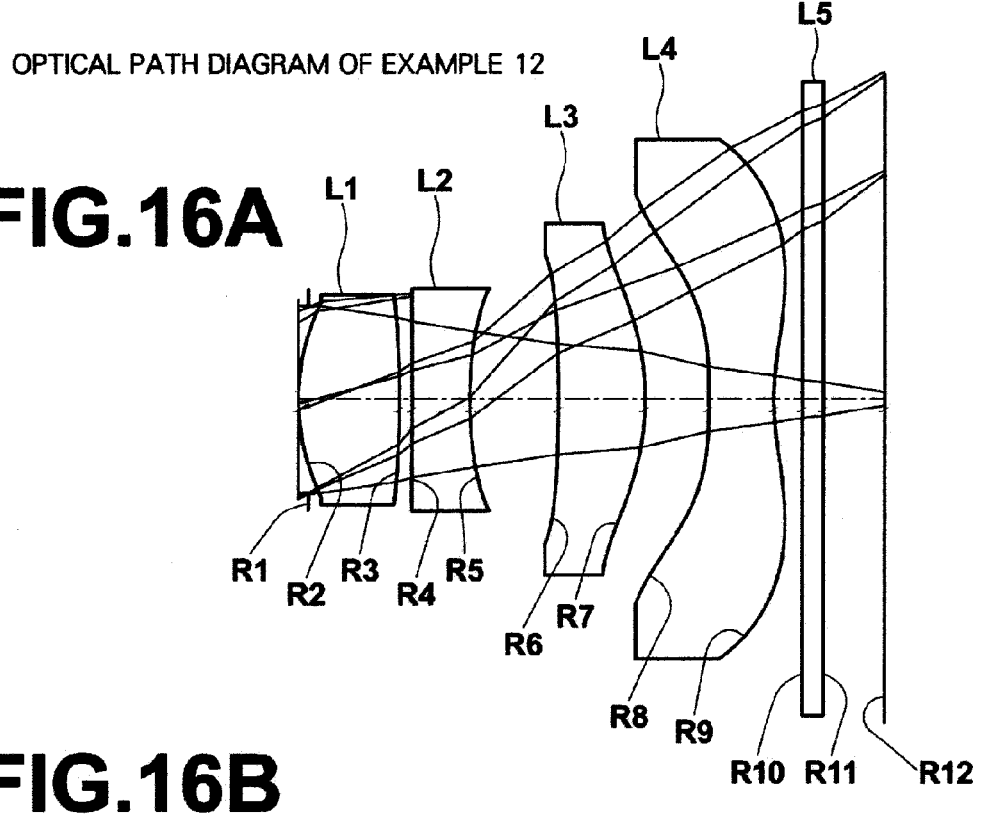
Figure 16B:
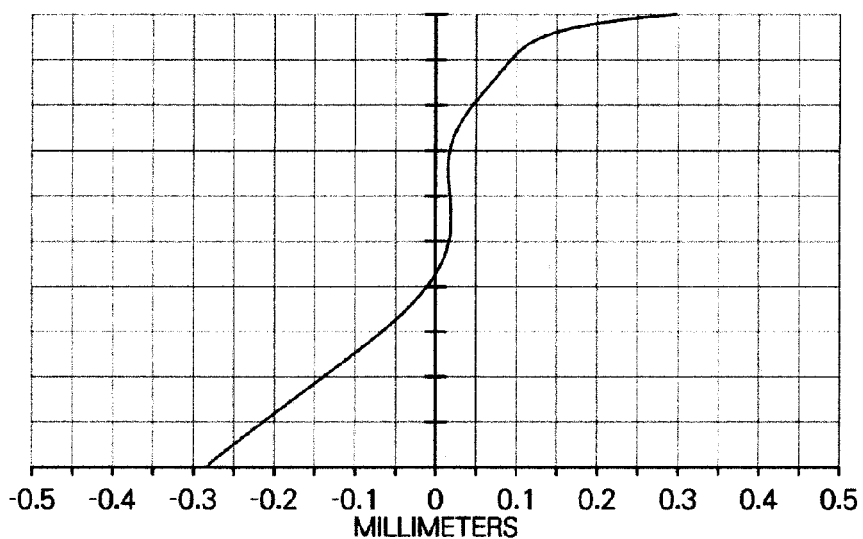
Figure 16C:
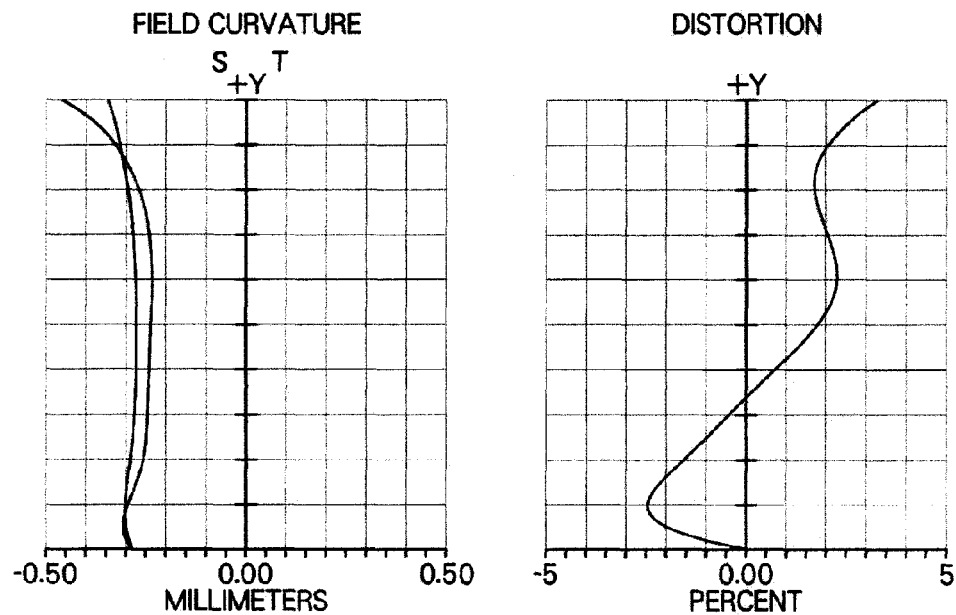
Figure 16D:
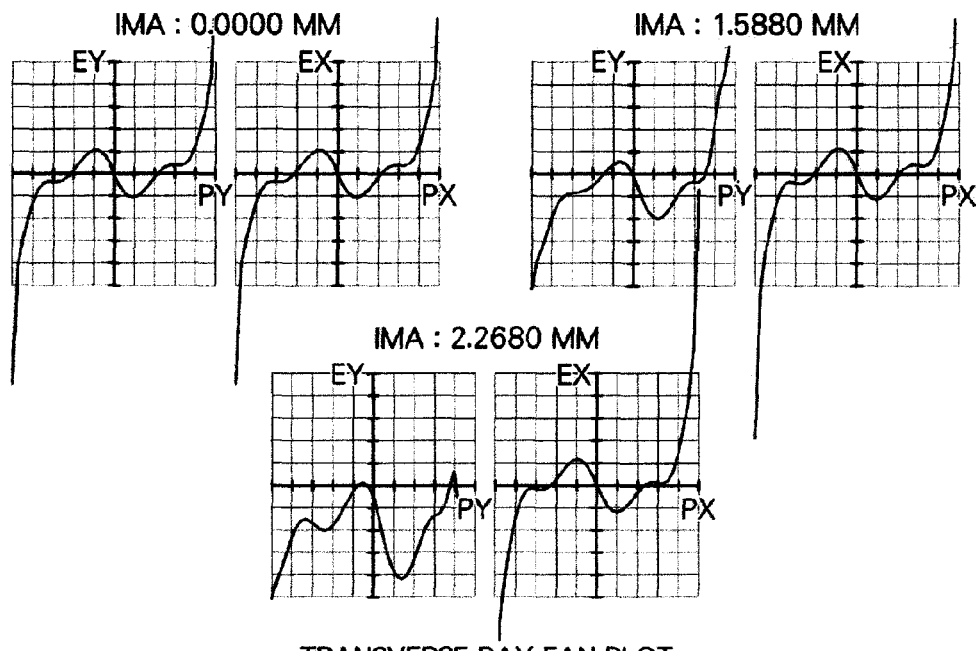
Figure 16E:
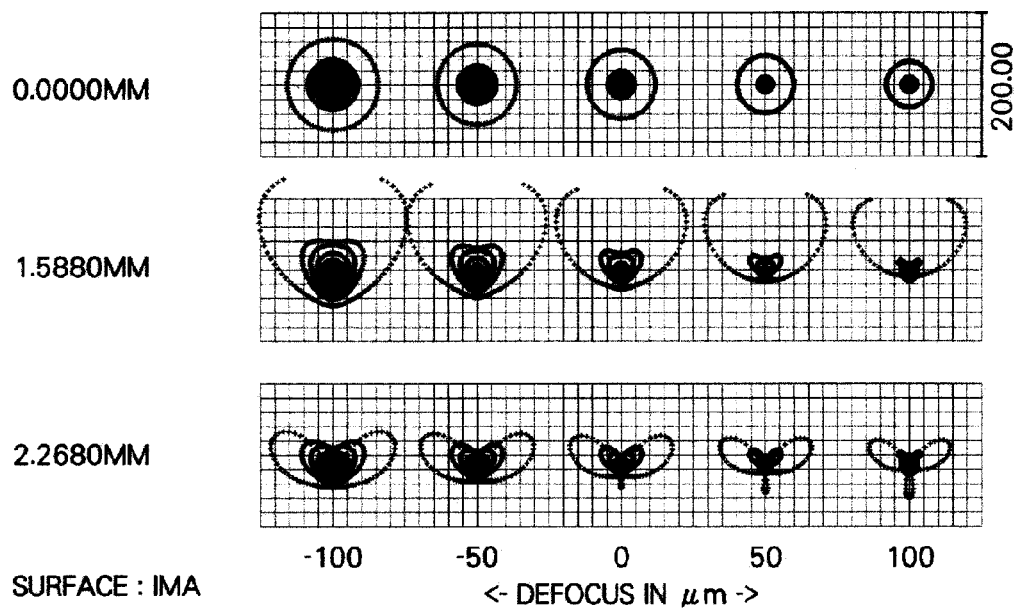
Figure 16F:
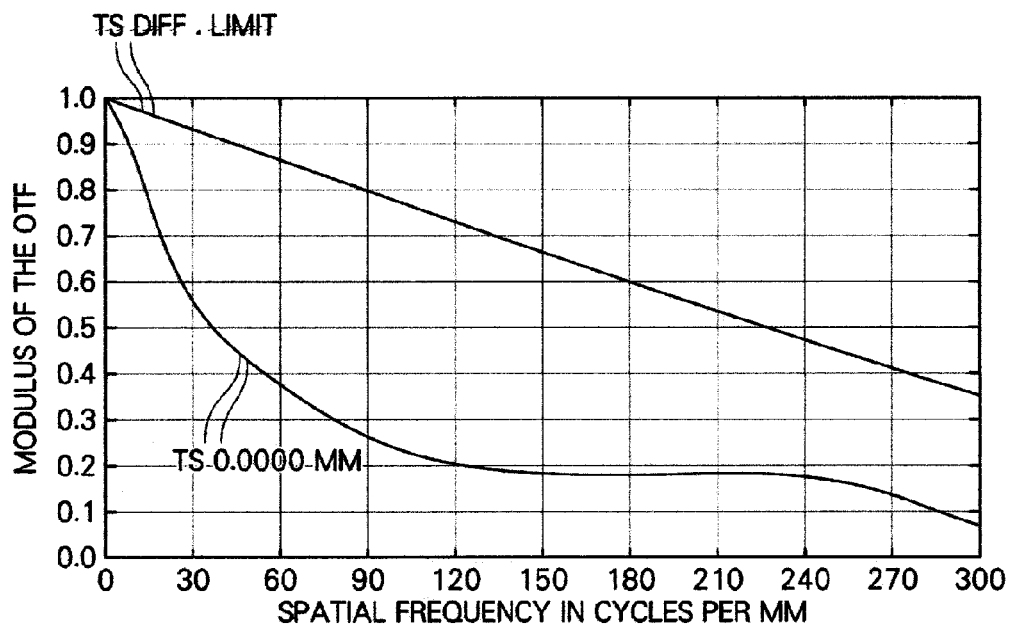
Figure 16G:
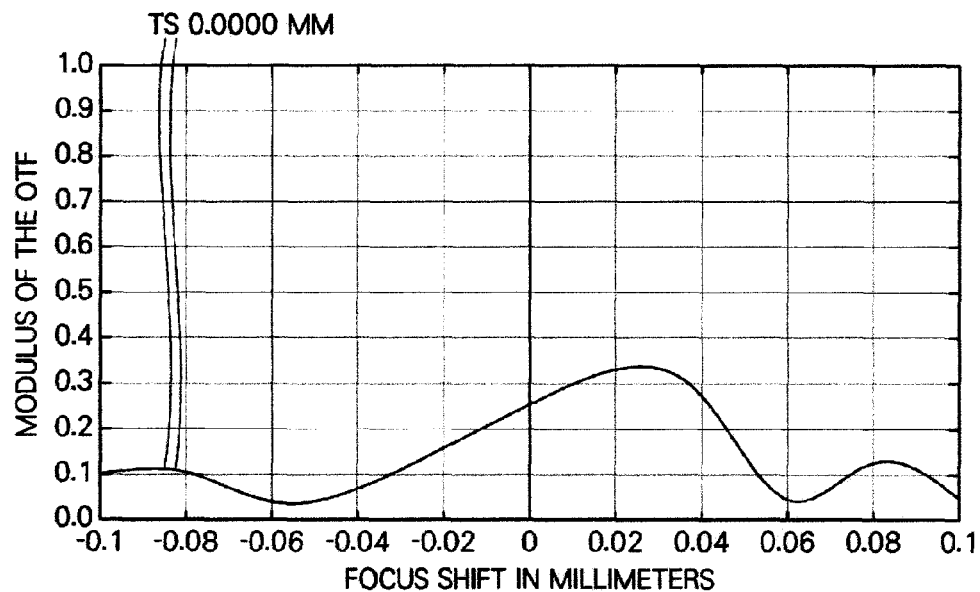
Figure 16H:
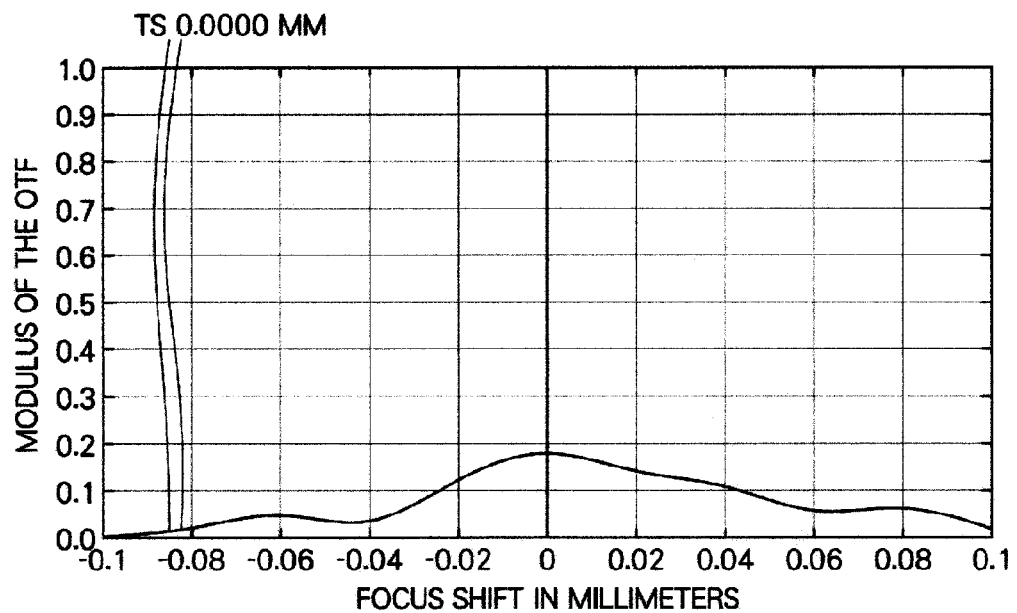
Figure 16I:
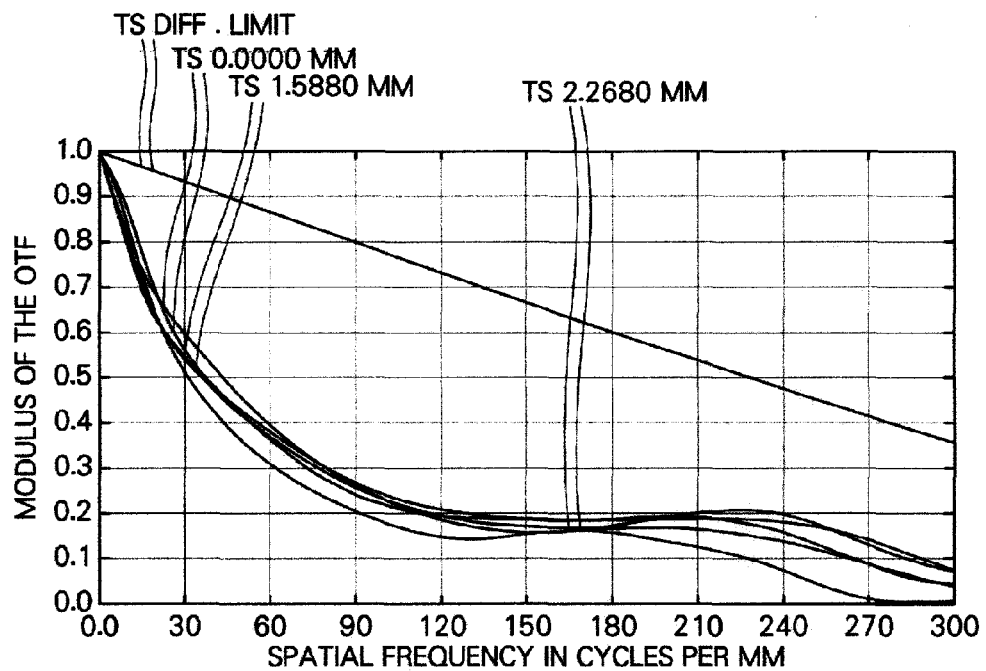
Figure 16J:
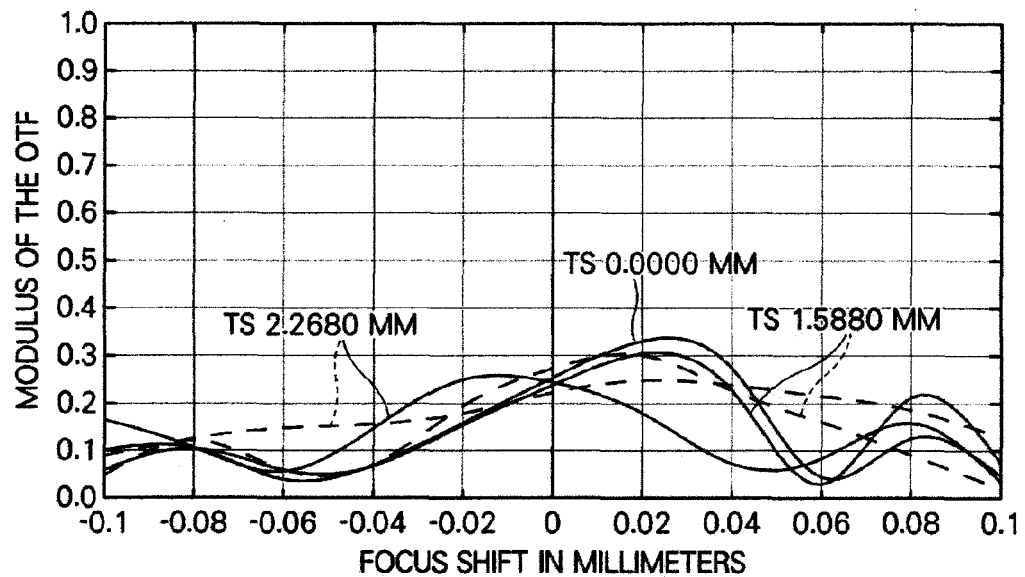
Figure 16K:
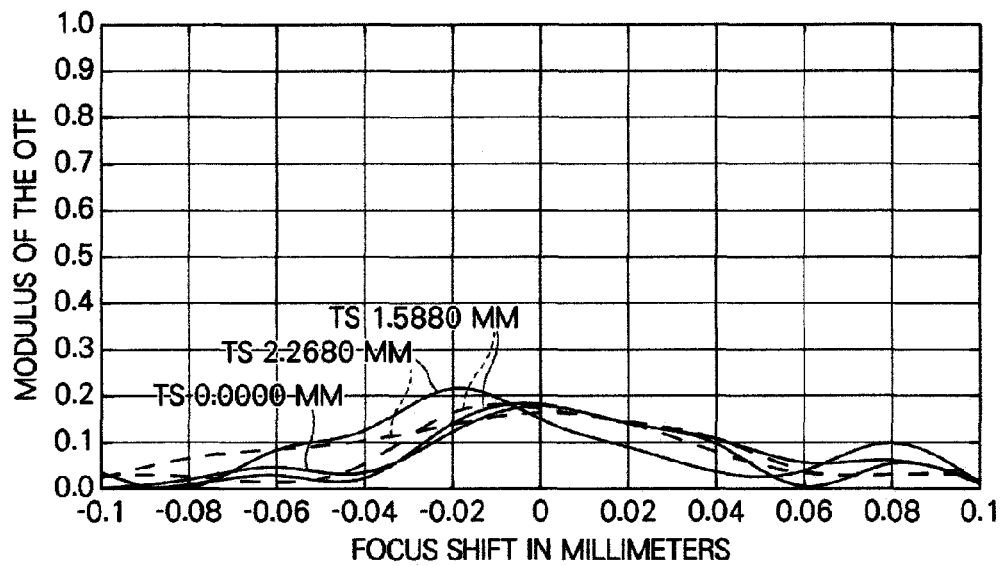
Figure 16N:
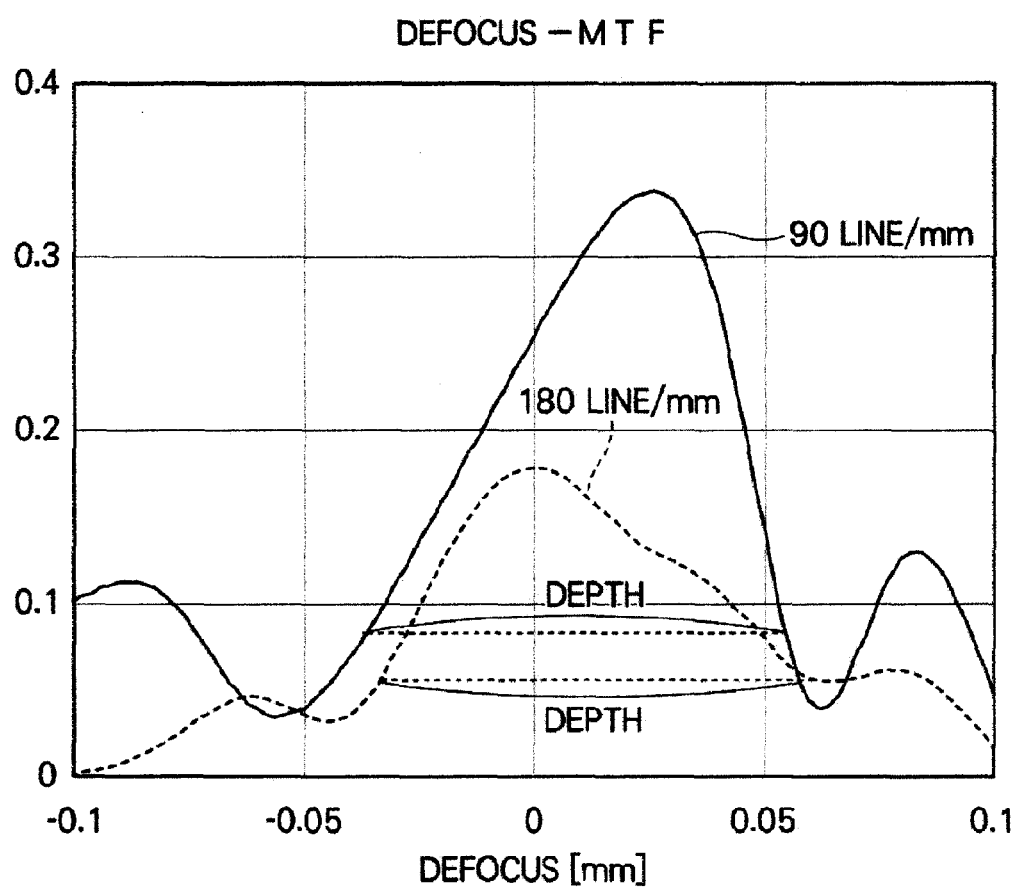
Figure 17A:
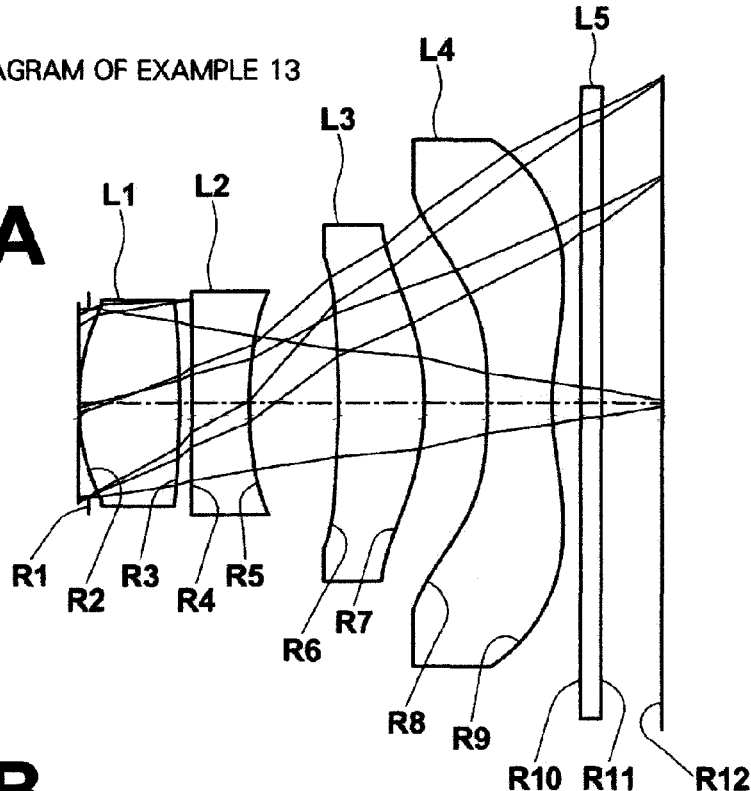
Figure 17B:
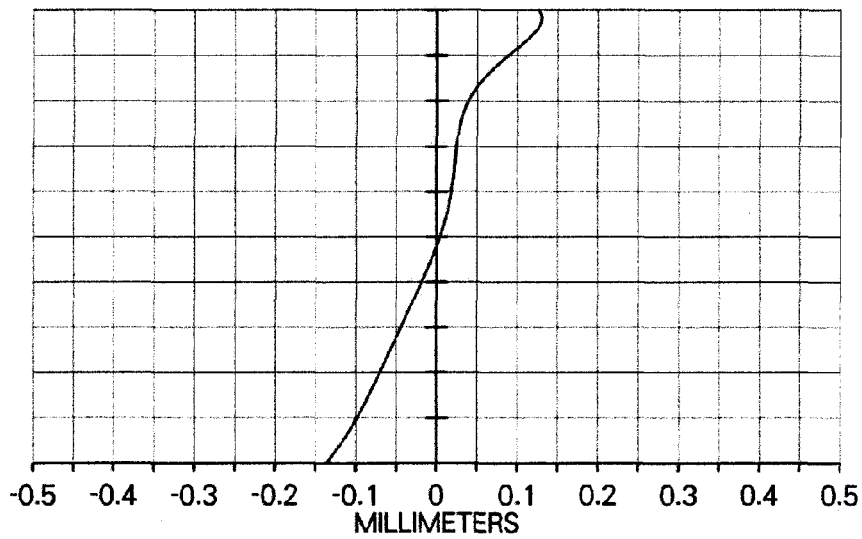
Figure 17C:
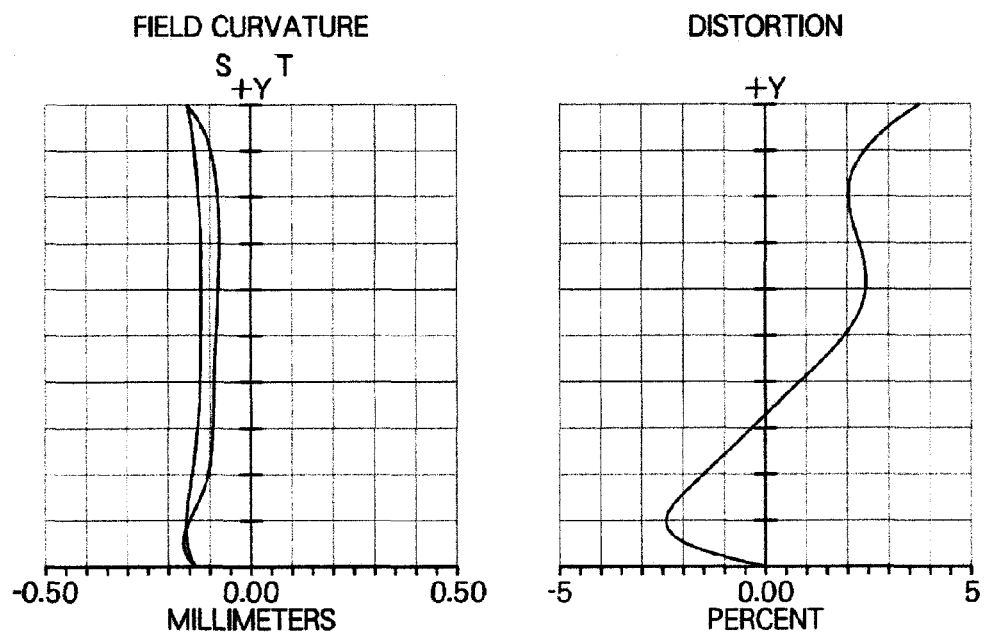
Figure 17D:
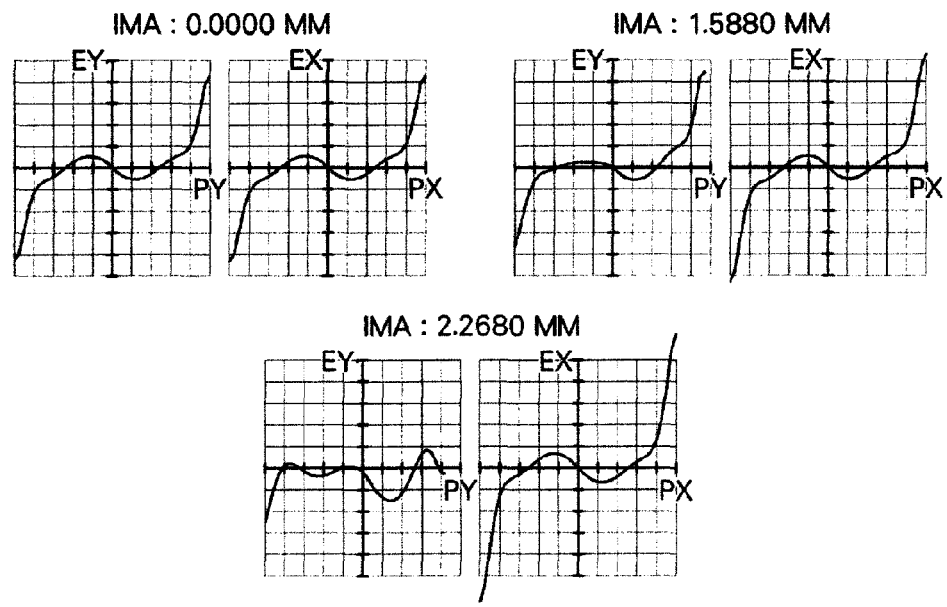
Figure 17E:
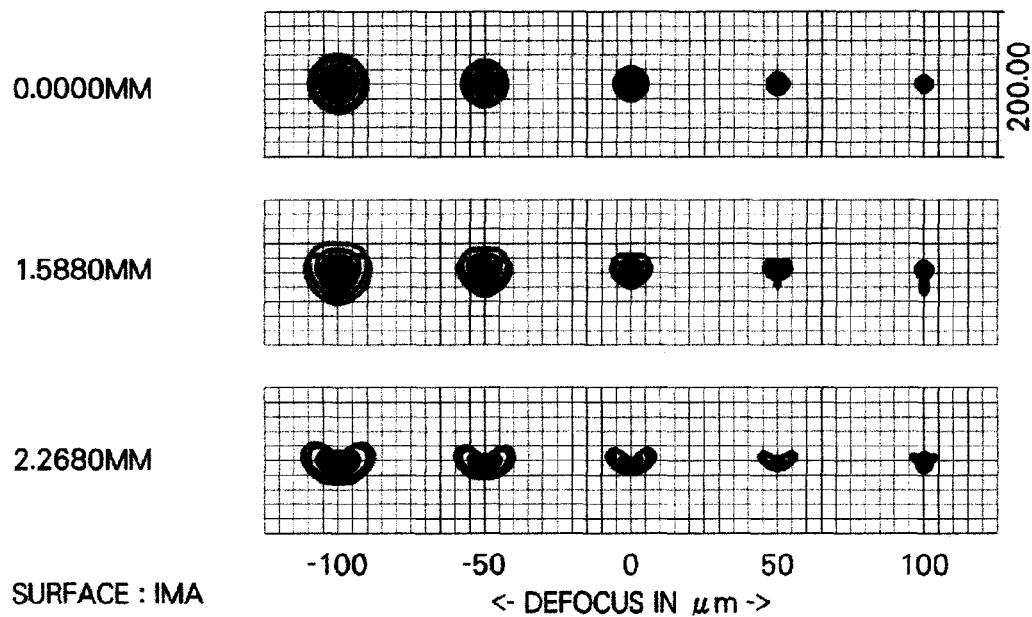
Figure 17F:
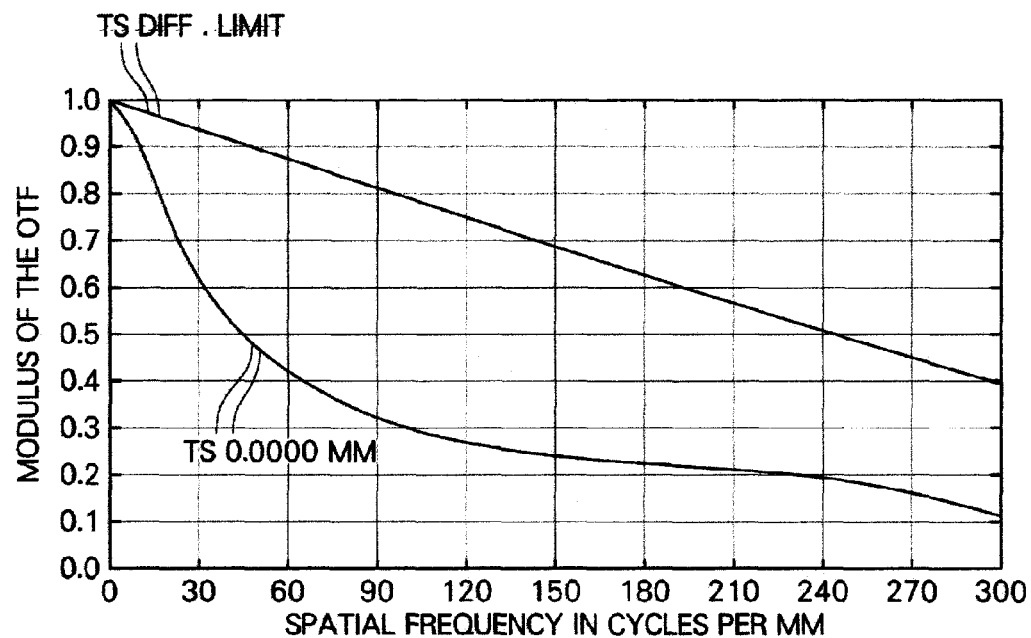
Figure 17H:
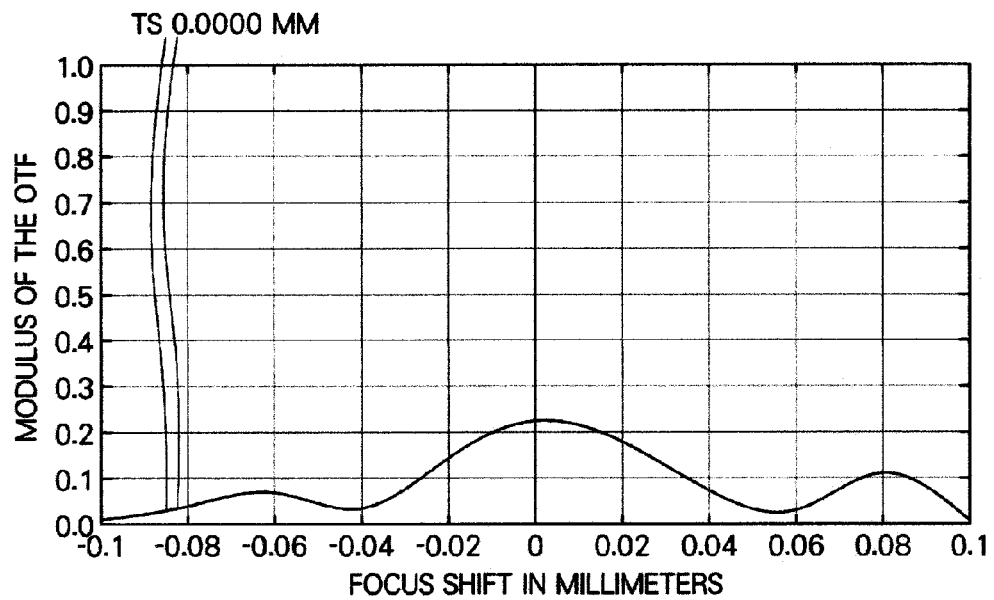
Figure 171:
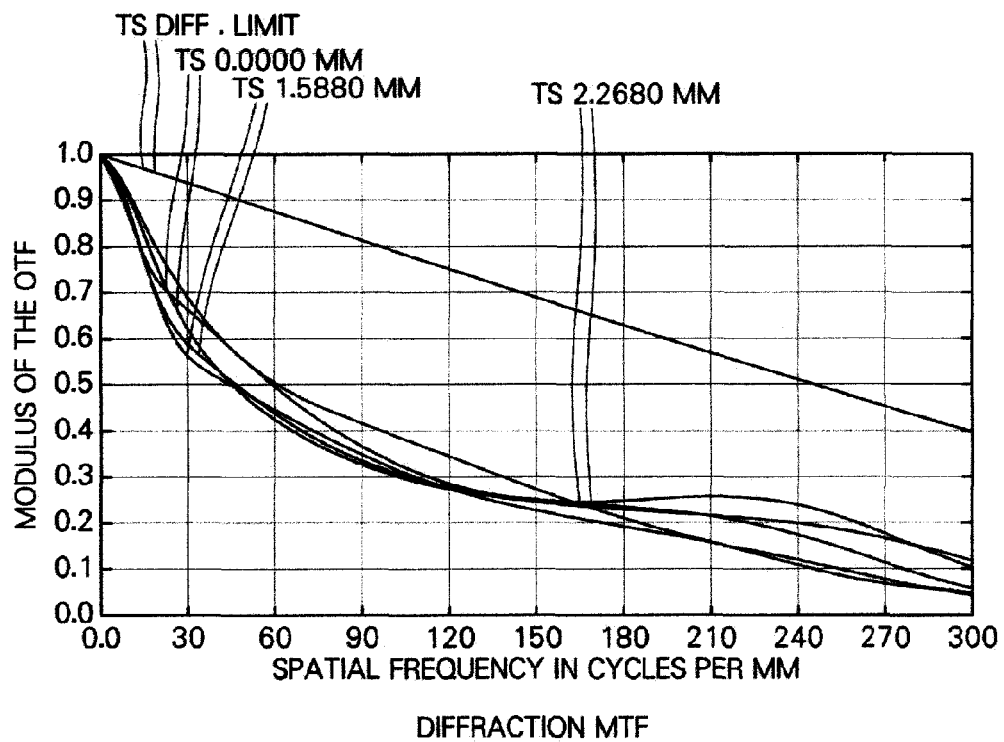
Figure 17J:
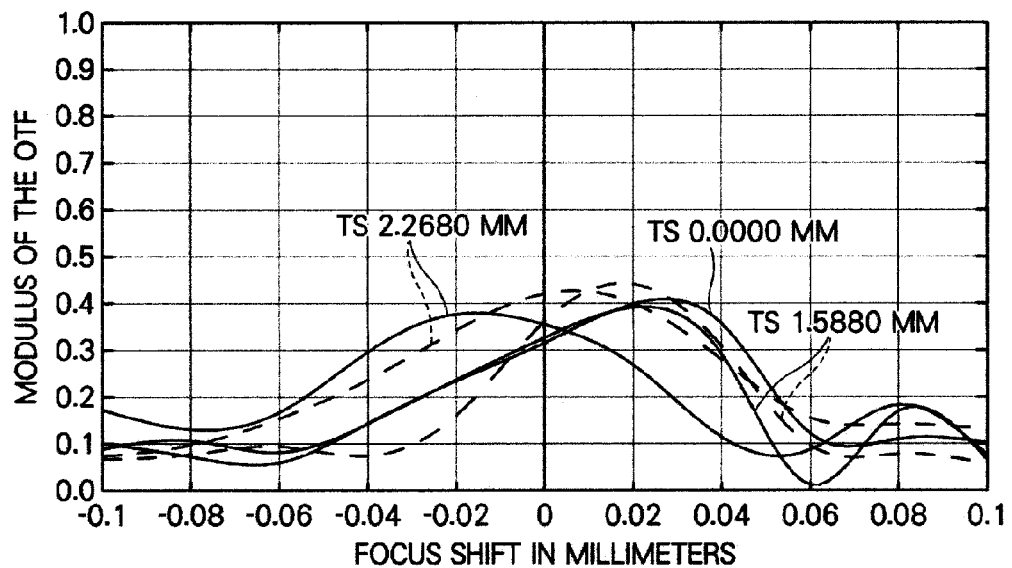
Figure 17K:
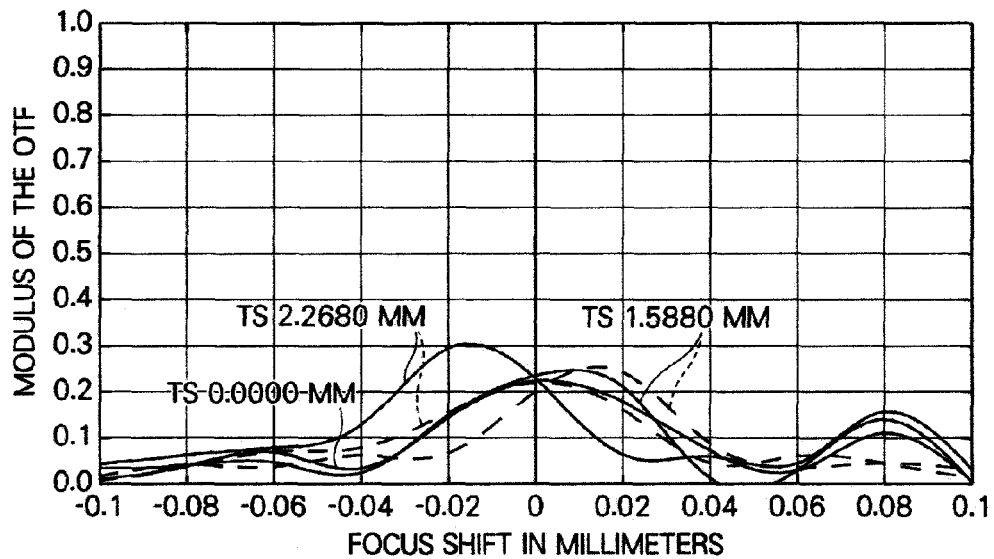
Figure 17N:
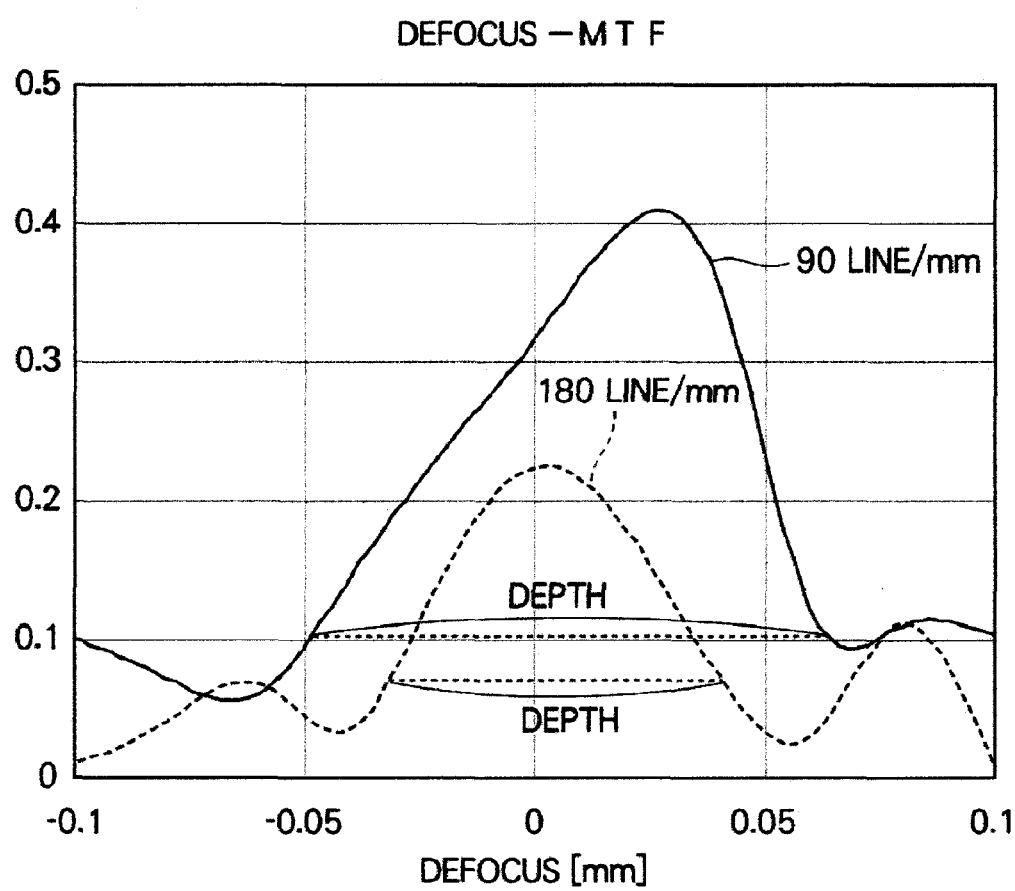
Figure 18A:
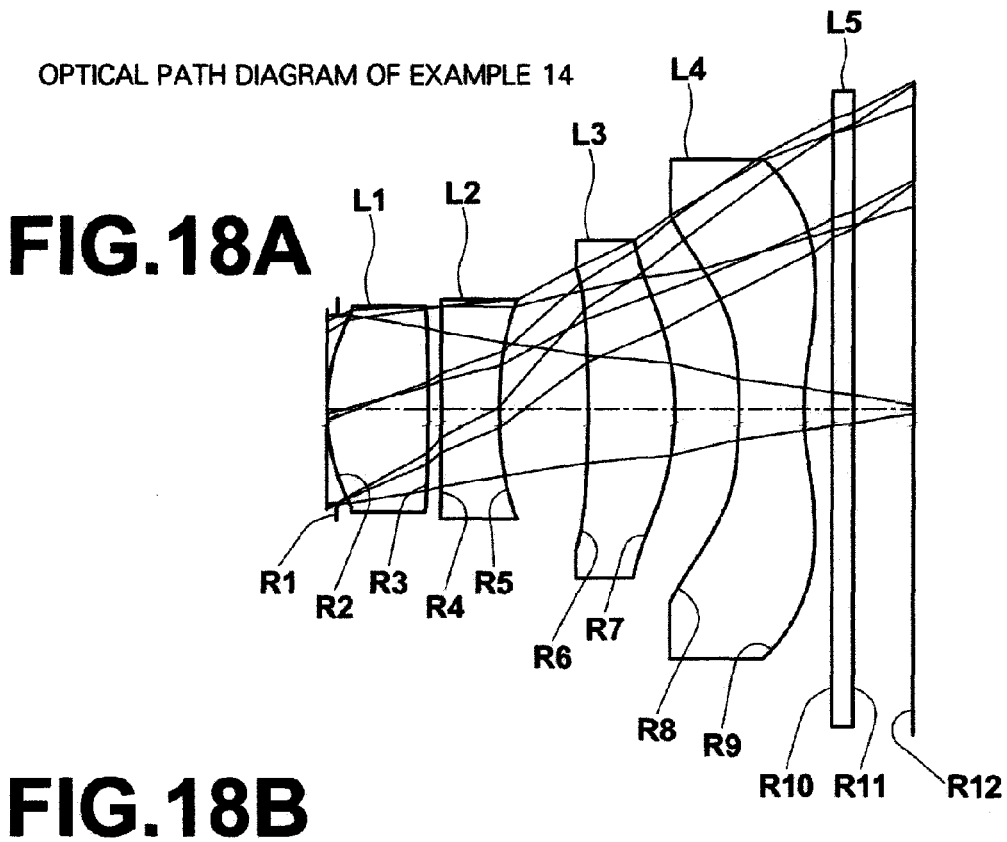
Figure 18B:
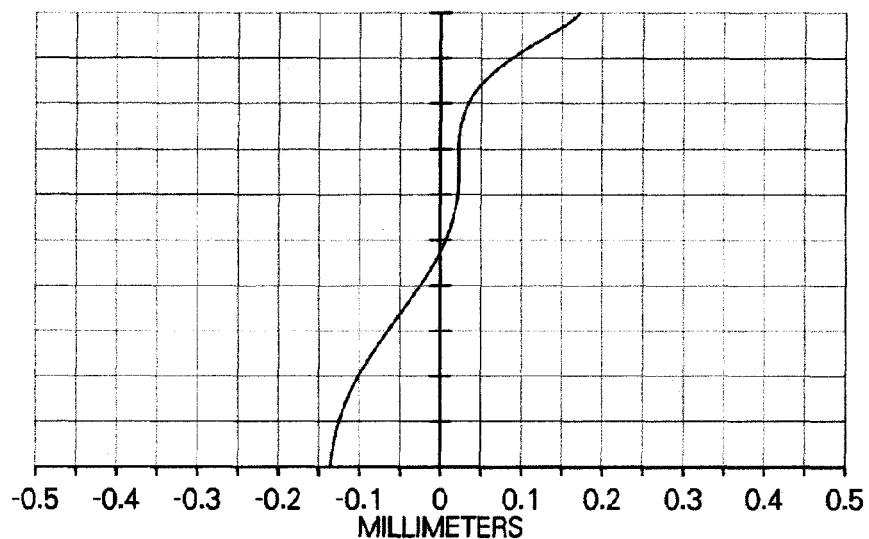
Figure 18C:
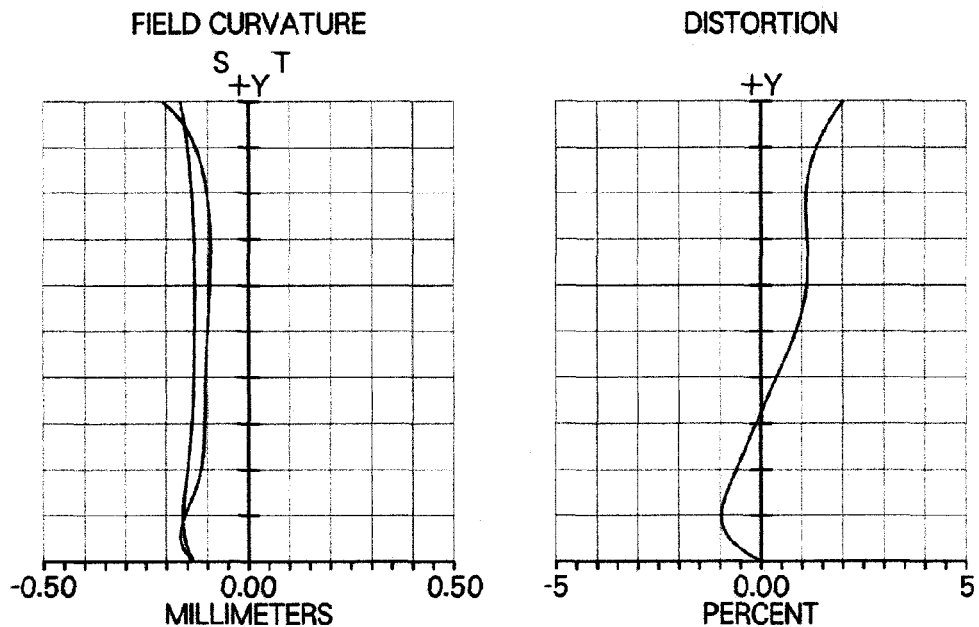
Figure 18D:
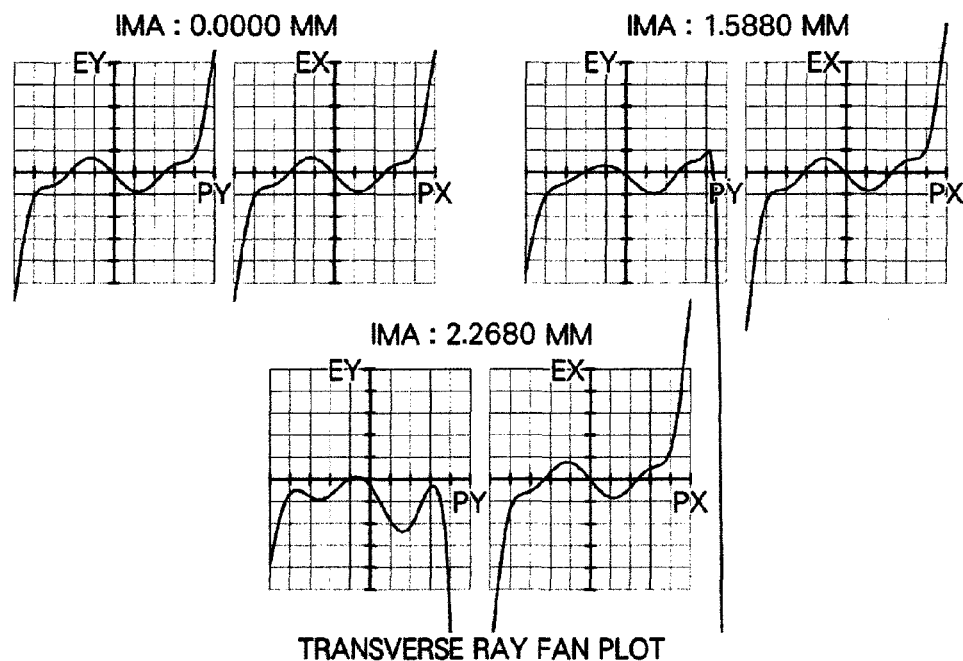
Figure 18E:
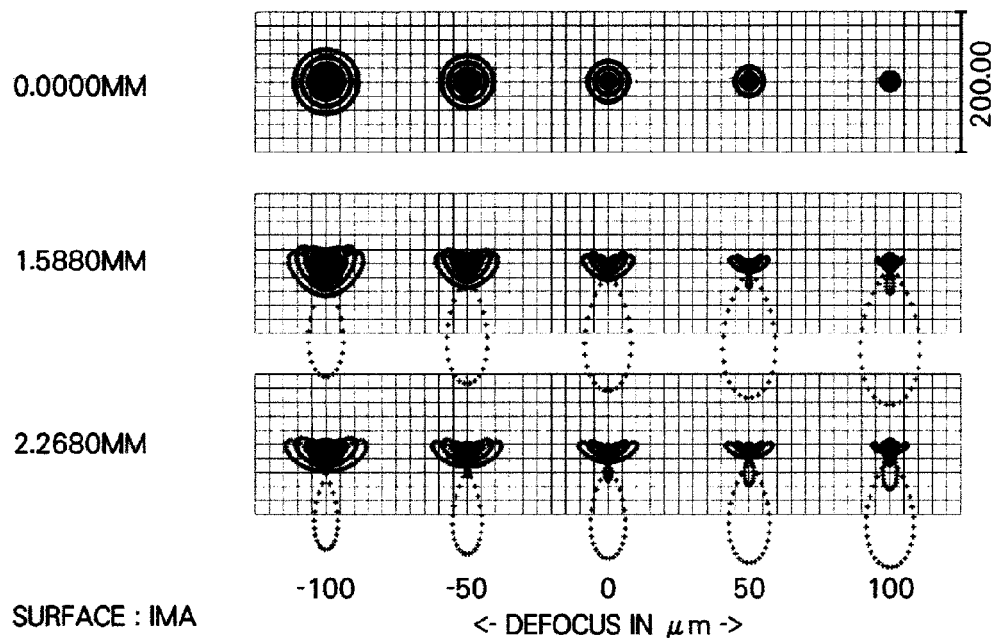
Figure 18F:
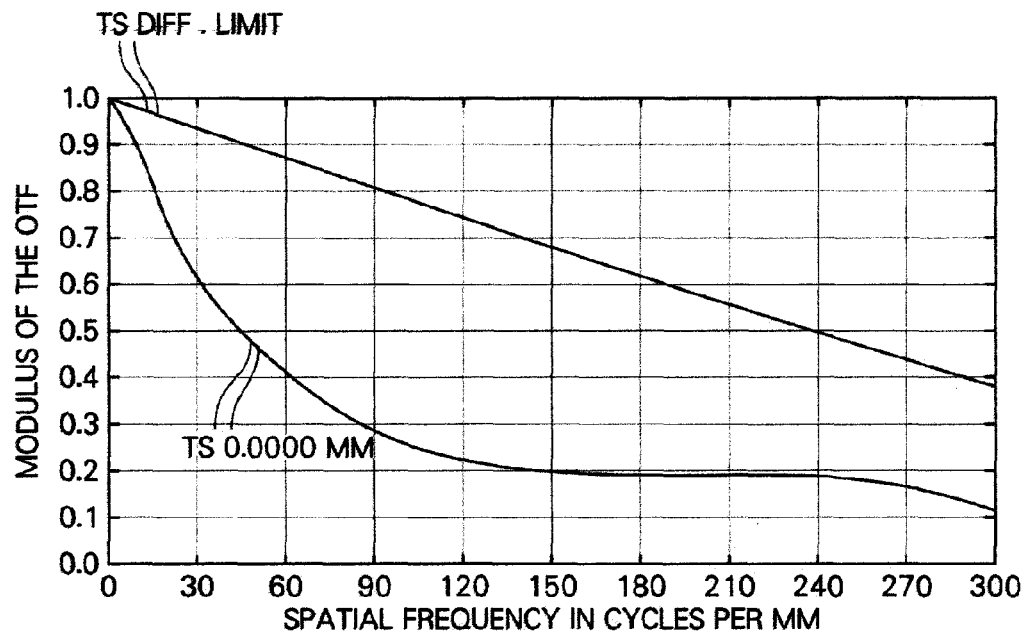
Figure 18G:
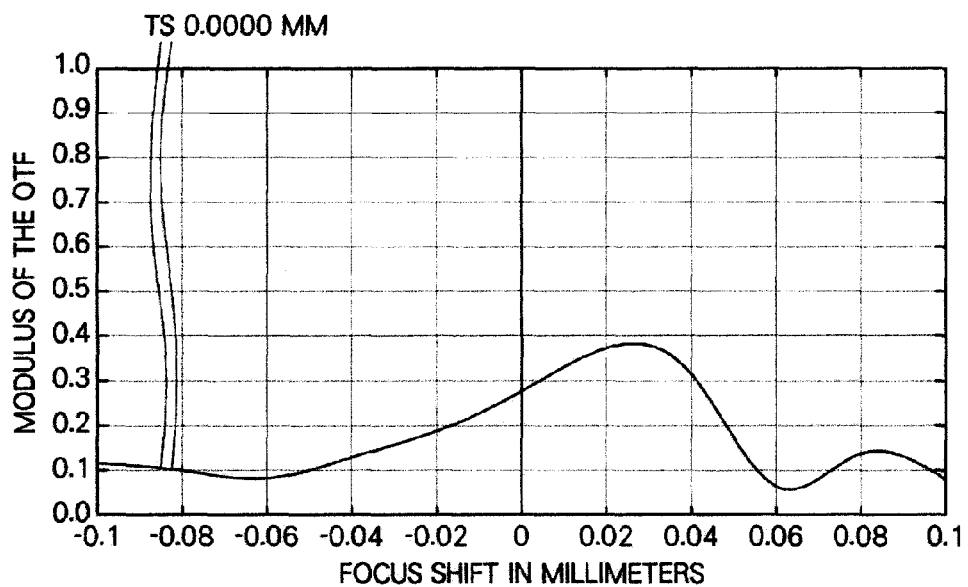
Figure 18H:
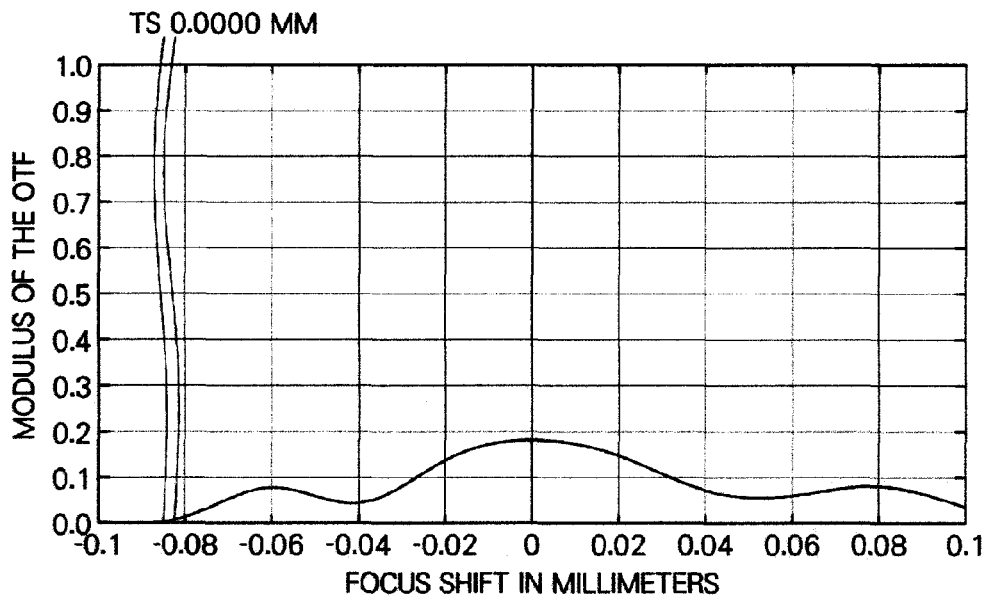
Figure 18I:
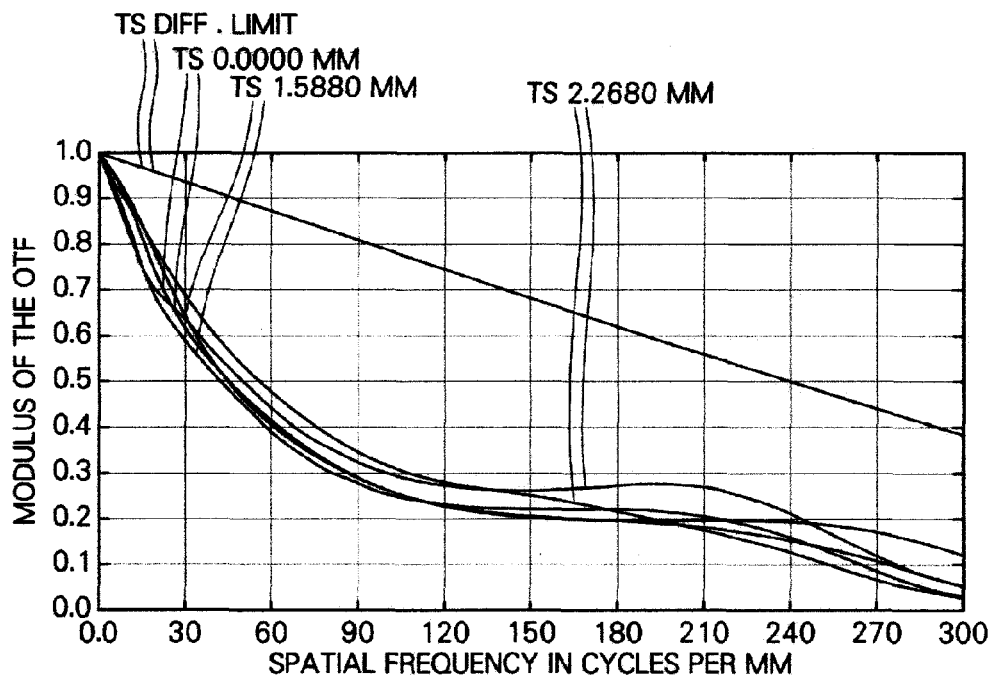
Figure 18J:
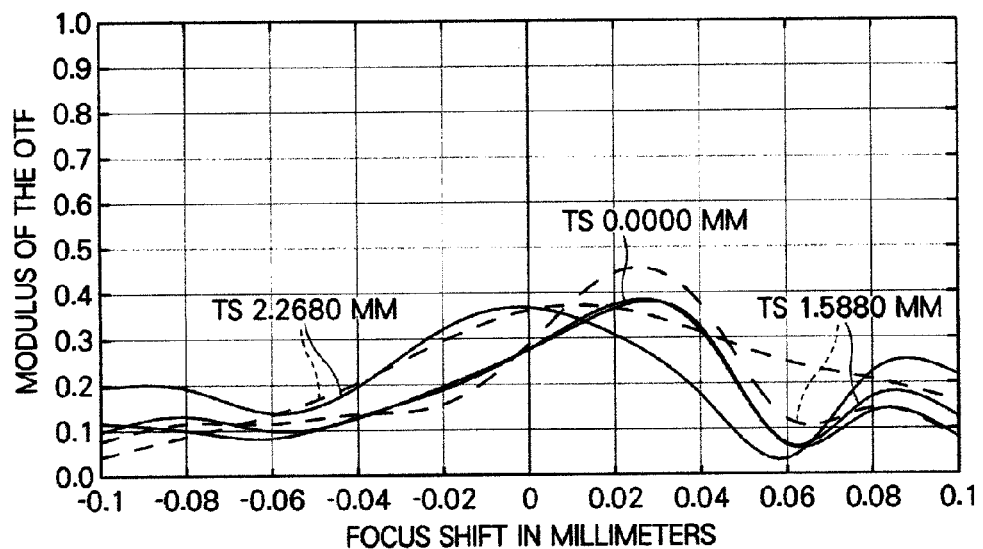
Figure 18K:
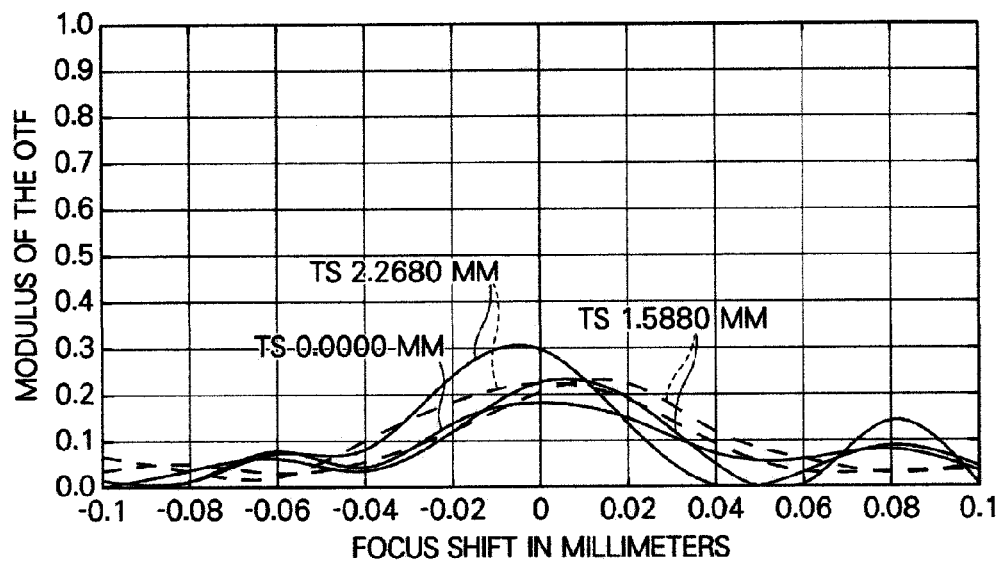
Figure 18N:
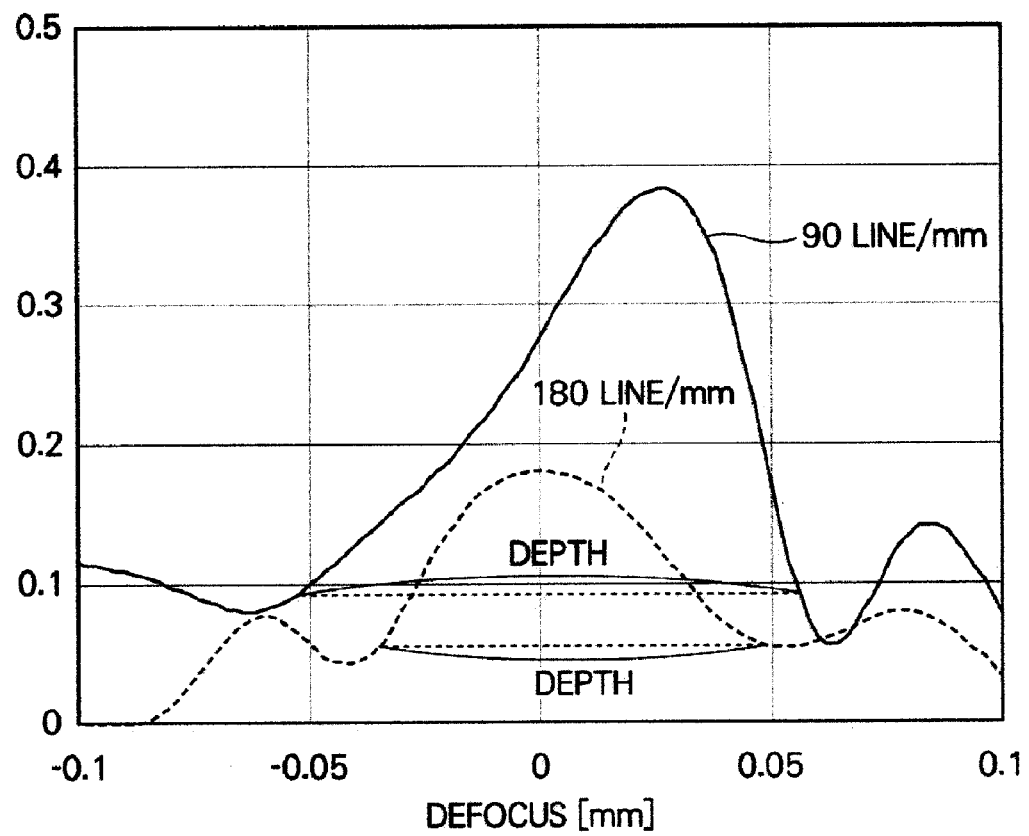
Figure 19A:
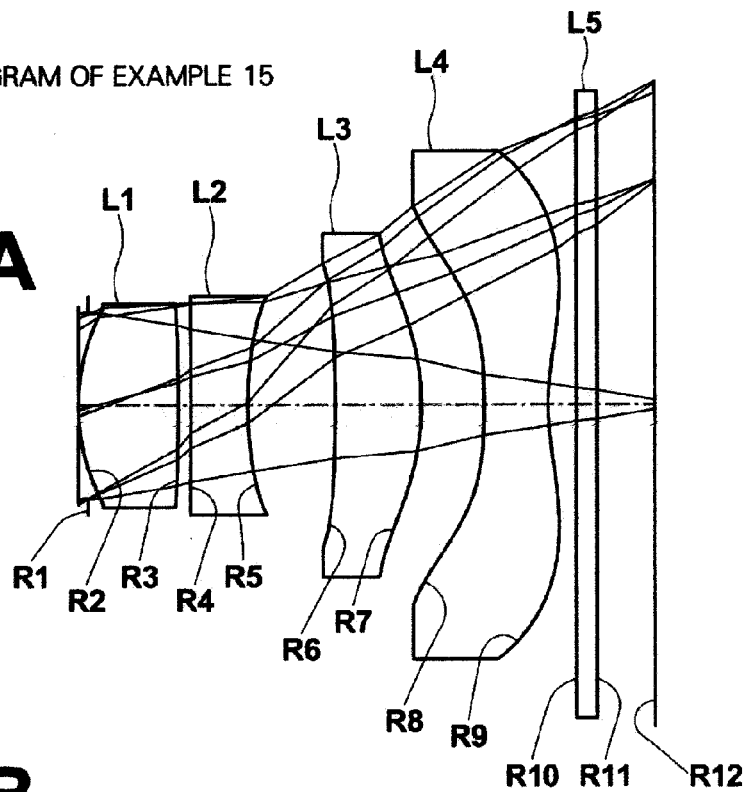
Figure 19B:
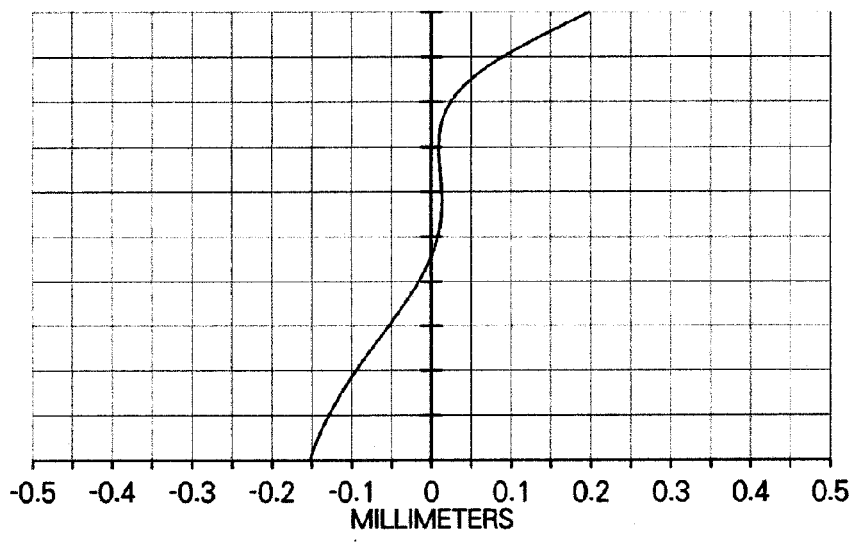
Figure 19C:
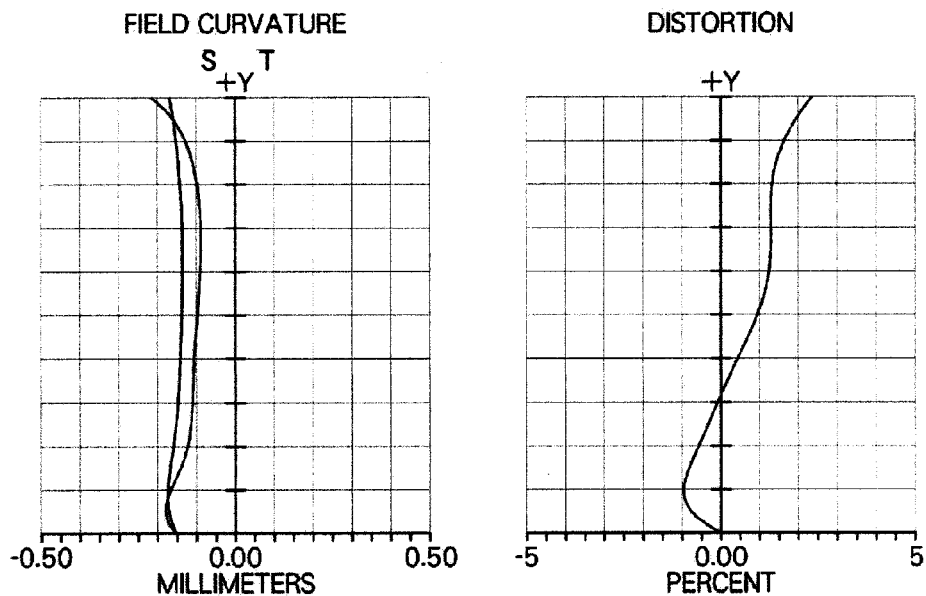
Figure 19D:
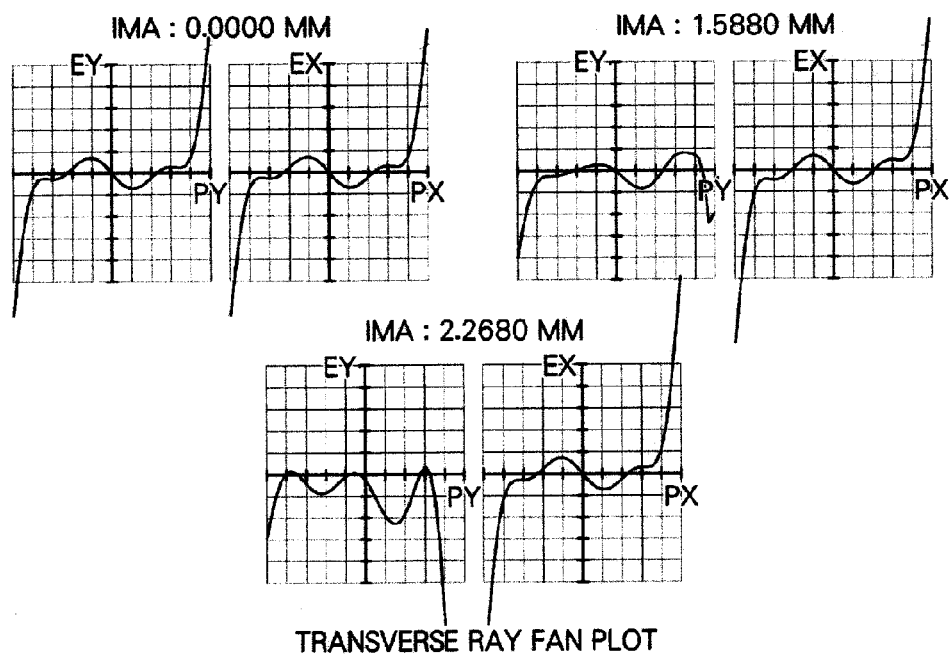
Figure 19E:
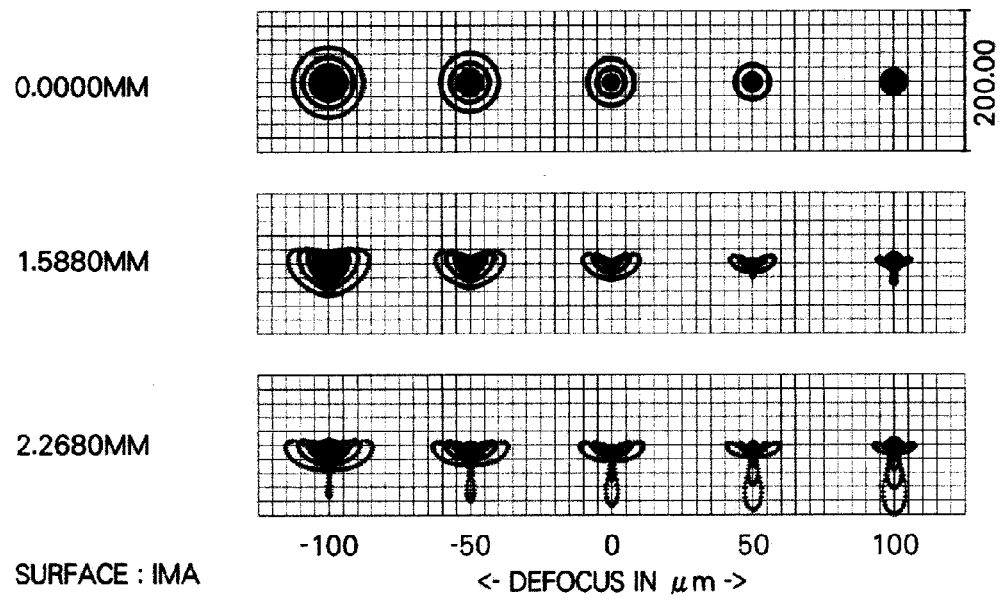
Figure 19F:
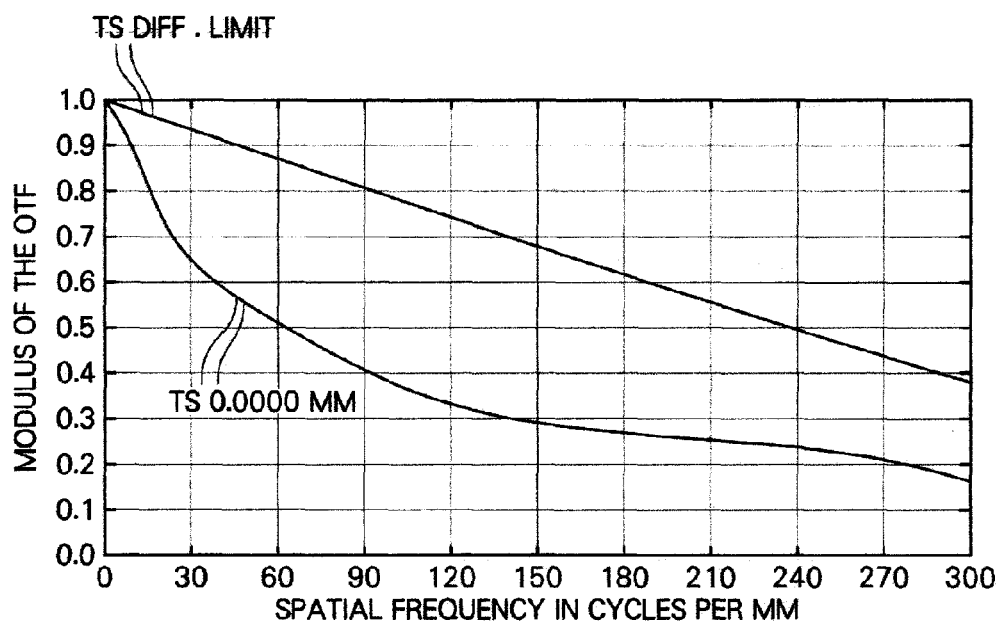
Figure 19G:
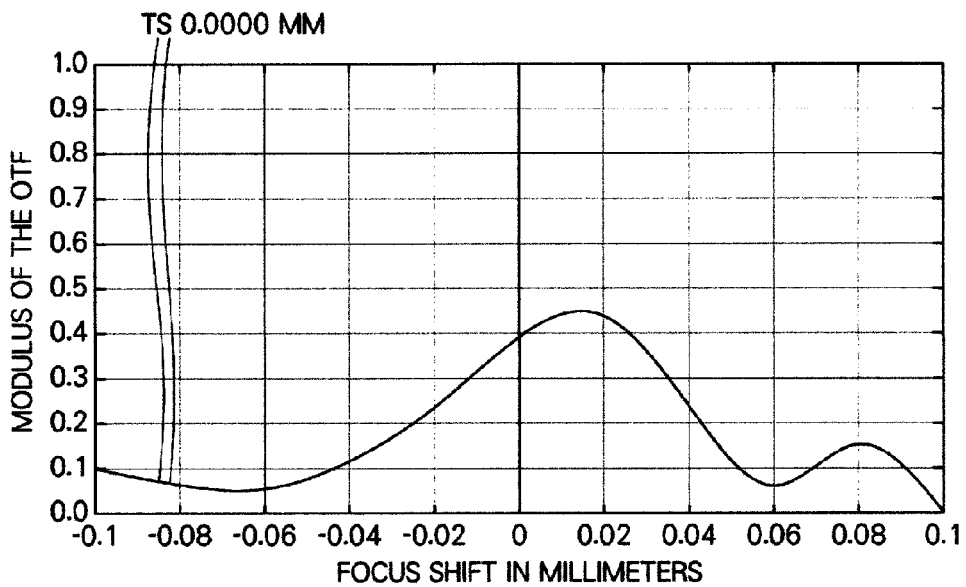
Figure 19H:
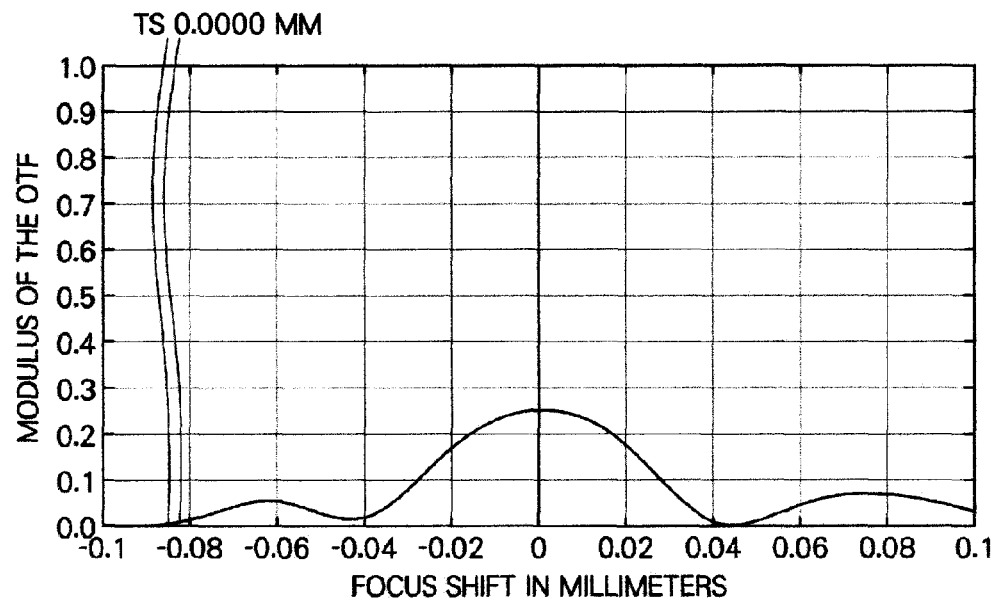
Figure 19I:
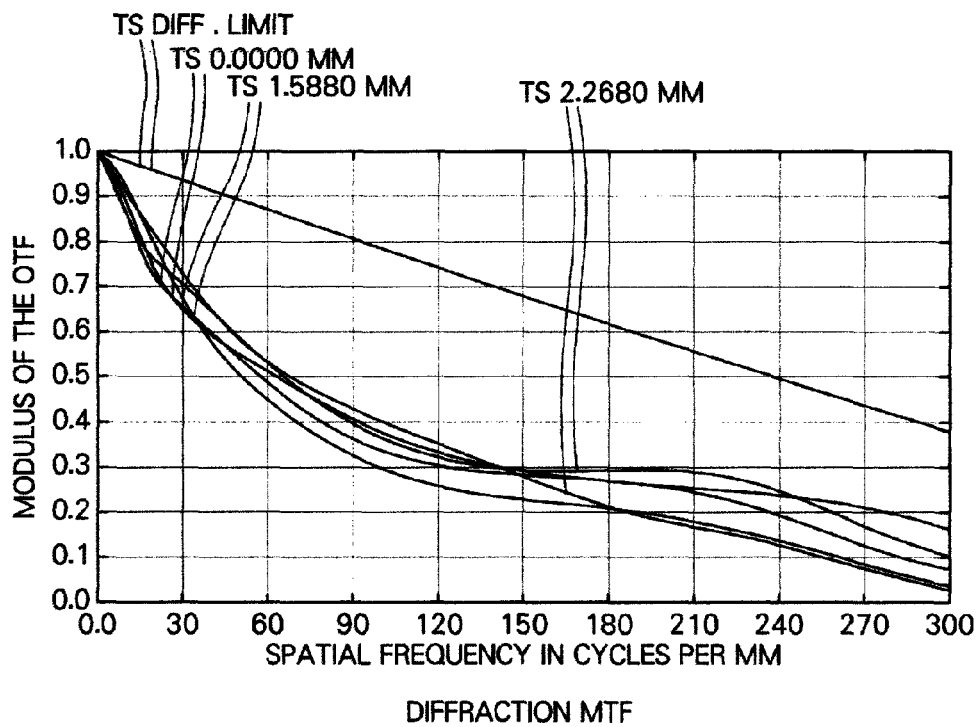
Figure 19J:
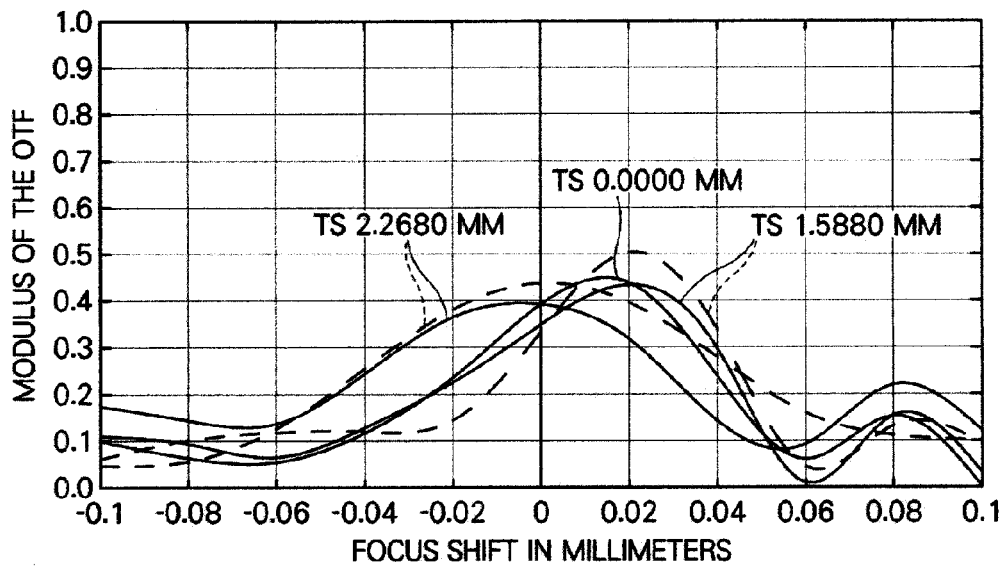
Figure 19K:
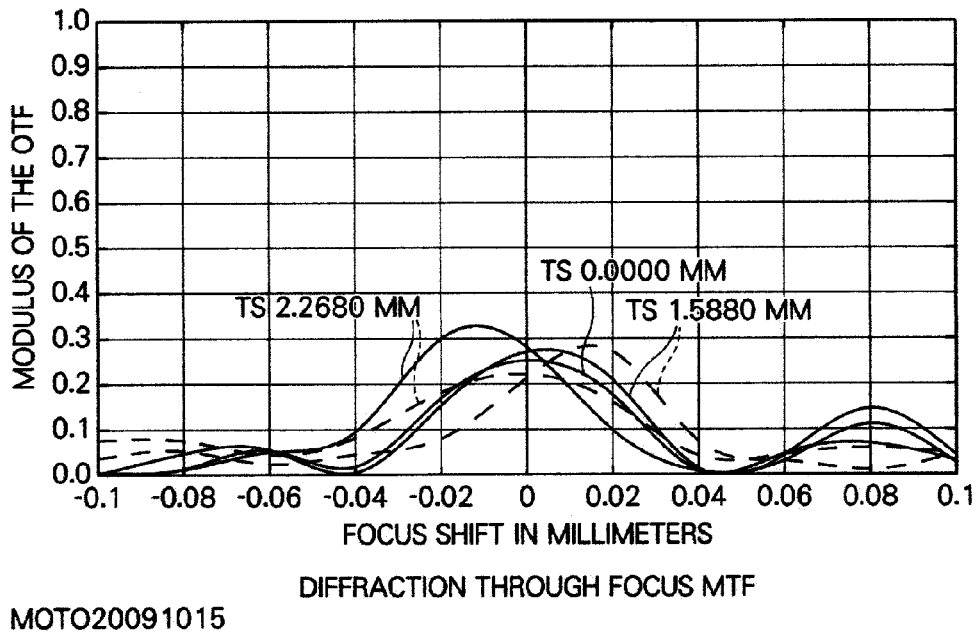
Figure 19N:
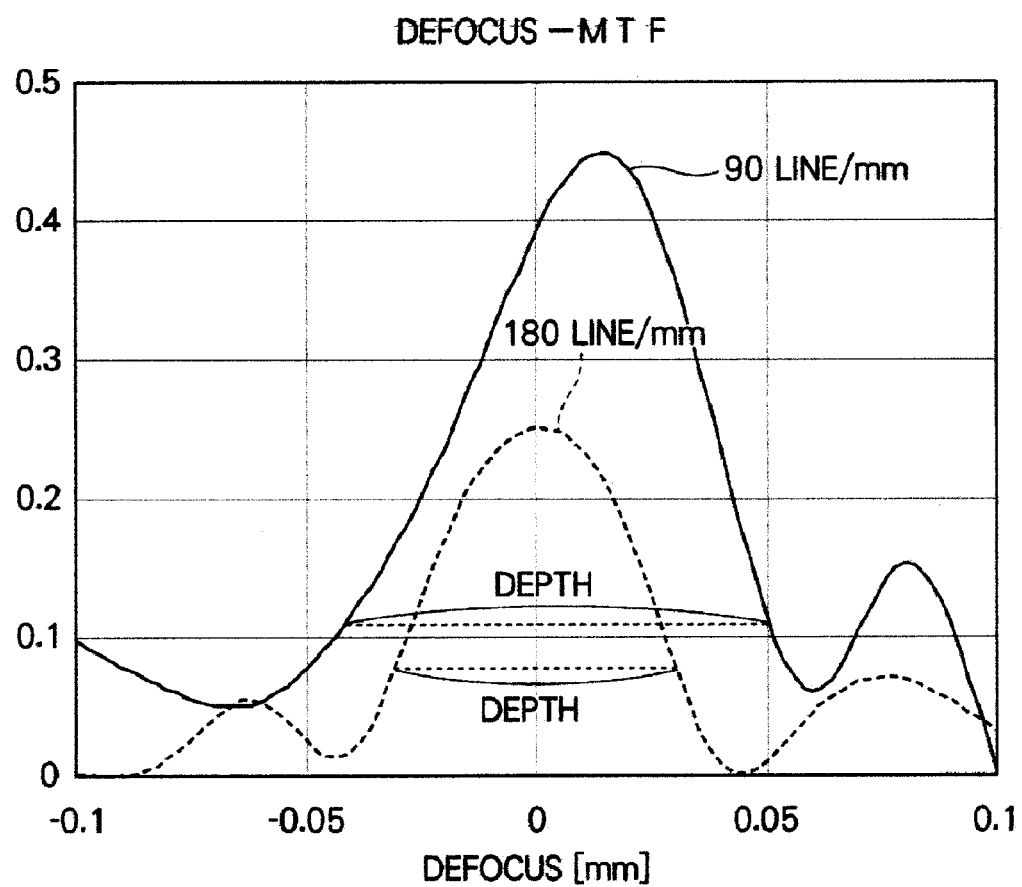
Figure 20A:
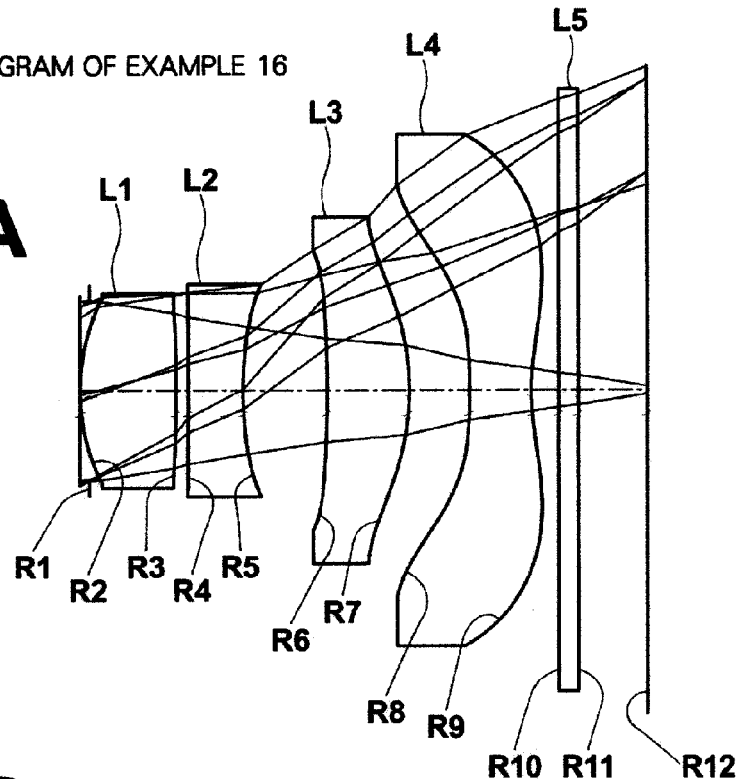
Figure 20B:
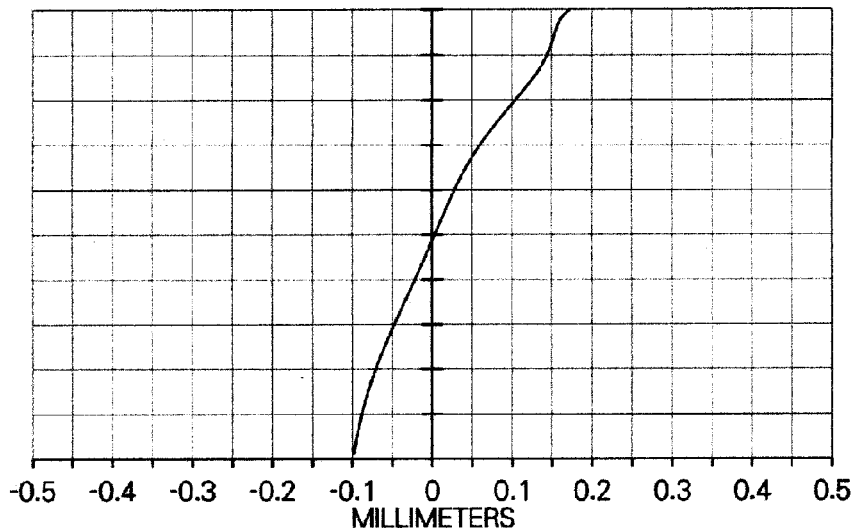
Figure 20C:
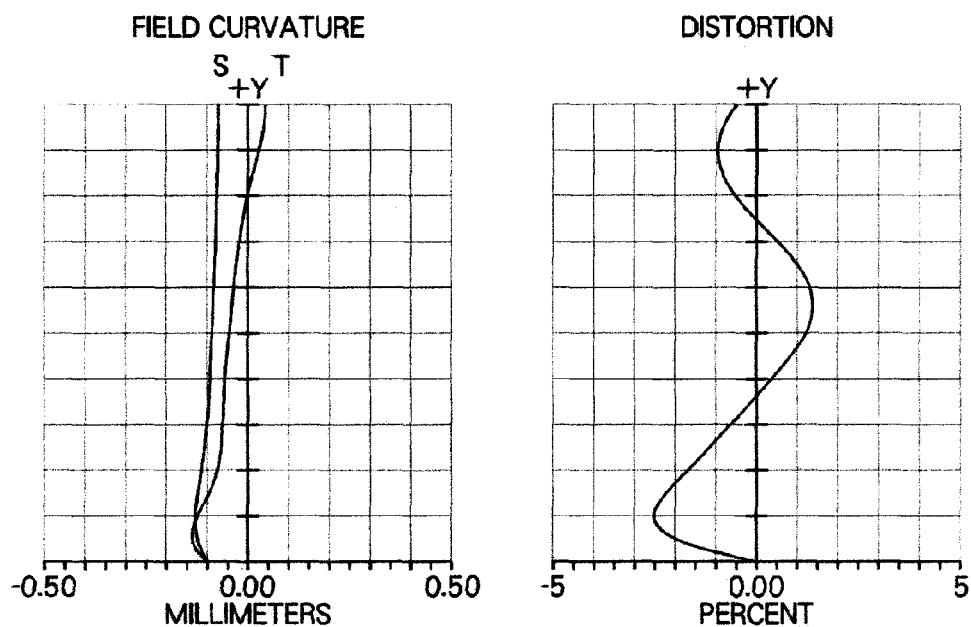
Figure 20D:
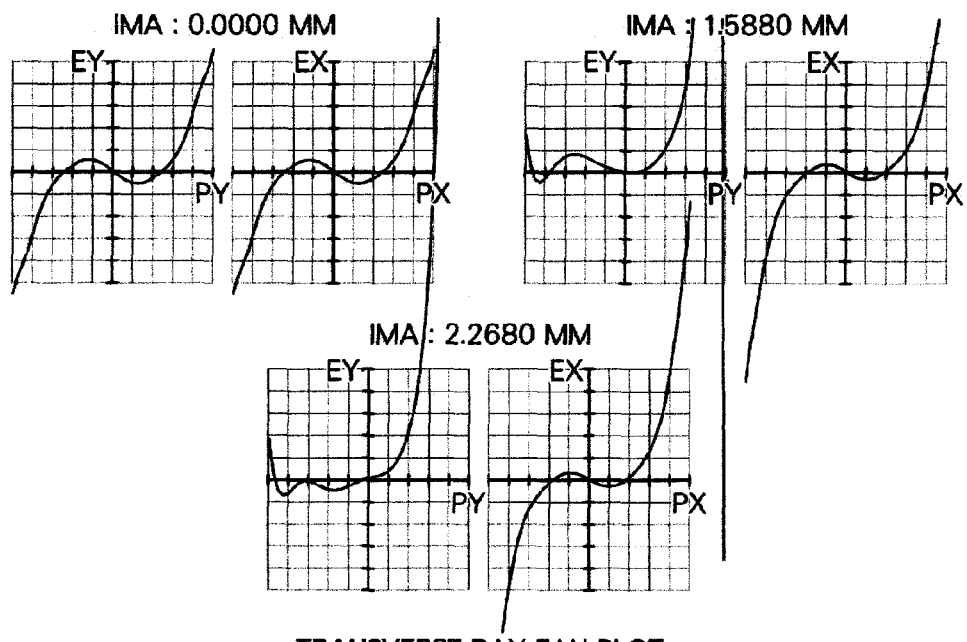
Figure 20E:
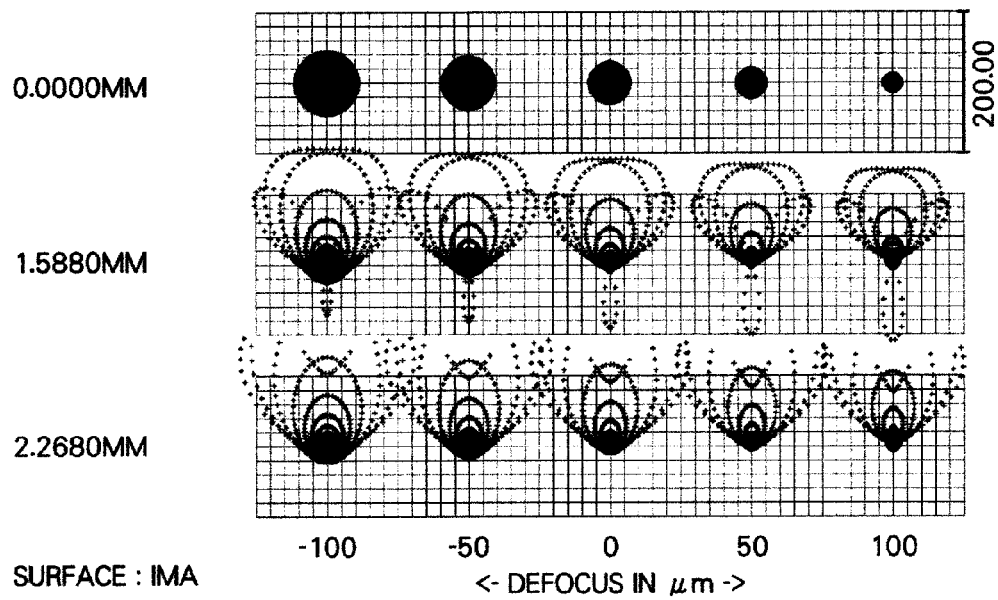
Figure 20F:
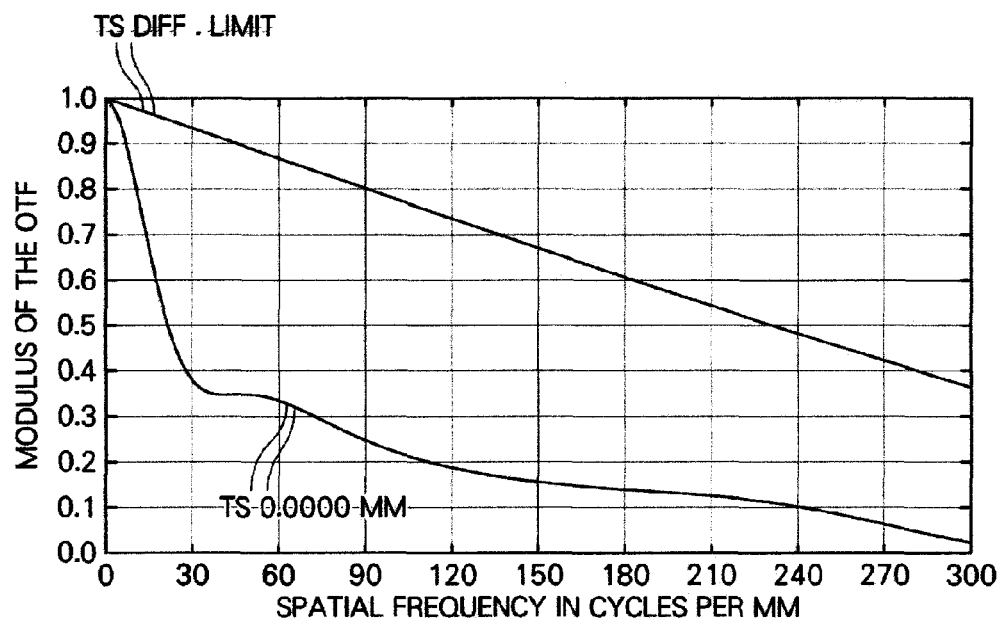
Figure 20G:
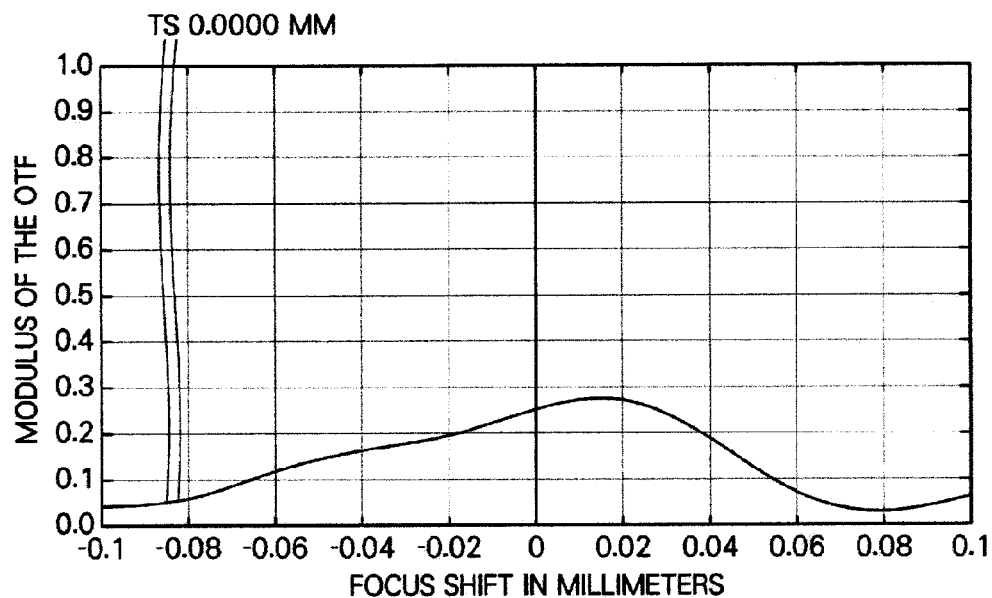
Figure 20H:
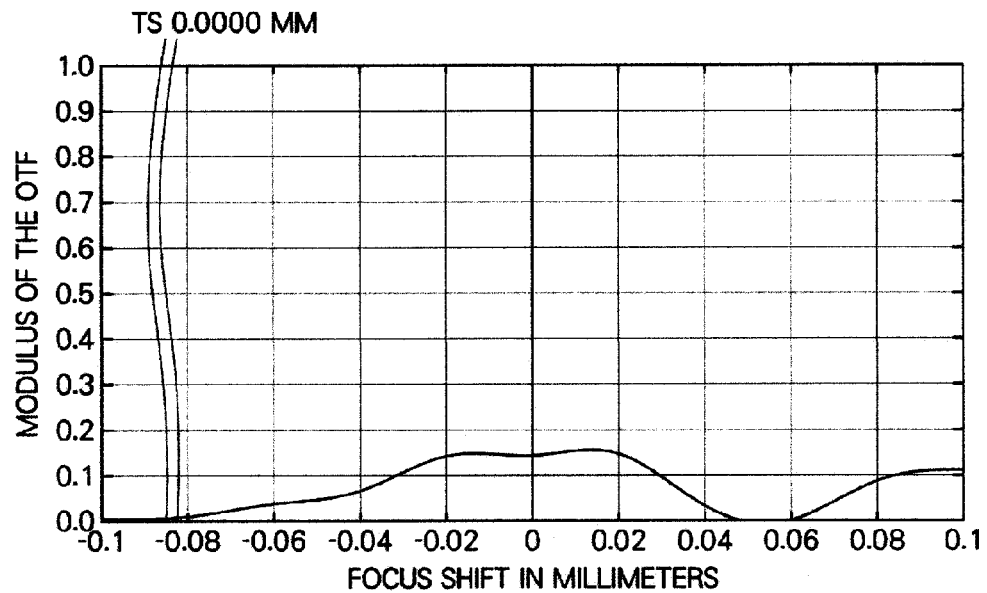
Figure 20I:
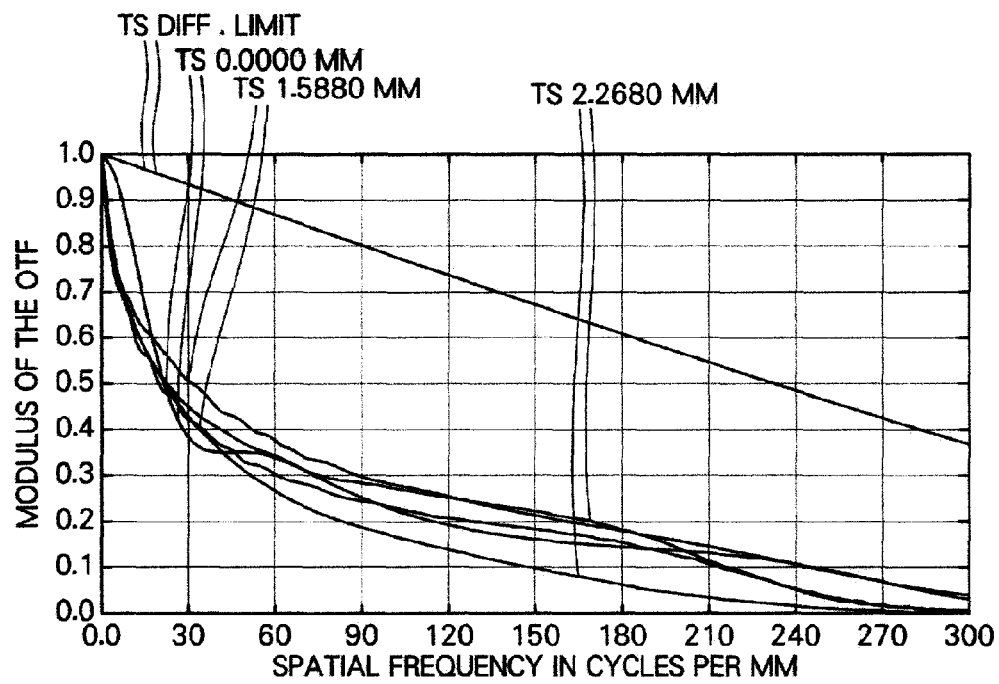
Figure 20J:
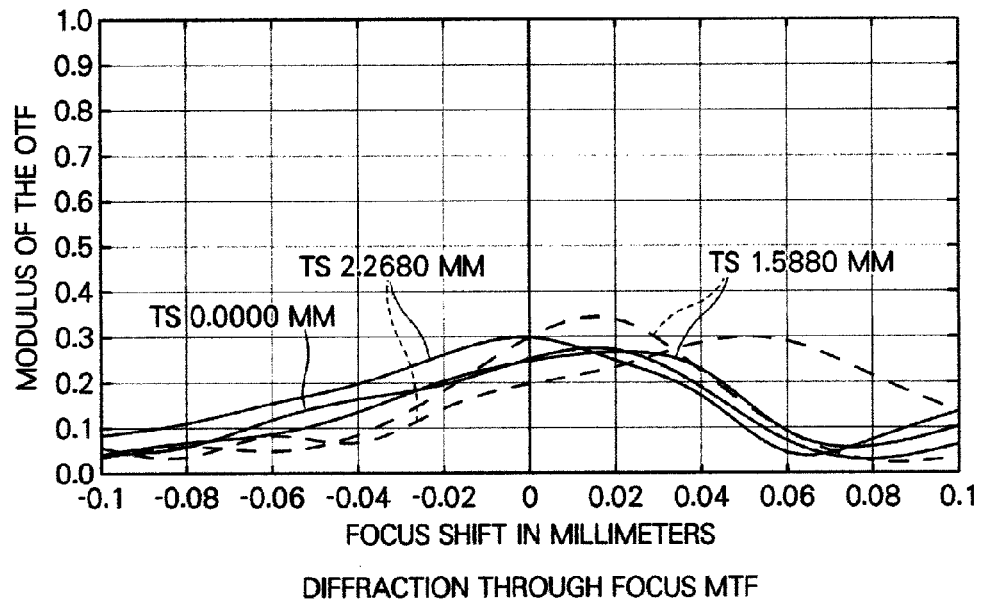
Figure 20K:
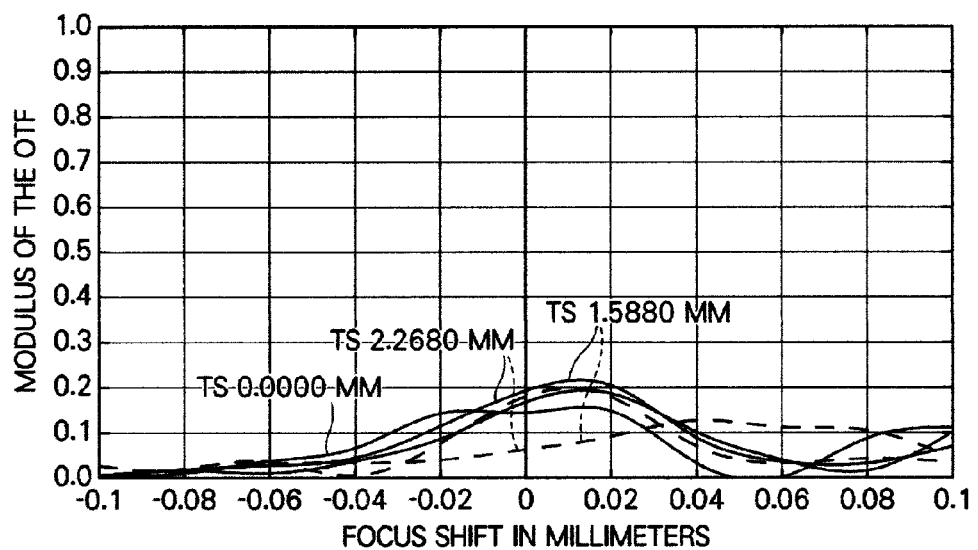
Figure 20N:
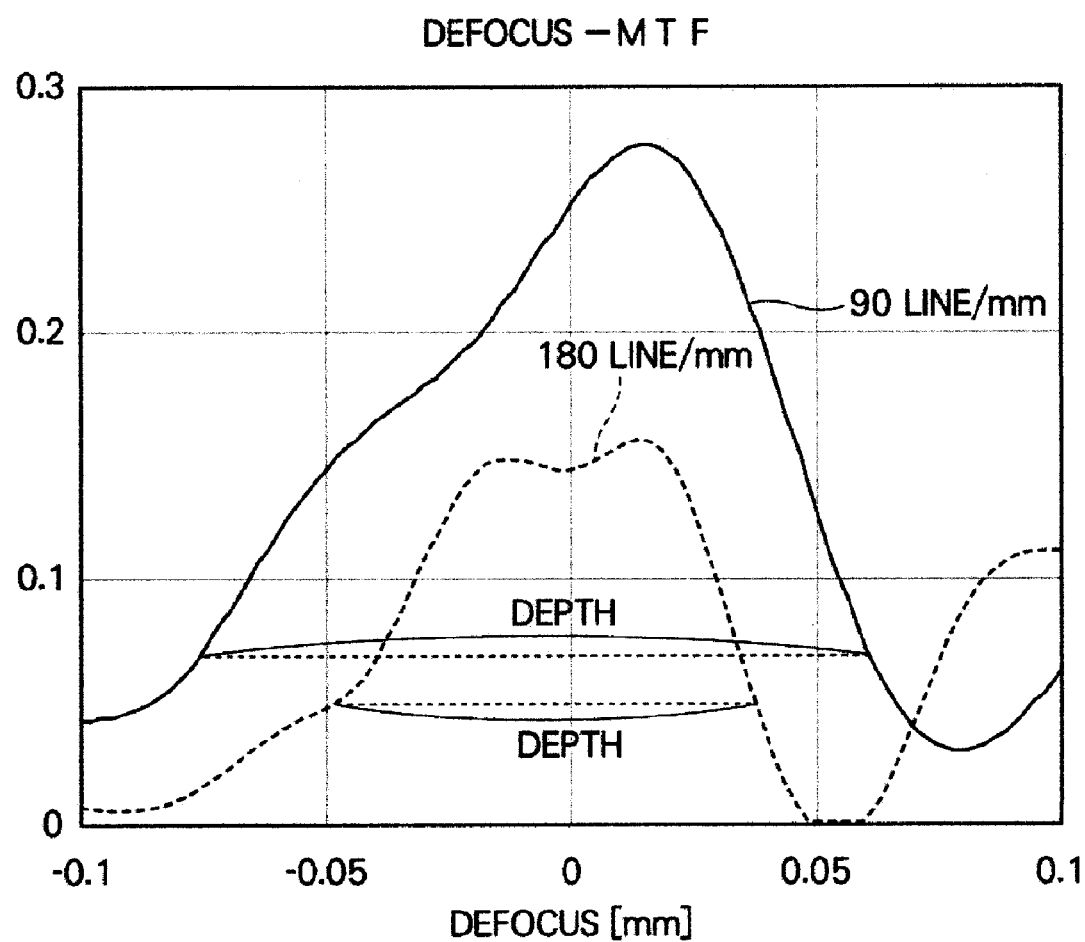
Figure 21A:
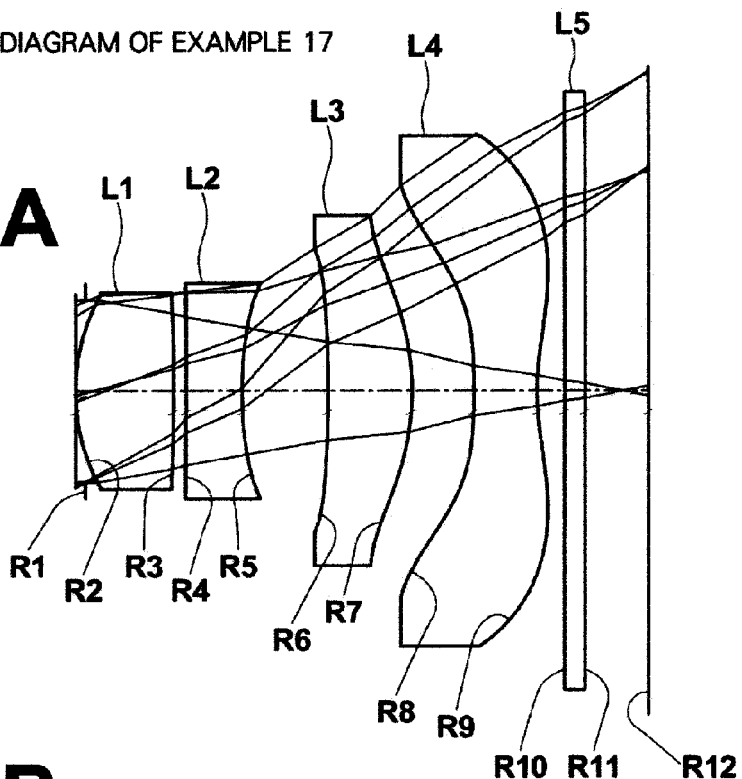
Figure 21B:
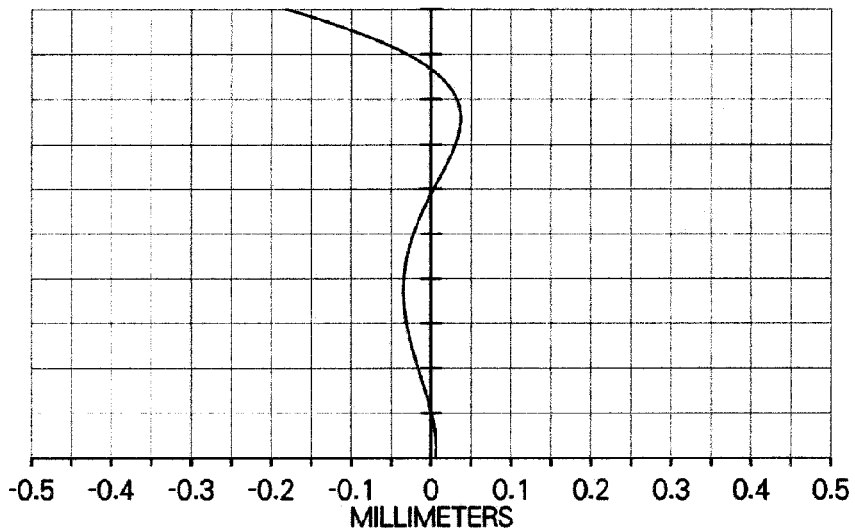
Figure 21C:
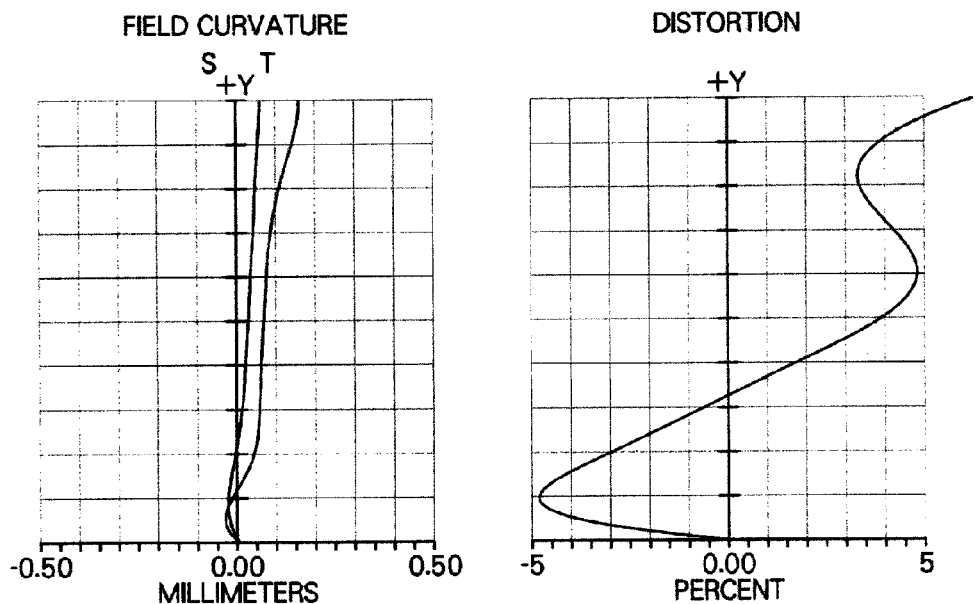
Figure 21D:
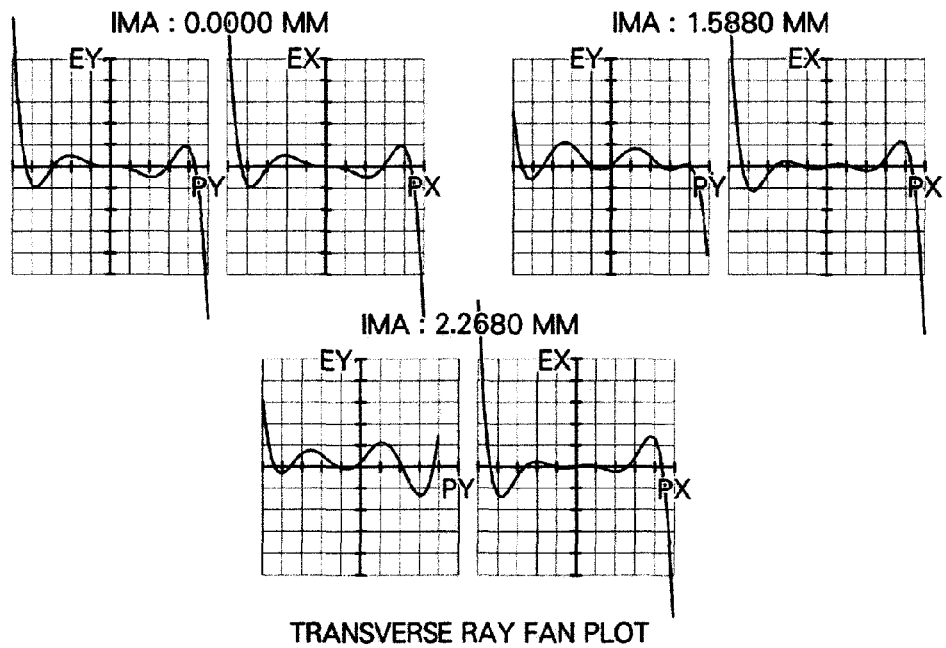
Figure 21E:
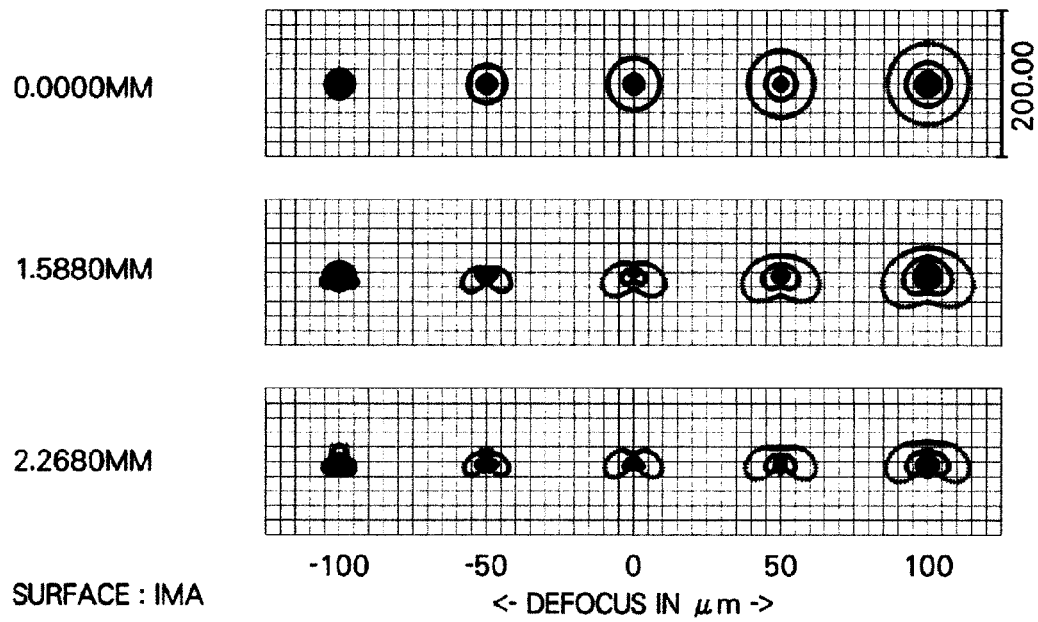
Figure 21F:
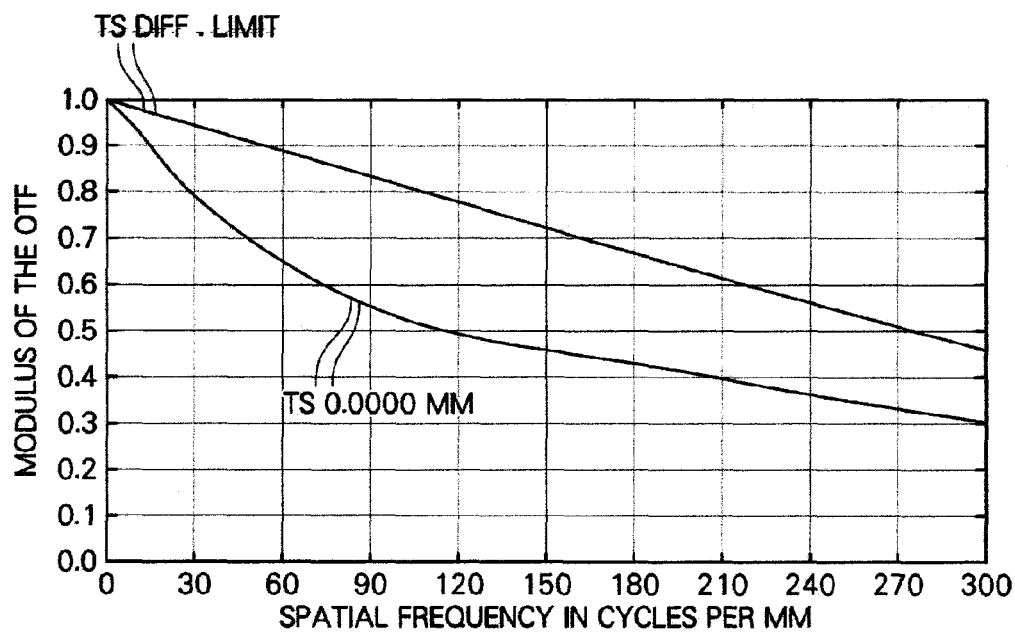
Figure 21G:
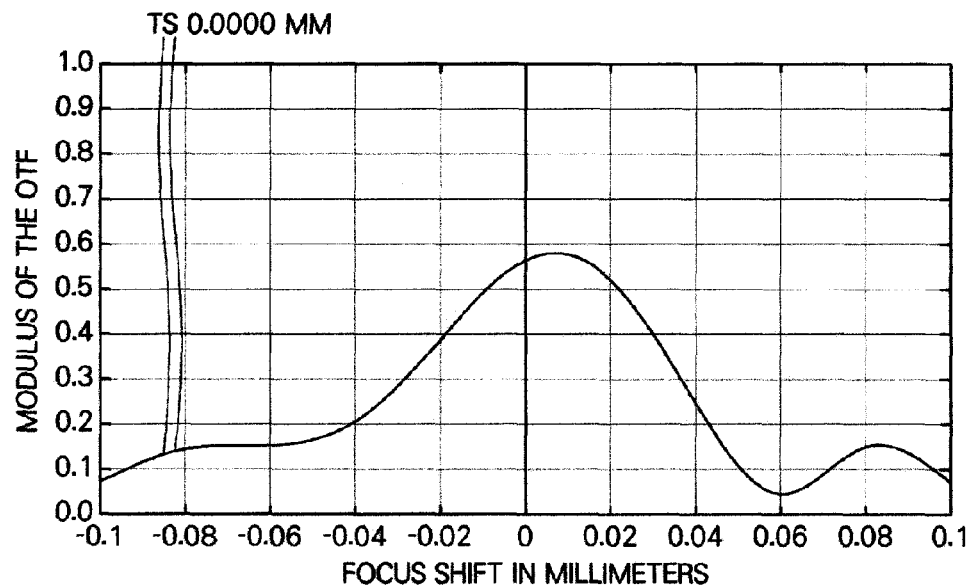
Figure 21H:
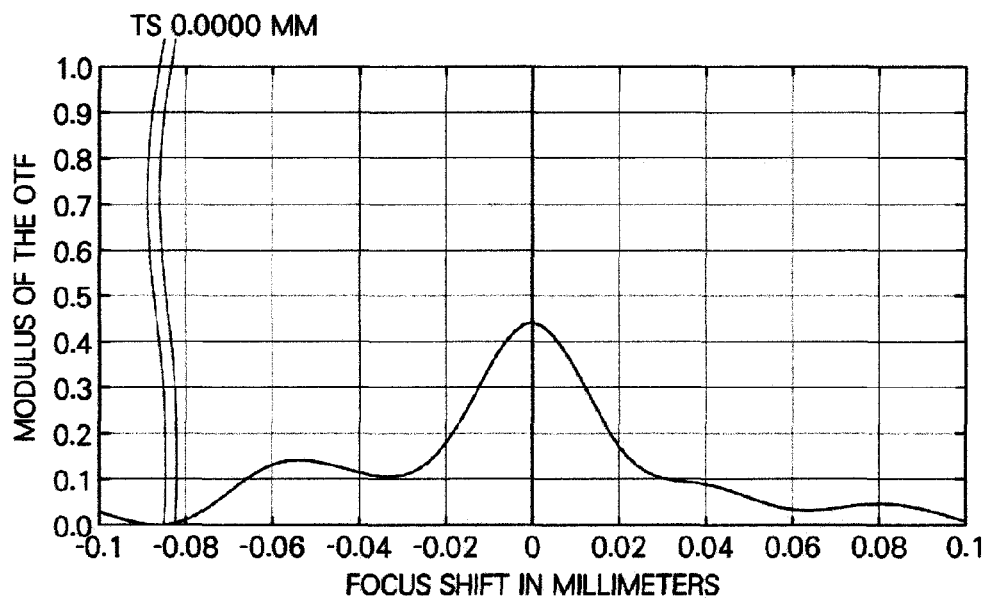
Figure 21I:
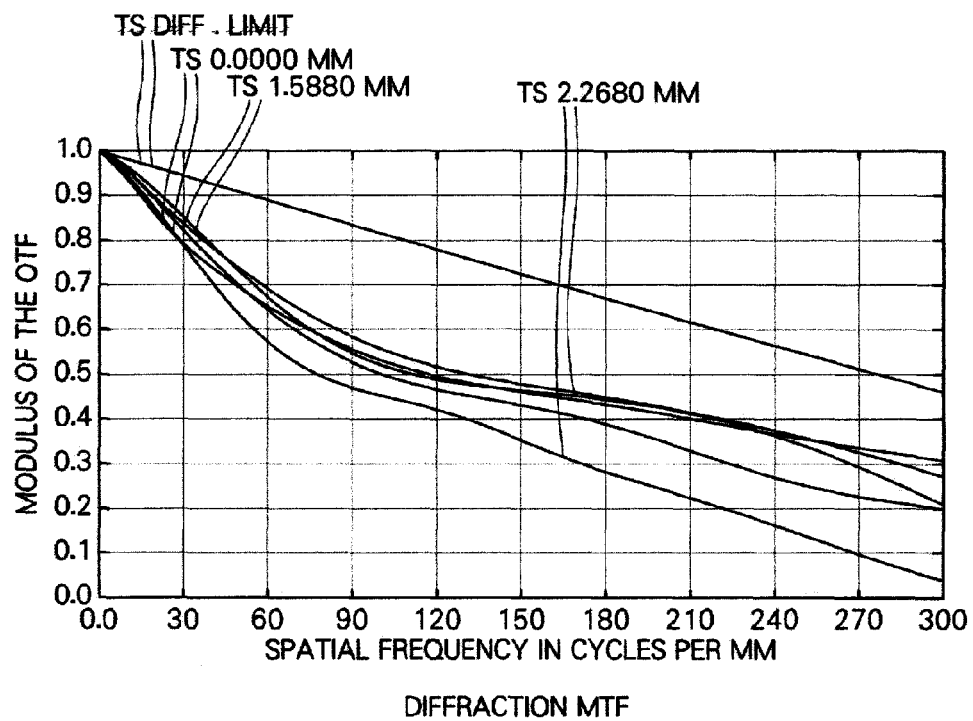
Figure 21J:
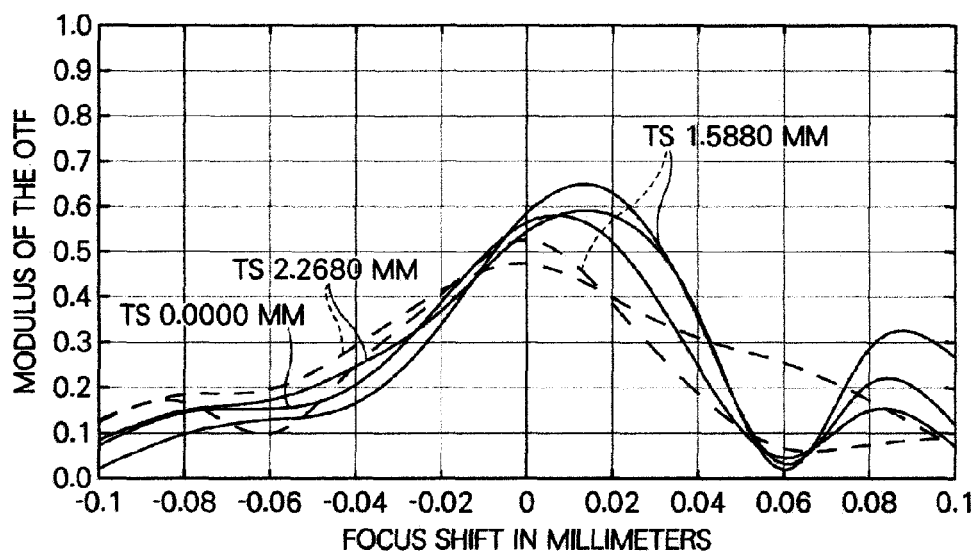
Figure 21K:
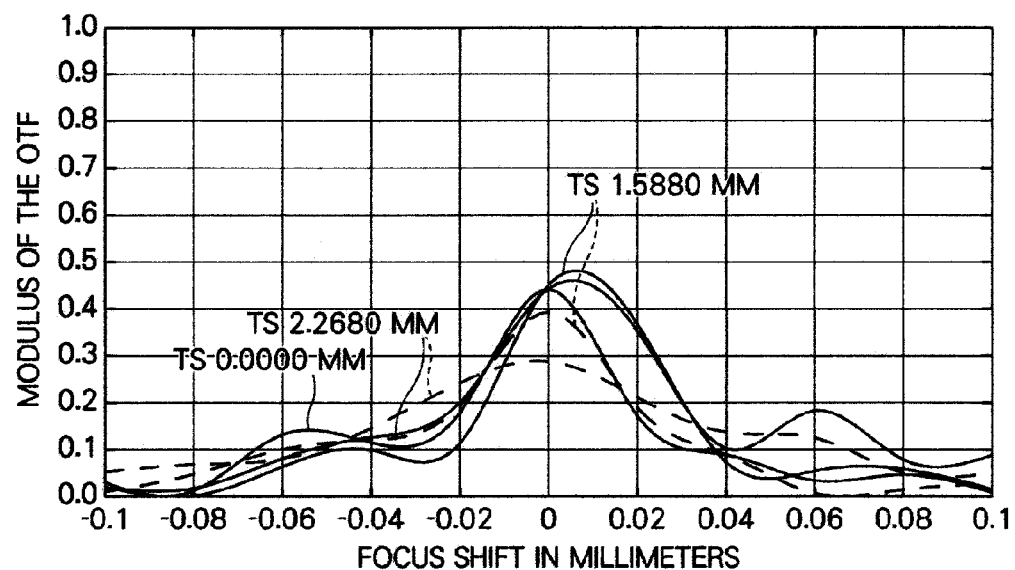
Figure 21N:
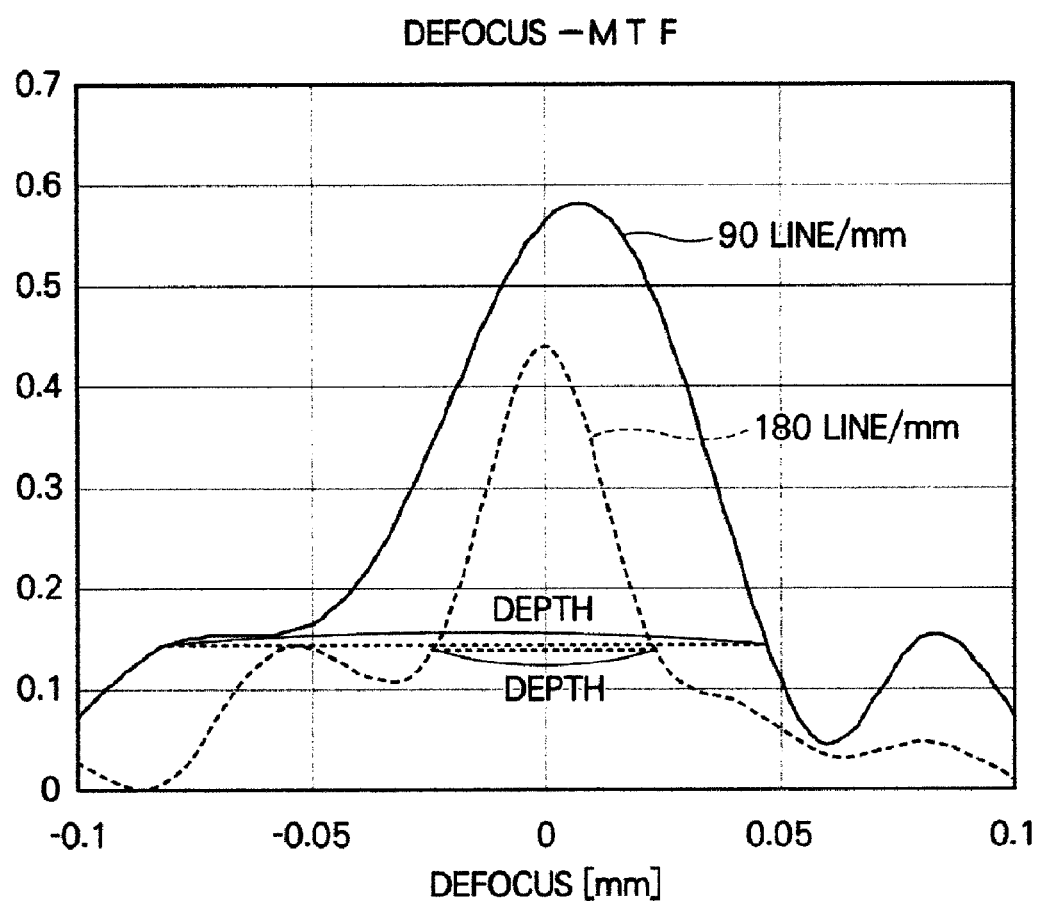
Figure 22A:
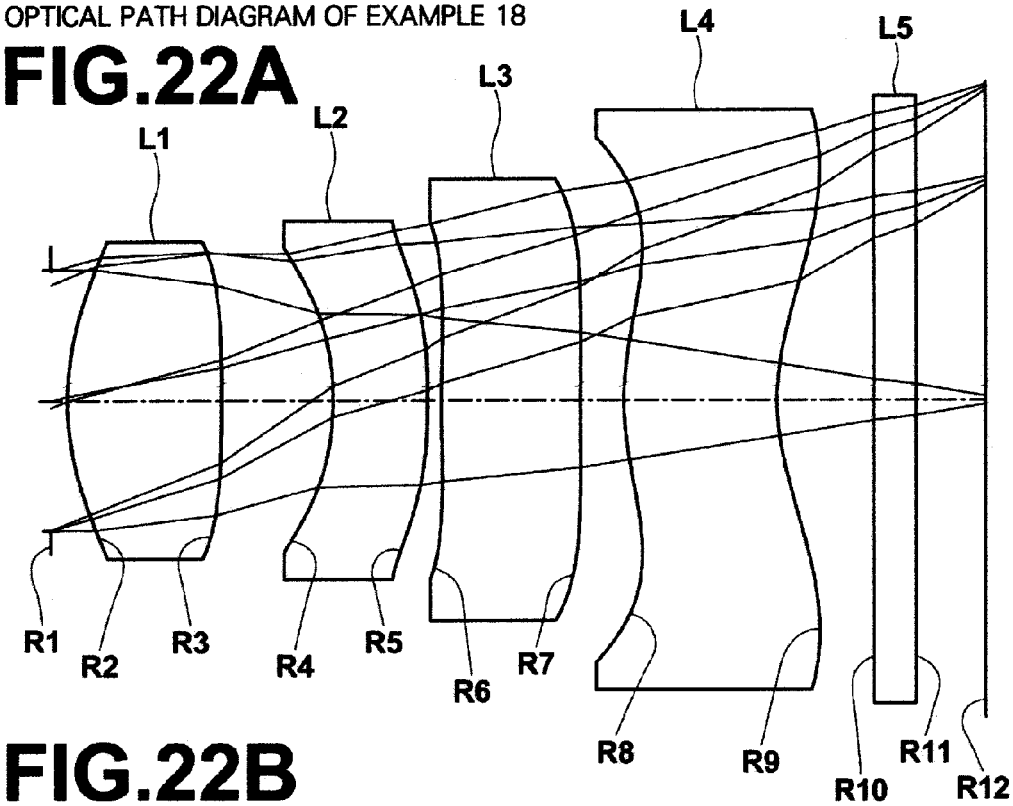
Figure 22B:
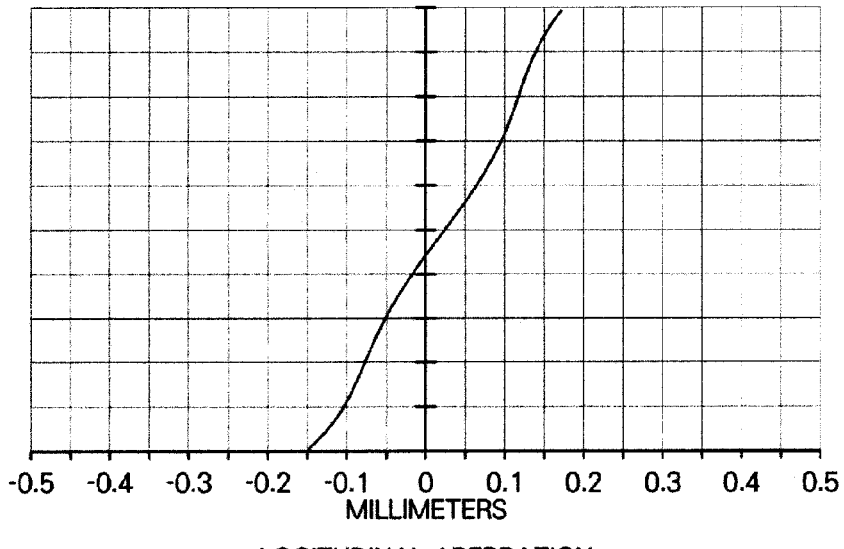
Figure 22C:
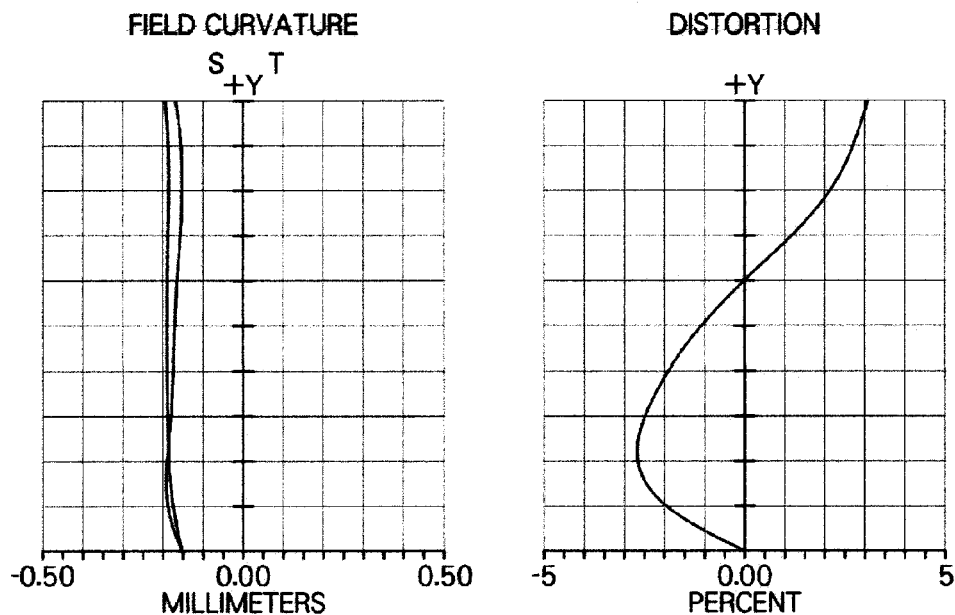
Figure 22D:
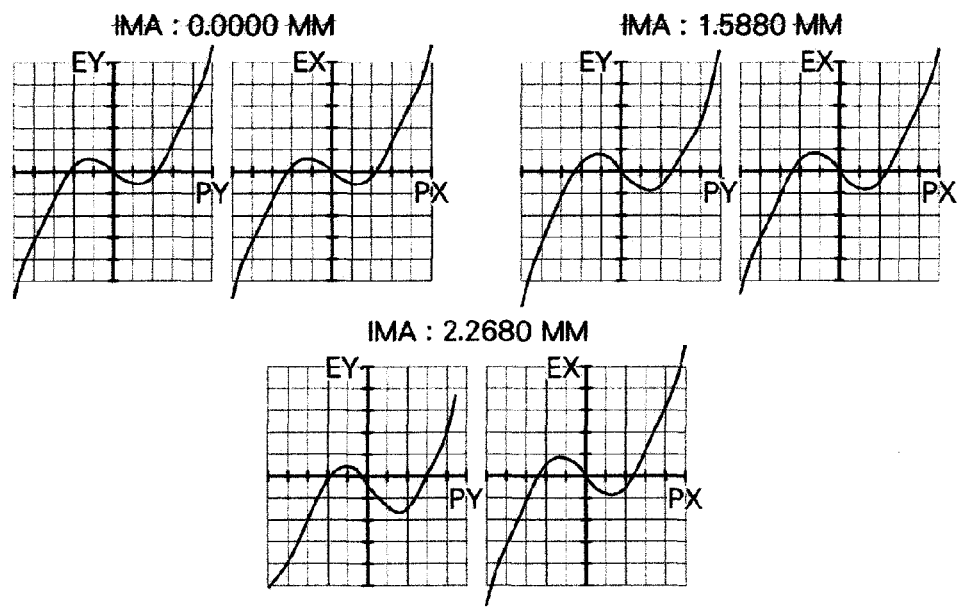
Figure 22E:
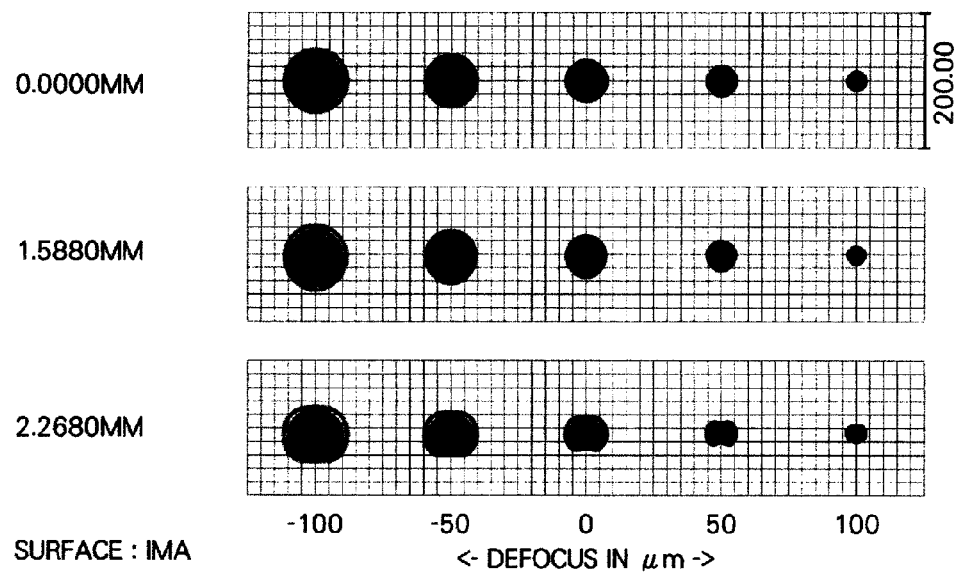
Figure 22F:
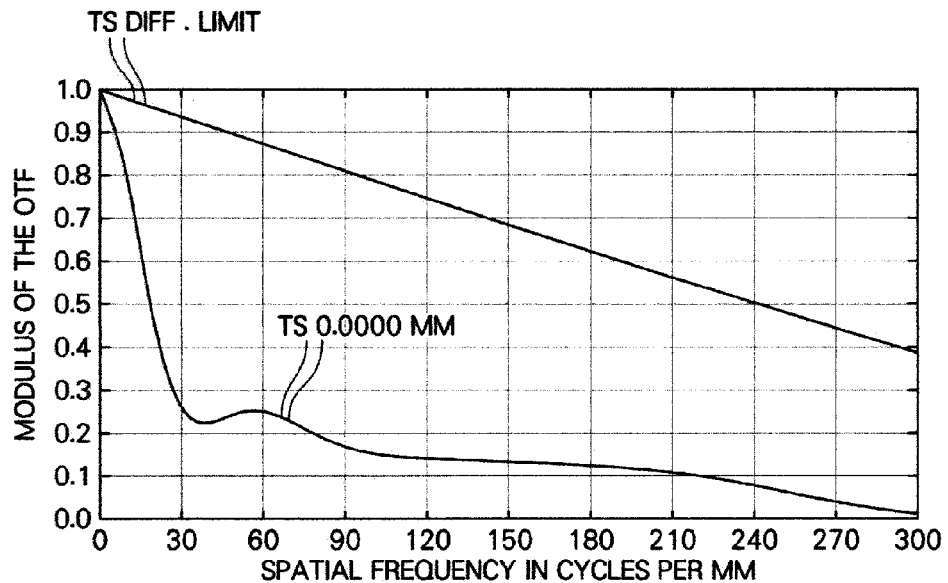
Figure 22G:
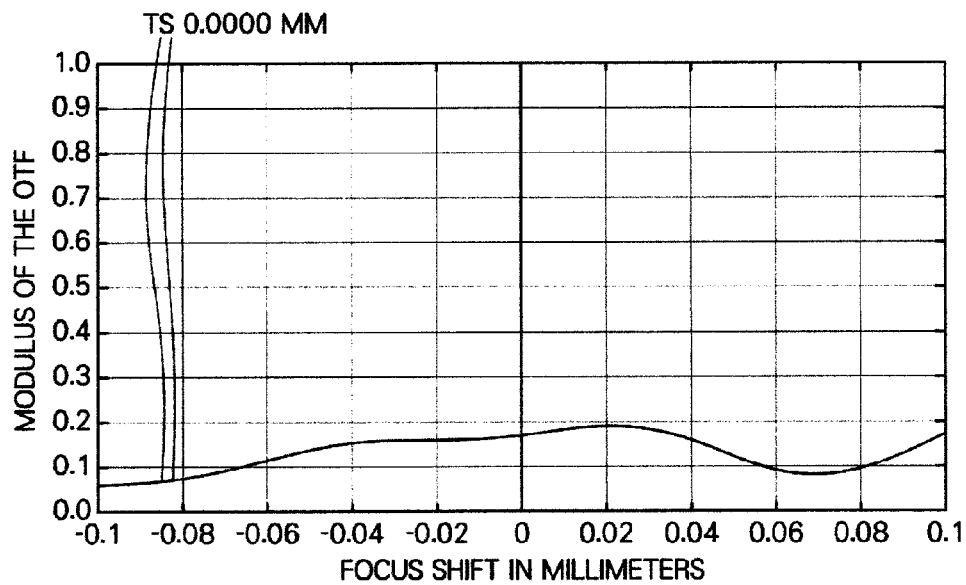
Figure 221:
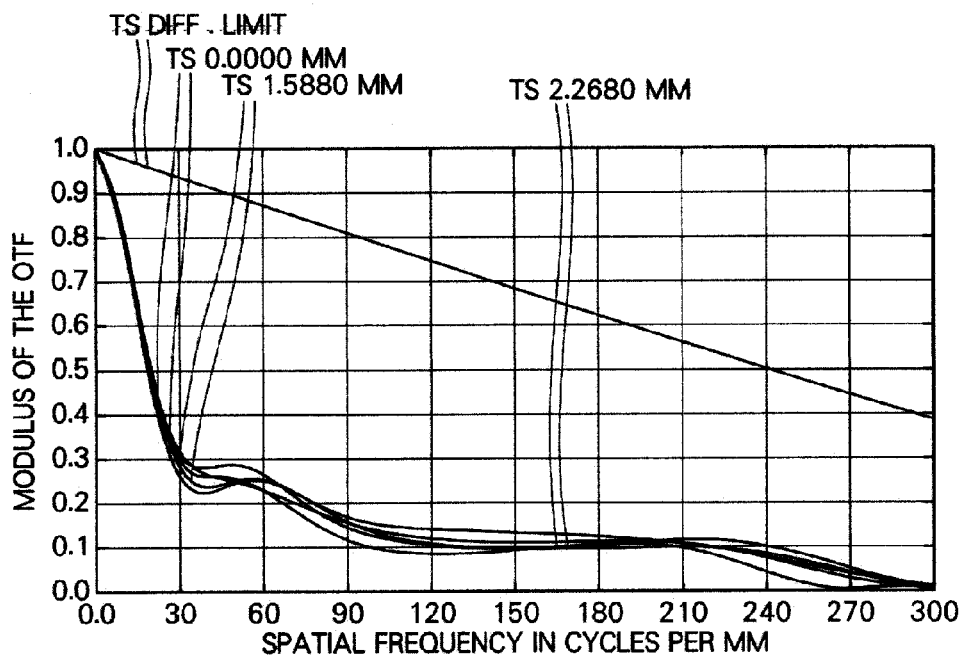
Figure 22J:
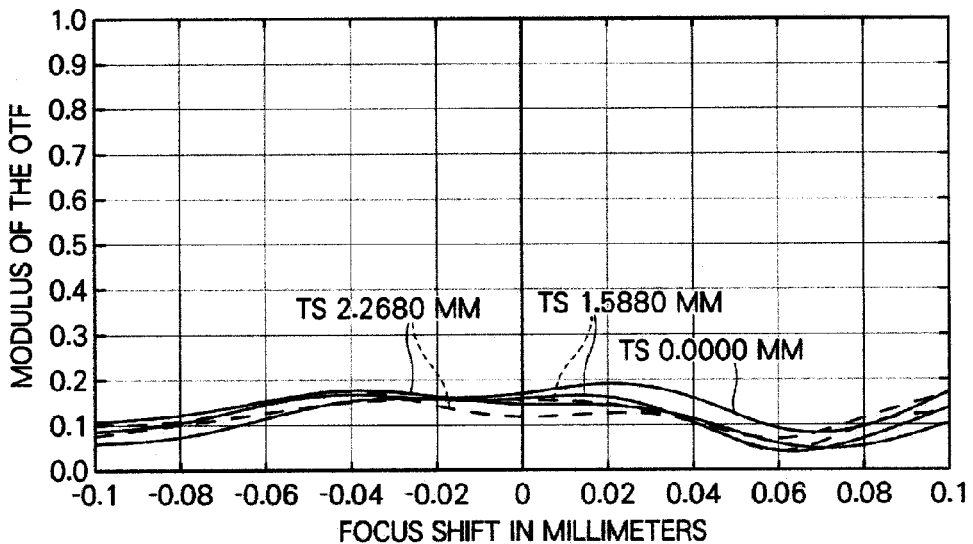
Figure 22K:
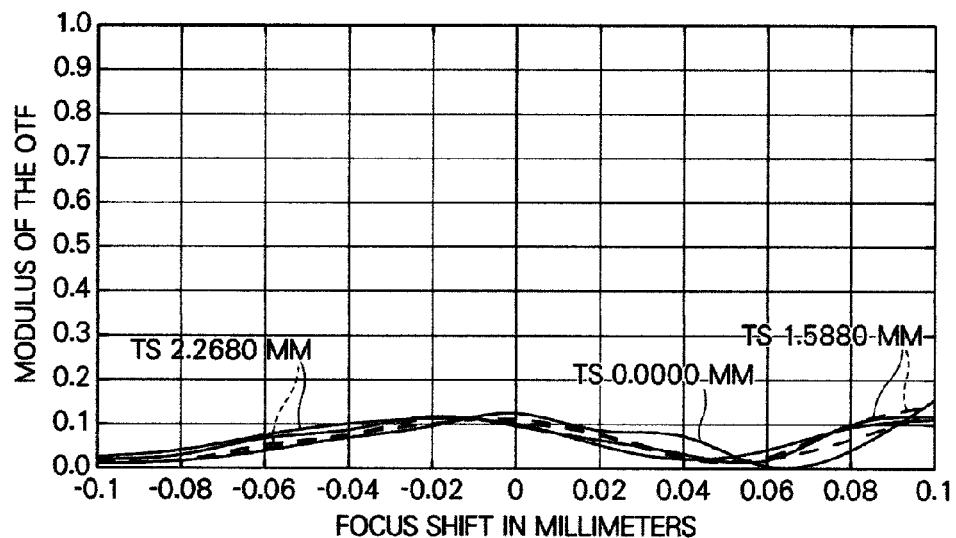
Figure 22N:
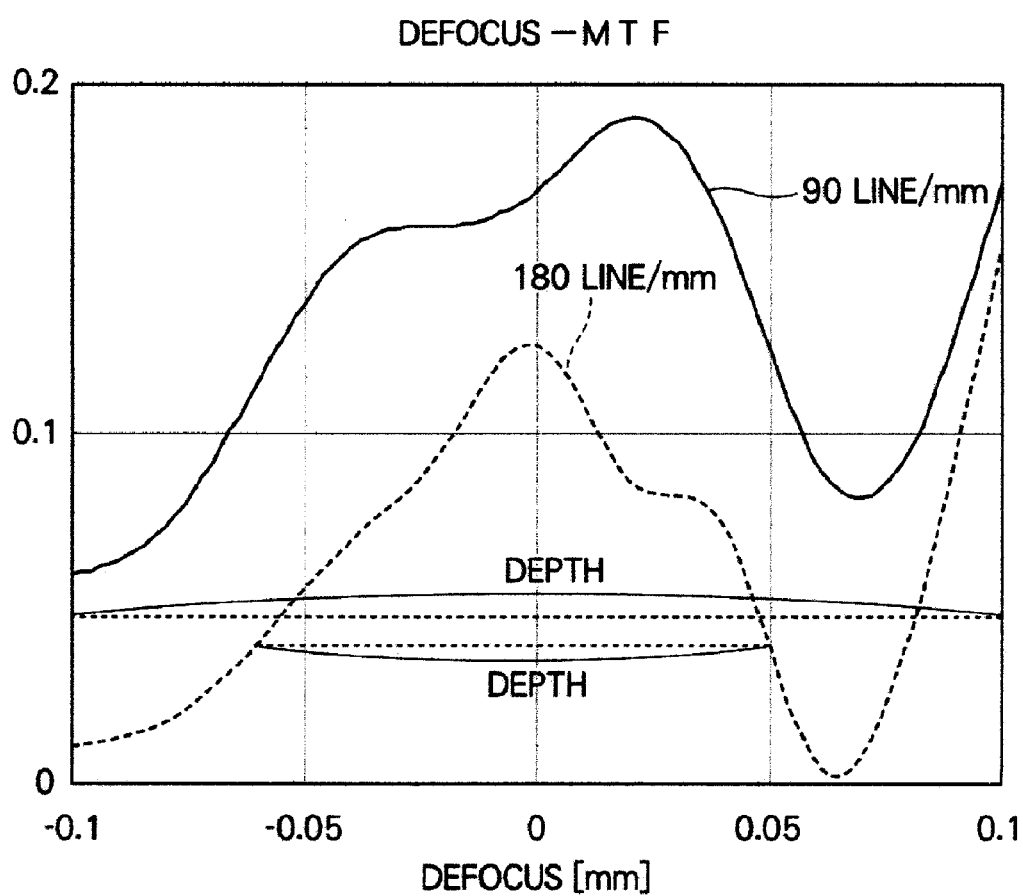
Figure 23A:
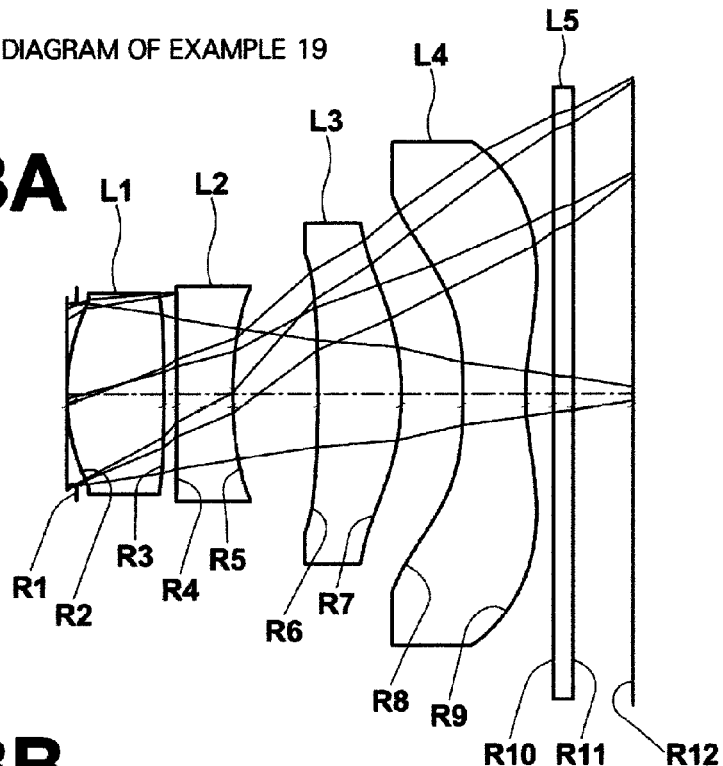
Figure 23B:
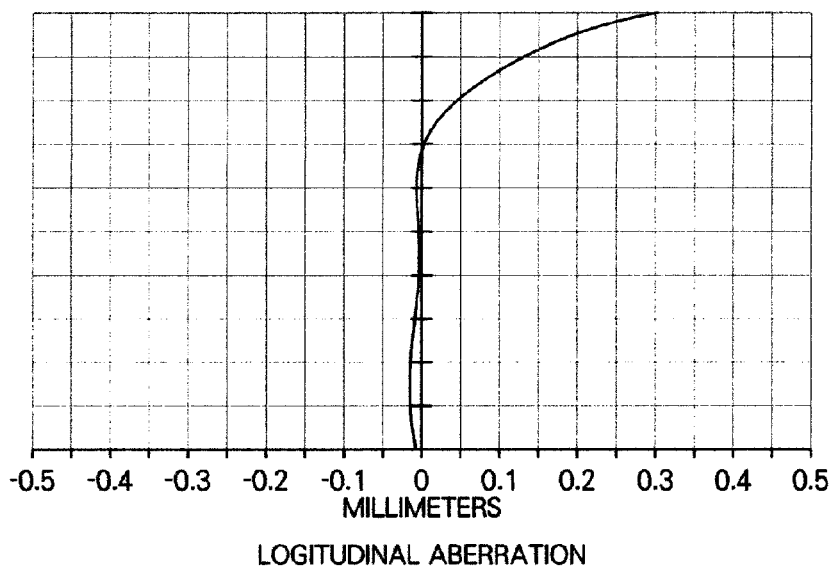
Figure 23C:
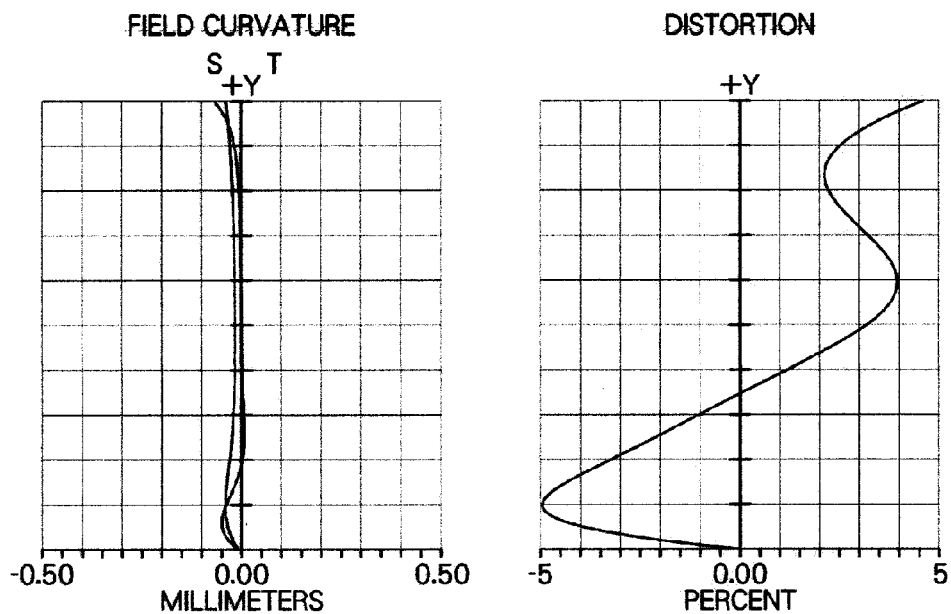
Figure 23D:
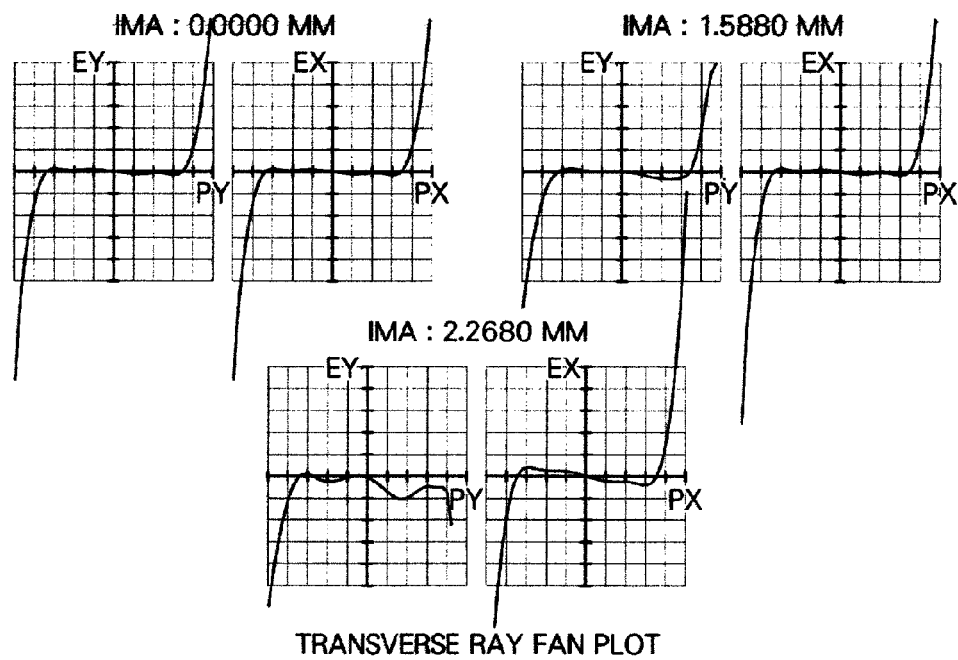
Figure 23E:
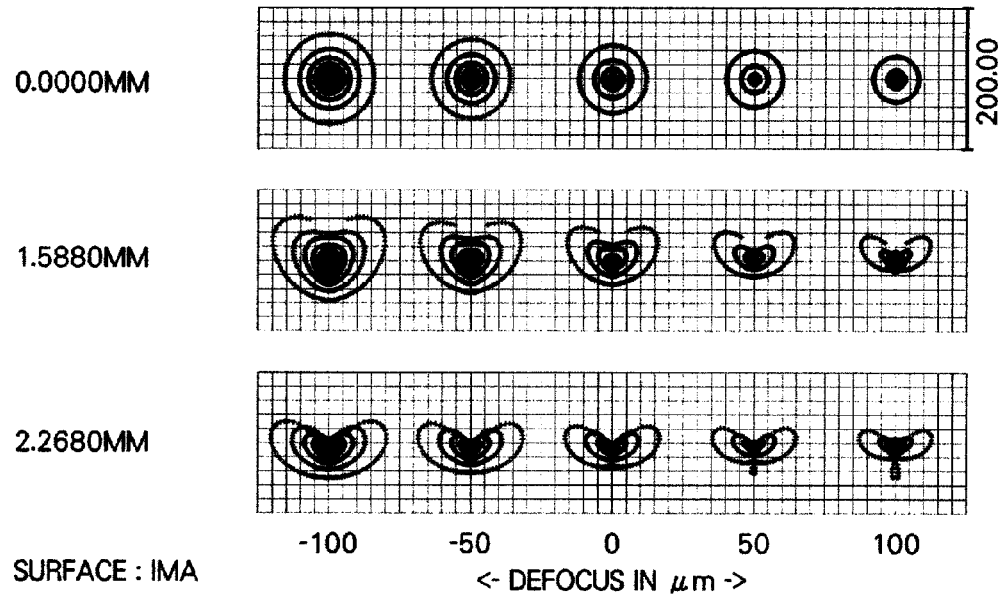
Figure 23F:
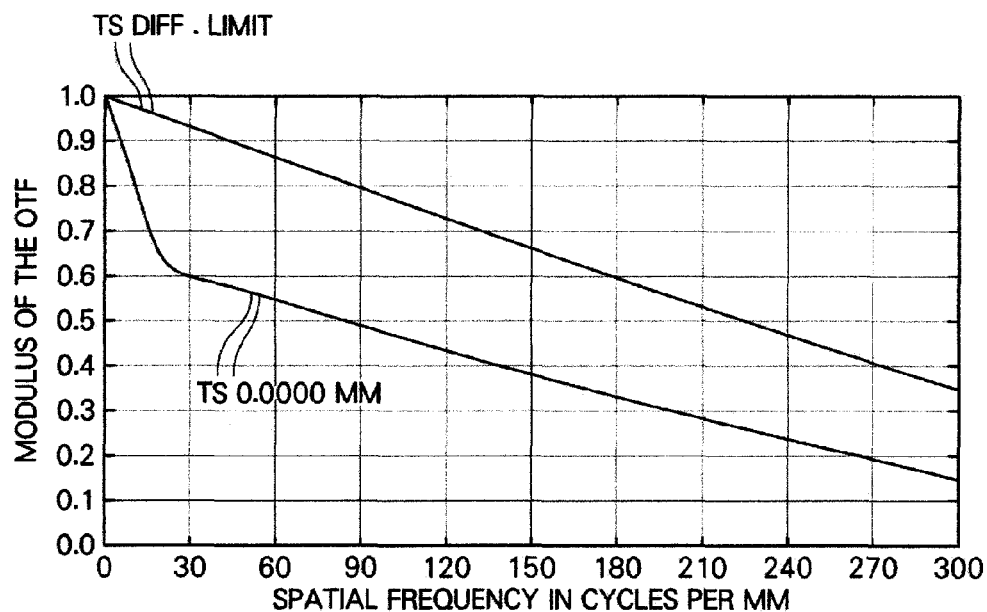
Figure 23G:
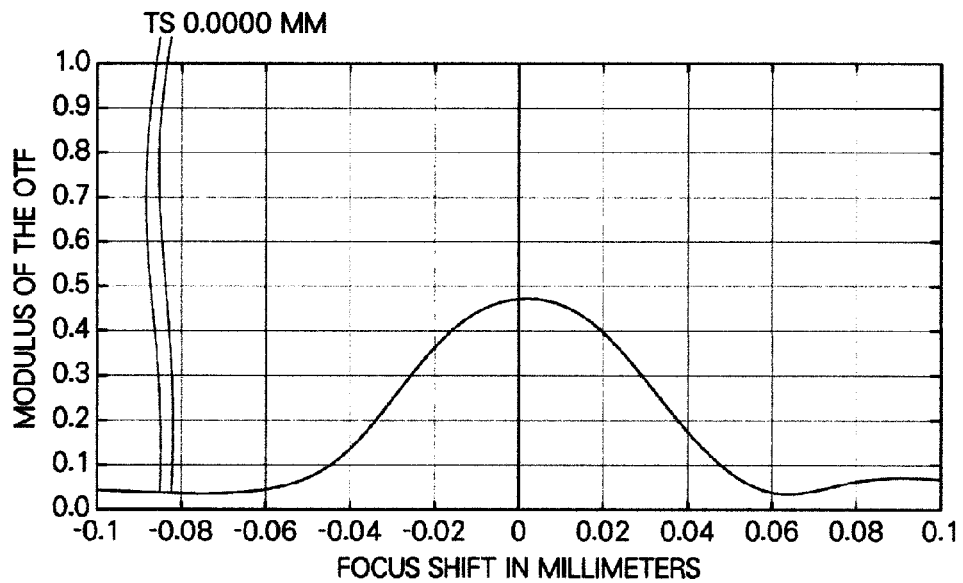
Figure 23H:
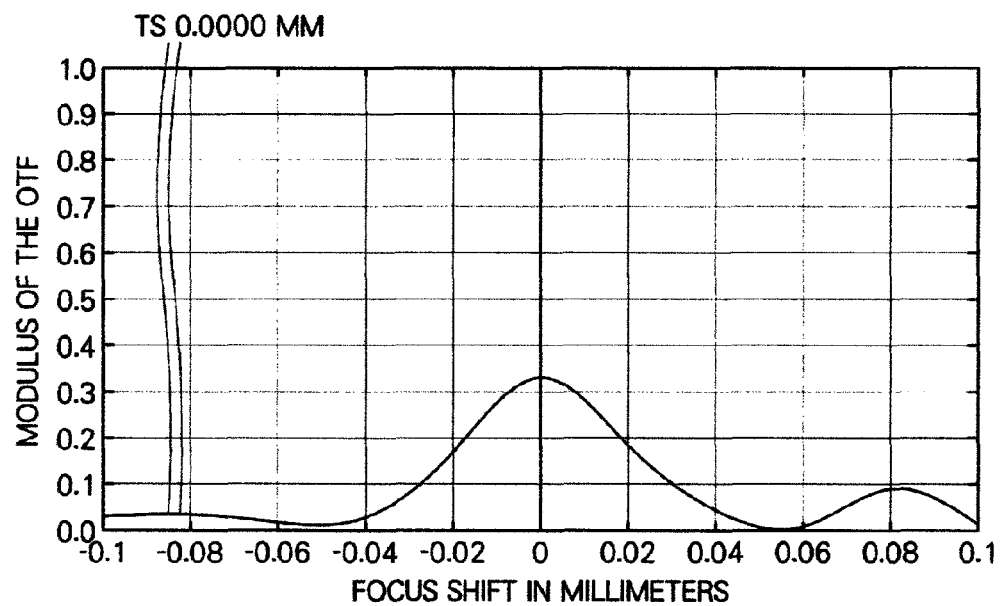
Figure 231:
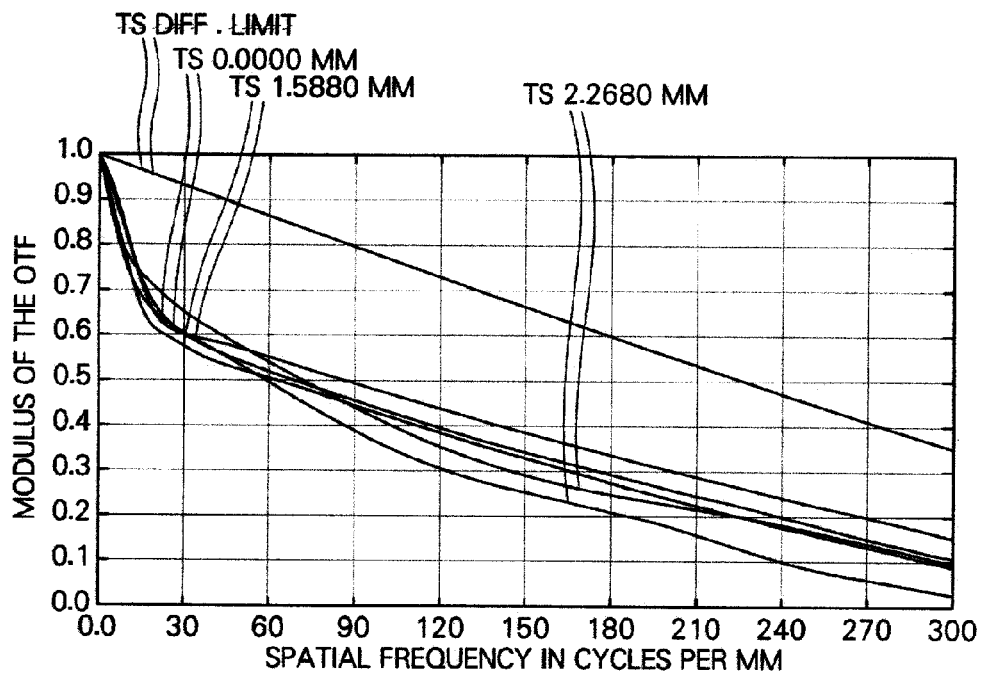
Figure 23J:
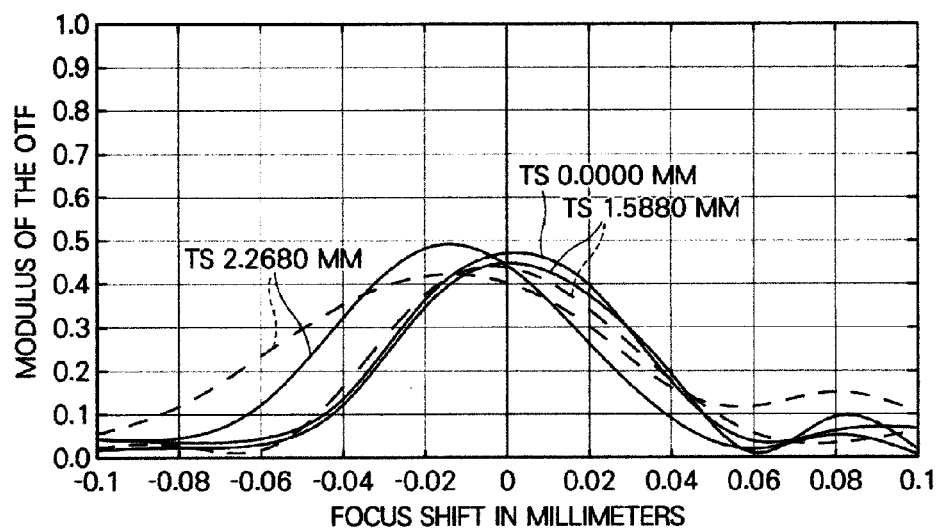
Figure 23K:
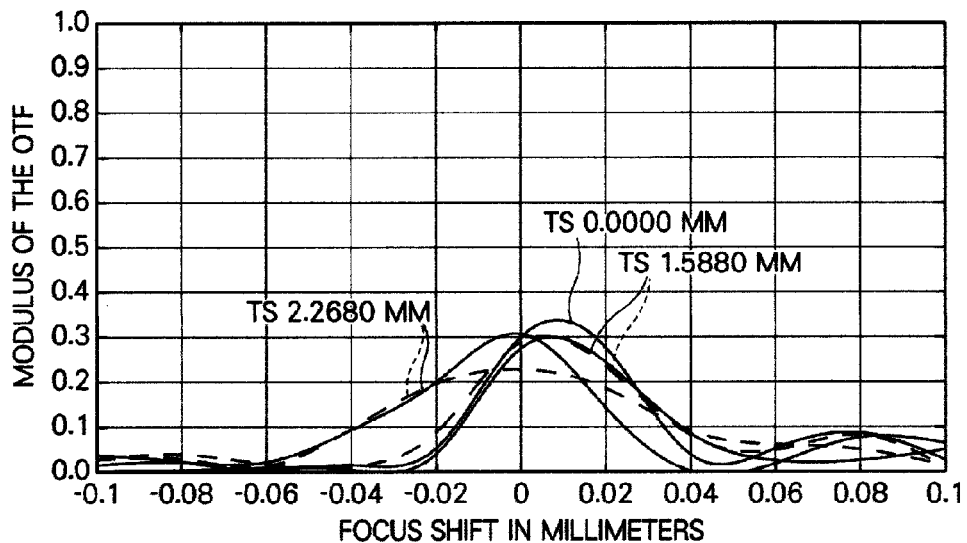
Figure 23N:
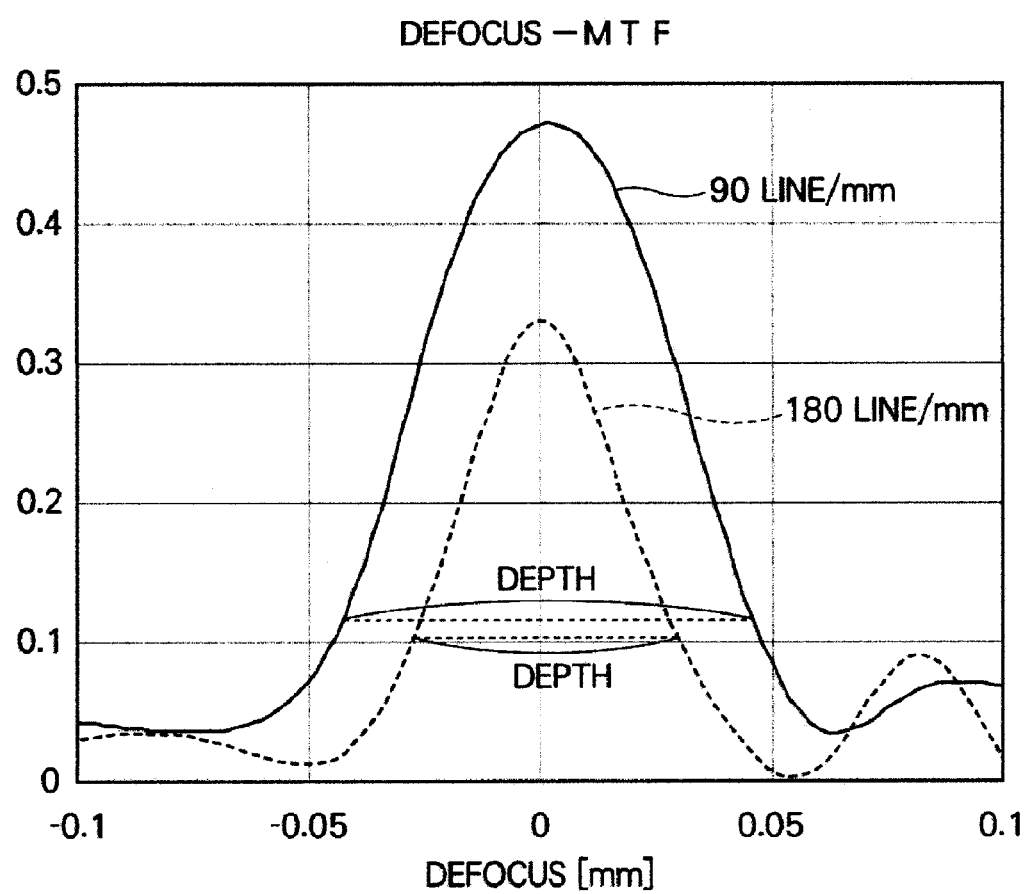
Figure 24:
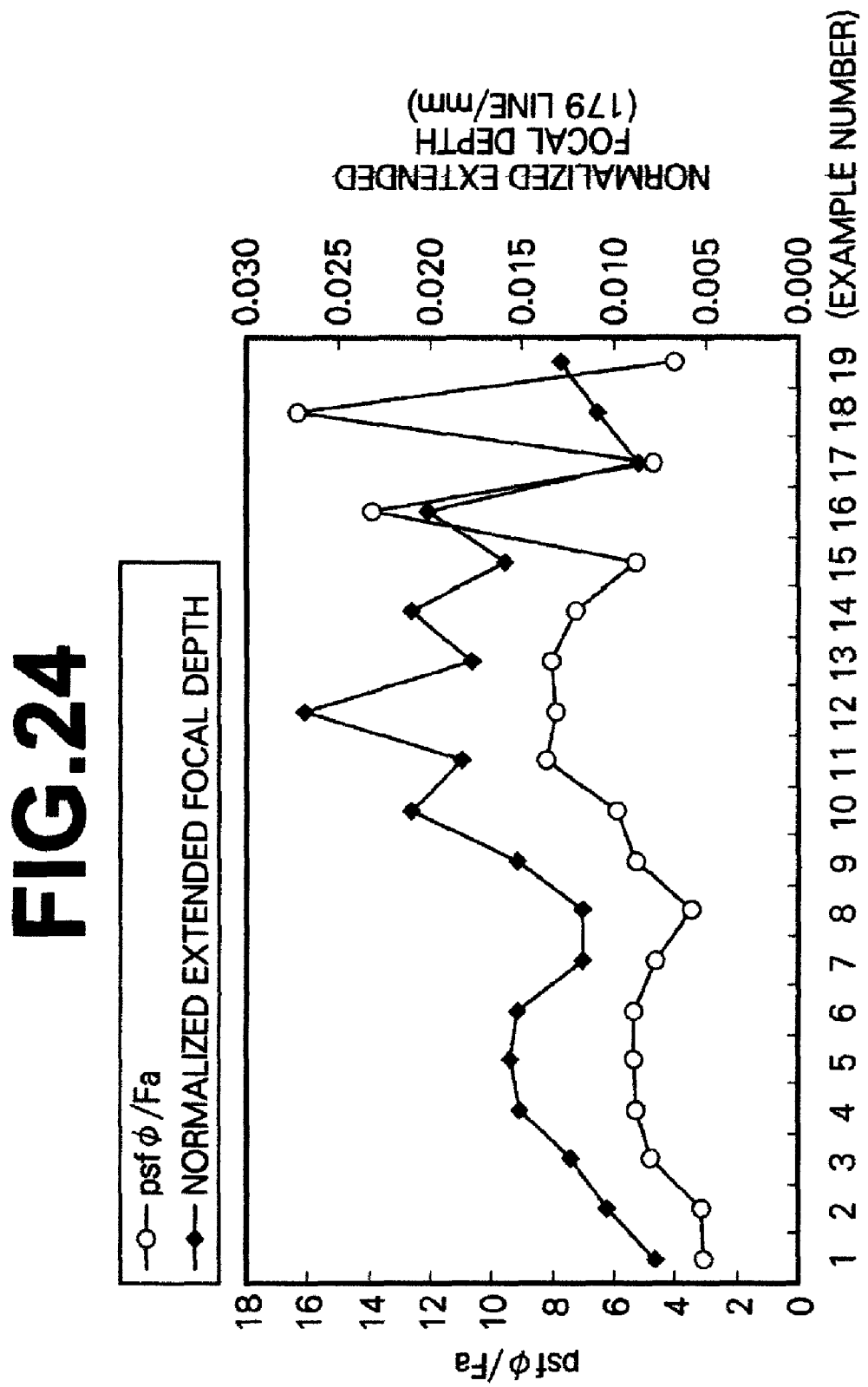

FIG. 13C is a diagram illustrating the astigmatism and distortion of the imaging lens of Example 9;

FIG. 13D is a diagram illustrating the coma aberrations of the imaging lens of Example 9;

FIG. 13E is a spot diagram of the imaging lens of Example 9;

FIG. 13F is a diagram illustrating spatial frequency MTF (incident height=0) of the imaging lens of Example 9;

FIG. 13G is a diagram illustrating depth MTF (90 line/mm, incident height=0) of the imaging lens of Example 9;

FIG. 13H is a diagram illustrating depth MTF (179 line/mm, incident height=0) of the imaging lens of Example 9;

FIG. 13I is a diagram illustrating spatial frequency MTF (plural incident heights) of the imaging lens of Example 9;

FIG. 13J is a diagram illustrating depth MTF (90 line/mm, plural incident heights) of the imaging lens of Example 9;

FIG. 13K is a diagram illustrating depth MTF (179 line/mm, plural incident heights) of the imaging lens of Example 9;

FIG. 13L is a diagram illustrating point images formed through the imaging lens of Example 9;

FIG. 13M is a diagram illustrating a spherical aberration minimum region in a spherical aberration curve of the imaging lens of Example 9;

FIG. 13N is a diagram illustrating an extended focal depth in a depth MTF curve showing depth MTF of the imaging lens of Example 9;

FIG. 14A is a diagram illustrating the structure of an imaging lens of Example 10;

FIG. 14B is a diagram illustrating the spherical aberration of the imaging lens of Example 10;

FIG. 14C is a diagram illustrating the astigmatism and distortion of the imaging lens of Example 10;

FIG. 14D is a diagram illustrating the coma aberrations of the imaging lens of Example 10;

FIG. 14E is a spot diagram of the imaging lens of Example 10;

FIG. 14F is a diagram illustrating spatial frequency MTF (incident height=0) of the imaging lens of Example 10;

FIG. 14G is a diagram illustrating depth MTF (90 line/mm, incident height=0) of the imaging lens of Example 10;

FIG. 14H is a diagram illustrating depth MTF (179 line/mm, incident height=0) of the imaging lens of Example 10;

FIG. 14I is a diagram illustrating spatial frequency MTF (plural incident heights) of the imaging lens of Example 10;

FIG. 14J is a diagram illustrating depth MTF (90 line/mm, plural incident heights) of the imaging lens of Example 10;

FIG. 14K is a diagram illustrating depth MTF (179 line/mm, plural incident heights) of the imaging lens of Example 10;

FIG. 14L is a diagram illustrating point images formed through the imaging lens of Example 10;

FIG. 14M is a diagram illustrating a spherical aberration minimum region in a spherical aberration curve of the imaging lens of Example 10;

FIG. 14N is a diagram illustrating an extended focal depth in a depth MTF curve showing depth MTF of the imaging lens of Example 10;

FIG. 15A is a diagram illustrating the structure of an imaging lens of Example 11;

FIG. 15B is a diagram illustrating the spherical aberration of the imaging lens of Example 11;

FIG. 15C is a diagram illustrating the astigmatism and distortion of the imaging lens of Example 11;

FIG. 15D is a diagram illustrating the coma aberrations of the imaging lens of Example 11;

FIG. 15E is a spot diagram of the imaging lens of Example 11;

FIG. 15F is a diagram illustrating spatial frequency MTF (incident height=0) of the imaging lens of Example 11;

FIG. 15G is a diagram illustrating depth MTF (90 line/mm, incident height=0) of the imaging lens of Example 11;

FIG. 15H is a diagram illustrating depth MTF (179 line/mm, incident height=0) of the imaging lens of Example 11;

FIG. 15I is a diagram illustrating spatial frequency MTF (plural incident heights) of the imaging lens of Example 11;

FIG. 15J is a diagram illustrating depth MTF (90 line/mm, plural incident heights) of the imaging lens of Example 11;

FIG. 15K is a diagram illustrating depth MTF (179 line/mm, plural incident heights) of the imaging lens of Example 11;

FIG. 15L is a diagram illustrating point images formed through the imaging lens of Example 11;

FIG. 15M is a diagram illustrating a spherical aberration minimum region in a spherical aberration curve of the imaging lens of Example 11;

FIG. 15N is a diagram illustrating an extended focal depth in a depth MTF curve showing depth MTF of the imaging lens of Example 11;

FIG. 16A is a diagram illustrating the structure of an imaging lens of Example 12;

FIG. 16B is a diagram illustrating the spherical aberration of the imaging lens of Example 12;

FIG. 16C is a diagram illustrating the astigmatism and distortion of the imaging lens of Example 12;

FIG. 16D is a diagram illustrating the coma aberrations of the imaging lens of Example 12;

FIG. 16E is a spot diagram of the imaging lens of Example 12;

FIG. 16F is a diagram illustrating spatial frequency MTF (incident height=0) of the imaging lens of Example 12;

FIG. 16G is a diagram illustrating depth MTF (90 line/mm, incident height=0) of the imaging lens of Example 12;

FIG. 16H is a diagram illustrating depth MTF (179 line/mm, incident height=0) of the imaging lens of Example 12;

FIG. 16I is a diagram illustrating spatial frequency MTF (plural incident heights) of the imaging lens of Example 12;

FIG. 16J is a diagram illustrating depth MTF (90 line/mm, plural incident heights) of the imaging lens of Example 12;

FIG. 16K is a diagram illustrating depth MTF (179 line/mm, plural incident heights) of the imaging lens of Example 12;

FIG. 16L is a diagram illustrating point images formed through the imaging lens of Example 12;

FIG. 16M is a diagram illustrating a spherical aberration minimum region in a spherical aberration curve of the imaging lens of Example 12;

FIG. 16N is a diagram illustrating an extended focal depth in a depth MTF curve showing depth MTF of the imaging lens of Example 12;

FIG. 17A is a diagram illustrating the structure of an imaging lens of Example 13;

FIG. 17B is a diagram illustrating the spherical aberration of the imaging lens of Example 13;

FIG. 17C is a diagram illustrating the astigmatism and distortion of the imaging lens of Example 13;

FIG. 17D is a diagram illustrating the coma aberrations of the imaging lens of Example 13;

FIG. 17E is a spot diagram of the imaging lens of Example 13;

FIG. 17F is a diagram illustrating spatial frequency MTF (incident height=0) of the imaging lens of Example 13;

FIG. 17G is a diagram illustrating depth MTF (90 line/mm, incident height=0) of the imaging lens of Example 13;

FIG. 17H is a diagram illustrating depth MTF (179 line/mm, incident height=0) of the imaging lens of Example 13;

FIG. 17I is a diagram illustrating spatial frequency MTF (plural incident heights) of the imaging lens of Example 13;

FIG. 17J is a diagram illustrating depth MTF (90 line/mm, plural incident heights) of the imaging lens of Example 13;

FIG. 17K is a diagram illustrating depth MTF (179 line/mm, plural incident heights) of the imaging lens of Example 13;

FIG. 17L is a diagram illustrating point images formed through the imaging lens of Example 13;

FIG. 17M is a diagram illustrating a spherical aberration minimum region in a spherical aberration curve of the imaging lens of Example 13;

FIG. 17N is a diagram illustrating an extended focal depth in a depth MTF curve showing depth MTF of the imaging lens of Example 13;

FIG. 18A is a diagram illustrating the structure of an imaging lens of Example 14;

FIG. 18B is a diagram illustrating the spherical aberration of the imaging lens of Example 14;

FIG. 18C is a diagram illustrating the astigmatism and distortion of the imaging lens of Example 14;

FIG. 18D is a diagram illustrating the coma aberrations of the imaging lens of Example 14;

FIG. 18E is a spot diagram of the imaging lens of Example 14;

FIG. 18F is a diagram illustrating spatial frequency MTF (incident height=0) of the imaging lens of Example 14;

FIG. 18G is a diagram illustrating depth MTF (90 line/mm, incident height=0) of the imaging lens of Example 14;

FIG. 18H is a diagram illustrating depth MTF (179 line/mm, incident height=0) of the imaging lens of Example 14;

FIG. 18I is a diagram illustrating spatial frequency MTF (plural incident heights) of the imaging lens of Example 14;

FIG. 18J is a diagram illustrating depth MTF (90 line/mm, plural incident heights) of the imaging lens of Example 14;

FIG. 18K is a diagram illustrating depth MTF (179 line/mm, plural incident heights) of the imaging lens of Example 14;

FIG. 18L is a diagram illustrating point images formed through the imaging lens of Example 14;

FIG. 18M is a diagram illustrating a spherical aberration minimum region in a spherical aberration curve of the imaging lens of Example 14;

FIG. 18N is a diagram illustrating an extended focal depth in a depth MTF curve showing depth MTF of the imaging lens of Example 14;

FIG. 19A is a diagram illustrating the structure of an imaging lens of Example 15;

FIG. 19B is a diagram illustrating the spherical aberration of the imaging lens of Example 15;

FIG. 19C is a diagram illustrating the astigmatism and distortion of the imaging lens of Example 15;

FIG. 19D is a diagram illustrating the coma aberrations of the imaging lens of Example 15;

FIG. 19E is a spot diagram of the imaging lens of Example 15;

FIG. 19F is a diagram illustrating spatial frequency MTF (incident height=0) of the imaging lens of Example 15;

FIG. 19G is a diagram illustrating depth MTF (90 line/mm, incident height=0) of the imaging lens of Example 15;

FIG. 19H is a diagram illustrating depth MTF (179 line/mm, incident height=0) of the imaging lens of Example 15;

FIG. 19I is a diagram illustrating spatial frequency MTF (plural incident heights) of the imaging lens of Example 15;

FIG. 19J is a diagram illustrating depth MTF (90 line/mm, plural incident heights) of the imaging lens of Example 15;

FIG. 19K is a diagram illustrating depth MTF (179 line/mm, plural incident heights) of the imaging lens of Example 15;

FIG. 19L is a diagram illustrating point images formed through the imaging lens of Example 15;

FIG. 19M is a diagram illustrating a spherical aberration minimum region in a spherical aberration curve of the imaging lens of Example 15;

FIG. 19N is a diagram illustrating an extended focal depth in a depth MTF curve showing depth MTF of the imaging lens of Example 15;

FIG. 20A is a diagram illustrating the structure of an imaging lens of Example 16;

FIG. 20B is a diagram illustrating the spherical aberration of the imaging lens of Example 16;

FIG. 20C is a diagram illustrating the astigmatism and distortion of the imaging lens of Example 16;

FIG. 20D is a diagram illustrating the coma aberrations of the imaging lens of Example 16;

FIG. 20E is a spot diagram of the imaging lens of Example 16;

FIG. 20F is a diagram illustrating spatial frequency MTF (incident height=0) of the imaging lens of Example 16;

FIG. 20G is a diagram illustrating depth MTF (90 line/mm, incident height=0) of the imaging lens of Example 16;

FIG. 20H is a diagram illustrating depth MTF (179 line/mm, incident height=0) of the imaging lens of Example 16;

FIG. 20I is a diagram illustrating spatial frequency MTF (plural incident heights) of the imaging lens of Example 16;

FIG. 20J is a diagram illustrating depth MTF (90 line/mm, plural incident heights) of the imaging lens of Example 16;

FIG. 20K is a diagram illustrating depth MTF (179 line/mm, plural incident heights) of the imaging lens of Example 16;

FIG. 20L is a diagram illustrating point images formed through the imaging lens of Example 16;

FIG. 20M is a diagram illustrating a spherical aberration minimum region in a spherical aberration curve of the imaging lens of Example 16;

FIG. 20N is a diagram illustrating an extended focal depth in a depth MTF curve showing depth MTF of the imaging lens of Example 16;

FIG. 21A is a diagram illustrating the structure of an imaging lens of Example 17;

FIG. 21B is a diagram illustrating the spherical aberration of the imaging lens of Example 17;

FIG. 21C is a diagram illustrating the astigmatism and distortion of the imaging lens of Example 17;

FIG. 21D is a diagram illustrating the coma aberrations of the imaging lens of Example 17;

FIG. 21E is a spot diagram of the imaging lens of Example 17;

FIG. 21F is a diagram illustrating spatial frequency MTF (incident height=0) of the imaging lens of Example 17;

FIG. 21G is a diagram illustrating depth MTF (90 line/mm, incident height=0) of the imaging lens of Example 17;

FIG. 21H is a diagram illustrating depth MTF (179 line/mm, incident height=0) of the imaging lens of Example 17;

FIG. 21I is a diagram illustrating spatial frequency MTF (plural incident heights) of the imaging lens of Example 17;

FIG. 21J is a diagram illustrating depth MTF (90 line/mm, plural incident heights) of the imaging lens of Example 17;

FIG. 21K is a diagram illustrating depth MTF (179 line/mm, plural incident heights) of the imaging lens of Example 17;

FIG. 21L is a diagram illustrating point images formed through the imaging lens of Example 17;

FIG. 21M is a diagram illustrating a spherical aberration minimum region in a spherical aberration curve of the imaging lens of Example 17;

FIG. 21N is a diagram illustrating an extended focal depth in a depth MTF curve showing depth MTF of the imaging lens of Example 17;

FIG. 22A is a diagram illustrating the structure of an imaging lens of Example 18;

FIG. 22B is a diagram illustrating the spherical aberration of the imaging lens of Example 18;

FIG. 22C is a diagram illustrating the astigmatism and distortion of the imaging lens of Example 18;

FIG. 22D is a diagram illustrating the coma aberrations of the imaging lens of Example 18;

FIG. 22E is a spot diagram of the imaging lens of Example 18;

FIG. 22F is a diagram illustrating spatial frequency MTF (incident height=0) of the imaging lens of Example 18;

FIG. 22G is a diagram illustrating depth MTF (90 line/mm, incident height=0) of the imaging lens of Example 18;

FIG. 22H is a diagram illustrating depth MTF (179 line/mm, incident height=0) of the imaging lens of Example 18;

FIG. 22I is a diagram illustrating spatial frequency MTF (plural incident heights) of the imaging lens of Example 18;

FIG. 22J is a diagram illustrating depth MTF (90 line/mm, plural incident heights) of the imaging lens of Example 18;

FIG. 22K is a diagram illustrating depth MTF (179 line/mm, plural incident heights) of the imaging lens of Example 18;

FIG. 22L is a diagram illustrating point images formed through the imaging lens of Example 18;

FIG. 22M is a diagram illustrating a spherical aberration minimum region in a spherical aberration curve of the imaging lens of Example 18;

FIG. 22N is a diagram illustrating an extended focal depth in a depth MTF curve showing depth MTF of the imaging lens of Example 18;

FIG. 23A is a diagram illustrating the structure of an imaging lens of Example 19;

FIG. 23B is a diagram illustrating the spherical aberration of the imaging lens of Example 19;

FIG. 23C is a diagram illustrating the astigmatism and distortion of the imaging lens of Example 19;

FIG. 23D is a diagram illustrating the coma aberrations of the imaging lens of Example 19;

FIG. 23E is a spot diagram of the imaging lens of Example 19;

FIG. 23F is a diagram illustrating spatial frequency MTF (incident height=0) of the imaging lens of Example 19;

FIG. 23G is a diagram illustrating depth MTF (90 line/mm, incident height=0) of the imaging lens of Example 19;

FIG. 23H is a diagram illustrating depth MTF (179 line/mm, incident height=0) of the imaging lens of Example 19;

FIG. 23I is a diagram illustrating spatial frequency MTF (plural incident heights) of the imaging lens of Example 19;

FIG. 23J is a diagram illustrating depth MTF (90 line/mm, plural incident heights) of the imaging lens of Example 19;

FIG. 23K is a diagram illustrating depth MTF (179 line/mm, plural incident heights) of the imaging lens of Example 19;

FIG. 23L is a diagram illustrating point images formed through the imaging lens of Example 19;

FIG. 23M is a diagram illustrating a spherical aberration minimum region in a spherical aberration curve of the imaging lens of Example 19;

FIG. 23N is a diagram illustrating an extended focal depth in a depth MTF curve showing depth MTF of the imaging lens of Example 19; and FIG. 24 is a diagram related to the imaging lenses of Examples 1 through 19, and illustrates normalized base point image diameters (psfφ/Fa) and normalized extended focal depths.

DESCRIPTION OF THE PREFERRED EMBODIMENTS

Figure 1:
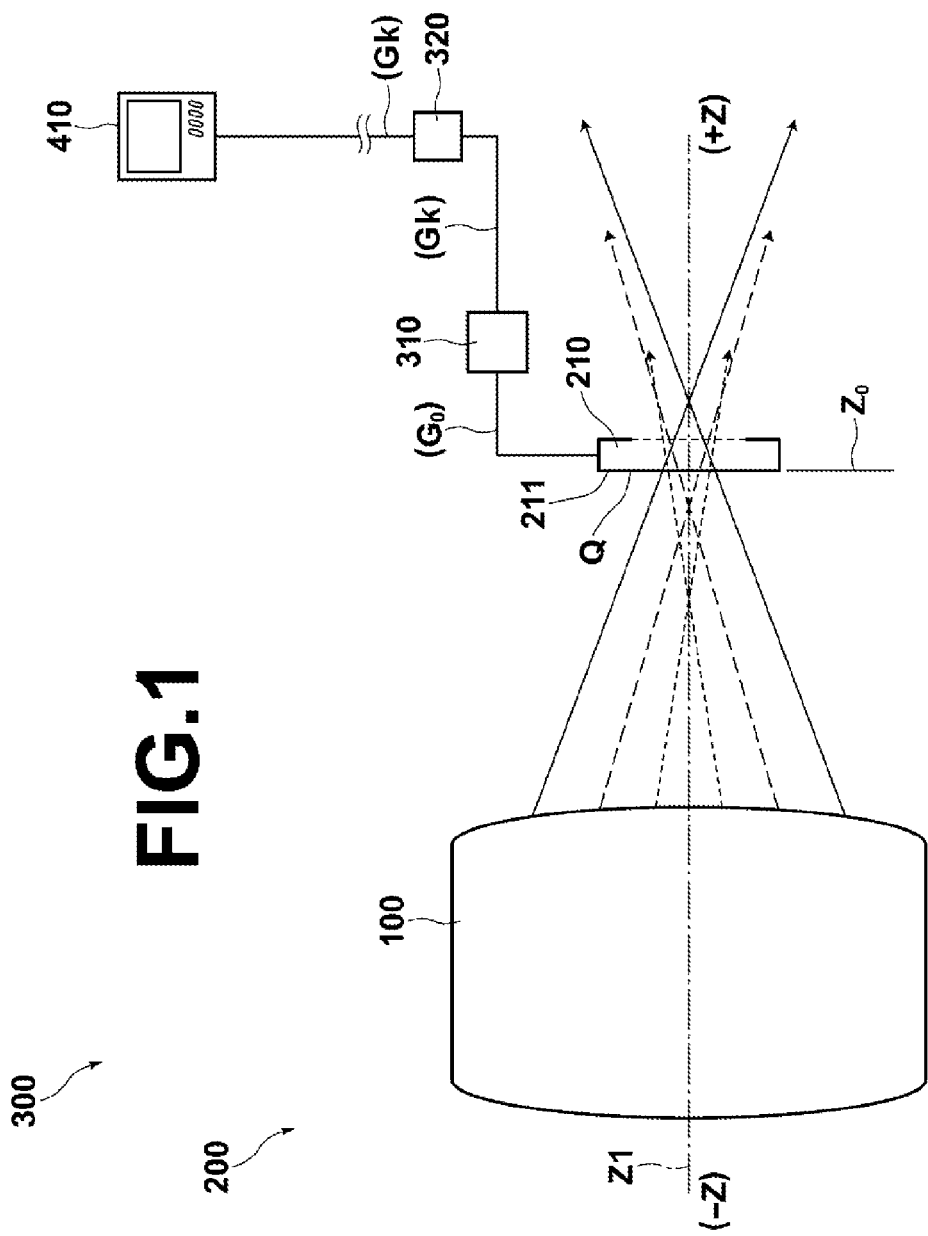
FIG. 1 is a schematic diagram illustrating the structure of an imaging lens and an imaging system according to a first embodiment and a second embodiment of the present invention.
Figure 2:
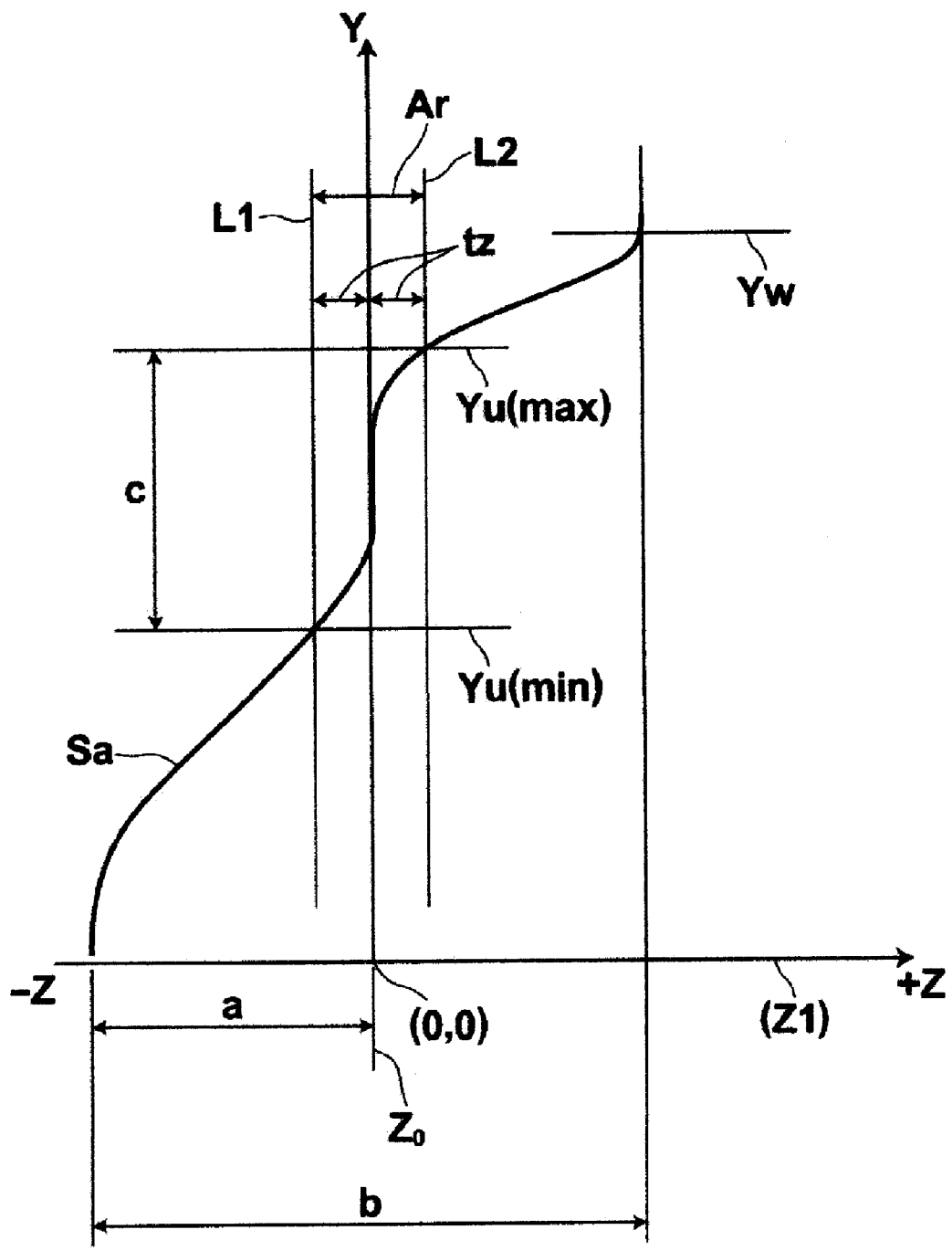
FIG. 2 is a diagram illustrating a spherical aberration curve showing the spherical aberration of the imaging lens according to the first embodiment of the present invention.
Figure 3:
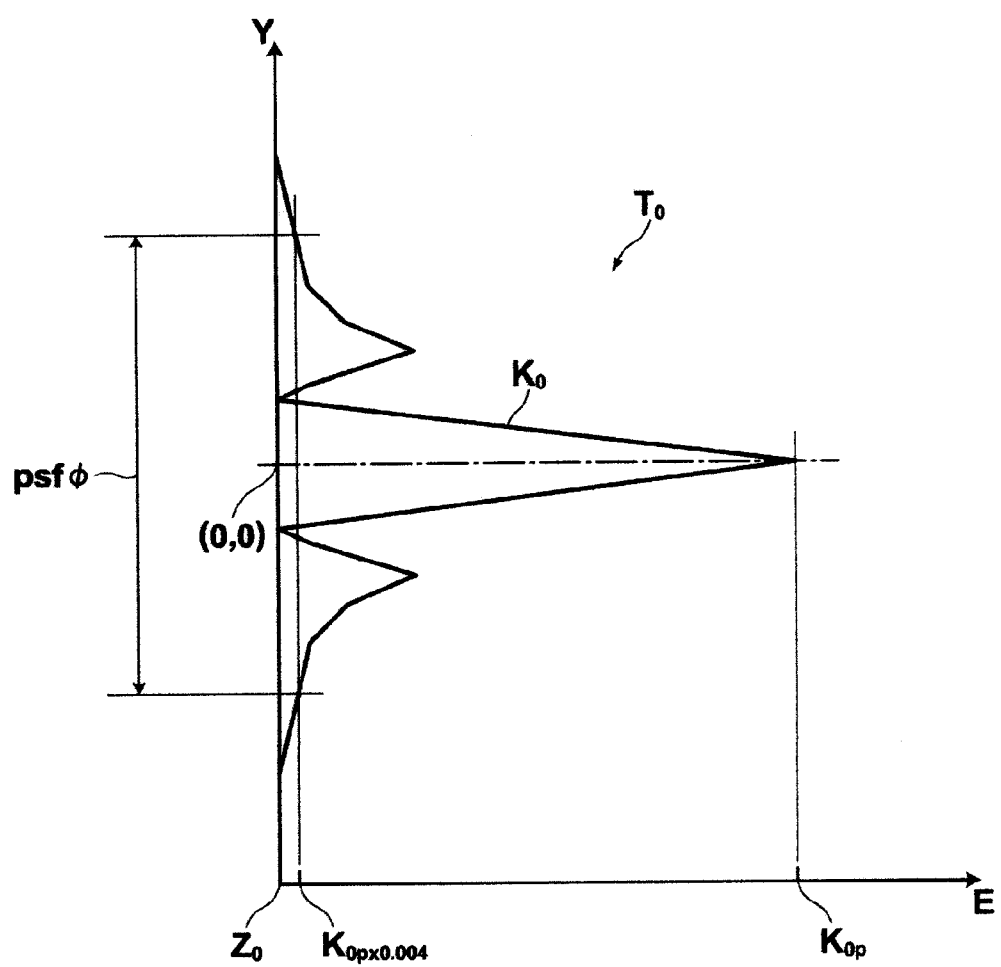
FIG. 3 is a diagram illustrating the light intensity distribution of a point image formed through the imaging lens of the present invention.

A first embodiment of the present invention will be described with reference to drawings. FIG. 1 is a diagram illustrating an imaging lens and an imaging system according to embodiments of the present invention. FIG. 2 is a diagram illustrating a spherical aberration curve in Z-Y coordinate system. In FIG. 2, horizontal axis Z represents positions in the direction of optical axis Z1, and vertical axis Y represents positions in a direction perpendicular to the optical axis Z1. FIG. 3 is a diagram illustrating, in E-Y coordinate system, the light intensity distribution of a point image formed through the imaging lens. In FIG. 3, horizontal axis E represents the intensity E of light, and vertical axis Y represents positions in a direction (Y direction) perpendicular to the optical axis.

FIG. 1 is common to an imaging lens and an imaging system using the imaging lens of the first embodiment, and an imaging lens and an imaging system using the imaging lens of the second embodiment.

Figure 4A:
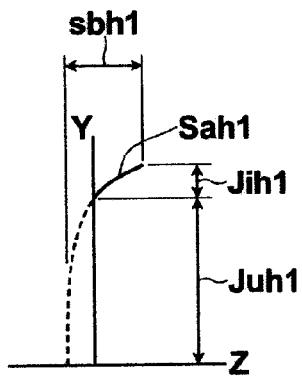
FIG. 4Aa is a diagram illustrating a spherical aberration curve of an imaging lens in Reference Example 1.
Figure 4A:
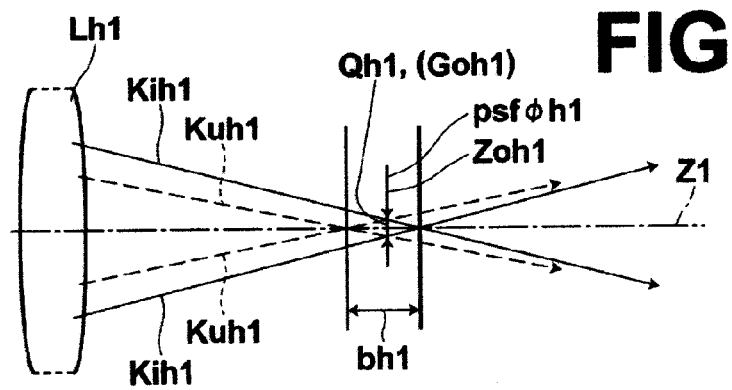

Meanwhile, FIGS. 2, 3, and 4Aa through 4F are applied only to the first embodiment of the present invention.

An imaging lens 100 according to the embodiments of the present invention, illustrated in FIG. 1, is an imaging lens for forming an optical image. The imaging lens 100 forms optical image Q in which a subject 1 located at any distance of photography is blurred. Original image Go is obtained by imaging the blurred optical image Q, and contrast recovery processing is performed on the original image Go to obtain blur recovery image Gk, in which blurs in the original image Go have been corrected.

The contrast recovery processing is performed to obtain the blur recovery image Gk having high sharpness, and in which blurs have been corrected. The contrast of the original image Go, which represents the blurred optical image Q obtained by imaging through the imaging lens 100, is recovered.

More specifically, for example, an image in which only a display portion corresponding to 50 line/mm is visible (identifiable) is corrected to an image in which even a display portion corresponding to 70 line/mm is visible. As the contrast recovery processing, image restoration processing by Fourier transformation, edge enhancement processing, gamma correction processing, contrast enhancement processing or the like may be adopted.

The imaging lens 100 is provided in an imaging unit 200. The blurred optical image Q is formed on an imaging plane 211 of an imaging device 210 included in the imaging unit 200.

The imaging unit 200 includes the imaging lens 100 for forming the blurred optical image Q and the imaging device 210 for imaging the optical image Q.

Further, an imaging system 300 of the present invention includes the imaging unit 200, an image processing unit 310, and an image output unit 320. The imaging unit 200 includes the imaging lens 100 for forming the blurred optical image Q, and the imaging device 210 for imaging the optical image Q. The image processing unit 310 performs contrast recovery processing on original image Go representing the optical image Q imaged by the imaging device 210. The image output unit 320 outputs blur recovery image Gk obtained by performing contrast recovery processing at the image processing unit 310. The blur recovery image Gk output from the image output unit 320 is displayed at a display unit 410.

The image processing unit 310 performs, as contrast recovery processing, one of image restoration processing using Fourier transformation, edge enhancement processing, gamma correction processing, and contrast enhancement processing, or at least two of them in combination.

The imaging lens 100 is structured in such a manner that the spherical aberration of the imaging lens 100 changes from an object point side (−Z direction in FIG. 2) of an image plane base position toward the other side (+Z direction in FIG. 2) of the image plane base position, as a distance from the optical axis of the imaging lens 100 increases. Further, the imaging lens 100 is structured so that a spherical aberration curve representing the spherical aberration of the imaging lens 100 satisfies the following formulas (1) and (2):

$$0.02 < a/f < 0.10 \quad (1); \text{ and}$$

$$0.02 < b/f \quad (2).$$

Examples 2 through 16 and 18 satisfy these conditions.

Here, "a" represents the maximum deviation (shift amount) of the spherical aberration curve, in the direction of the optical axis, from the image plane base position Zo toward the object point side of the image plane base position Zo with respect to light passing through a central part of the pupil of the imaging lens (please refer to FIG. 2). Further, "b" represents the maximum width of the spherical aberration curve in the direction of the optical axis (please refer to FIG. 2). Further, "f" represents the focal length of the imaging lens 100.

The central part of the pupil of the imaging lens 100 is a portion in which the spherical aberration of the imaging lens 100 is only on the object point side of the image plane base position. The central part of the pupil of the imaging lens 100 includes a region on the optical axis. In other words, the central part of the pupil of the imaging lens 100 is a region of the pupil in which the spherical aberration of the imaging lens 100 is only toward the object point side of the image plane base position, and the central part of the pupil is a continuous region including a region on the optical axis.

When the imaging lens 100 is structured in such a manner that the value of a/f becomes lower than or equal to the lower limit defined by the formula (1), a depth extension effect toward the front side (object point side of the image plane base position) becomes weaker, and the depth decreases in some cases (as illustrated in FIGS. 4Aa and 4Ab).

In contrast, when the imaging lens 100 is structured in such a manner that the value of a/f becomes greater than or equal to the higher limit defined by the formula (1), light that has passed through the central part of the pupil of the imaging lens is condensed further toward the object point side as the value of a/f increases. Therefore, the depth slightly increases, but the demerit (increase of psfφ) outweighs the merit in some cases.

Further, the value of b/f may be defined to be less than 0.3.

The image plane base position Zo is a position at which the contrast of the optical image Q formed through the imaging lens 100 becomes highest, or substantially highest.

More specifically, the image plane base position Zo is a position at which the diameters of point images formed become smallest or substantially smallest when rays coming from all points (object points) including a near point to a far point on the optical axis have passed through the imaging lens 100. A point image formed on the image plane base position Zo is referred to as a base point image. The diameter of the base point image is a base point image diameter (psfφ).

In other words, the image plane base position Zo is a position, in the direction of the optical axis, at which the value of MTF becomes the largest when a plane perpendicular to the optical axis on which the optical image is formed through the imaging lens 100 is moved in the direction of the optical axis (defocusing). Here, the image plane base position Zo is the same as a position at which the imaging plane 211 is arranged. However, it is not necessary that the image plane base position Zo and the position at which the imaging plane 211 is arranged are the same.

In spherical aberration curve Sa illustrated in FIG. 2, an intersection of optical axis Z1 of the imaging lens 100 and the imaging plane 211 of the imaging device 210 (image plane base position Zo) is origin (0,0). In Z-Y coordinate system, illustrated in FIG. 2, horizontal axis Z represents positions in the direction of the optical axis Z1, and vertical axis Y represents heights of rays entering the entrance pupil of the imaging lens 100. FIG. 2 illustrates, in the Z-Y coordinate system, a relationship between the height of a ray entering the entrance pupil (angle of view=0) and a position at which the ray that has passed through the entrance pupil crosses the optical axis.

The spherical aberration curve Sa is a continuous curve based on incident heights. The spherical aberration curve Sa shows a relationship between an incident height (position in the direction of Y axis) when a ray parallel to the optical axis Z1 (a ray with angle of view=0) passes through the pupil of the imaging lens 100, and a condensed position of the ray (position in the direction of Z axis).

Next, a desirable structure or the like of the present invention, which is not essential to the present invention, will be described.

In the imaging lens 100, when the radius of the pupil of the imaging lens 100 is 1, it is desirable that the spherical aberration curve Sa representing the spherical aberration of the imaging lens 100 satisfies the following formula (3):

$$0.1 < c < 1.0 \quad (3).$$

Here, "c" represents the length of the spherical aberration curve Sa included in region Ar between two planes L1 and L2 (please refer to FIG. 2), which are away from the image plane base position Zo in the direction of the optical axis by distance tz (tz=(Fa/f)×0.03)) toward either side of the image plane base position Zo. The length c is a length in a direction perpendicular to the optical axis. Further, Fa is the effective F-number of the imaging lens.

Examples 2 through 18, which will be described later, satisfy this conditions (Example 17 is not included in the present invention).

When the imaging lens 100 is structured in such a manner that the value of c becomes lower than or equal to the lower limit defined by the formula (3), the depth increases as the value of c decreases, but the demerit (increase of psfφ) outweighs the merit in some cases.

In contrast, when the imaging lens 100 is structured in such a manner that the value of c becomes higher than or equal to the upper limit (c=1.0) defined by the formula (3), the spherical aberration of the imaging lens 100 is substantially zero. Therefore, the imaging lens 100 becomes an ordinary lens (without depth extended effect) (please refer to Example 1).

A region of the spherical aberration curve Sa included in region Ar is a spherical aberration minimum region. The spherical aberration minimum region is a region in which the spherical aberration is constant (in other words, within a certain range) in the spherical aberration curve Sa. Specifically, the length c is the length of a region of the spherical aberration curve Sa included in the region Ar, and the length c is a length in a direction perpendicular to the direction of the optical axis.

In other words, the spherical aberration minimum region corresponds to a region in the pupil of the imaging lens, and rays entering the region condense substantially at the same position (a position crossing the optical axis).

Distance tz is a range of focal depth ±0.03 mm, which is regarded as not being substantially affected by spherical aberration in an ordinary image formation optical system. In the ordinary image formation optical system, an optical image of a subject is formed on an imaging plane in such a manner that various aberrations are suppressed.

The distance tz may be regarded as the fluctuation range of spherical aberration that does not substantially affect the performance of an imaging lens constituted of an image formation optical system based on which the imaging lens 100, which is the focal-depth extended optical system, is designed.

Here, the imaging lens 100 may be structured, for example, in such a manner that the spherical aberration of the imaging lens 100 changes from the object point side of the image plane base position toward the other side of the image plane base position (which is opposite to the object point) as a distance from the optical axis increases, and that the spherical aberration changes in such a manner that the spherical aberration does not return from the side opposite to the object point side toward the object point side by more than or equal to the distance tz (an optical image non-deterioration distance, at which the deterioration of the optical image by fluctuation of the spherical aberration in the direction of the optical axis is substantially ignorable).

Further, it is desirable that spherical aberration curve Sa representing the spherical aberration of the imaging lens 100 satisfies all of the following formulas (4) through (6):

$$0.02 < a/f < 0.10 \qquad (4);$$

$$0.02 < b/f < 0.2 \qquad (5); \text{ and}$$

$$0.1 < c < 0.6 \qquad (6).$$

Examples 2 through 16, which will be described later, satisfy these conditions.

Further, it is desirable that the imaging lens 100 is structured in such a manner that spherical aberration curve Sa representing the spherical aberration of the imaging lens 100 satisfies the following formula (7):

$$0.30 < Yu < 0.90 \qquad (7).$$

Examples 3 through 16 and 18, which will be described later, satisfy this condition.

Here, Yu is the position (incident height of a ray entering the pupil of the lens) of a region of the spherical aberration curve Sa between two flat planes L1 and L2 (please refer to FIG. 2), which are away by distance tz from the image plane base position Zo on either side of the image plane base position Zo in the direction of optical axis Z. Yu is a position of the region in a direction perpendicular to the optical axis (Y direction in FIG. 2).

In other words, Yu is a position in the direction perpendicular to the optical axis within the spherical aberration minimum region in the spherical aberration curve Sa.

As illustrated in FIG. 2, c is a difference between maximum value Yu (max) of Yu and minimum value Yu (min) of Yu. The formula (7) may be expressed, as follows:

$$0.30 < Yu(\min); \text{ and}$$

$$Yu(\max) < 0.90.$$

When the imaging lens 100 is structured in such a manner that the value of Yu is lower than or equal to the lower limit defined by the formula (7), the depth extension effect toward the front side of the imaging lens 100 (object point side of the image plane base position) becomes weaker as the value of Yu decreases, and the depth decreases (as illustrated in FIGS. 4Aa and 4Ab when Yu≈0).

In contrast, when the imaging lens 100 is structured in such a manner that the value of Yu is higher than or equal to the upper limit defined by the formula (7), the depth extension effect toward the rear side of the imaging lens (a side opposite to the object point side of the image plane base position) becomes weaker as the value of Yu increases, and the depth decreases in some cases.

The influence of the value of Yu depends on the amount (area) of light passing through the pupil. Therefore, when the value of Yu is higher than or equal to the upper limit defined by the formula (7), the depth extension effect becomes extremely weak in some cases.

In the imaging lens 100, it is desirable that the ratio of the area of the spherical aberration minimum region to the area of the entire region of the pupil is greater than 0.20 and less than 0.75. In other words, it is desirable that spherical aberration curve Sa representing the spherical aberration of the imaging lens 100 satisfies the following formula (J):

$$0.20 < d/e < 0.75 \qquad (J).$$

Examples 2 through 16 and Example 19, which will be described later, satisfy this condition (Example 19 is not included in the present invention).

Here, $d = \pi \times (Yu(\max))^2 - \pi \times (Yu(\min))^2$, and $$e = \pi \times (Yw)^2.$$

"Yw" represents the maximum value of incident height of a ray entering the pupil of the imaging lens (the radius of the pupil) (please refer to FIG. 2).

Further, "e" represents the area of the radius of the pupil, and "d" represents the area of a region in the pupil, the region being defined by the formula (7).

When the imaging lens 100 is structured in such a manner that the value of d/e is lower than or equal to the lower limit defined by the formula (J), the depth extends as the value of d/e decreases. However, the demerit (an increase of psfφ) outweighs the merit in some cases.

In contrast, when the imaging lens 100 is structured in such a manner that the value of d/e is higher than or equal to the upper limit defined by the formula (J), the depth decreases as the value of d/e increases.

Further, it is desirable that spherical aberration curve Sa representing the spherical aberration of the imaging lens 100 satisfies the following formula (8):

$$3 < psf\phi/Fa < 15 \tag{8}$$

Examples 2 through 17 and 19, which will be described later, satisfy this condition (Examples 17 and 19 are not included in the present invention).

When the imaging lens 100 is structured in such a manner that the value of psfϕ/Fa is lower than or equal to the lower limit defined by the formula (8), the depth extension effect becomes weaker as the value of psfϕ decreases, and the depth decreases.

In contrast, when the imaging lens 100 is structured in such a manner that the value of psfϕ/Fa is higher than or equal to the higher limit defined by the formula (8), the depth increases as the value of psfϕ increases. However, the demerit (deterioration of the image quality) increases in some cases.

More specifically, as illustrated in FIG. 3, in the optical intensity distribution Ko of point image (base point image) To formed on a flat plane that is perpendicular to the optical axis and that passes through the image plane base position Zo, an average diameter of a circle defined by an outline connecting most outer positions at which the light intensity is 0.004 times higher than peak intensity Kop of optical intensity distribution Ko may be base point image diameter (psfϕ).

Here, the condition of "0.004 times" is set, because image data output in bitmap format have 8 bit graduation (256 graduations). Specifically, when the peak intensity Kop of a point image corresponds to the maximum value of 256 gradation, a position corresponding to the minimum value (the intensity of light is ¹⁄₂₅₆ of the peak intensity Kop) of 256 gradation in the light intensity distribution Ko is defined as the most outer position of the point image.

Further, the imaging lens 100 may include a first lens group composed of at least one lens, and which has positive power, and a second lens group composed of at least one lens, the first lens group and the second lens group being sequentially arranged from the object side of the imaging lens 100. Further, the most-image-side lens of the second lens group may have negative power on the optical axis thereof, and include a region in which negative power becomes weaker from an optical-axis-side of the region toward a peripheral side thereof.

In the imaging lens 100, a first lens having positive power, a second lens having negative power, a third lens having positive power, and a fourth lens having negative power may be sequentially arranged from the object side of the imaging lens. Examples 1 through 19, which will be described later, satisfy the condition (Examples 17 and 19 are not included in the present invention).

Further, an image-plane-side surface of the fourth lens may be aspheric, and have an inflection point. Examples 1 through 19, which will be described later, satisfy the condition (Examples 17 and 19 are not included in the present invention).

Alternatively, an image-plane-side surface of the fourth lens may be aspheric, and have an extreme point in a region other than the center of the optical axis. Examples 1 through 19, which will be described later, satisfy the condition (Examples 17 and 19 are not included in the present invention).

Further, the image processing unit 310 of the imaging system 300 may perform, as contrast recovery processing, at least two of image restoration processing, edge enhancement processing, gamma correction processing, and contrast enhancement processing in combination.

As the image restoration processing, edge enhancement processing, gamma correction processing, and contrast enhancement processing, known techniques may be adopted.

Next, the action of the imaging lens of the present invention, particularly, the action of the spherical aberration of the imaging lens will be described.

Imaging lenses of Reference Examples 4 and 5, which will be described later, are imaging lenses of the present invention. However, imaging lenses of Reference Examples 1 through 3 are not included in the present invention.

In the following descriptions about the imaging lenses of Reference Examples 1 through 5, the action with respect to a ray coming from a position on optical axis Z1 of each of the imaging lenses will be explained.

<Explanation 1>

FIGS. 4Aa and 4Ab are diagrams related to imaging lens Lh1 of Reference Example 1. FIG. 4Aa is a diagram illustrating spherical aberration curve Sah1 representing the spherical aberration of the imaging lens Lh1 in Z-Y coordinate system. In the Z-Y coordinate system, the horizontal axis Z represents positions in the direction of optical axis Z1, and the vertical axis Y represents positions in a direction perpendicular to the optical axis Z1. FIG. 4Ab is a diagram illustrating the optical paths of rays passing through the imaging lens Lh1. Further, FIG. 4Ab illustrates base point image diameter (psfϕh1), extended focal depth bh1 of the imaging lens Lh1, and the like. The base point image diameter (psfϕh1) is the diameter of a point image formed at image plane base position Zoh1 by making a ray coming from a position on the optical axis of the imaging lens Lh1 pass through the imaging lens Lh1.

The extended focal depth is set so that a blur recovery image the image quality of which is practically acceptable is obtainable by imaging an optical image formed on an imaging plane located within the range of the extended focal depth through the imaging lens, and by performing contrast recovery processing on an original image obtained by imaging.

The extended focal depth corresponds to a focal depth in an ordinary image formation system in which an optical image of a subject is formed on an imaging plane in such a manner that various aberrations are suppressed.

The imaging lens Lh1 of Reference Example 1, illustrated in FIG. 4Aa, has a spherical aberration (the spherical aberration has been induced). In the imaging lens Lh1 of Reference Example 1, rays Kuh1 that have passed through a central part of the pupil of the imaging lens Lh1 are condensed on the object point side of the image plane base position Zoh1 by the influence of the aberration illustrated at central part Juh1 (optical axis side) in the spherical aberration curve Sah1. Further, rays Kih1 that have passed through a peripheral part of the pupil of the imaging lens Lh1 are condensed on a side opposite to the object point side (also referred to as "opposite object point side") of the image plane base position Zoh1 by the influence of the aberration illustrated at peripheral part Jih1 in the spherical aberration curve Sah1 (please refer to FIG. 4Ab).

A range from the most object point side position at which rays that have passed through the imaging lens condense to the most opposite object point side position at which rays that have passed through the imaging lens condense is substantially the same as the range of the extended focal depth.

Further, reference focal depth, which will be described later, is a range that is not regarded (acceptable) as the extended focal depth. The reference focal depth is presented for reference.

As described above, the condensing positions of rays in the direction of the optical axis differ depending on the positions (incident heights) at which rays have passed through the imaging lens Lh1. Consequently, the range of the extended focal depth of the imaging lens Lh1 is increased.

Further, base point image diameter (psf$\phi$h1) is the thickness (size) of a ray forming a base point image at image plane base position Zoh1. Further, the value of maximum width sbh1 of the spherical aberration curve Sah1 of the imaging lens Lh1, illustrated in FIG. 4Aa, is substantially the same as the value of extended focal depth bh1 of the imaging lens Lh1 illustrated in FIG. 4Ab.

At the image plane base position, rays coming from object points located between a near point and a far point on the optical axis of the imaging lens condense most densely. For example, the image plane base position may be defined as a position at which the value of MTF becomes the highest (MTF peak position at which contrast becomes the highest) when a flat plane perpendicular to the optical axis is moved in the direction of the optical axis (direction of the depth) while the value of MTF of an optical image formed on the flat plane perpendicular to the optical axis through the imaging lens is measured.

The image plane base position varies depending on the form of the spherical aberration curve (the inclination angle of the curve, an inclination start position, and the like).

Figure 4B:
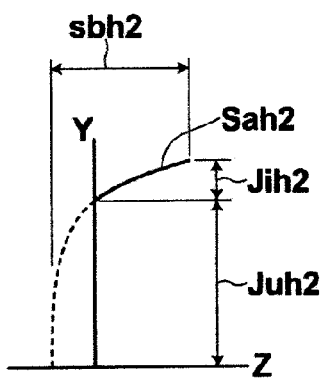
FIG. 4Ba is a diagram illustrating a spherical aberration curve of an imaging lens in Reference Example 2.
Figure 4B:
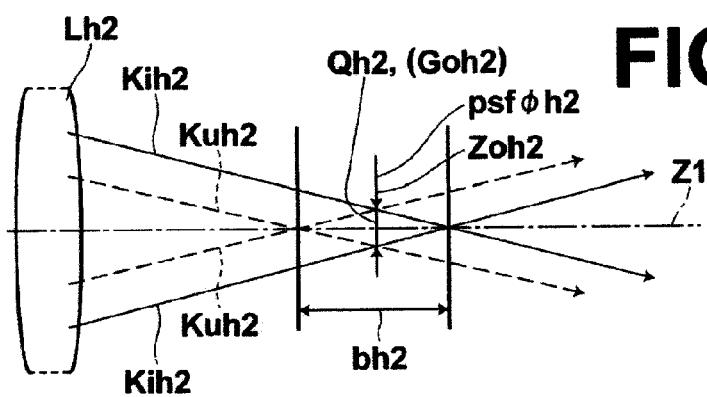

Further, FIGS. 4Ba, 4Ca, 4Da, and 4Ea illustrate spherical aberration curves on coordinate systems similar to the coordinate system illustrated in FIG. 4Aa. FIGS. 4Bb, 4Cb, 4Db, and 4Eb illustrate the optical paths of rays passing through the imaging lens, base point image diameter (psf$\phi$), extended focal depth of the imaging lens, reference focal depth, and the like in a manner similar to FIG. 4Ab. The base point image diameter (psf$\phi$) is the diameter of a point image formed at image plane base position by making a ray coming from a position on the optical axis of the imaging lens pass through the imaging lens.

<Explanation 2>

FIGS. 4Ba and 4Bb are diagrams related to imaging lens Lh2 of Reference Example 2. FIG. 4Ba is a diagram illustrating a spherical aberration curve representing the spherical aberration of the imaging lens Lh2. FIG. 4Bb illustrates the optical paths of rays passing through the imaging lens Lh2, base point image diameter (psf$\phi$h2) of a point image formed by the rays, reference focal depth bh2 of the imaging lens Lh2, and the like.

In the imaging lens Lh2, a spherical aberration is induced in such a manner that the maximum width of the spherical aberration curve is wider than the case of the imaging lens Lh1 of Reference Example 1, which has been described already.

In the imaging lens Lh2, which has the spherical aberration as illustrated in FIG. 4Ba, ray Kuh2 that has passed through the central part of the pupil of the imaging lens Lh2 condenses on the object point side of the image plane base position Zoh2 in a manner similar to the imaging lens Lh1, which has been described already. The ray Kuh2 condenses in such a manner because of the influence of the aberration at central part Juh2 (optical axis side) in the spherical aberration curve Sah2. Further, ray Kih2 that has passed through the peripheral part of the pupil of the imaging lens Lh2 condenses on a side opposite to the object point side (opposite side to object point) of the image plane base position Zoh2. The ray Kih2 condenses in such a manner because of the influence of the aberration illustrated in peripheral part Jih2 in the spherical aberration curve Sah2 (please refer to FIG. 4Bb).

Therefore, reference focal depth bh2 of the imaging lens Lh2 that has the spherical aberration as described above is extended more than the extended focal depth bh1 of the imaging lens Lh1, which has been described already.

However, when the base point image diameter (psf$\phi$h2) increases as the range of the extended focal depth increases, the demerit increases when contrast recovery processing is performed on an original image formed through the imaging lens Lh2. Therefore, extension (increase) of the maximum width sbh2 of the spherical aberration curve Sah2 is limited.

Specifically, when the maximum width sbh2 of the spherical aberration curve Sah2 is increased, the base point image diameter (psf$\phi$h2) increases. When contrast recovery processing is performed on an original image obtained by imaging an optical image composed of a multiplicity of point images having large diameters, a noise included in the original image increases by the contrast recovery processing. Further, the image quality of the blur recovery image deteriorates. Further, the increase of the base point image diameter (psf$\phi$h2) causes generation of artifacts (spurious resolution), and the image quality deteriorates in some cases.

As the base point image diameter (psf$\phi$h2) increases, the number of pixels in an original image used to perform contrast recovery processing (pixels located within the range of the base point image diameter (psf$\phi$h2)) increases and the operation amount increases. In other words, the area (the range of the base point image diameter (psf$\phi$h2)) that is the target of contrast recovery processing increases. Consequently, the ratio of a noise component included in the range becomes larger than the ratio of a signal component included in the range. Therefore, the noise included in a blur recovery image obtained by performing contrast recovery processing on the original image increases, and the image quality deteriorates.

This shows that it is difficult to obtain a blur recovery image that has an excellent image quality, and in which the depth of field is increased, only by increasing the spherical aberration of an imaging lens, as described above.

<Explanation 3>

Figure 4C:
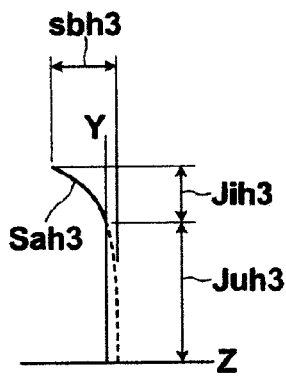
FIG. 4Ca is a diagram illustrating a spherical aberration curve of an imaging lens in Reference Example 3.
Figure 4C:
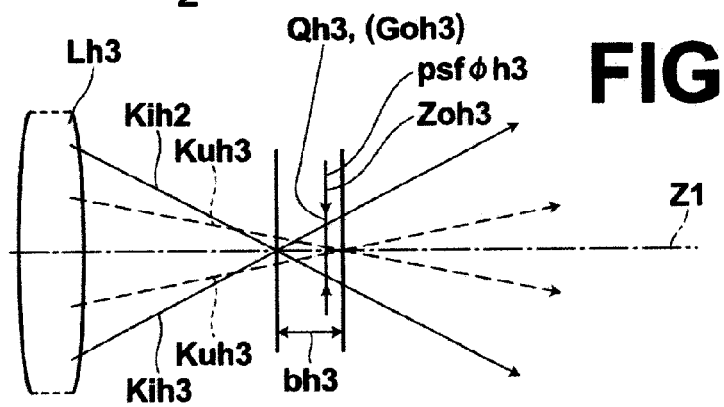

FIGS. 4Ca and 4Cb are diagrams related to imaging lens Lh3 of Reference Example 3. FIG. 4Ca is a diagram illustrating spherical aberration curve Sah3 representing the spherical aberration of imaging lens Lh3. FIG. 4Cb illustrates the optical paths of rays passing through the imaging lens Lh3, base point image diameter (psf$\phi$h3) of a point image formed by the rays, reference focal depth bh3 of the imaging lens Lh3, and the like.

The imaging lens Lh3 has a spherical aberration the properties of which are opposite to the properties of the spherical aberrations of the imaging lens Lh1 and the imaging lens Lh2, which have been described already.

As illustrated in FIG. 4Ca, in the imaging lens Lh3 of Reference Example 3, ray Kuh3 that has passed through the central part of the pupil of the imaging lens Lh3 condenses on a side (opposite object point side) opposite to the object point side of the image plane base position Zoh3, because of the influence of the aberration at central part Juh3 (optical axis side) in the spherical aberration curve Sah3. Further, ray Kih3 that has passed through the peripheral part of the pupil of the imaging lens Lh3 condenses on the object point side of the image plane base position Zoh3, because of the influence of the aberration illustrated in peripheral part Jih3 in the spherical aberration curve Sah3 (please refer to FIG. 4Cb).

In the imaging lens Lh3 that has spherical aberrations as described above, maximum width sbh3 of spherical aberration curve Sah3 is less than the maximum width sbh2 of the spherical aberration curve Sah2 of the imaging lens Lh2, which has been described already. Therefore, the range of reference focal depth bh3 of the imaging lens Lh3 is reduced. However, even if the range of the reference focal depth bh3 of the imaging lens Lh3 is reduced, the base point image diameter (psfφh3) of the imaging lens Lh3 is larger than the base point image diameter (psfφh2) of the imaging lens Lh2.

Therefore, in the imaging lens Lh3, the depth of field is not increased. Further, in the imaging lens Lh3, the base point image diameter (psfφh3) increases. Therefore, when, contrast recovery processing is performed on an original image obtained through the imaging lens Lh3, the noise included in the blur recovery image increases, and the image quality of the blur recovery image deteriorates.

<Explanation 4>

Figure 4D:
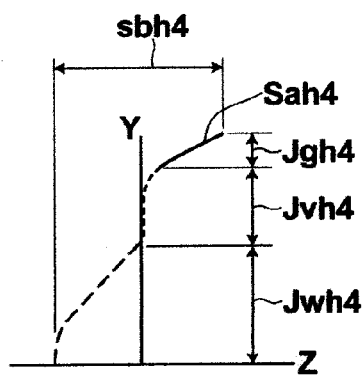
FIG. 4Da is a diagram illustrating a spherical aberration curve of an imaging lens in Reference Example 4.
Figure 4D:
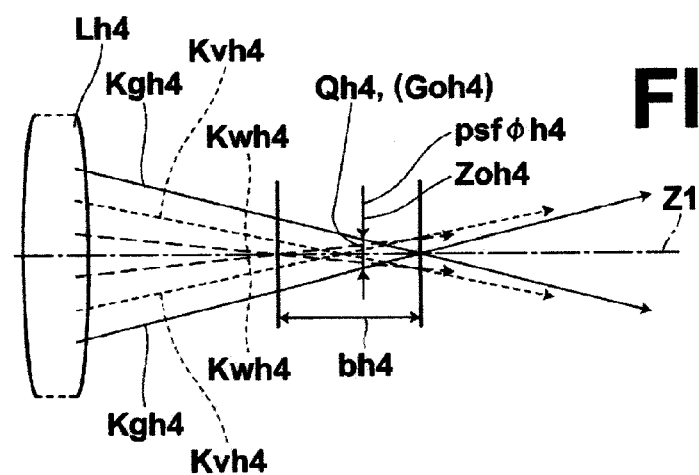

FIGS. 4Da and 4Db are diagrams related to imaging lens Lh4 of Reference Example 4, which is an imaging lens of the present invention. FIG. 4Da is a diagram illustrating spherical aberration curve Sah4 representing the spherical aberration of imaging lens Lh4. FIG. 4Db illustrates the optical paths of rays passing through the imaging lens Lh4, base point image diameter (psfφh4) of a point image formed by the rays, extended focal depth bh4 of the imaging lens Lh4, and the like.

In the imaging lens Lh4, maximum width sbh4 in the spherical aberration curve Sah4 is wider than the maximum width sbh1 of the imaging lens Lh1 of Reference Example 1, which has been described already. Further, the spherical aberration curve Sah4 has a spherical aberration minimum region (middle part Jvh4, which will be described later), in which the condensing position of rays do not change in the direction of the optical axis even if the incident heights of rays passing through the pupil of imaging lens Lh4 change.

As illustrated in FIG. 4Da, in the imaging lens Lh4 of Reference Example 4, rays Kgh4 that have passed through the peripheral portion, which is the most outer region of the pupil of the imaging lens Lh4, condense on the opposite object point side of the image plane base position Zoh4 by the influence of the aberration in peripheral part Jgh4 of the spherical aberration curve Sah4 (please refer to FIG. 4Db). Further, rays Kwh4 that have passed through the central part of the pupil of the imaging lens Lh4 condense on the object point side of the image plane base position Zoh4 by the influence of the aberration illustrated at central part Jwh4 (most optical axis side) in the spherical aberration curve Sah4 (please refer to FIG. 4Db). Further, rays Kvh4 that have passed a middle part between the peripheral part of the pupil of the imaging lens Lh4 and the central part of the pupil of the imaging lens Lh4 condense at positions between the condensing position of the rays Kgh4, which have passed through the peripheral part of the pupil of the imaging lens Lh4, and the condensing position of the rays Kwh4, which have passed through the central part of the pupil of the imaging lens Lh4, by the influence of the aberration illustrated in middle part Jvh4 of the spherical aberration curve Sah4 (please refer to FIG. 4Db).

In the imaging lens Lh4, the maximum width sbh4 of the spherical aberration curve Sah4 is wider than the maximum width sbh1 of the spherical aberration curve Sah1 of the imaging lens Lh1, which has been described already. Therefore, the range of the extended focal depth bh4 of the imaging lens Lh4 is extended more than the case of the imaging lens Lh1.

Here, the maximum width sbh4 of the spherical aberration curve Sah4 of the imaging lens Lh4 and the extended focal depth bh4 of the imaging lens Lh4 are substantially the same.

Further, even if the range of the extended focal depth bh4 of the imaging lens Lh4 is increased as described above, an increase of the base point image diameter (psfφh4) formed at the image plane base position Zoh4 through the imaging lens Lh4 is suppressed. Therefore, the base point image diameter (psfφh4) of the imaging lens Lh4 is smaller than the base point image diameter (psfφh2) of the imaging lens Lh2.

Accordingly, the imaging lens Lh4 can increase the depth of field, while an increase of the base point image diameter (psfφh4) is suppressed.

Specifically, a blur recovery image obtained by performing contrast recovery processing on an original image obtained by imaging an optical image composed of a multiplicity of point images (point images having base point image diameter (psfφh4)) formed through the imaging lens Lh4 has contrast that is higher than or equal to a predetermined value for any subject from a short distance through a long distance. Further, the depth of the obtained image is deep, and the image has an excellent image quality.

<Explanation 5>

Figure 4E:
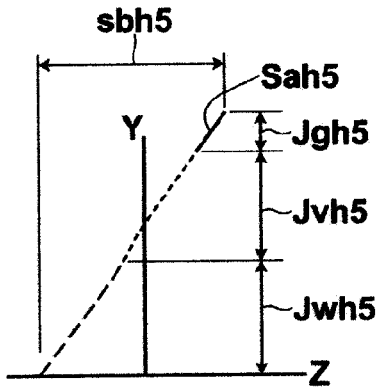
FIG. 4Ea is a diagram illustrating a spherical aberration curve of an imaging lens in Reference Example 5.
Figure 4E:
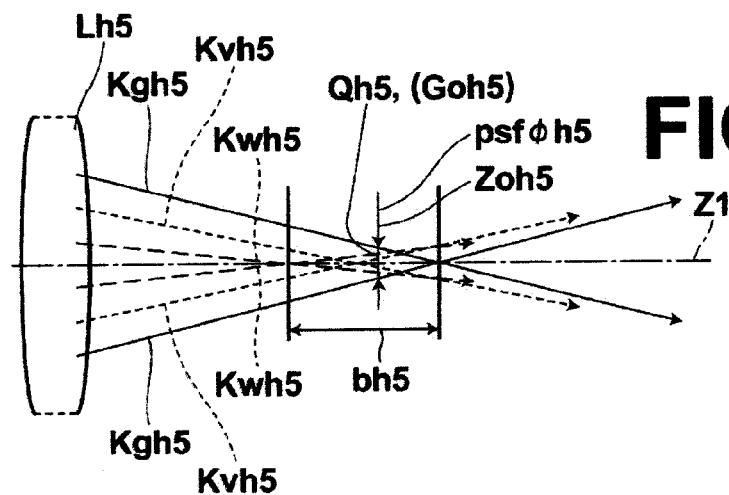

FIGS. 4Ea and 4Eb are diagrams related to imaging lens Lh5 of Reference Example 5, which is an imaging lens of the present invention. FIG. 4Ea is a diagram illustrating spherical aberration curve Sah5 representing the spherical aberration of imaging lens Lh5. FIG. 4Eb illustrates the optical paths of rays passing through the imaging lens Lh5, base point image diameter (psfφh5) of a point image formed by the rays, extended focal depth bh5 of the imaging lens Lh5, and the like.

In the imaging lens Lh5, maximum width bh5 in the spherical aberration curve Sah5 is wider than the maximum width bh1 of the imaging lens Lh1 of Reference Example 1, which has been described already. Further, the imaging lens Lh5 has a spherical aberration in such a manner that condensing positions of rays passing at incident heights move to the opposite object point side in the direction of the optical axis, as the incident heights increase (the value of Y axis in FIG. 4Ea increases).

As illustrated in FIG. 4Ea, in the imaging lens Lh5 of Reference Example 5, rays Kgh5 that have passed through the peripheral portion, which is the most outer region of the pupil of the imaging lens Lh5, condense on the opposite object point side of the image plane base position Zoh5 by the influence of the aberration illustrated in peripheral part Jgh5 of the spherical aberration curve Sah5 (please refer to FIG. 4Eb). Further, rays Kwh5 that have passed through the central part of the pupil of the imaging lens Lh5 condense on the object point side of the image plane base position Zoh5 by the influence of the aberration illustrated at central part Jwh5 (most optical axis side) in the spherical aberration curve Sah5 (please refer to FIG. 4Eb). Further, rays Kvh5 that have passed a middle part between the peripheral part of the pupil of the imaging lens Lh5 and the central part of the pupil of the imaging lens Lh5 condense at positions between the condensing position of the rays Kgh5, which have passed through the peripheral part of the pupil of the imaging lens Lh5, and the condensing position of the rays Kwh5, which have passed through the central part of the pupil of the imaging lens Lh5, by the influence of the aberration illustrated in middle part Jvh5 of the spherical aberration curve Sah5 (please refer to FIG. 4Eb).

Therefore, in the imaging lens Lh5, which has the spherical aberration as described above, maximum width sbh5 of spherical aberration curve Sah5 is larger than the maximum width sbh1 of the spherical aberration curve sbh1 of the imaging lens Lh1, which has been described already, in a manner similar to the imaging lens Lh4 of Reference Example 4. Therefore, extended focal depth bh5 of the imaging lens Lh5 is extended.

Here, the maximum width sbh5 of the spherical aberration curve Sah5 of the imaging lens Lh5 and the extended focal depth bh5 of the imaging lens Lh5 are substantially the same.

Further, even if the range of the extended focal depth bh5 of the imaging lens Lh5 is increased, an increase of base point image diameter (psfφh5) of the imaging lens Lh5 is suppressed. The base point image diameter (psfφh5) of the imaging lens Lh5 is smaller than the base point image diameter (psfφh2) of the imaging lens Lh2, which has been described already. Therefore, it is possible to extend the depth of field of the imaging lens Lh5, while increase of the base point image diameter (psfφh5) is suppressed.

Specifically, a blur recovery image obtained by performing contrast recovery processing on an original image obtained by imaging an optical image composed of a multiplicity of point images (point images having base point image diameter (psfφh5)) formed through the imaging lens Lh5 has contrast that is higher than or equal to a predetermined value for any subject from a close distance through a long distance. Further, the depth of the obtained image is deep, and the image has an excellent image quality.

The maximum width sbh5 of the spherical aberration curve Sah5 of the imaging lens Lh5 and the maximum width sbh4 of the spherical aberration curve Sah4 of the imaging lens Lh4 are substantially the same. Therefore, the extended focal depth bh5 of the imaging lens Lh5 and the extended focal depth bh4 of the imaging lens Lh4 are substantially the same.

Meanwhile, the base point image diameter (psfφh4) of the imaging lens Lh4, which has been described already, (for example, Example 15, please refer to FIGS. 19L and 19M) is smaller than the base point image diameter (psfφh5) of the imaging lens Lh5 (Example 16, please refer to FIGS. 20L and 20M). Therefore, the blur recovery image obtained by using the imaging lens Lh4, which has been described already, has less noise and less artifact than a blur recovery image obtained by using the imaging lens Lh5. The image quality of the blur recovery image obtained by using the imaging lens Lh4 is higher.

This effect is achieved because a part (spherical aberration minimum region) in which condensing positions of rays do not change in the direction of the optical axis (Z direction in the drawings) even if the incident heights of rays entering the pupil of the imaging lens Lh4 change is present in the spherical aberration curve Sah4, which has been described already.

<Explanation 6>

Next, the effect of extending the depth of field by the imaging lens of the present invention will be described with reference to FIG. 4F.

Figure 4F:
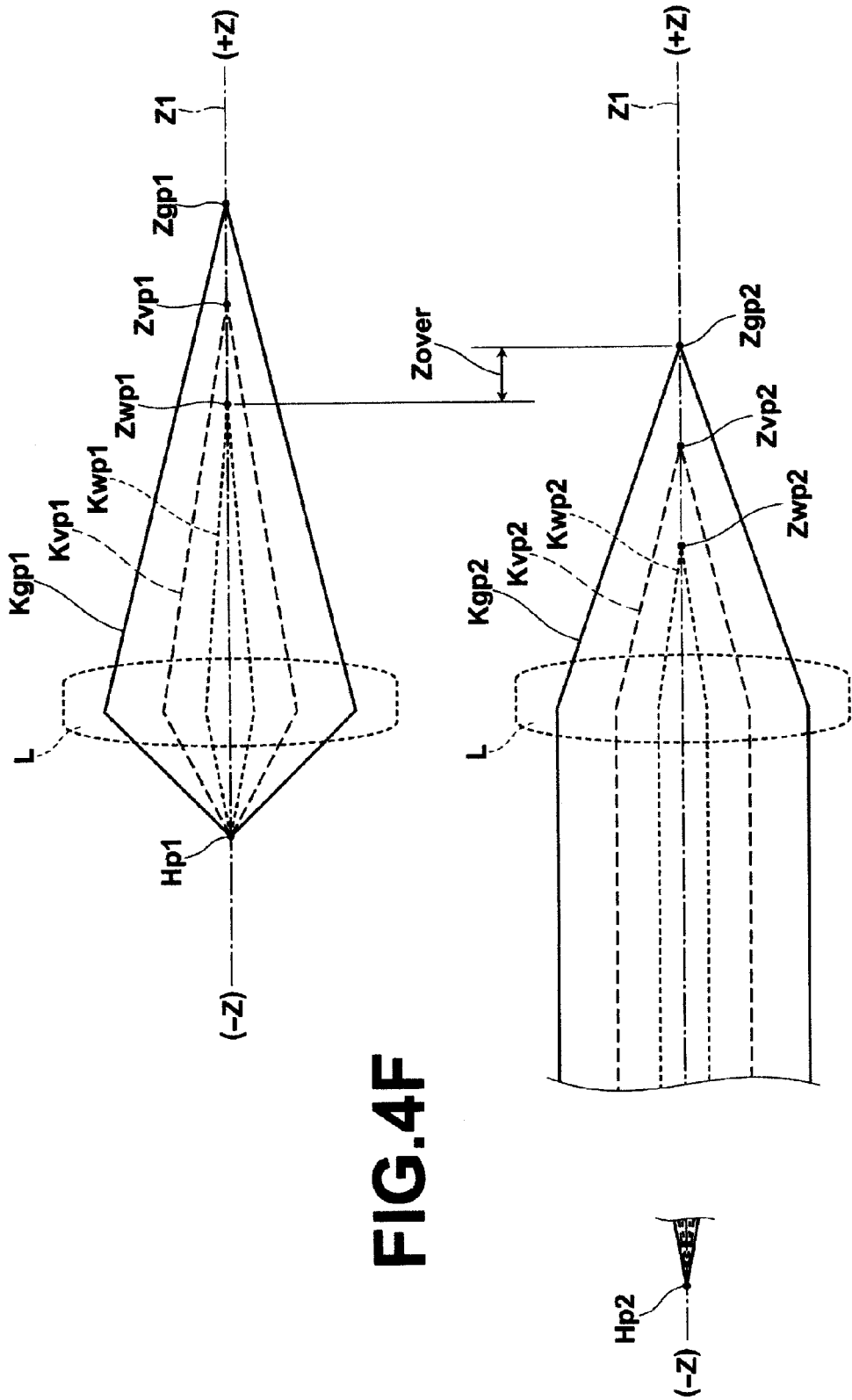
FIG. 4F is a diagram illustrating condensed positions of rays when the rays come from a near point and a far point and pass through an imaging lens.

FIG. 4F is a diagram illustrating a manner of condensing rays coming from a near point through an imaging lens and a manner of condensing rays coming from a far point through the imaging lens in comparison with each other. The upper part of FIG. 4F (left side of the page) is related to the near point, and the lower part of FIG. 4F (right side of the page) is related to the far point.

As the upper part of FIG. 4F shows, ray Kgp1 coming from near point Hp1 on optical axis Z1 through a peripheral part of the pupil of imaging lens L is accurately formed at position Zgp1 on the optical axis Z1 without blurs. Further, ray Kwp1 coming from the near point Hp1 on the optical axis Z1 through a central part of the pupil of the imaging lens L is accurately formed at position Zwp1, which is located on the object point side of the position Zgp1, on the optical axis Z1 without blurs. Further, ray Kvp1 coming from the near point Hp1 on the optical axis Z1 through a middle part of the pupil of imaging lens L is accurately formed at position Zvp1, which is located between the position Zgp1 and the position Zwp1, on the optical axis Z1 without blurs.

Specifically, an optical image accurately representing the near point Hp1 on the optical axis Z1 is formed at all positions from the position Zgp1 through the position Zwp1 on the optical axis Z1.

However, a ray coming from a point other than the near point Hp1 and that has passed through the optical axis reaches each of positions from the position Zgp1 through the position Zwp1 on the optical axis. The ray coming from a point other than the near point Hp1 generates a noise, and does not contribute to formation of an optical image representing the near point Hp1. Therefore, a blurred optical image representing the near point Hp1 is formed at each of the positions from the position Zgp1 through the position Zwp1 on the optical axis.

Here, the extended focal depth with respect to the near point Hp1 is substantially a range from the position Zgp1 to the position Zwp1 on the optical axis.

Meanwhile, as the lower part of FIG. 4F shows, ray Kgp2 coming from far point Hp2 on optical axis Z1 through the peripheral part of the pupil of imaging lens L is accurately formed at position Zgp2 on the optical axis Z1 without blurs. Further, ray Kwp2 coming from the far point Hp2 on the optical axis Z1 through the central part of the pupil of imaging lens L is accurately formed at position Zwp2, which is located on the object point side of the position Zgp2, on the optical axis Z1 without blurs. Further, ray Kvp2 coming from the far point Hp2 on the optical axis Z1 through the middle part of the pupil of imaging lens L is accurately formed at position Zvp2, which is located between the position Zgp2 and the position Zwp2, on the optical axis without blurs.

Specifically, an optical image accurately representing the far point Hp2 on the optical axis Z1 is formed at all positions from the position Zgp2 through the position Zwp2 on the optical axis Z1.

However, a ray coming from a point other than the far point Hp2 and that has passed through the optical axis reaches each of positions from the position Zgp2 through the position Zwp2 on the optical axis. The ray coming from a point other than the far point Hp2 generates a noise, and does not contribute to formation of an optical image representing the far point Hp2. Therefore, a blurred optical image representing the far point Hp2 is formed at each of the positions from the position Zgp2 through the position Zwp2 on the optical axis.

Here, the extended focal depth with respect to the far point Hp2 is substantially a range from the position Zgp2 to the position Zwp2 on the optical axis.

In region Zover, a region from the position Zgp1 through the position Zwp1, which is the extended focal depth with respect the near point Hp1, and a region from the position Zgp2 through the position Zwp2, which is the extended focal depth with respect to the far point Hp2, overlap each other. In the region Zover, an optical image with respect to any point from the near point Hp1 through the far point Hp2 on the optical axis can be formed in such a manner that the optical image may be blurred, but in a practically acceptable condition.

The expression "the optical image may be blurred, but in a practically acceptable condition" means that an image that is practically usable without trouble is recoverable by performing contrast recovery processing on the blurred optical image.

Therefore, the region Zover is the extended focal depth for all of points from the near point Hp1 through the far point Hp2 on the optical axis. Hence, when an imaging plane of an imaging device is arranged in the region Zover, it is possible to image, within the extended focal depth of the imaging lens L, a subject arranged at any position from the near point Hp1 through the far point Hp2.

It is possible to extend the depth of field of the imaging lens and to suppress deterioration of the image quality of a blur recovery image obtained through the imaging lens by the action of the imaging lens of the present invention as described above.

When the imaging lens of the present invention is applied, for example, to a camera of a cellular phone, it is desirable that the position of the imaging plane arranged in the region Zover is set in such a manner that the resolution of an optical image of a subject located at the far point Hp2 is higher than the resolution of an optical image of a subject located at the near point Hp1 when the optical images are formed on the imaging plane.

Specifically, when an object located at a very near point (closest distance) is photographed by a camera mounted on a cellular phone, the purpose of photography is mainly photography of letters and characters. When the letters and characters are photographed, an image quality is not required but whether the letters and characters are readable (distinguishable) is important. Therefore, the thickness (size) of a bundle of rays that comes from the near point Hp1 and enters the imaging plane may be thicker than that of a bundle of rays that comes from the far point Hp2 and enters the imaging plane to some extent.

Especially, when the imaging lens is used for an occasion in which a lens flare is acceptable in photography of a subject at a very near point (low frequency resolution is not required), use of the imaging lens of the present invention, which has the spherical aberration as described above, is appropriate. Meanwhile, a certain level of high frequency resolution is required to read the letters and characters.

So far, the first embodiment of the present invention has been described.

Figure 4G:
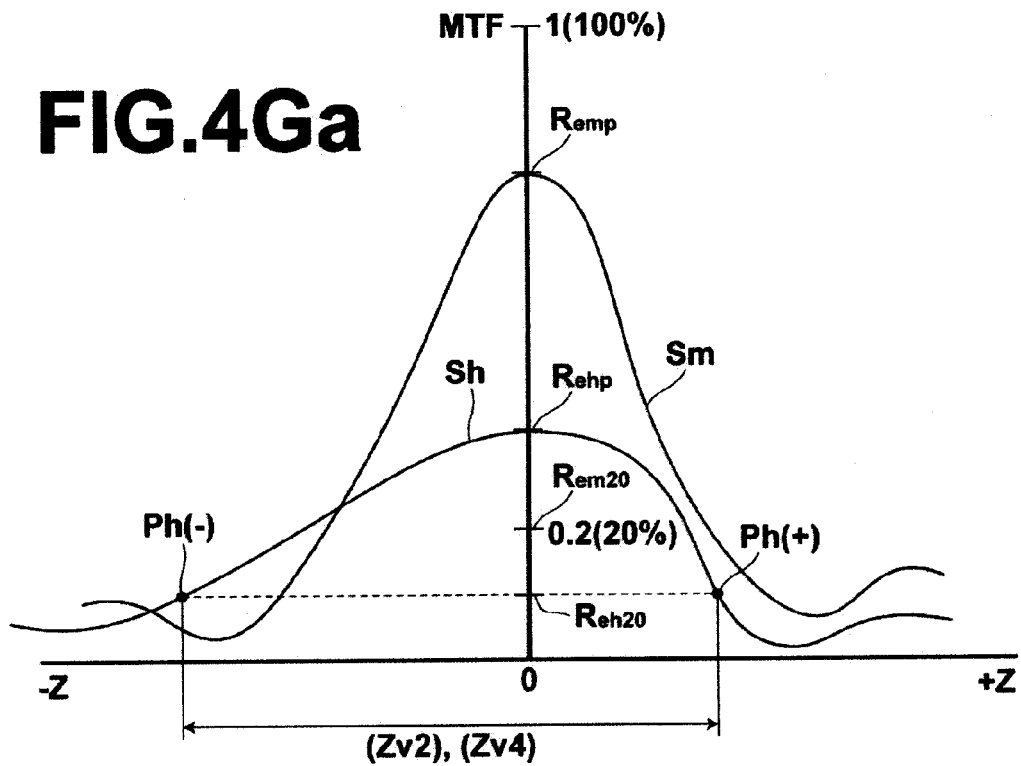
FIG. 4Ga is a diagram related to the imaging lens according to the second embodiment of the present invention, and illustrates Nyquist extended focal depth corresponding to defocus MTF.
Figure 4G:
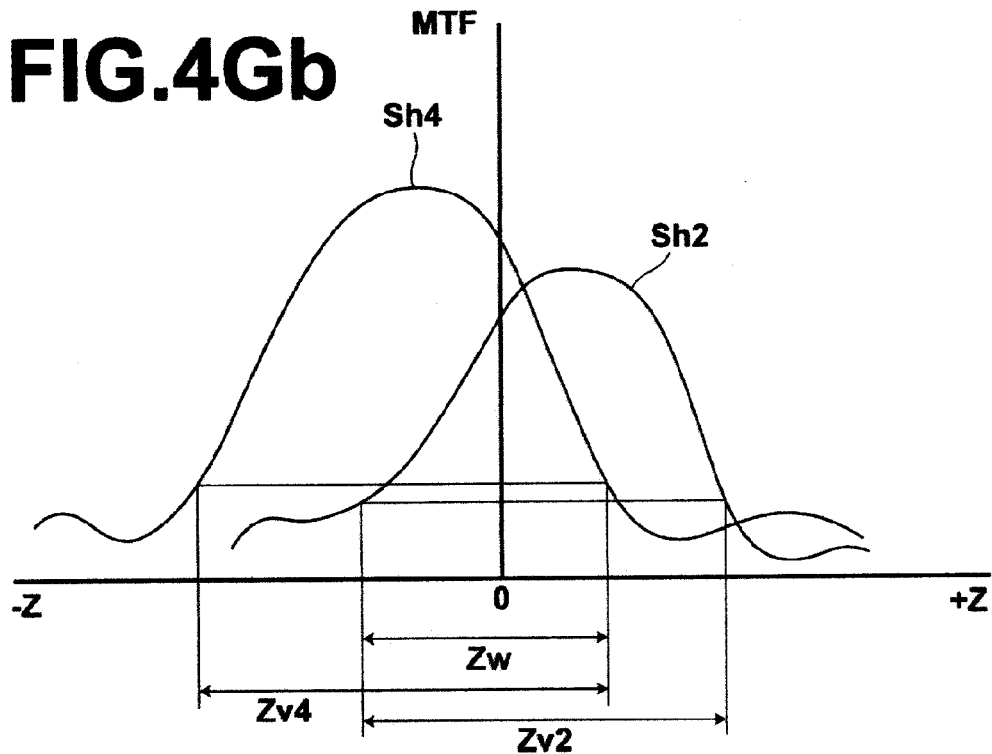

Next, the second embodiment of the present invention will be described with reference to drawings. FIG. 1 is a diagram illustrating an imaging lens and an imaging system according to the second embodiment of the present invention. FIG. 4Ga is a diagram illustrating Nyquist extended focal depth corresponding to defocus MTF (depth MTF) in a coordinate system. In the coordinate system illustrated in FIG. 4Ga, the horizontal axis Z represents positions in the direction of the optical axis Z1, and the vertical axis represents MTF values. FIG. 4Gb is a diagram illustrating a manner of obtaining a common extended focal depth from ½ Nyquist extended focal depth of the imaging lens and ¼ Nyquist extended focal depth of the imaging lens. In the coordinate system illustrated in FIG. 4Gb, horizontal axis Z represents positions in the direction of optical axis Z1, and vertical axis represents MTF values. FIG. 4Gc is a diagram illustrating the relationship between the light intensity distribution of a point image formed through the imaging lens and a base point image diameter. In the coordinate system of E-Y illustrated in FIG. 4Gc, the vertical axis represents light intensity E, and the horizontal axis represents positions in a direction (Y direction) perpendicular to the optical axis.

The term "direction perpendicular to the optical direction" refers to a direction that is perpendicular to the optical axis, and in other words, the direction of the radius of the lens. Further, the term "a plane perpendicular to the optical axis" refers to a plane (flat plane) that is perpendicular to the optical axis.

FIG. 1 is a diagram common to the imaging lens and the imaging system using the imaging lens according to the first embodiment of the present invention, and the imaging lens and the imaging system using the imaging lens according to the second embodiment of the present invention.

Meanwhile, FIGS. 4Ga, 4Gb and 4Gc are applied only to the second embodiment of the present invention.

The imaging lens 100 according to the embodiments of the present invention, illustrated in FIG. 1, forms blurred optical image Q of a subject 1 located at any distance of photography. The imaging lens 100 is an imaging lens for forming an optical image. The optical image is formed to obtain blur recovery image Gk of original image Go by performing contrast recovery processing on the original image Go obtained by imaging the blurred optical image Q.

In the contrast recovery processing, image processing is performed on the original image Go representing the blurred optical image Q obtained by imaging through the imaging lens 100, and blur recovery image Gk is obtained by recovering the contrast of the original image Go.

The contrast recovery processing improves the sharpness of an image by enhancing the contrast of the image. More specifically, for example, an image that has a resolution of 70 line/mm is recovered from an image that has a resolution of 50 line/mm. For example, an image in which only a display portion corresponding to 50 line/mm is visible is corrected to an image in which a display portion corresponding to 70 line/mm is visible. As the contrast recovery processing, image restoration processing by Fourier transformation, edge enhancement processing, gamma correction processing, contrast enhancement processing or the like may be adopted, for example. The imaging lens 100 is provided in an imaging unit 200. The imaging lens 100 forms the blurred optical image Q on an imaging plane 211 of the imaging device 210 provided in the imaging unit 200.

The imaging unit 200 includes the imaging lens 100 that forms the blurred optical image Q and the imaging device 210 for imaging the optical image Q.

An imaging system 300 of the present invention includes an imaging unit 200 having the imaging lens 100 for forming the blurred optical image and the imaging device 210 for imaging the optical image Q, an image processing unit 310, and an image output unit 320.

The image processing unit 310 performs contrast recovery processing on original image Go representing the optical image Q obtained by imaging by the imaging device 210. The image output unit 320 outputs blur recovery image Gk obtained by performing contrast recovery processing at the image processing unit 310. The blur recovery image Gk output from the image output unit 320 is displayed at a display unit 410.

The image processing unit 310 performs, as contrast recovery processing, one of image restoration processing using Fourier transformation, edge enhancement processing, gamma correction processing, and contrast enhancement processing, or at least two of them in combination.

Next, the meanings of signs in the formulas that will be described later will be explained together.

<½ Nyquist Spatial Frequency and ¼ Nyquist Spatial Frequency>

½ Nyquist spatial frequency (cycle/mm) is a spatial frequency that is determined based on the pixel pitch of an imaging device for imaging an optical image formed through an imaging lens.

A spatial frequency when imaging is performed in such a mariner that two pixel pitch corresponds to ½ cycle is ½ Nyquist spatial frequency.

½ Nyquist spatial frequency Fre2 related to an imaging device the pixel pitch of which is 0.0014 mm (1.4 μm) may be obtained in the following manner.

Specifically, since "Width of One Cycle=Two Pixel Pitch× 2=0.0056 mm (5.6 μm), the ½ Nyquist spatial frequency Fre2 may be obtained as follows:

Fre2=1/0.00056≈179(cycle/mm).

Further, ¼ Nyquist spatial frequency (cycle/mm) is defined in a similar manner to the ½ Nyquist spatial frequency. A spatial frequency when imaging is performed in such a manner that four pixel pitch corresponds to ½ cycle is ¼ Nyquist spatial frequency.

¼ Nyquist spatial frequency Fre4 related to an imaging device the pixel pitch of which is 0.0014 mm (1.4 μm) may be obtained in the following manner.

Specifically, since "Width of One Cycle=Two Pixel Pitch× 4=0.00112 mm (11.2 μm), the ¼ Nyquist spatial frequency Fre4 may be obtained as follows:

Fre4=1/0.0011290(cycle/mm).

<Peak Response>

Peak response is the peak value of depth MTF. In other words, the peak response is the peak value of MTF obtained at the time of defocusing.

<Base Response>

Next, base response will be described with reference to FIG. 4Ga, which illustrates defocus MTF (depth MTF) of the imaging lens. In FIG. 4Ga, a defocus amount is ±0 at position (0), at which the vertical axis (MTF axis) and the horizontal axis (Z axis corresponding to optical axis Z1) cross each other. This position is an image plane base position.

In FIG. 4Ga, depth MTF curve Sm of imaging lens M and depth MTF curve Sh of imaging lens H are illustrated. The imaging lens M is an ordinary image formation optical system that is designed to reduce aberrations as much as possible without assuming that contrast recovery processing will be performed. A depth-of-field extended optical system is designed based on the imaging lens M. Further, the imaging lens H is the depth-of-field extended optical system designed based on the imaging lens M.

Here, the value (depth MTF peak value) of peak response Remp of the imaging lens M is obtained. Further, the value of 20% (0.20) with respect to full scale 100% (1.00) of MTF is set as the value of base response Rem20 of the imaging lens M.

What is meant by the expression "the value of 20% (0.20) with respect to full scale 100% (1.00) of MTF is set as the value of base response Rem20 of the imaging lens M" will be explained.

Even if the value of MTF becomes lower than 20%, an image of a subject does not suddenly become irresolvable. However, the resolution becomes lower, as the value of MTF becomes lower. Meanwhile, those skilled in the art commonly regard that an image of a subject is resolved if MTF is at least 20%. The depth represents a range in which an image of the subject is resolved. Therefore, with respect to the depth, a range in which MTF is 20% or higher is defined as a range in which the image of the subject is resolved.

Next, the value (depth MTF peak value) of peak response Rehp of the imaging lens H, which is a depth-of-field extended optical system, is obtained.

Then, base response Reh20 of the imaging lens H is set so that the ratio of the value of the base response Rem20 of the imaging lens M to the value of the peak response Remp of the imaging lens M becomes the same as the ratio of the value of the base response Reh20 of the imaging lens H to the value of the peak response Rehp of the imaging lens H.

Specifically, the base response Reh20 of the imaging lens H may be obtained by the following formula:

Reh20=Rehp×(Reh20/Remp).

For example, with respect to ¼ Nyquist spatial frequency, the peak response of the imaging lens of Example 2, which is a depth-of-field extended optical system, is 0.702, and the base response of the imaging lens of Example 2 is 17.1%. The base response of Example 2 may be obtained, by using values in Example 1, based on which depth-of-field extended optical system is designed, as follows.

Specifically, the base response of Example 2 may be obtained by the following operation:

Base Response of Example 2(17.1%)=Base Response of Example 1×(Peak Response of Example 2/Peak Response of Example 1)=0.20×(0.702/ 0.818).

<¼ Nyquist Extended Focal Depth and ½ Nyquist Extended Focal Depth>

¼ Nyquist extended focal depth Zv4 is a depth (extended focal depth) corresponding to the base response of an imaging lens at ¼ Nyquist spatial frequency.

The base response is a response at which the contrast of an original image is improved to a practically acceptable level when contrast recovery processing is performed on the original image obtained through an imaging lens that is the depth-of-field optical system. The base response is an extended response of the imaging lens. Therefore, it is possible to obtain a blur recovery image the image quality of which is practically acceptable by placing an imaging plane within a range of the extended focal depth of the imaging lens, the range in which a response higher than or equal to the base response is obtained, and by imaging an optical image formed on the imaging plane, and by performing contrast recovery processing on the original image obtained by imaging.

The practically acceptable image may be obtained, for example, by imaging an optical image formed through an image formation optical system, the MTF characteristic of which is 0.2.

Specifically, for example, when FIG. 4Ga is related to ¼ Nyquist spatial frequency, the value of base response Reh20 of the imaging lens H, which is the depth-of-field extended optical system, at ¼ Nyquist spatial frequency has been obtained already. Further, a point the value of which is the same as the value of the base response Reh20 in the depth MTF curve Sh of the imaging lens H, and that is closest to the position of defocus amount 0, and at which the defocus amount is negative is determined as point Ph(−). Further, a point the value of which is the same as the value of the base response Reh20 in the depth MTF curve Sh of the imaging lens H, and that is closest to the position of defocus amount 0, and at which the defocus amount is positive is determined as point Ph(+). A distance between the point Ph(+) and the point Ph(−) is the value of the ¼ Nyquist extended focal depth Zv4.

In a manner similar to obtainment of the ¼ Nyquist extended focal depth Zv4, ½ Nyquist extended focal depth Zv2 may be obtained as the depth (extended focal depth) corresponding to the base response of the imaging lens at ½ Nyquist spatial frequency.

<¼ Nyquist Normalized Extended Focal Depth and ½ Nyquist Normalized Focal Depth>

¼ Nyquist normalized extended focal depth is a normalized value of the ¼ Nyquist extended focal depth Zv4 by using the value of F-number and the value of focal depth f. The ¼ Nyquist normalized extended focal depth may be obtained by the following formula:

¼ Nyquist Normalized Extended Focal Depth=Zv4× (Fa/f²).

In a manner similar to the case of ¼ Nyquist normalized extended focal depth, ½ Nyquist normalized extended focal depth is a normalized value of the ½ Nyquist extended focal depth Zv2 by using the value of F-number and the value of focal depth f. The ½ Nyquist normalized extended focal depth may be obtained by the following formula:

½ Nyquist Normalized Extended Focal Depth=$Zv2 \times (Fa/f^2)$.

<Common Extended Focal Depth>

As illustrated in FIG. 4Gb, common extended focal depth Zw may be obtained as a focal depth (extended focal depth) in which the ¼ Nyquist extended focal depth Zv4 and the ½ Nyquist extended focal depth Zv2 overlap each other in the direction of the optical axis (Z direction in FIG. 4Gb). In FIG. 4Gb, position (0) at which the vertical axis (MTF axis) and the horizontal axis (Z axis corresponding to optical axis Z1) cross each other is a position at which the defocus amount is ±0. This position is an image plane base position.

Here, the ¼ Nyquist extended focal depth Zv4 of the imaging lens is an extended focal depth related to depth MTF curve Sh4 at ¼ Nyquist spatial frequency of the imaging lens.

Further, the ½ Nyquist extended focal depth Zv2 of the imaging lens is an extended focal depth related to depth MTF curve Sh2 at ½ Nyquist spatial frequency of the imaging lens.

<Normalized Common Extended Focal Depth>

Normalized common extended focal depth is a normalized value of common extended focal depth Zw by using the value of F-number and the value of the focal length f. The normalized common extended focal depth may be obtained by the following formula:

Normalized Common Extended Focal Depth=$Zw \times (Fa/f^2)$.

<Image Plane Base Position>

Image plane base position Zo is a position at which the contrast of optical image Q formed through the imaging lens 100 is the highest.

More specifically, the diameter of a point image formed, through the imaging lens 100, by a ray coming from all of points (object points) from a near point to a far point on the optical axis of the imaging lens 100 is smallest at the image plane base position Zo. The point image formed at the image plane base position Zo is referred to as a base point image. Further, the diameter of the base point image is referred to as base point image diameter (psfφ).

In other words, the image plane base position Zo is a position, in the direction of the optical axis, at which the value of MTF is highest when a flat plane perpendicular to the optical axis, on which an optical image is formed through the imaging lens 100, is moved in the direction of the optical axis (defocusing). Ordinarily, the image plane base position Zo is set so as to be the same as the position at which the imaging plane 211 is arranged. However, it is not necessary that the image plane base position Zo is the same as the position at which the imaging plane 211 is arranged.

<Base Point Image Diameter (psfφ)>

Base point image diameter (psfφ) is the diameter (mm) of a point image (base point image) formed on a plane that is perpendicular to the optical axis and that passes through the image plane base position. The base point image is formed by rays coming from all positions, on the optical axis, from a predetermined near point through a predetermined far point of the imaging lens through the imaging lens.

More specifically, as illustrated in FIG. 4Gc, an average diameter of a circle defined by an outline connecting most outer positions the light intensity of which is 0.004 times higher than peak intensity Kop in the optical intensity distribution Ko of point image (base point image) To may be base point image diameter (psfφ). The point image (base point image) To is formed on a plane that is perpendicular to the optical axis and that passes through the image plane base position Zo.

The condition "0.004 times" is set, because image data output in bitmap format have 8 bit graduation (256 graduations). Specifically, when the peak intensity Kop of a point image is the intensity of light corresponding to the maximum value of 256 gradation, a position corresponding to the minimum value (the intensity of light that is 1/256 of the peak intensity Kop) of 256 gradation in the light intensity distribution Ko is defined as the most outer position of the point image.

The imaging lens 100 is structured so as to satisfy the following formula (1'):

$$0.015 < Zw \times Fa/f^2 < 0.030 \qquad (1').$$

Examples 4 through 6 and 9 through 16, which will be described later, satisfy the condition. Examples 1 through 3, 7, 8 and 17 through 19 are not included in the present invention (they are not within the scope of the present invention).

As described above, when the imaging lens 100 satisfies the formula (1'), it is possible to extend the depth of field of the imaging lens 100, while deterioration of the image quality of a blur recovery image Gk formed by performing contrast recovery processing on blurred original image Go obtained by the imaging lens 100 is suppressed.

However, when the imaging lens 100 is structured in such a manner that the value of Zw×Fa/f² is lower than the lower limit defined by the formula (1'), even if contrast recovery processing is performed, it is difficult to achieve recovery for both of blurs for ½ Nyquist spatial frequency and blurs for ¼ Nyquist spatial frequency. Further, when the imaging lens 100 is structured in such a manner, a depth extension effect is not expectable, and in some cases, artifacts (spurious resolution) are generated.

In contrast, when the imaging lens 100 is structured in such a manner that the value of Zw×Fa/f² is higher than the higher limit defined by the formula (1'), the depth extension effect increases. However, deterioration in the image quality, which is a demerit, is noticeable.

Next, desirable structure, elements or the like of the present invention, which is not essential to the present invention, will be described.

When the imaging lens 100 is structured so as to satisfy the formula (2'): 0.015<Zv4×Fa/f²<0.035, generation of artifacts is suppressed, and both of high image quality and depth are achieved at the same time. Examples 2 through 19, which will be described later, satisfy the condition. However, Examples 2 through 19 include the aforementioned examples that are not within the scope of the present invention.

When the imaging lens 100 is structured in such a manner that the value of Zv4×Fa/f² is lower than or equal to the lower limit defined by the formula (2'), a depth extension effect becomes lower, and especially, artifacts (spurious resolution) tend to be generated.

In contrast, when the imaging lens 100 is structured in such a manner that the value of Zv4×Fa/f² is higher than or equal to the higher limit defined by the formula (2'), deterioration in the image quality, which is a demerit, is noticeable.

When the imaging lens 100 is structured so as to satisfy the formula (3'): 0.011<Zv2×Fa/f²<0.030, generation of artifacts is suppressed, and both of high image quality and depth are easily achieved at the same time. Examples 3 through 16 and 19, which will be described later, satisfy the condition. However, they include the aforementioned examples that are not within the scope of the present invention.

When the imaging lens 100 is structured in such a manner that the value of $Zv2 \times Fa/f^2$ is lower than or equal to the lower limit defined by the formula (3'), there is a risk of generation of artifacts, and especially, the depth extension effect becomes lower.

In contrast, when the imaging lens 100 is structured in such a manner that the value of $Zv2 \times Fa/f^2$ is higher than or equal to the higher limit defined by the formula (3'), deterioration in the image quality, which is a demerit, is noticeable.

When the imaging lens 100 is structured so as to satisfy the formula (4'): $Pi \times 7 \leq psf\phi \leq Pi \times 30$, generation of artifacts is suppressed, and both of a high image quality and the depth are easily achieved at the same time. Examples 2 through 17 and 19, which will be described later, satisfy the condition. However, Examples 2 through 17 and 19 include the aforementioned examples that are not within the scope of the present invention.

When the imaging lens 100 is structured in such a manner that the value of $psf\phi$ is lower than the lower limit defined by the formula (4'), the depth extension effect becomes lower.

In contrast, when the imaging lens 100 is structured in such a manner that the value of $psf\phi$ is higher than the higher limit defined by the formula (4'), deterioration in the image quality, which is a demerit, is noticeable.

Further, it is desirable that the imaging lens 100 includes a first lens group composed of at least one lens, and which has positive power, and a second lens group composed of at least one lens, and that the first lens group and the second lens group are sequentially arranged from the object side of the imaging lens 100. In the imaging lens 100, it is desirable that the most-image-side lens of the second lens group has negative power on the optical axis thereof, and includes a region in which negative power becomes weaker from an optical-axis-side of the region toward a peripheral side thereof.

Examples 1 through 19, which will be described later, satisfy the condition. However, Examples 1 through 19 include the aforementioned examples that are not within the scope of the present invention.

Further, in the imaging lens 100, it is desirable that a first lens having positive power, a second lens having negative power, a third lens having positive power, and a fourth lens having negative power are sequentially arranged from the object side of the imaging lens.

Examples 1 through 19, which will be described later, satisfy the condition. However, Examples 1 through 19 include the aforementioned examples that are not within the scope of the present invention.

Further, an image-plane-side surface of the fourth lens may be aspheric, and have an inflection point.

Examples 1 through 19, which will be described later, satisfy the condition. However, Examples 1 through 19 include the aforementioned examples that are not within the scope of the present invention.

Alternatively, an image-plane-side surface of the fourth lens may be aspheric, and have an extreme point in a region other than the center of the optical axis.

Examples 1 through 19, which will be described later, satisfy the condition. However, Examples 1 through 19 include the aforementioned examples that are not within the scope of the present invention.

So far, the second embodiment of the present invention has been described.

Specific Examples Related to First and Second Embodiments

Next, with reference to FIGS. 5A-5N through FIGS. 23A-23N, and FIG. 24, and Tables 1A, 1B through Tables 19A, 19B, and Tables 20A, 20B, imaging lenses of Examples 1 through 19 will be described.

Tables 1A through 20B are presented together at the end of the specification.

The imaging lens of Example 1 is constituted of an image formation optical system which is designed to reduce aberrations as much as possible. The imaging lens of Example 1 forms an optical image without blurs on an imaging plane.

Imaging lenses of Examples 2 through 19 form blurred optical images to extend the depth of field. These lenses are used to obtain blur recovery images by performing contrast recovery processing on original images obtained by imaging blurred optical images. The contrast recovery processing increases the contrast of the original images for a wide range of photography.

The imaging lenses of Examples 2 through 18 satisfy the conditions of the imaging lens according to the first embodiment of the present invention. However, the imaging lenses of Examples 1 and 19 do not satisfy the conditions of the imaging lens according to the first embodiment of the present invention.

Similarly, the imaging lenses of Examples 4 through 6 and 9 through 16 satisfy the conditions of the imaging lens according to the second embodiment of the present invention. However, the imaging lenses of Examples 1 through 3, 7, 8, and 17 through 19 do not satisfy the conditions of the imaging lens according to the second embodiment of the present invention.

The imaging lenses of Examples 2 through 19 are based on the imaging lens of Example 1.

Figure 5A:
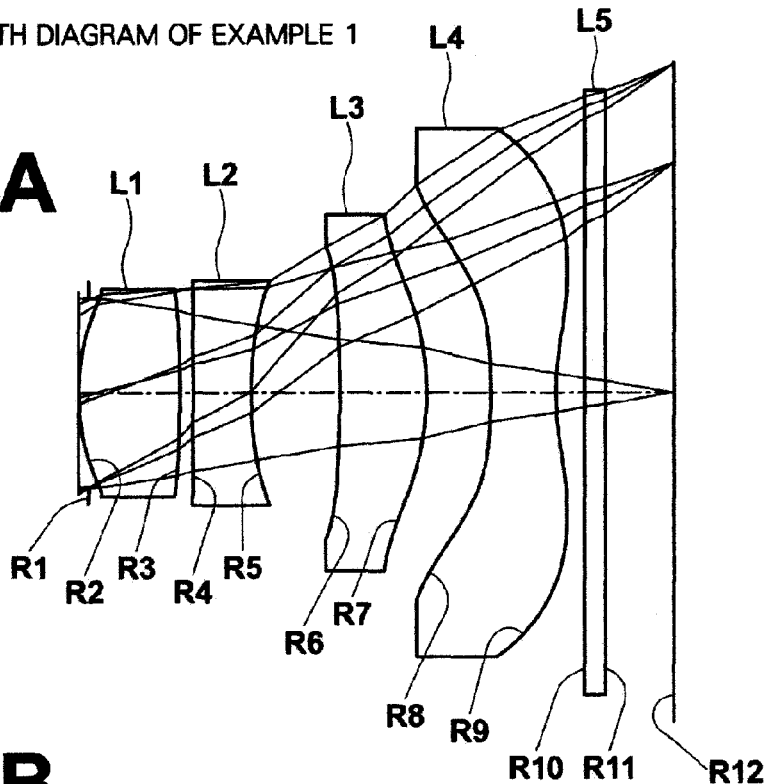
FIG. 5A is a diagram illustrating the structure of an imaging lens of Example 1.
Figure 5B:
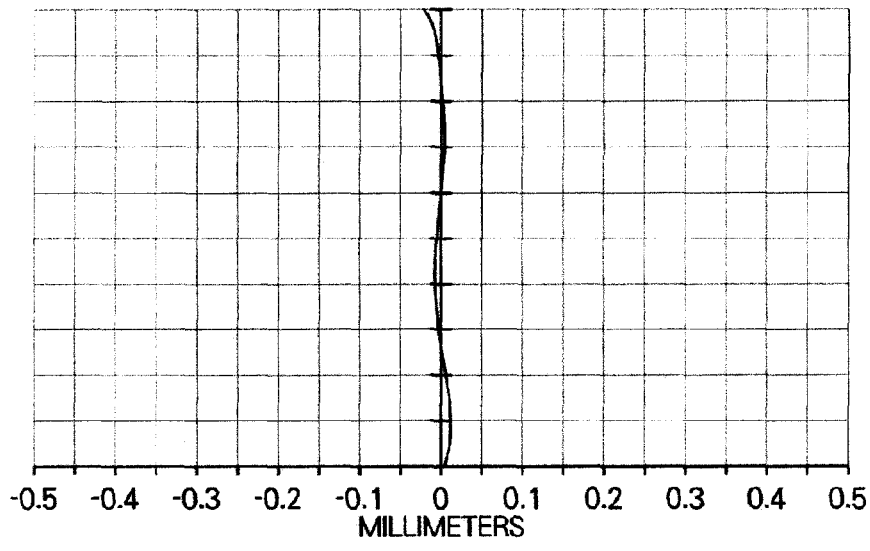
FIG. 5B is a diagram illustrating the spherical aberration of the imaging lens of Example 1.
Figure 5E:
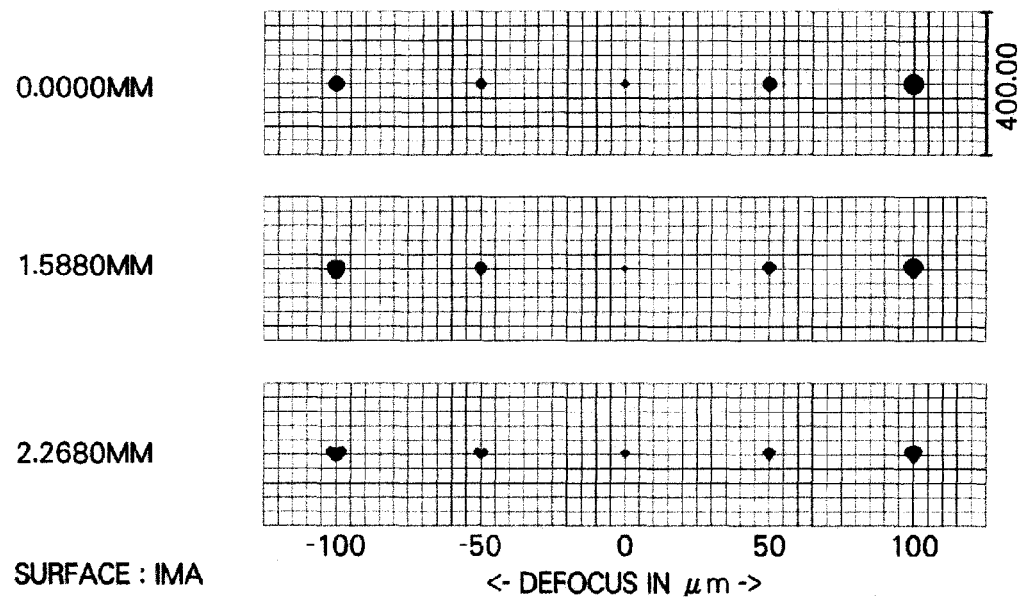
FIG. 5E is a spot diagram of the imaging lens of Example 1.
Figure 5F:
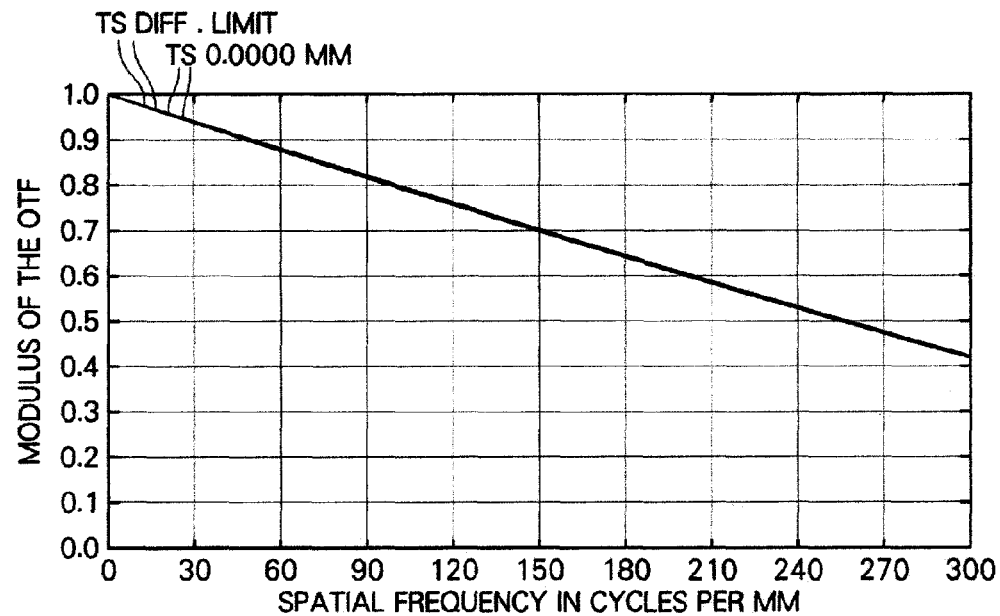
FIG. 5F is a diagram illustrating spatial frequency MTF (incident height=0) of the imaging lens of Example 1.
Figure 5G:
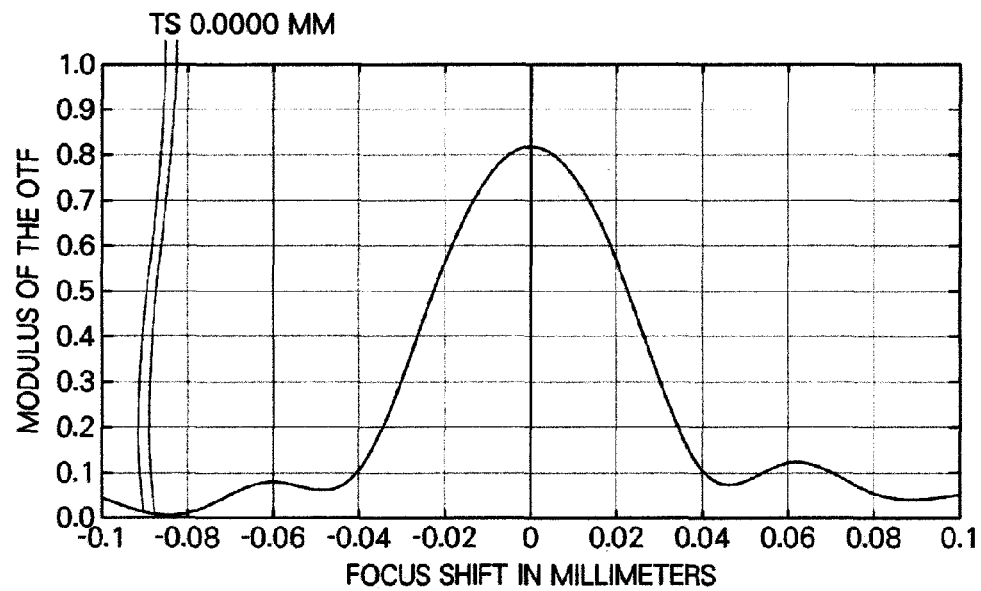
FIG. 5G is a diagram illustrating depth MTF (90 line/mm, incident height=0) of the imaging lens of Example 1.
Figure 5H:
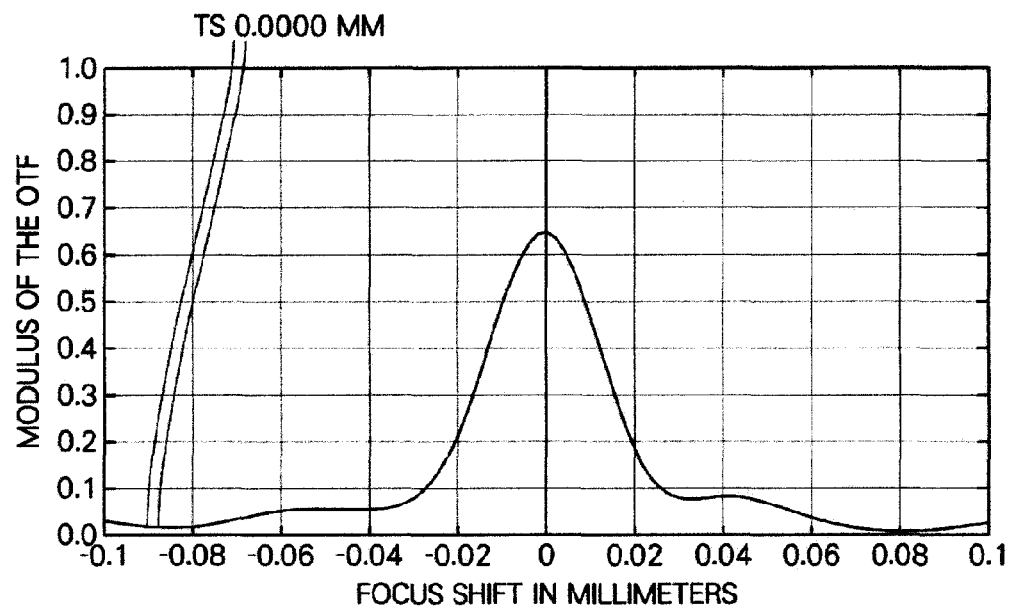
FIG. 5H is a diagram illustrating depth MTF (179 line/mm, incident height=0) of the imaging lens of Example 1.
Figure 51:
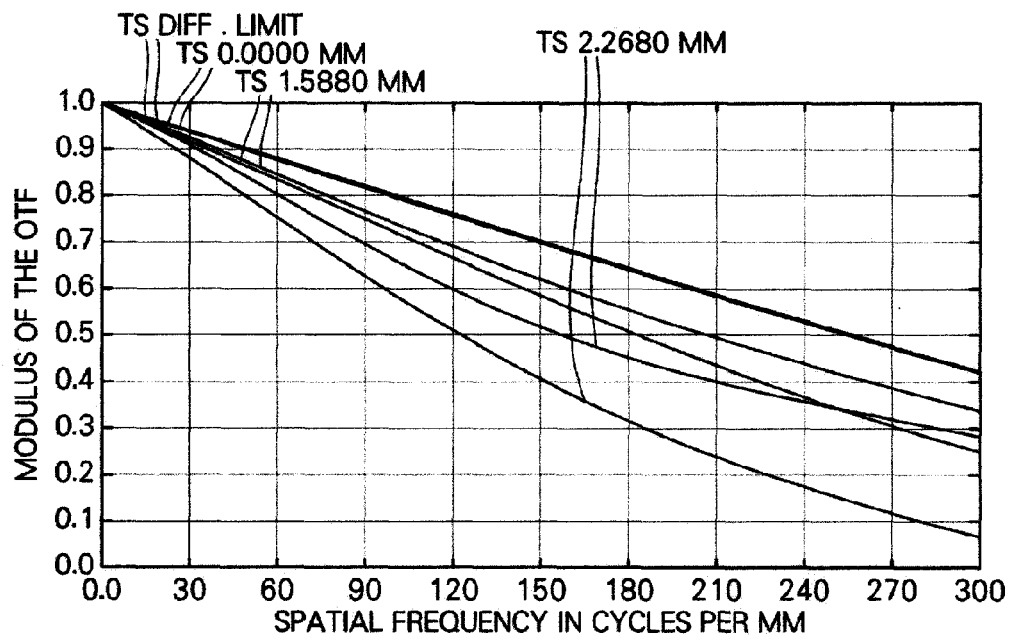
Figure 5J:
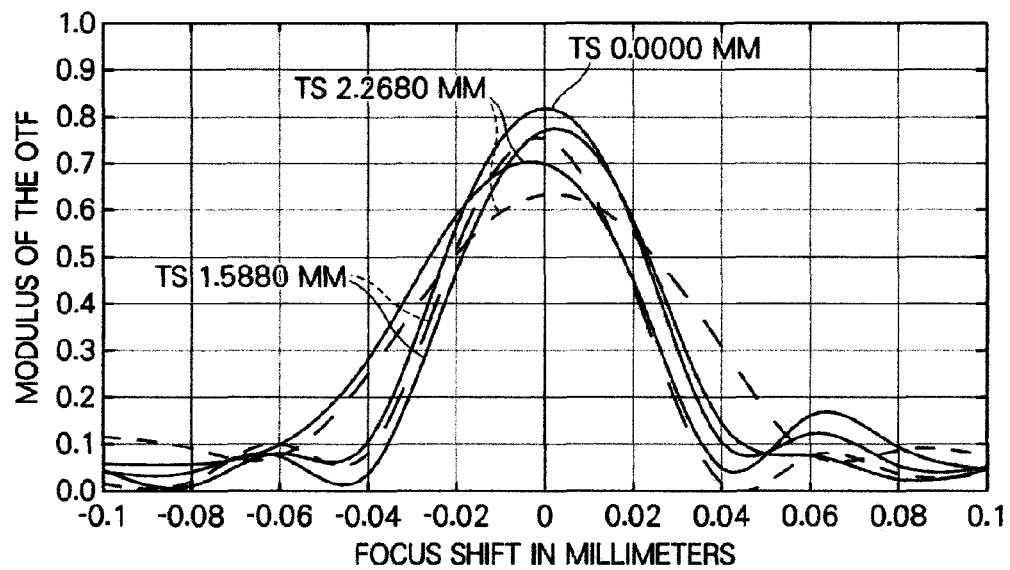
FIG. 5J is a diagram illustrating depth MTF (90 line/mm, plural incident heights) of the imaging lens of Example 1.
Figure 5K:
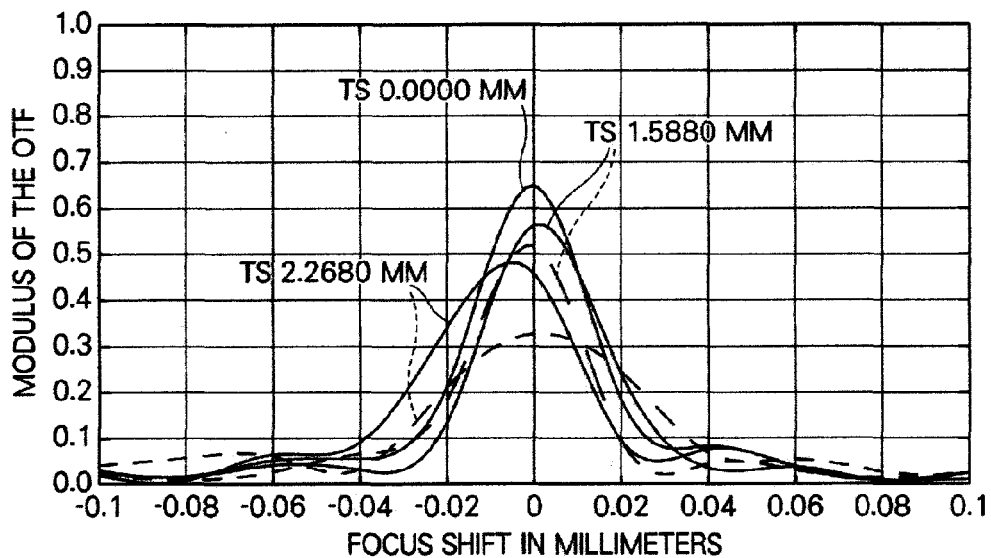
FIG. 5K is a diagram illustrating depth MTF (179 line/mm, plural incident heights) of the imaging lens of Example 1.
Figure 5N:
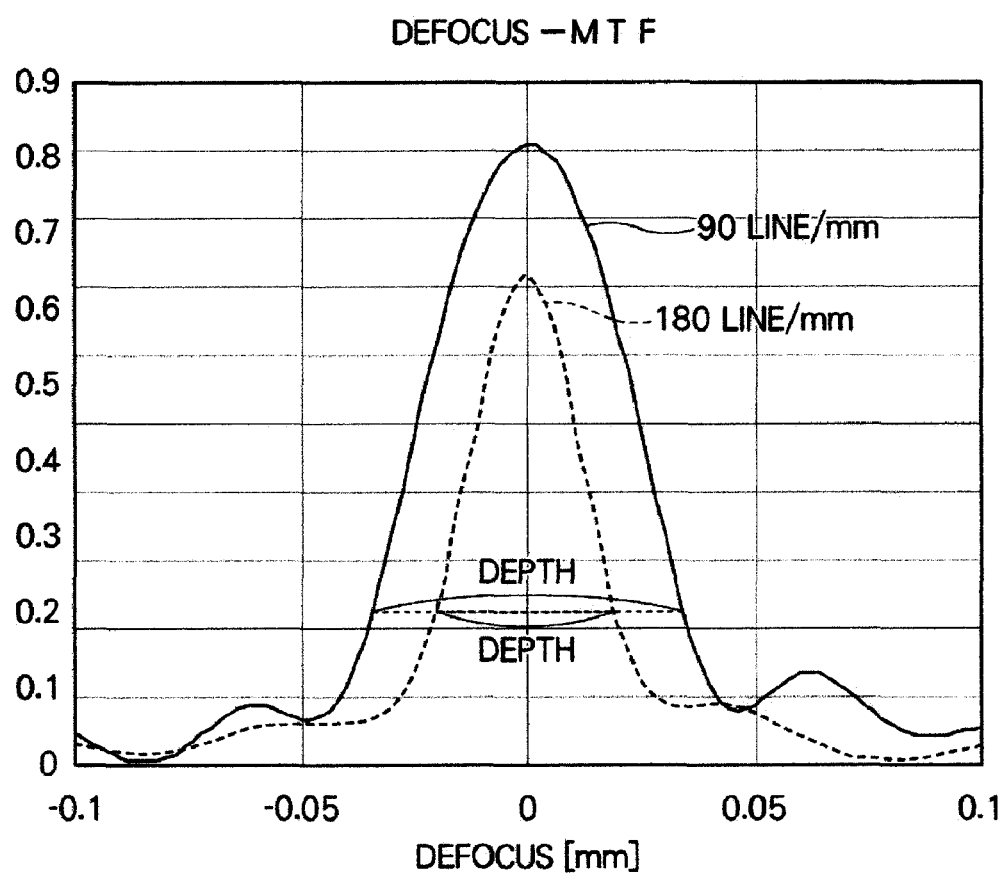
FIG. 5N is a diagram illustrating an extended focal depth in a depth MTF curve showing depth MTF of the imaging lens of Example 1.

FIGS. 5A through 5N and Tables 1A, 1B show data related to the imaging lens of Example 1.

Figure 6A:
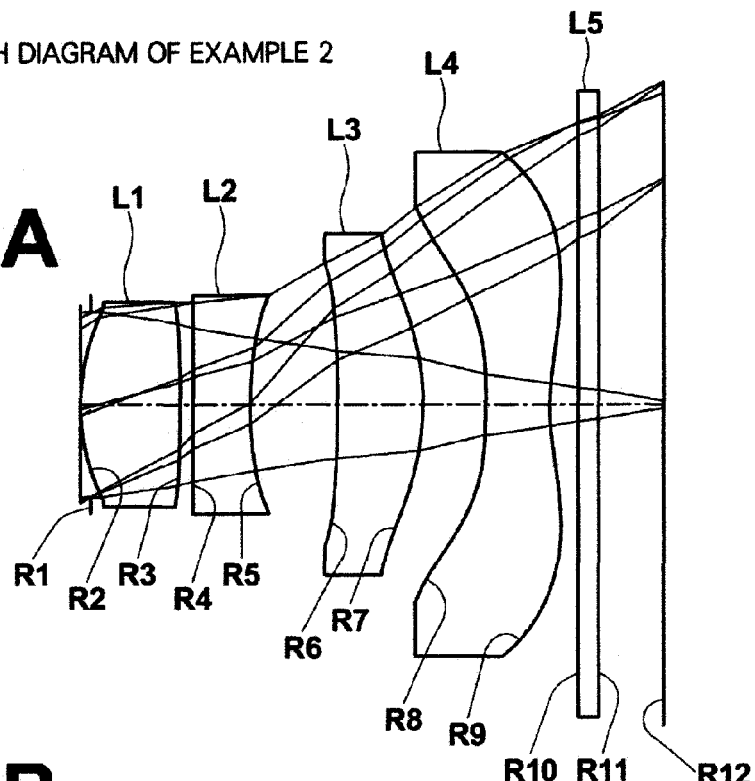
FIG. 6A is a diagram illustrating the structure of an imaging lens of Example 2.
Figure 6B:
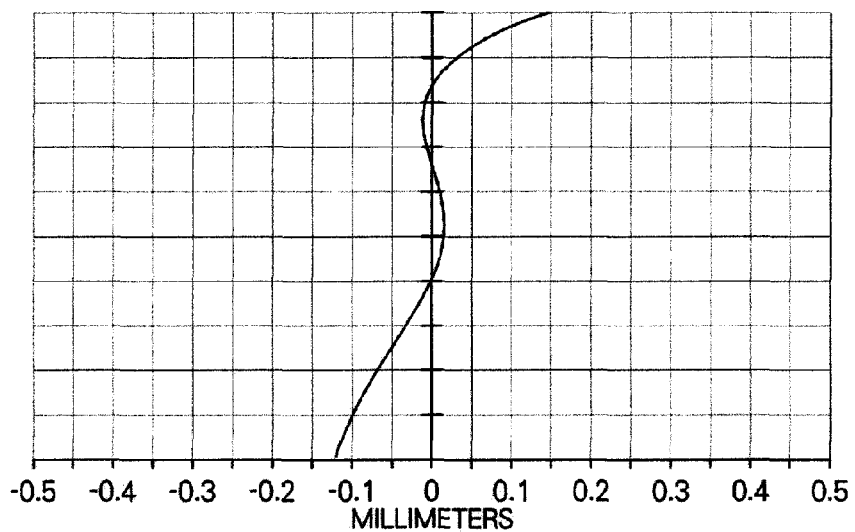
FIG. 6B is a diagram illustrating the spherical aberration of the imaging lens of Example 2.
Figure 6C:
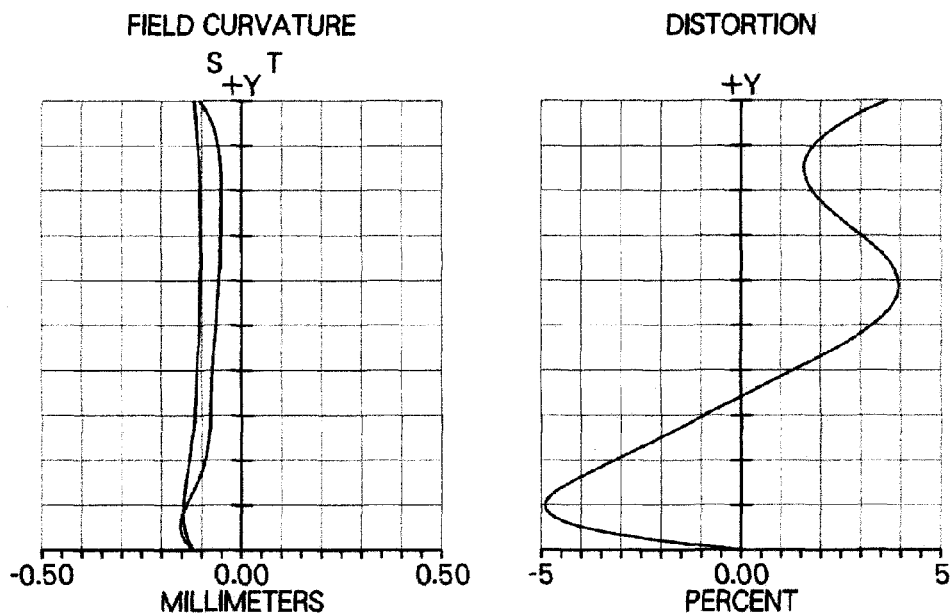
FIG. 6C is a diagram illustrating the astigmatism and distortion of the imaging lens of Example 2.
Figure 6D:
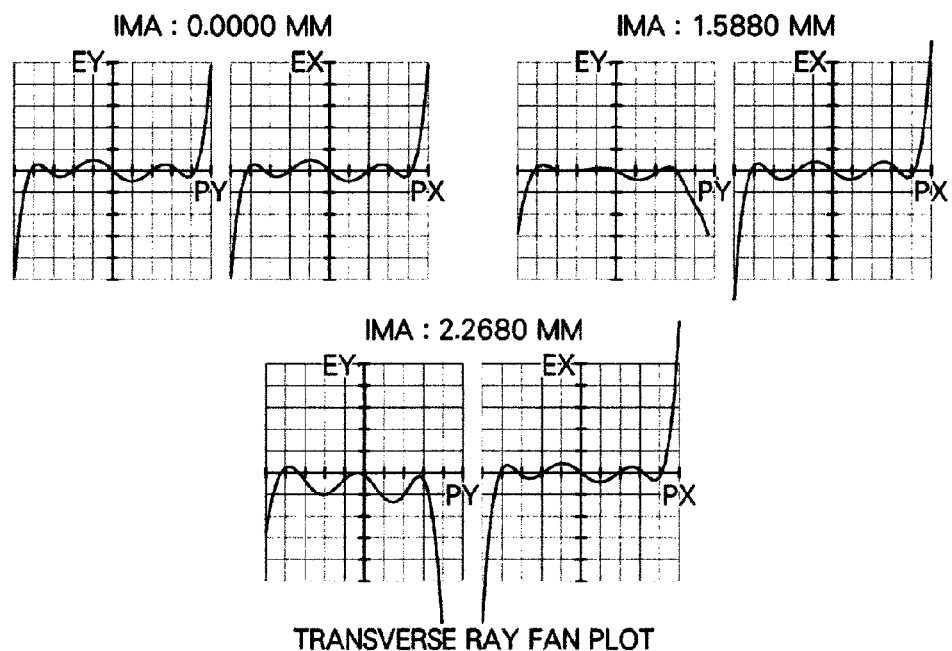
FIG. 6D is a diagram illustrating the coma aberrations of the imaging lens of Example 2.
Figure 6E:
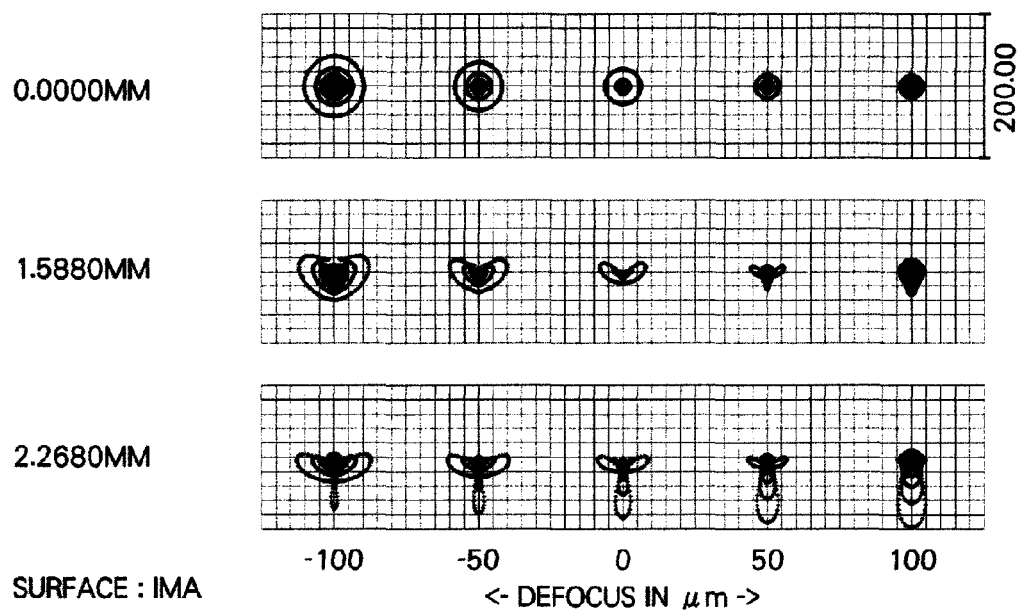
FIG. 6E is a spot diagram of the imaging lens of Example 2.
Figure 6F:
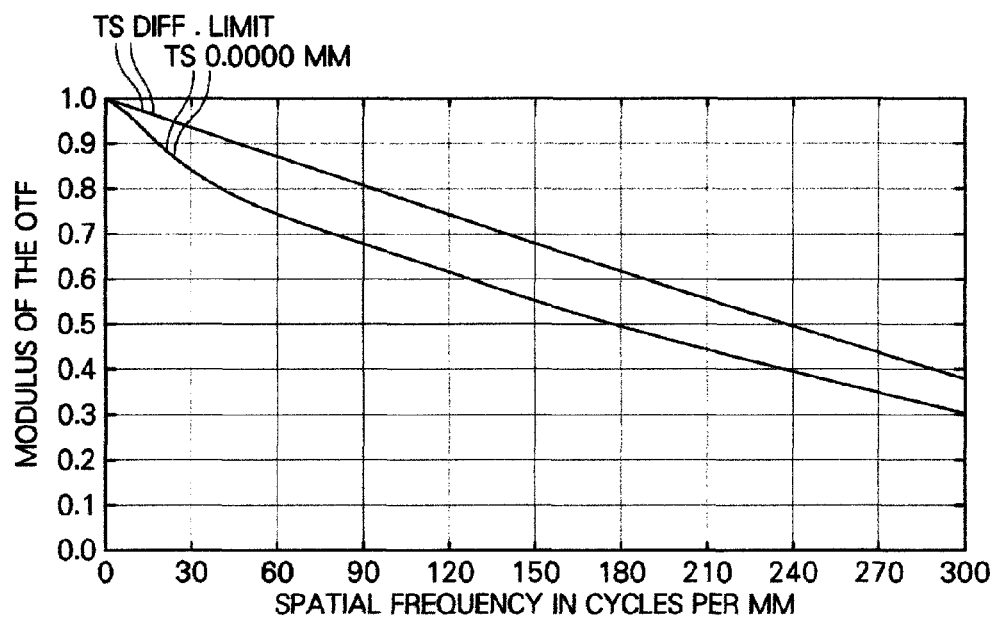
FIG. 6F is a diagram illustrating spatial frequency MTF (incident height=0) of the imaging lens of Example 2.
Figure 6G:
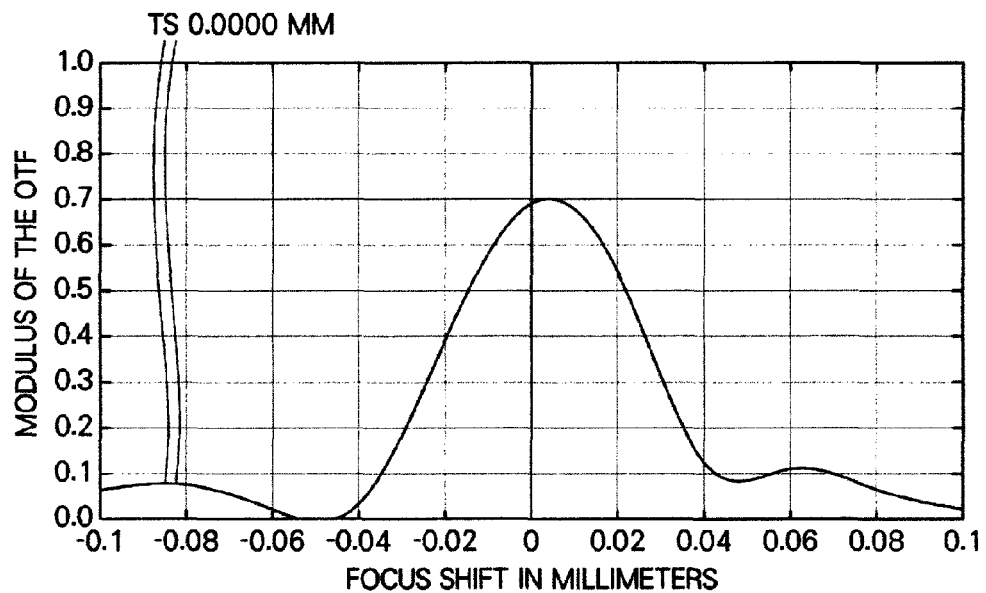
FIG. 6G is a diagram illustrating depth MTF (90 line/mm, incident height=0) of the imaging lens of Example 2.
Figure 6H:
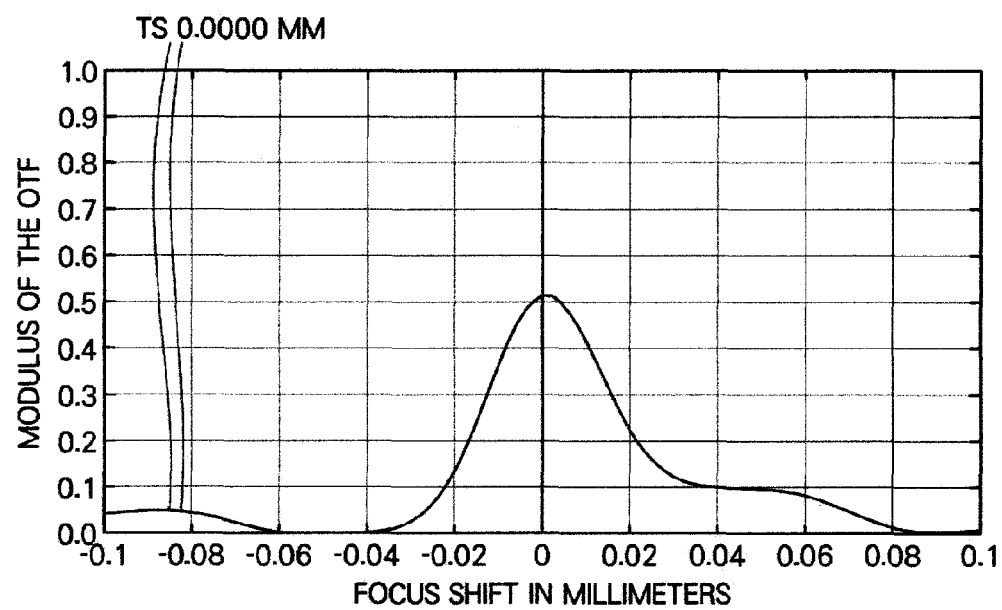
FIG. 6H is a diagram illustrating depth MTF (179 line/mm, incident height=0) of the imaging lens of Example 2.
Figure 6I:
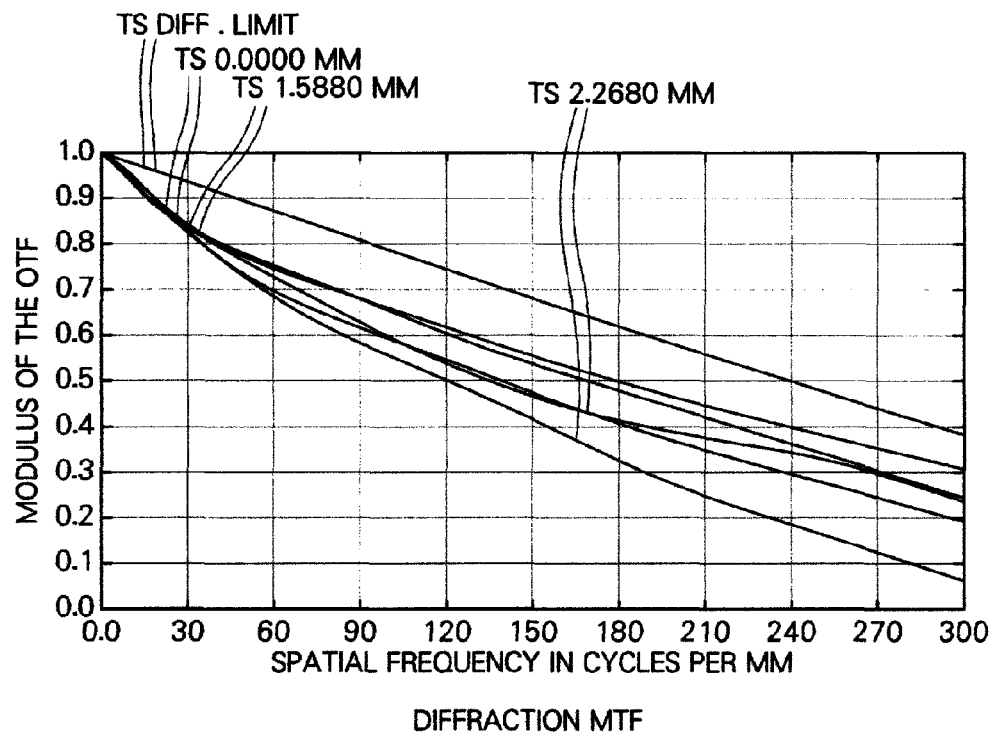
FIG. 6I is a diagram illustrating spatial frequency MTF (plural incident heights) of the imaging lens of Example 2.
Figure 6J:
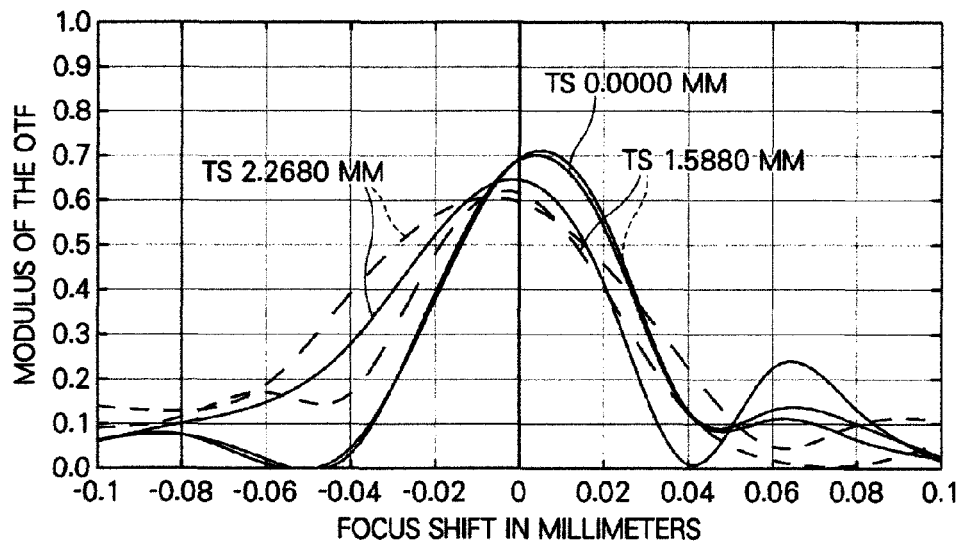
FIG. 6J is a diagram illustrating depth MTF (90 line/mm, plural incident heights) of the imaging lens of Example 2.
Figure 6K:
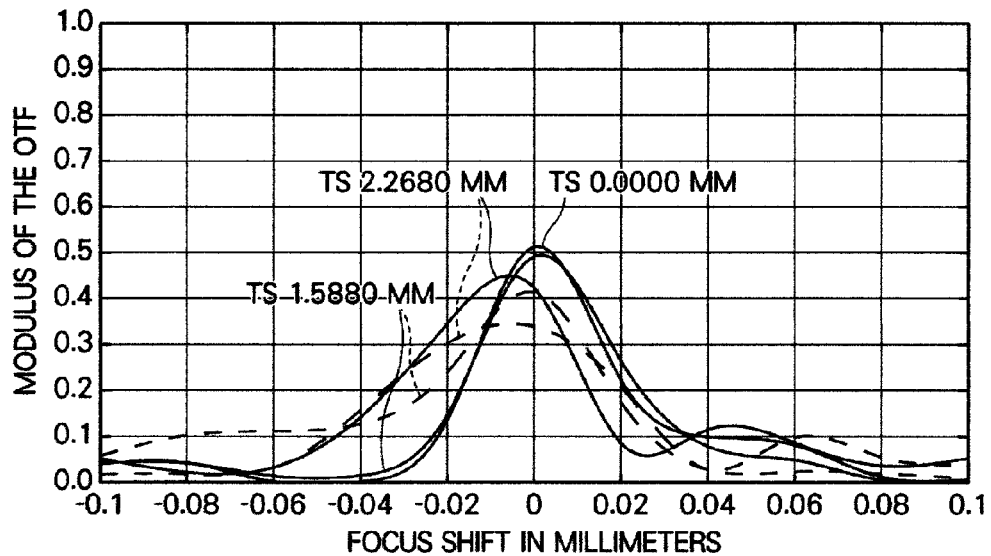
FIG. 6K is a diagram illustrating depth MTF (179 line/mm, plural incident heights) of the imaging lens of Example 2.
Figure 6N:
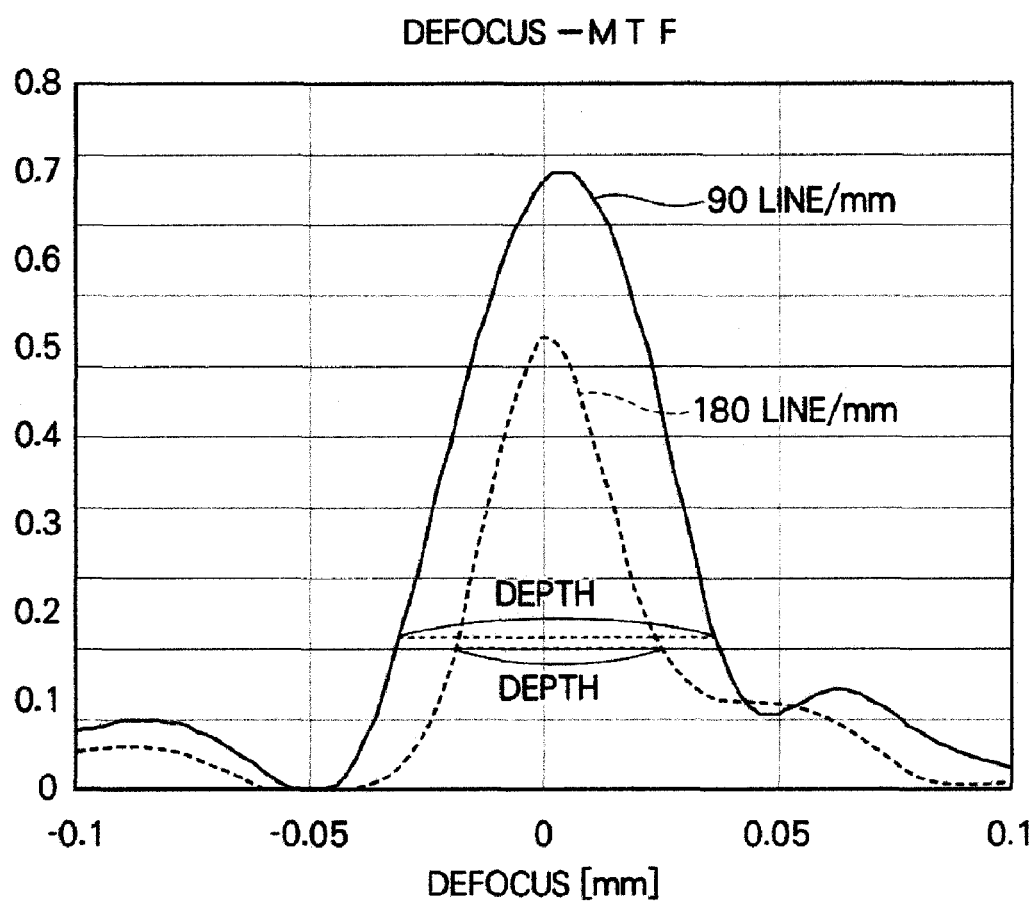
FIG. 6N is a diagram illustrating an extended focal depth in a depth MTF curve showing depth MTF of the imaging lens of Example 2.

FIGS. 6A through 6N and Tables 2A, 2B show data related to the imaging lens of Example 2.

Figure 7A:
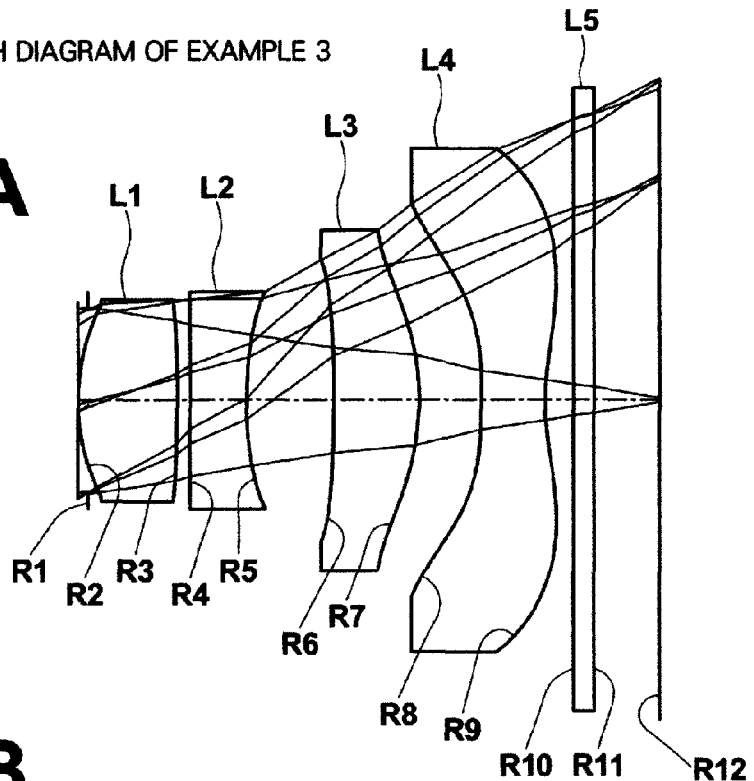
FIG. 7A is a diagram illustrating the structure of an imaging lens of Example 3.
Figure 7B:
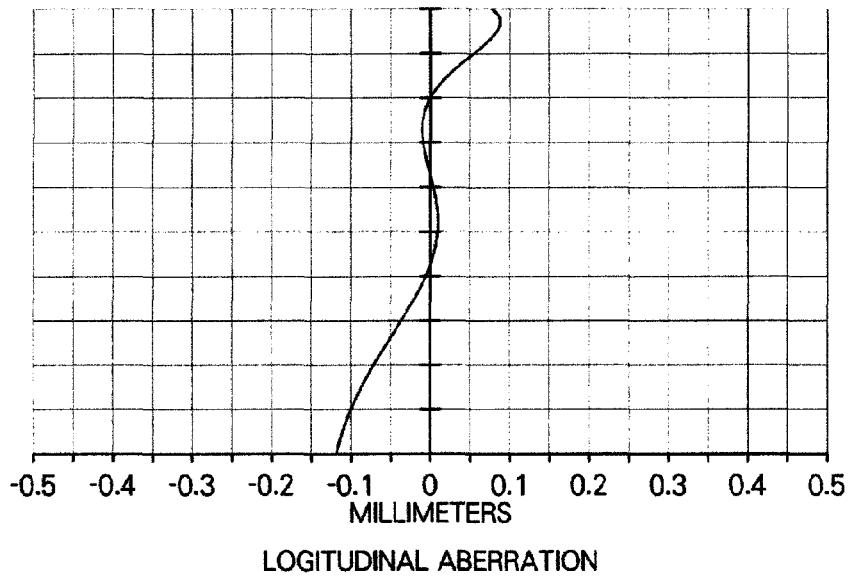
FIG. 7B is a diagram illustrating the spherical aberration of the imaging lens of Example 3.
Figure 7C:
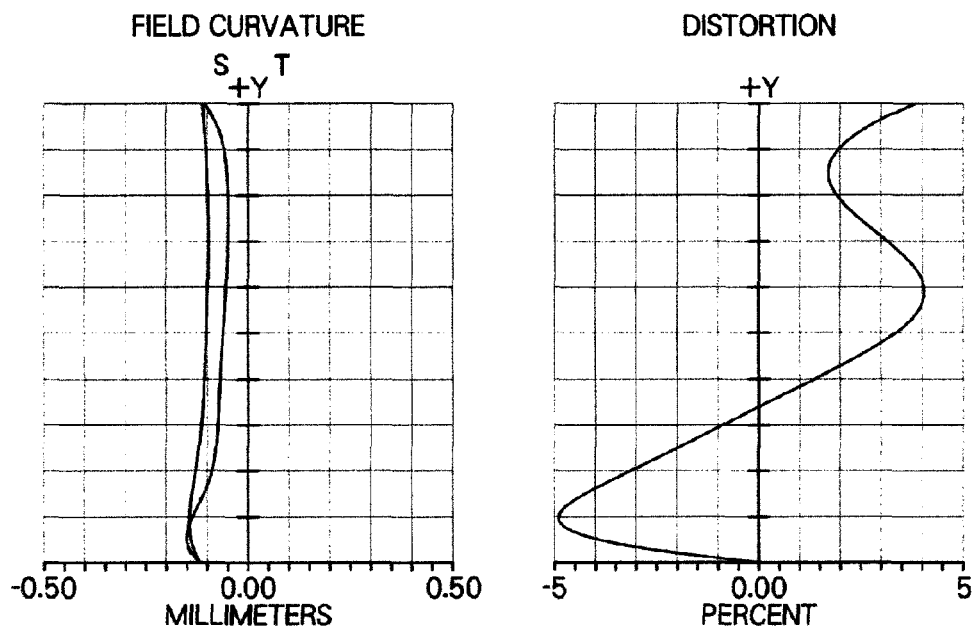
FIG. 7C is a diagram illustrating the astigmatism and distortion of the imaging lens of Example 3.
Figure 7D:
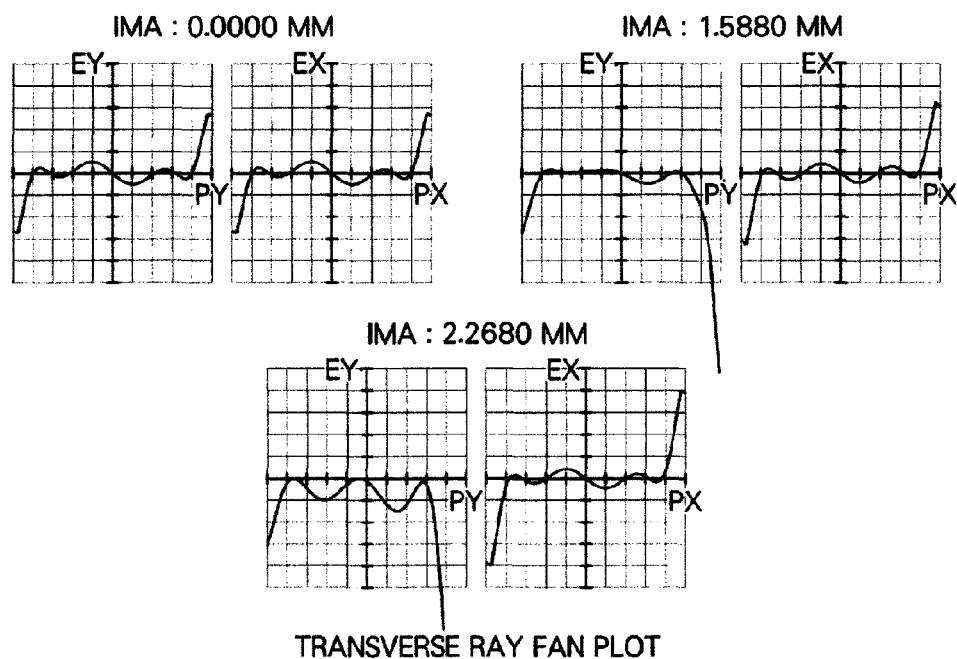
FIG. 7D is a diagram illustrating the coma aberrations of the imaging lens of Example 3.
Figure 7E:
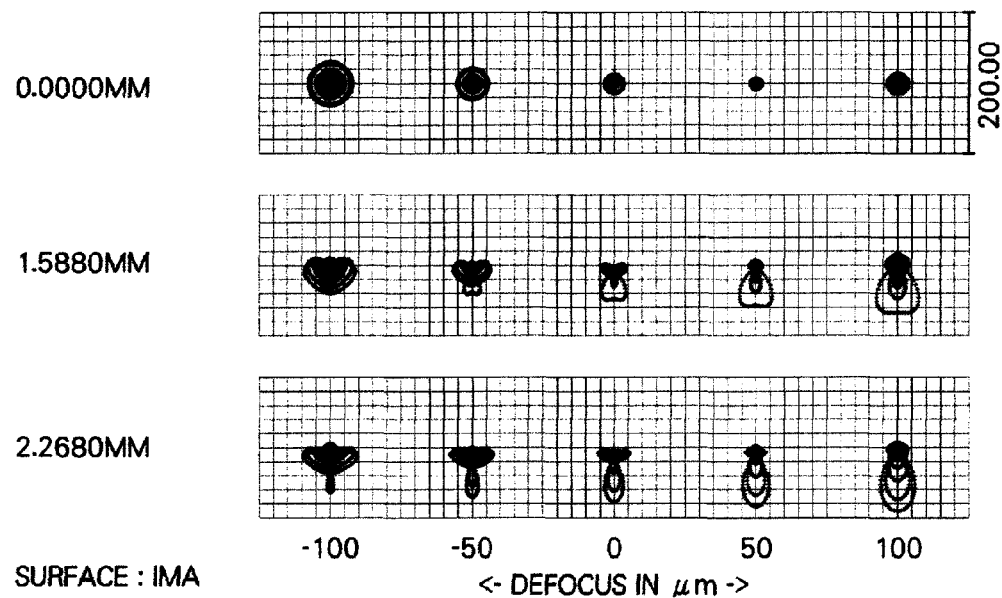
FIG. 7E is a spot diagram of the imaging lens of Example 3.
Figure 7F:
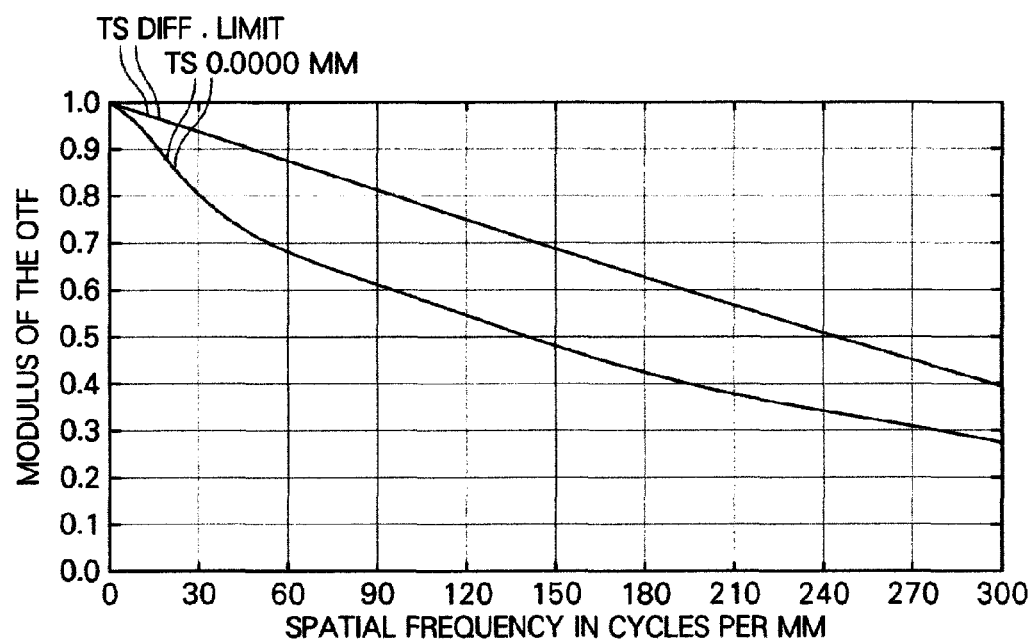
FIG. 7F is a diagram illustrating spatial frequency MTF (incident height=0) of the imaging lens of Example 3.
Figure 7G:
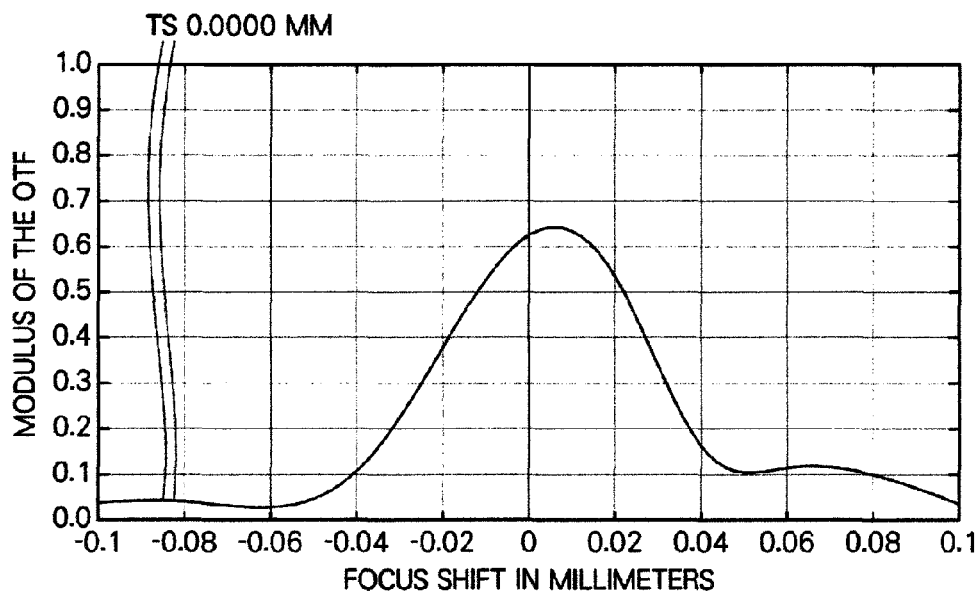
FIG. 7G is a diagram illustrating depth MTF (90 line/mm, incident height=0) of the imaging lens of Example 3.
Figure 7H:
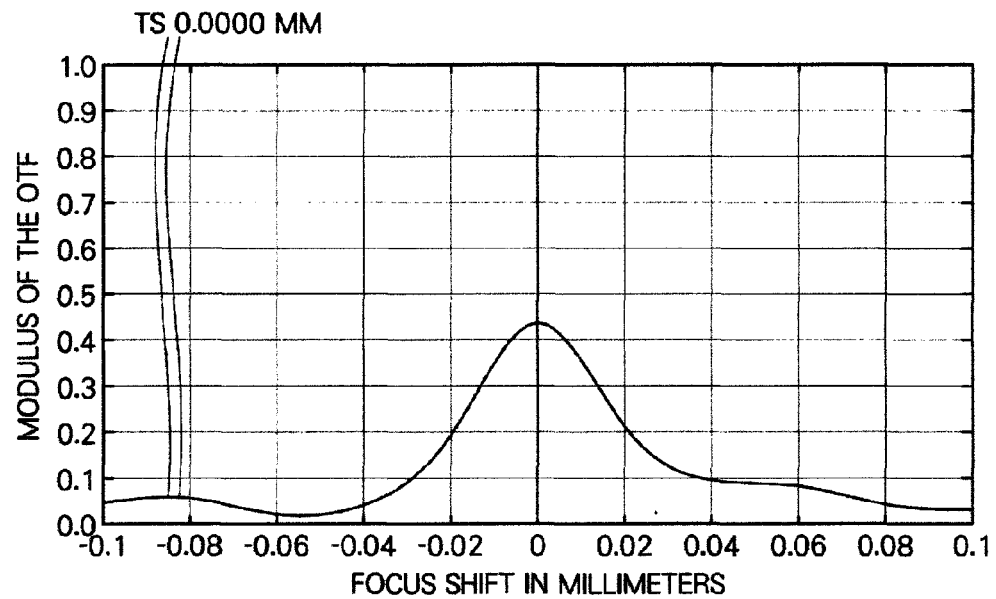
FIG. 7H is a diagram illustrating depth MTF (179 line/mm, incident height=0) of the imaging lens of Example 3.
Figure 7I:
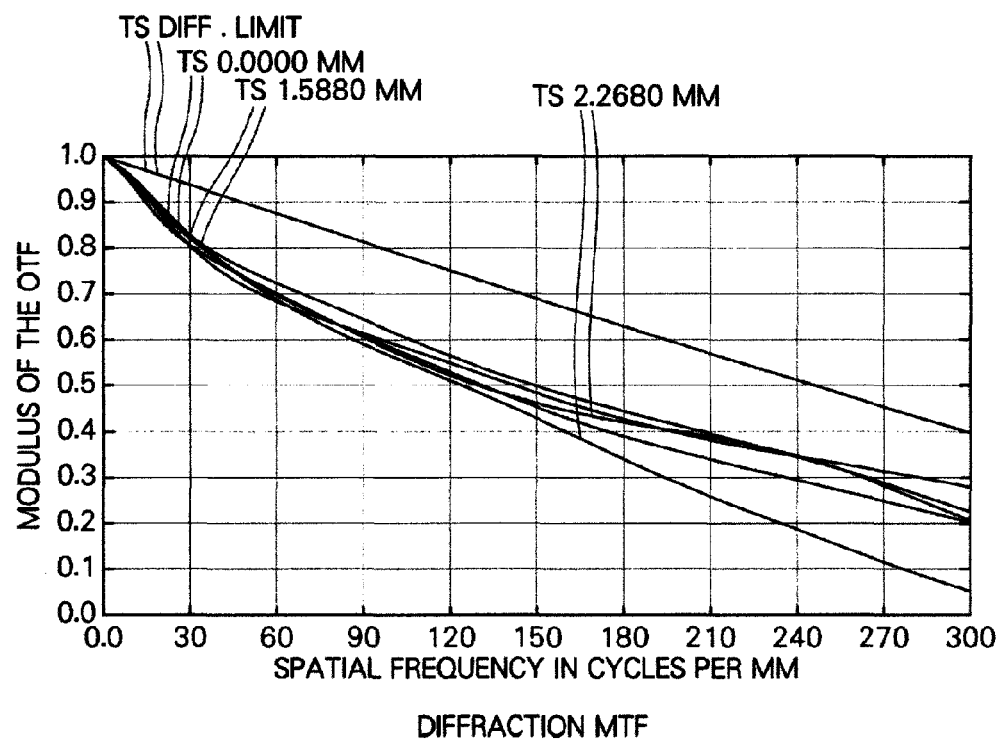
FIG. 7I is a diagram illustrating spatial frequency MTF (plural incident heights) of the imaging lens of Example 3.
Figure 7J:
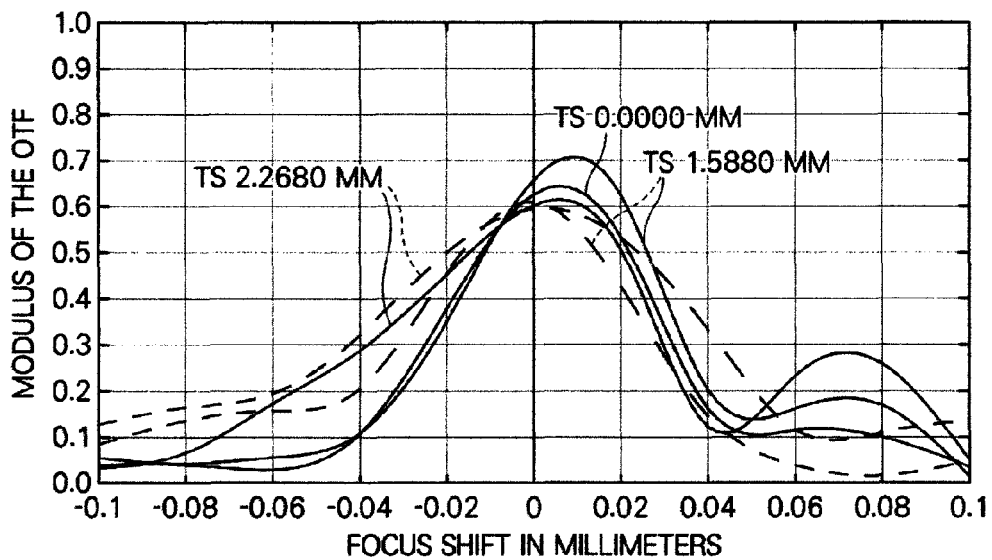
FIG. 7J is a diagram illustrating depth MTF (90 line/mm, plural incident heights) of the imaging lens of Example 3.
Figure 7K:
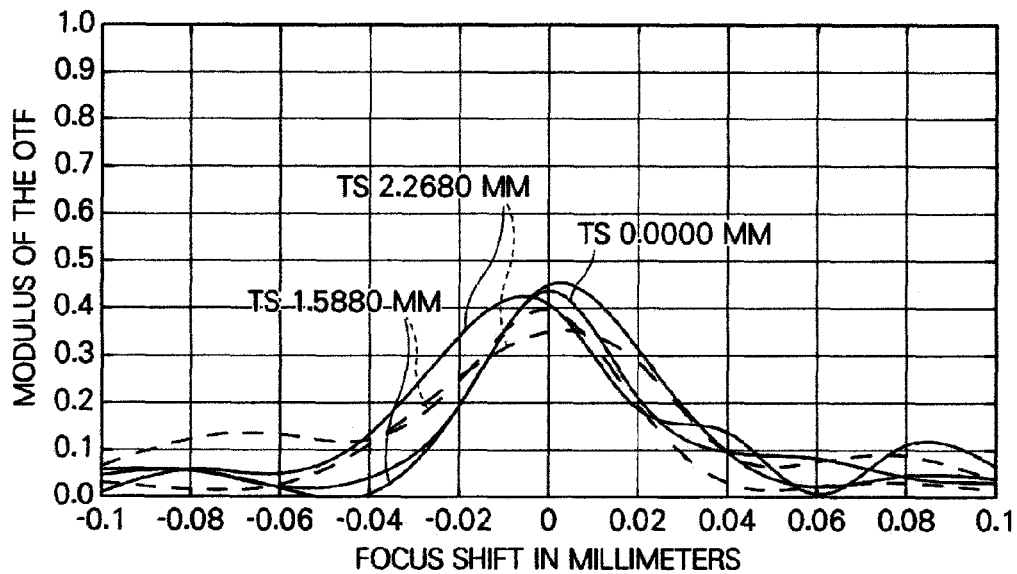
FIG. 7K is a diagram illustrating depth MTF (179 line/mm, plural incident heights) of the imaging lens of Example 3.
Figure 7N:
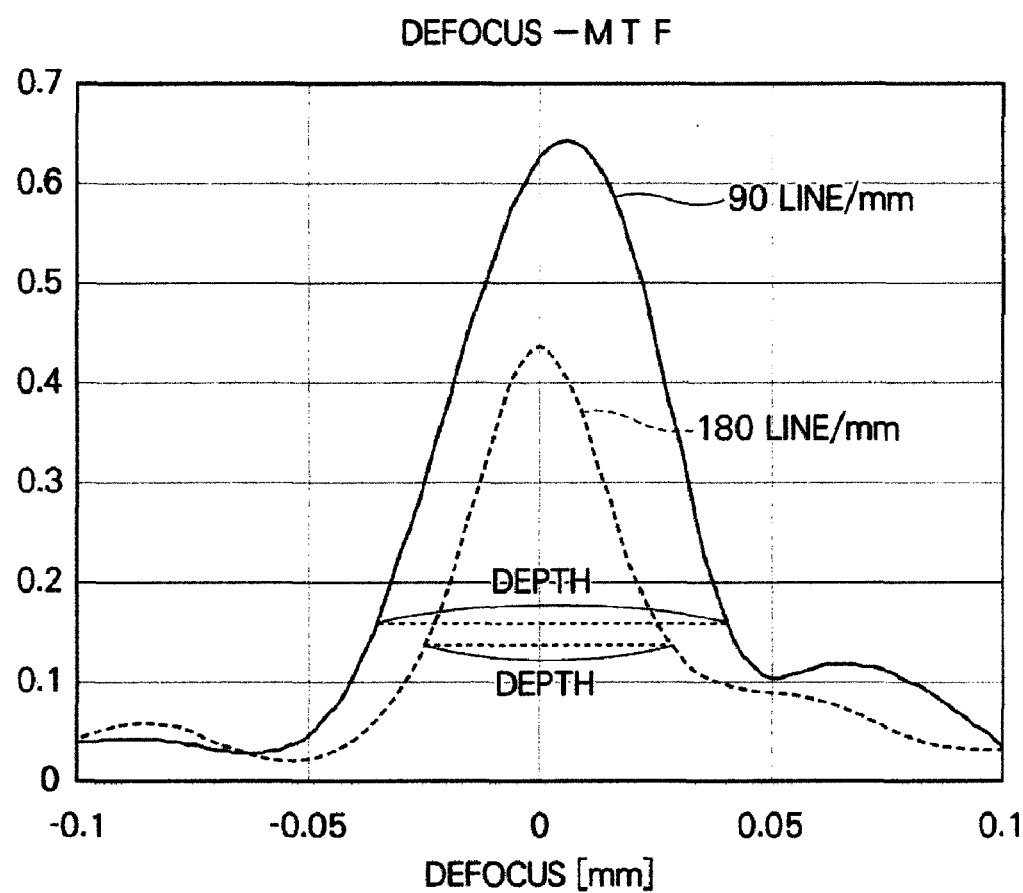
FIG. 7N is a diagram illustrating an extended focal depth in a depth MTF curve showing depth MTF of the imaging lens of Example 3.

FIGS. 7A through 7N and Tables 3A, 3B show data related to the imaging lens of Example 3.

Figure 8A:
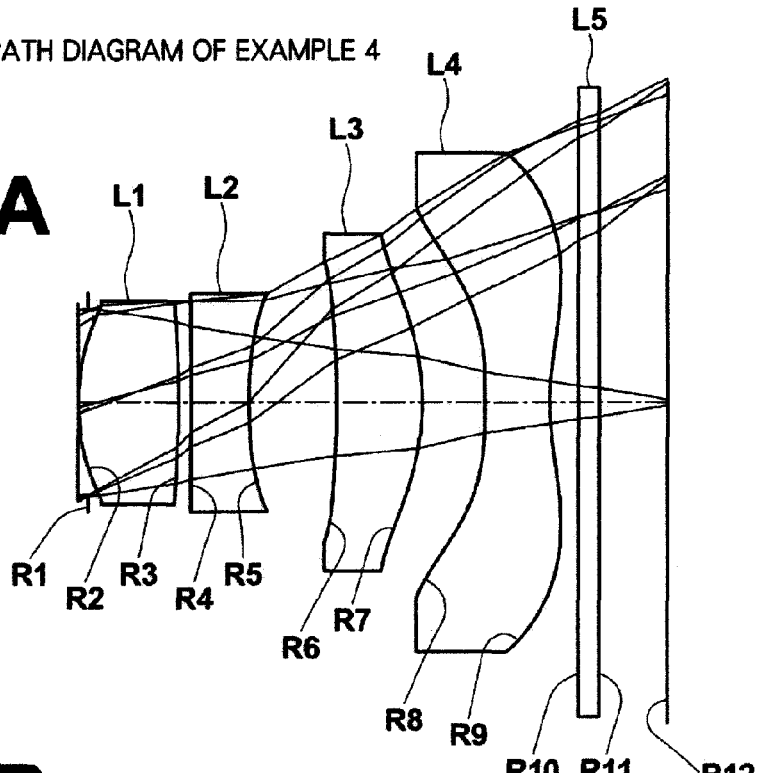
FIG. 8A is a diagram illustrating the structure of an imaging lens of Example 4.
Figure 8B:
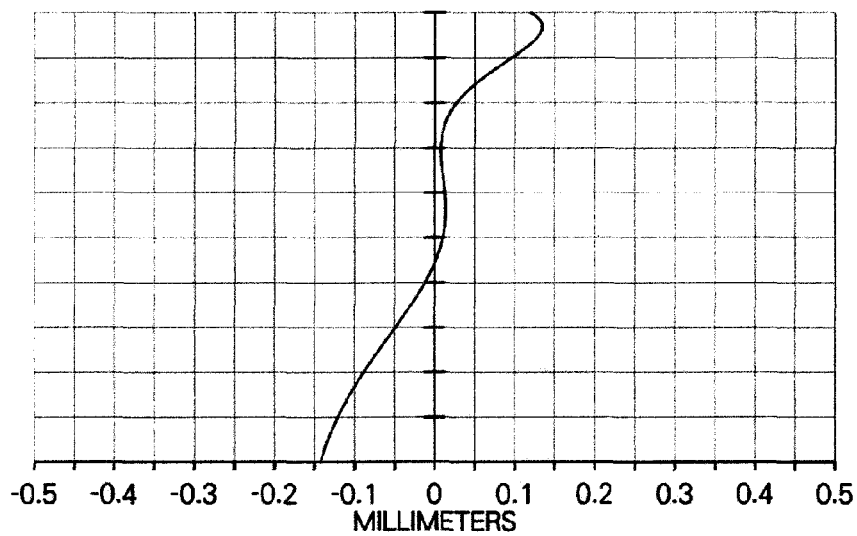
FIG. 8B is a diagram illustrating the spherical aberration of the imaging lens of Example 4.
Figure 8C:
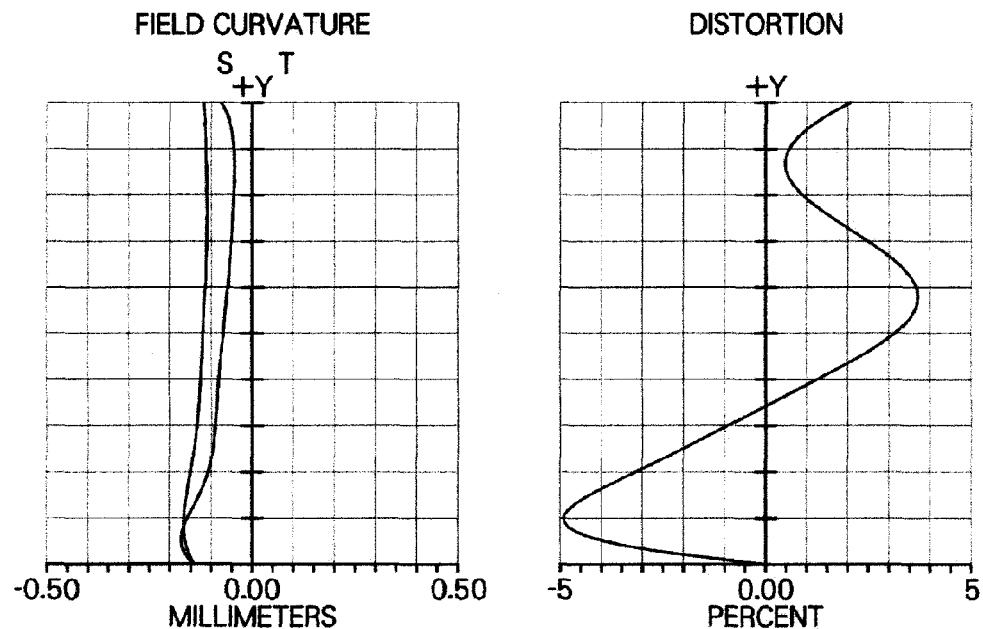
FIG. 8C is a diagram illustrating the astigmatism and distortion of the imaging lens of Example 4.
Figure 8D:
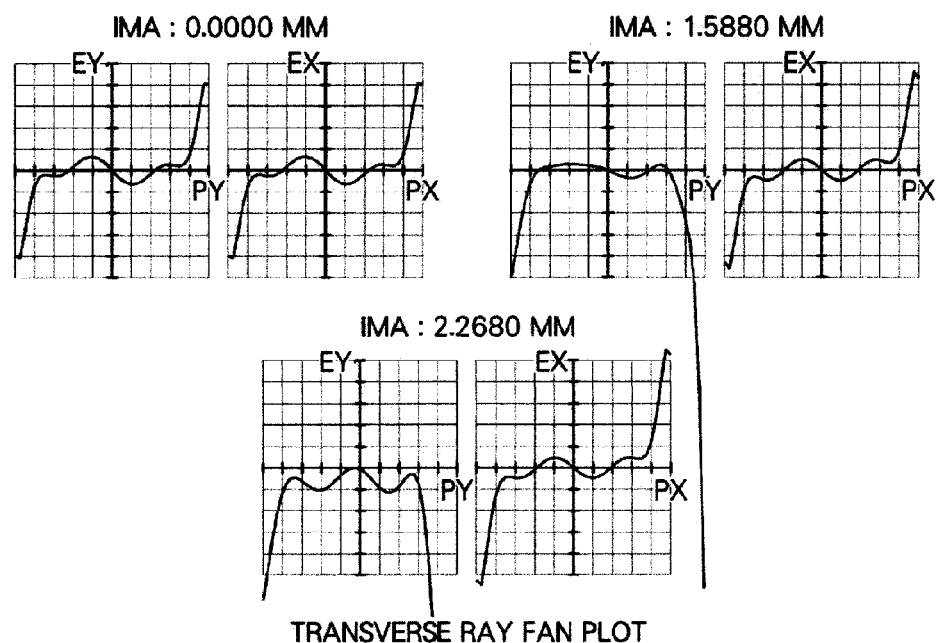
FIG. 8D is a diagram illustrating the coma aberrations of the imaging lens of Example 4.
Figure 8E:
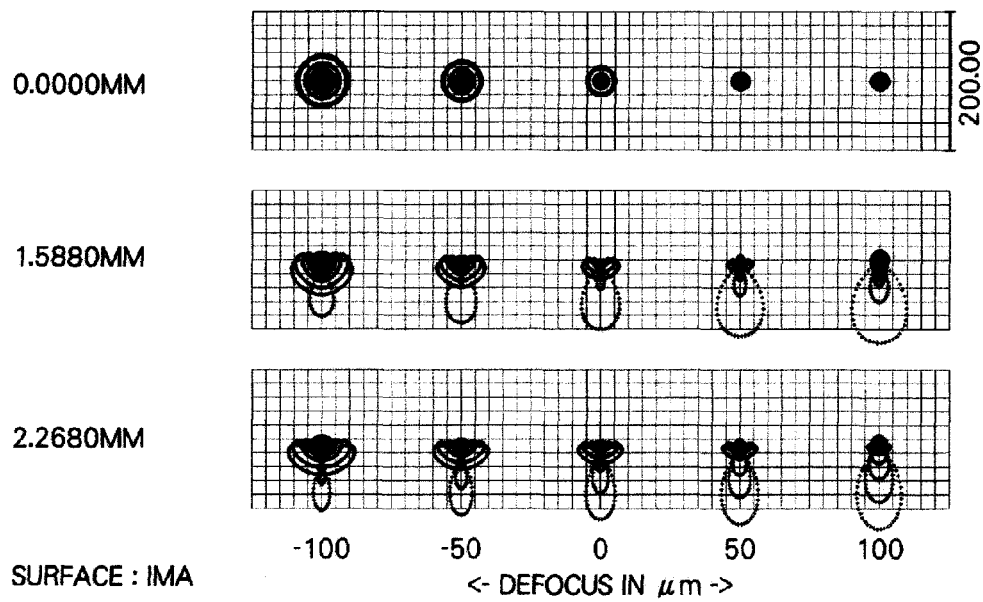
FIG. 8E is a spot diagram of the imaging lens of Example 4.
Figure 8F:
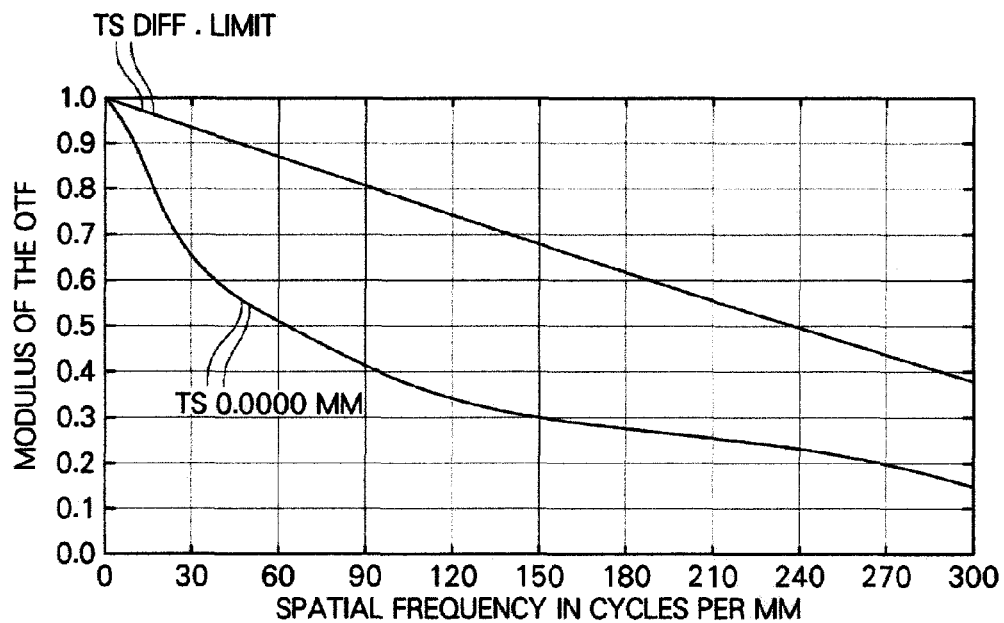
FIG. 8F is a diagram illustrating spatial frequency MTF (incident height=0) of the imaging lens of Example 4.
Figure 8G:
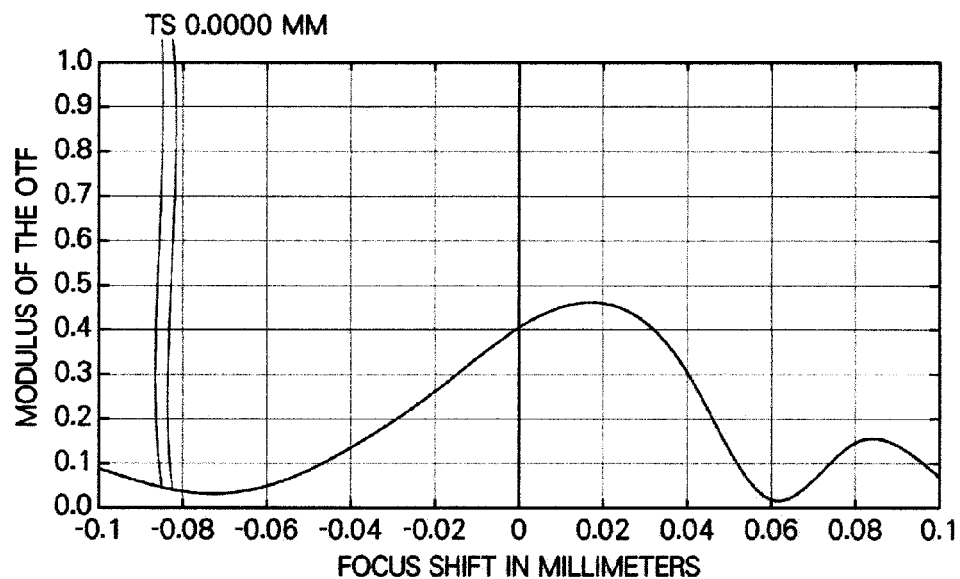
FIG. 8G is a diagram illustrating depth MTF (90 line/mm, incident height=0) of the imaging lens of Example 4.
Figure 8H:
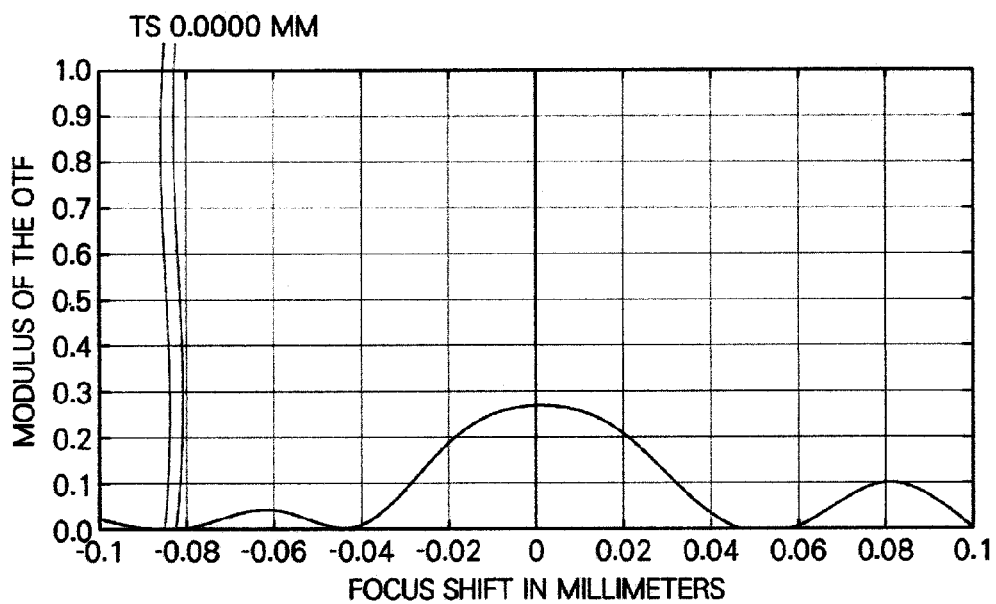
FIG. 8H is a diagram illustrating depth MTF (179 line/mm, incident height=0) of the imaging lens of Example 4.
Figure 8I:
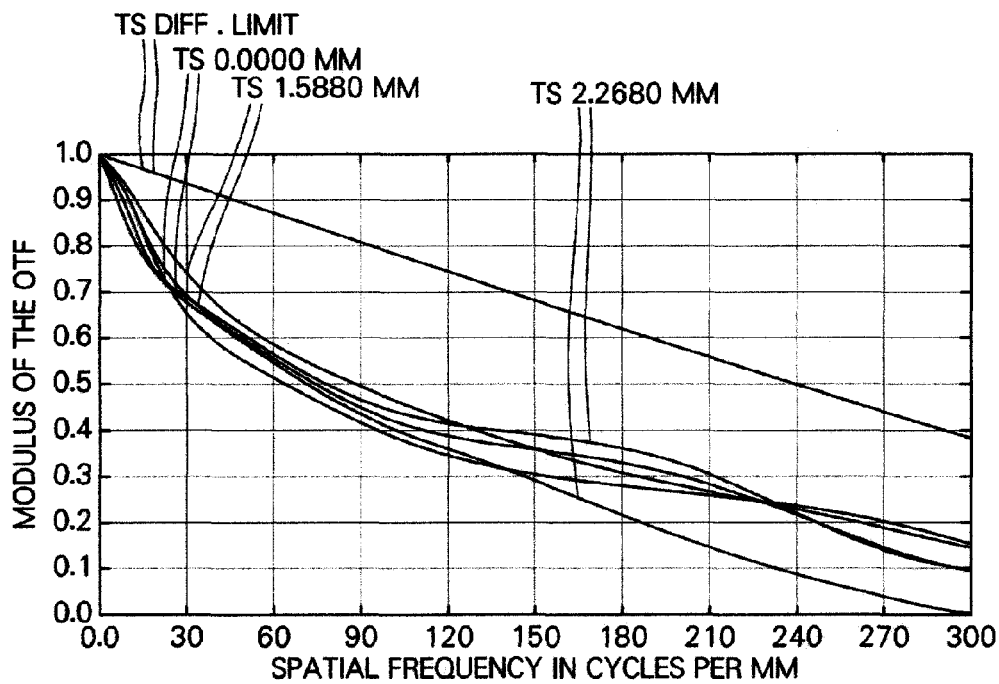
FIG. 8I is a diagram illustrating spatial frequency MTF (plural incident heights) of the imaging lens of Example 4.
Figure 8J:
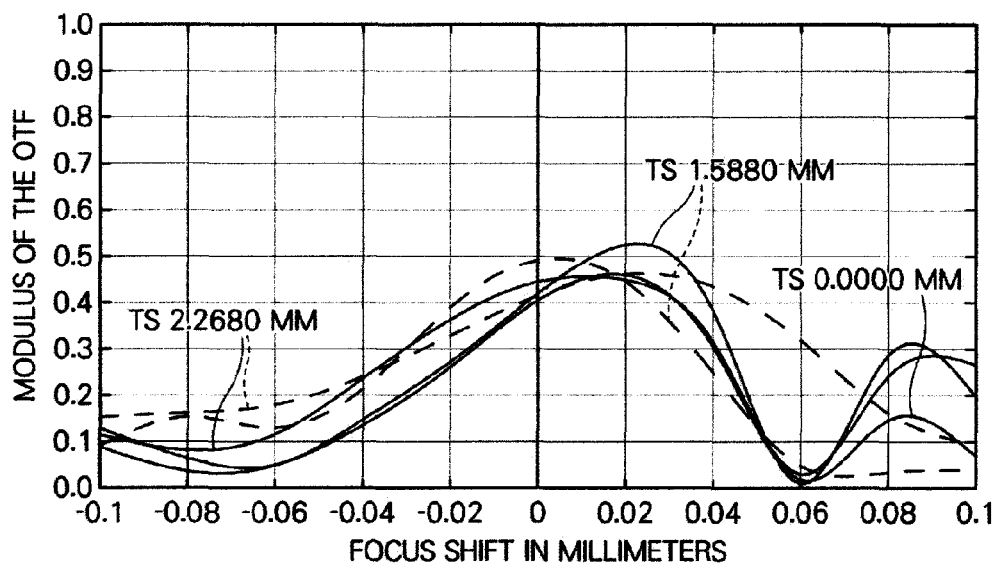
FIG. 8J is a diagram illustrating depth MTF (90 line/mm, plural incident heights) of the imaging lens of Example 4.
Figure 8K:
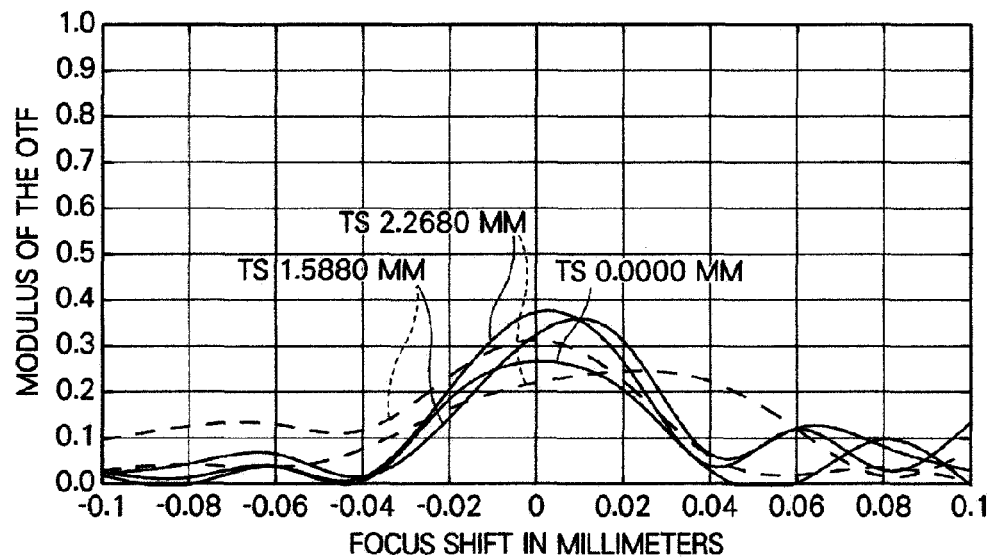
FIG. 8K is a diagram illustrating depth MTF (179 line/mm, plural incident heights) of the imaging lens of Example 4.

FIGS. 8A through 8N and Tables 4A, 4B show data related to the imaging lens of Example 4.

Figure 9A:
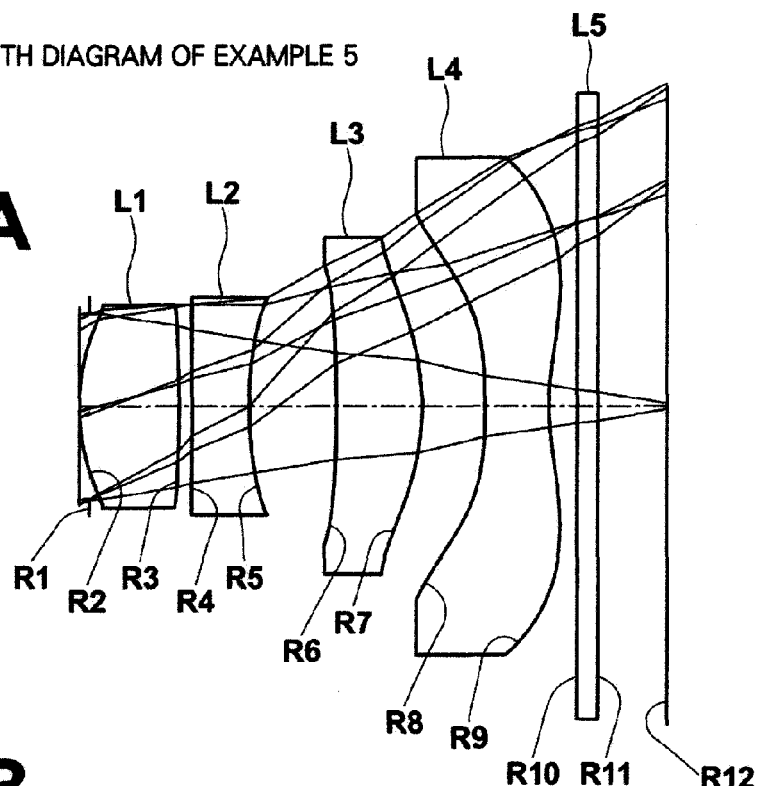
FIG. 9A is a diagram illustrating the structure of an imaging lens of Example 5.
Figure 9B:
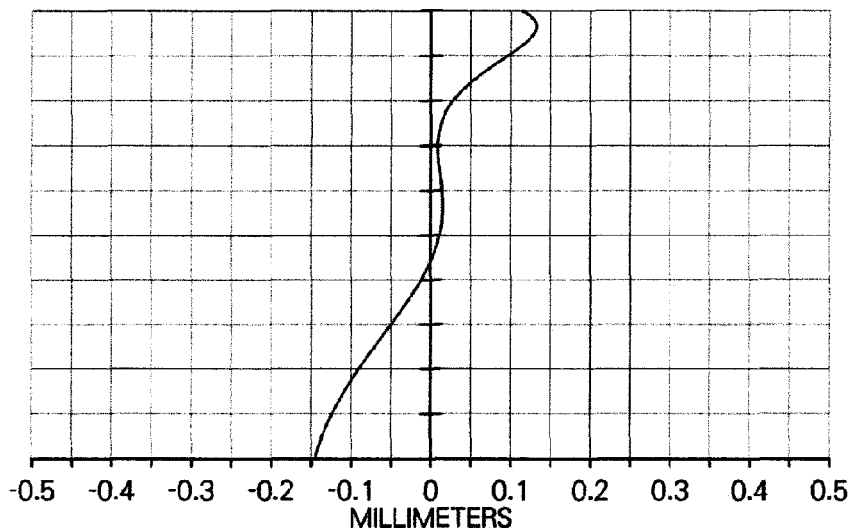
FIG. 9B is a diagram illustrating the spherical aberration of the imaging lens of Example 5.
Figure 9D:
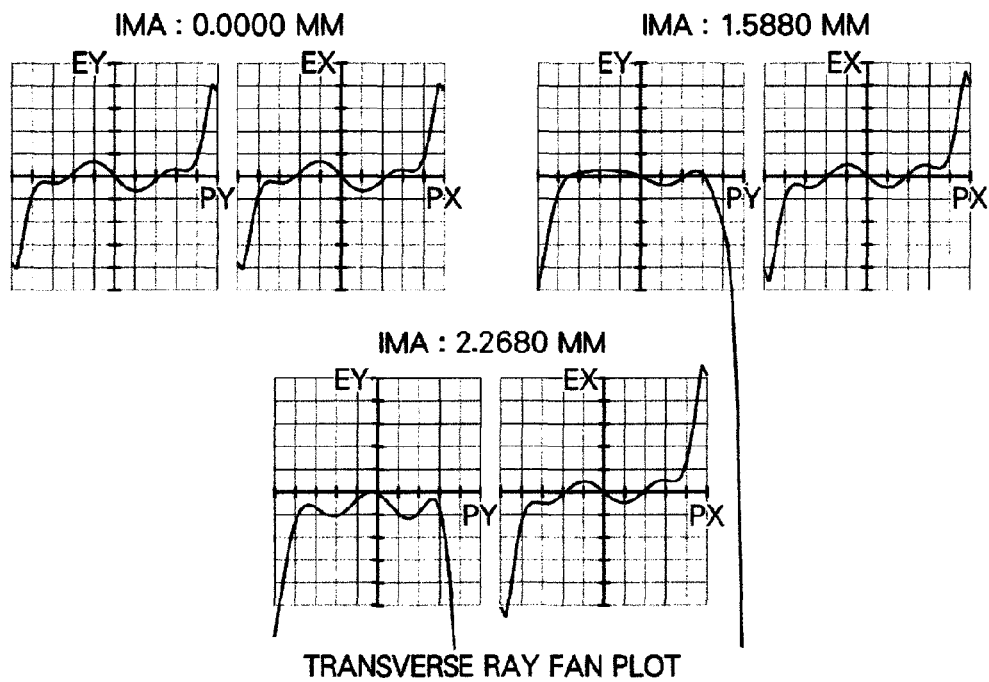
FIG. 9D is a diagram illustrating the coma aberrations of the imaging lens of Example 5.
Figure 9E:
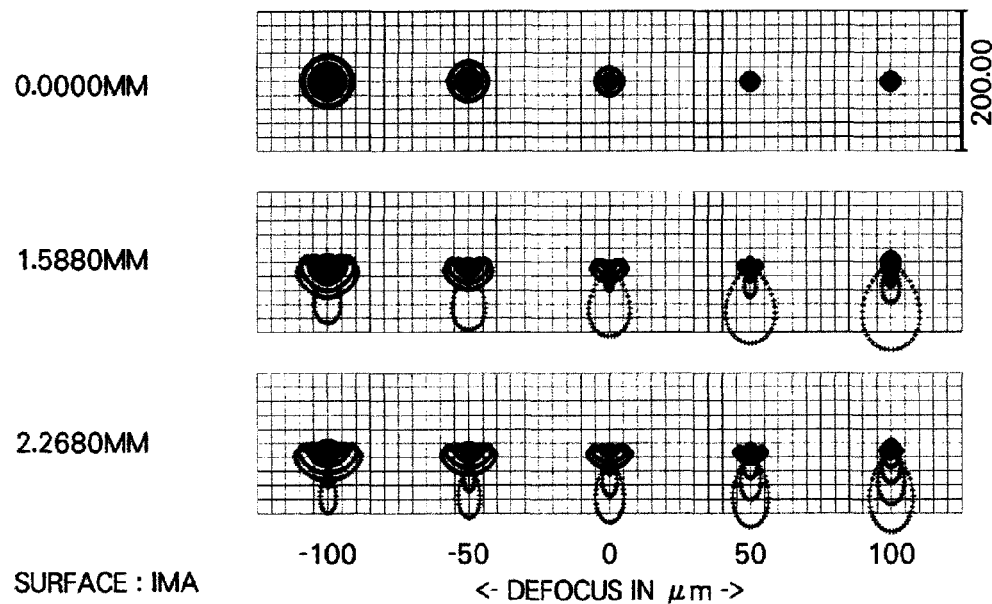
FIG. 9E is a spot diagram of the imaging lens of Example 5.
Figure 9F:
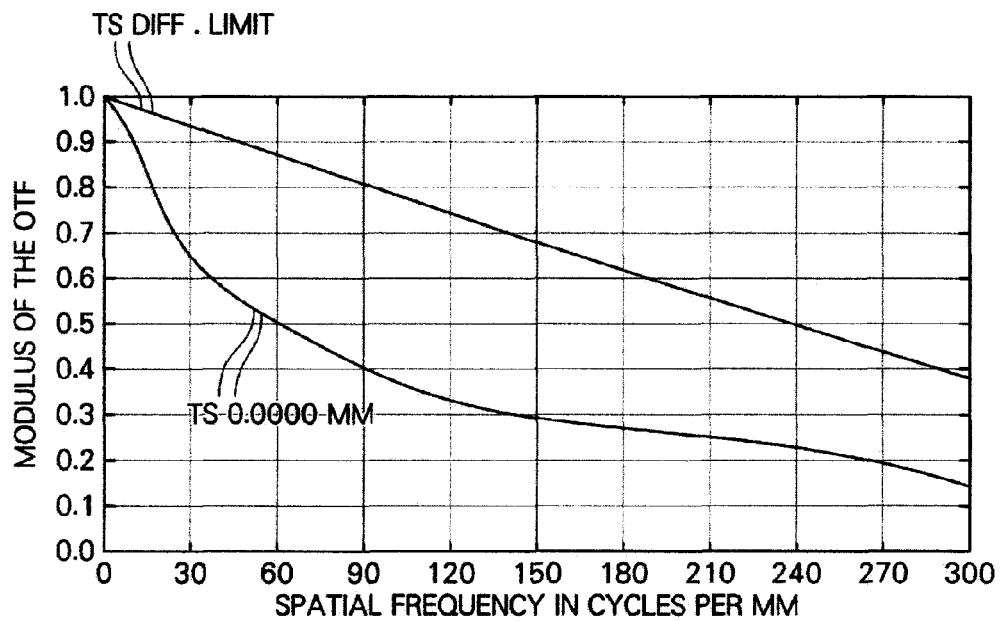
FIG. 9F is a diagram illustrating spatial frequency MTF (incident height=0) of the imaging lens of Example 5.
Figure 9G:
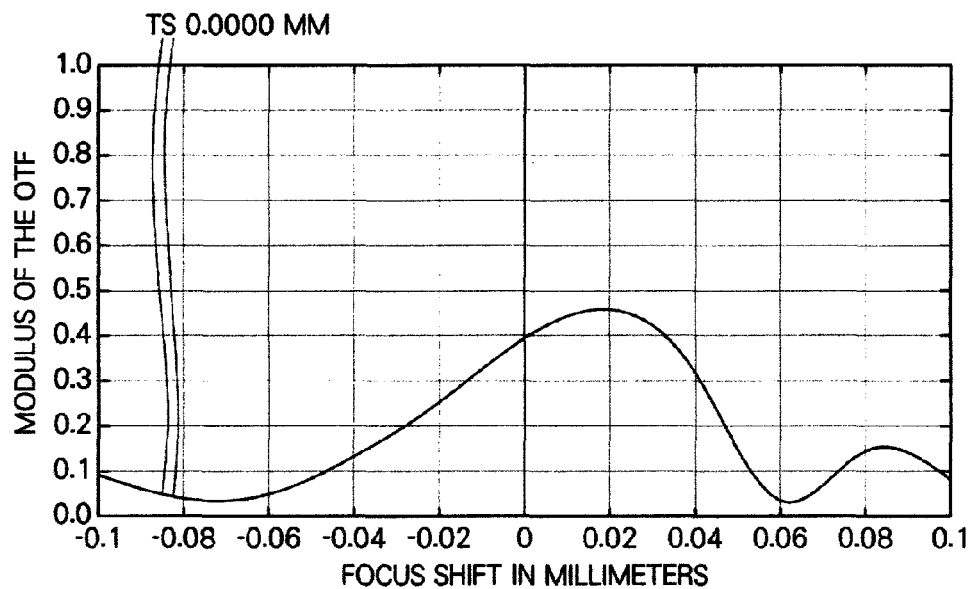
FIG. 9G is a diagram illustrating depth MTF (90 line/mm, incident height=0) of the imaging lens of Example 5.
Figure 9H:
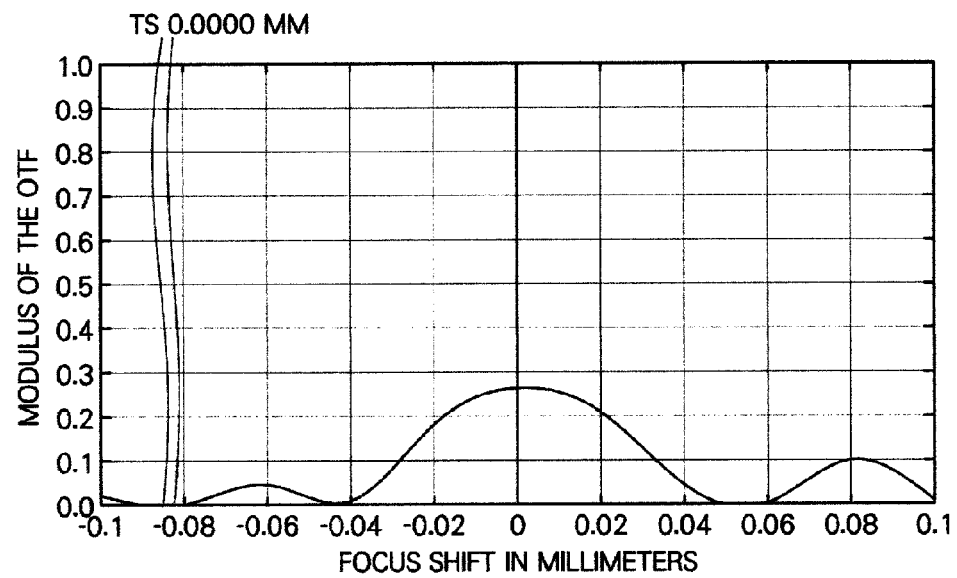
FIG. 9H is a diagram illustrating depth MTF (179 line/mm, incident height=0) of the imaging lens of Example 5.
Figure 9I:
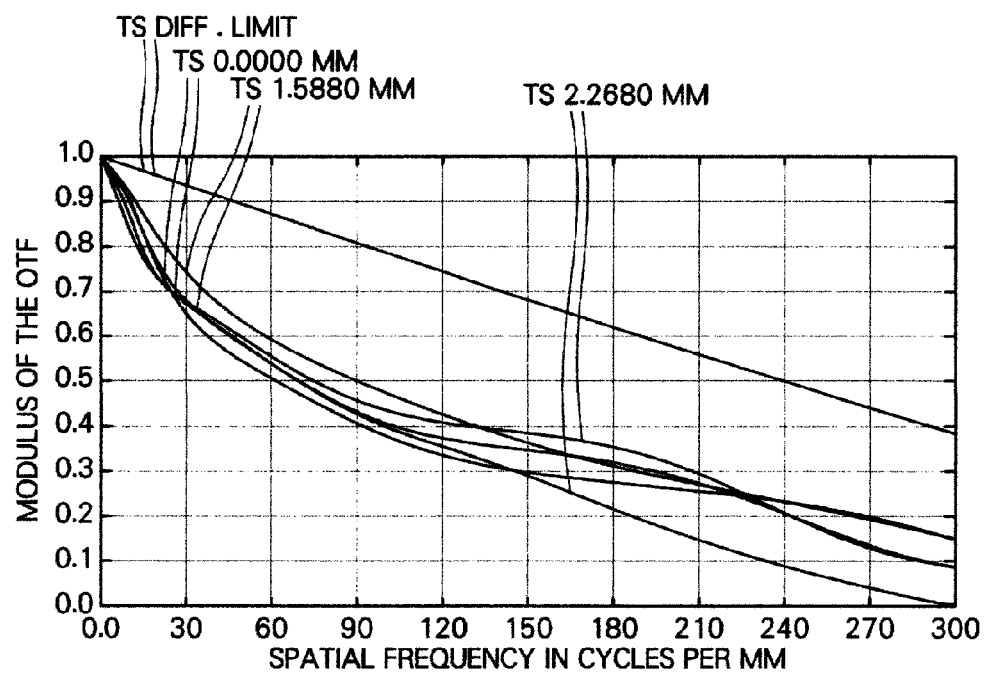
FIG. 9I is a diagram illustrating spatial frequency MTF (plural incident heights) of the imaging lens of Example 5.
Figure 9J:
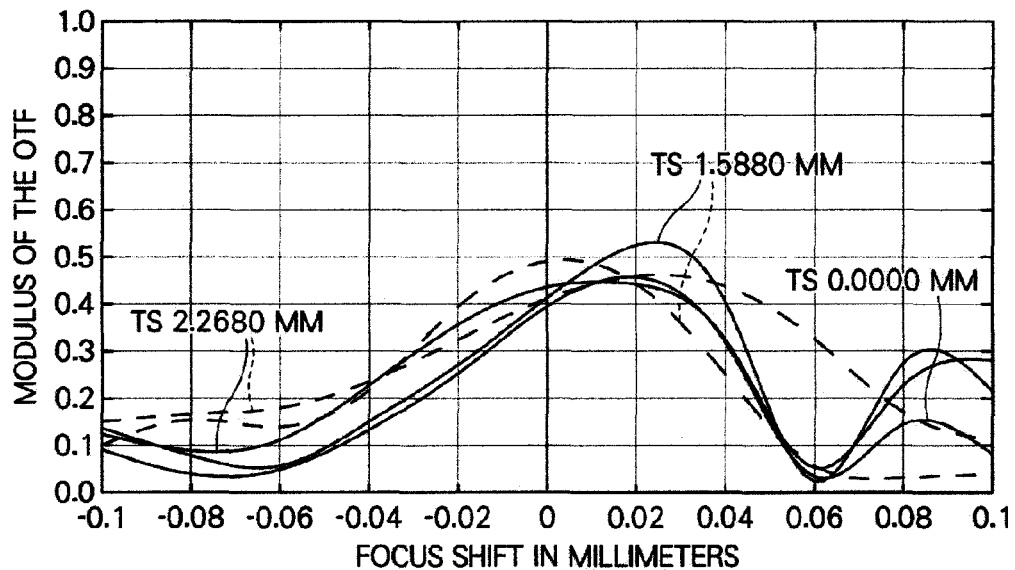
FIG. 9J is a diagram illustrating depth MTF (90 line/min, plural incident heights) of the imaging lens of Example 5.
Figure 9K:
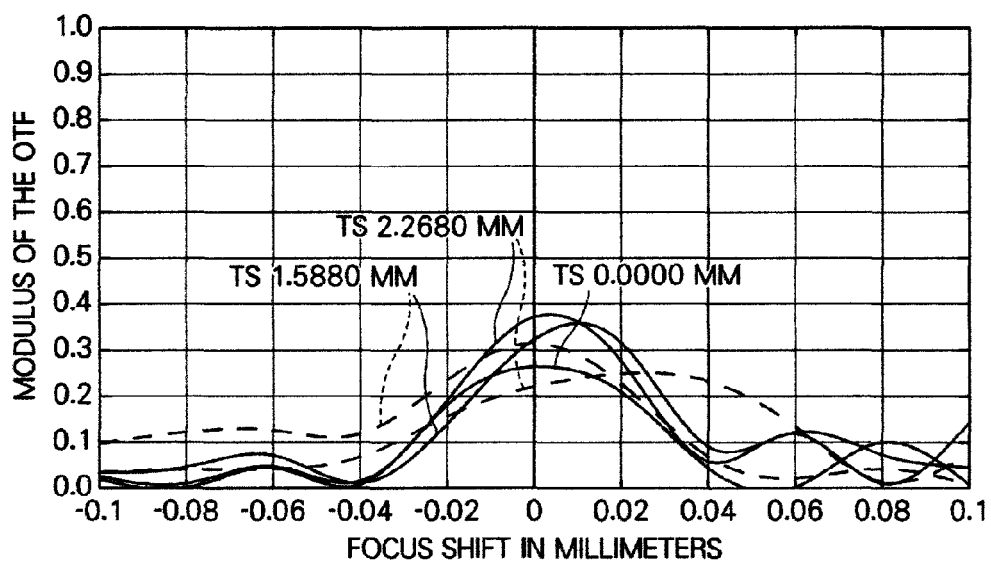
FIG. 9K is a diagram illustrating depth MTF (179 line/mm, plural incident heights) of the imaging lens of Example 5.
Figure 9N:
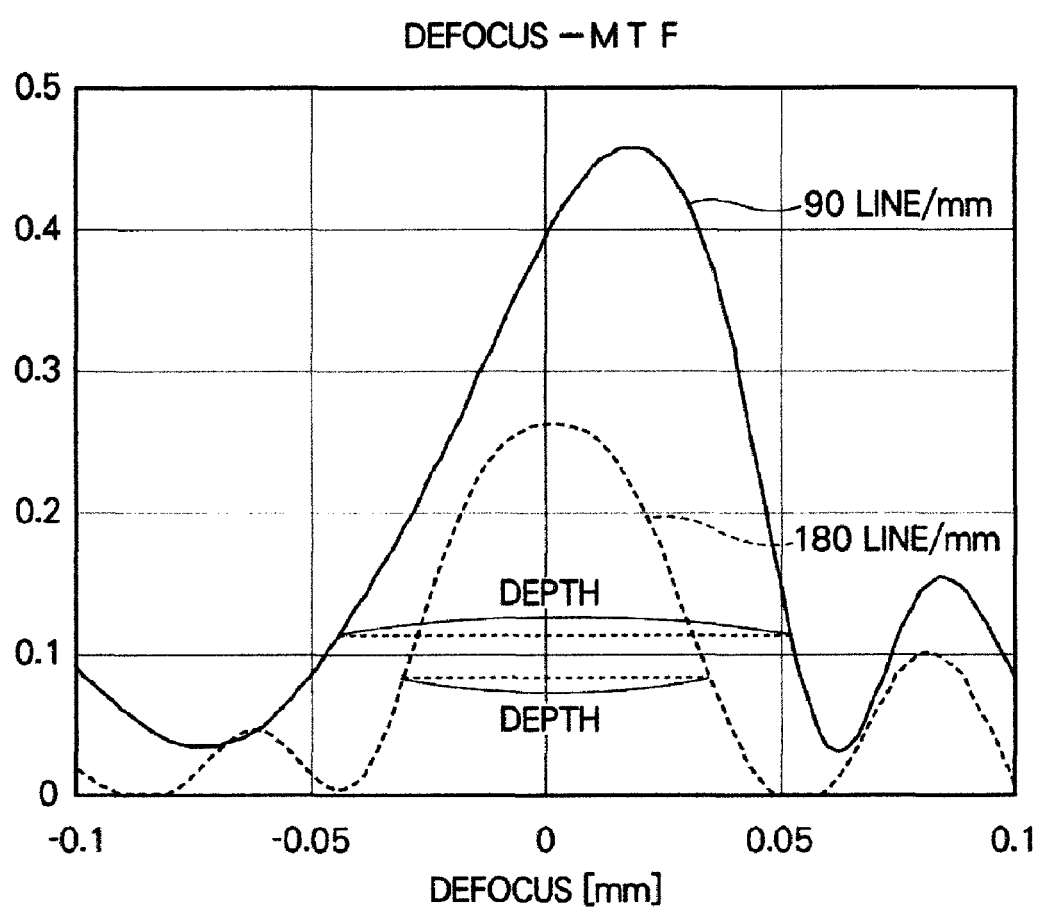
FIG. 9N is a diagram illustrating an extended focal depth in a depth MTF curve showing depth MTF of the imaging lens of Example 5.

FIGS. 9A through 9N and Tables 5A, 5B show data related to the imaging lens of Example 5.

Figure 10A:
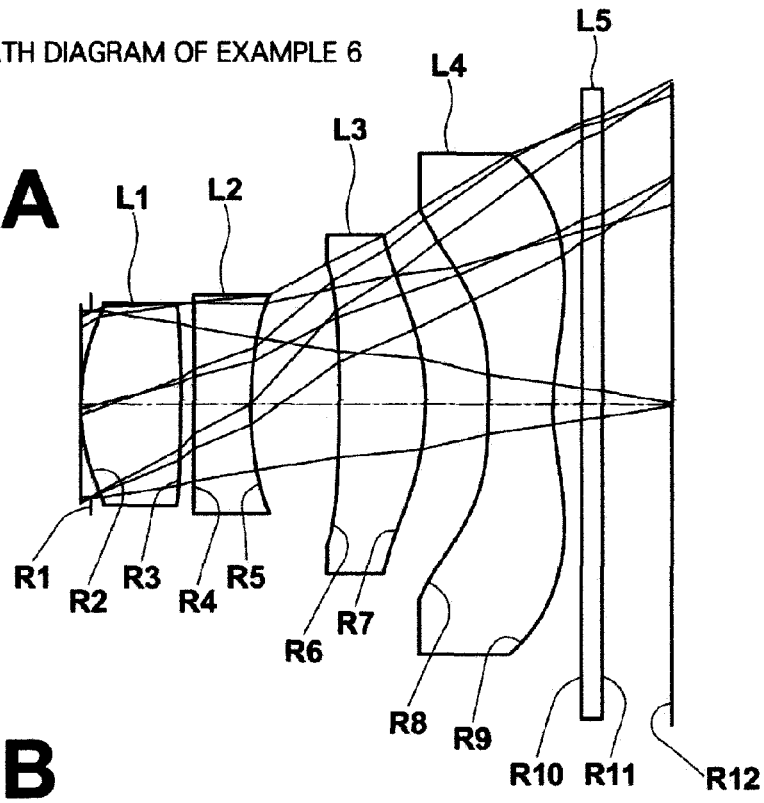
FIG. 10A is a diagram illustrating the structure of an imaging lens of Example 6.
Figure 10B:
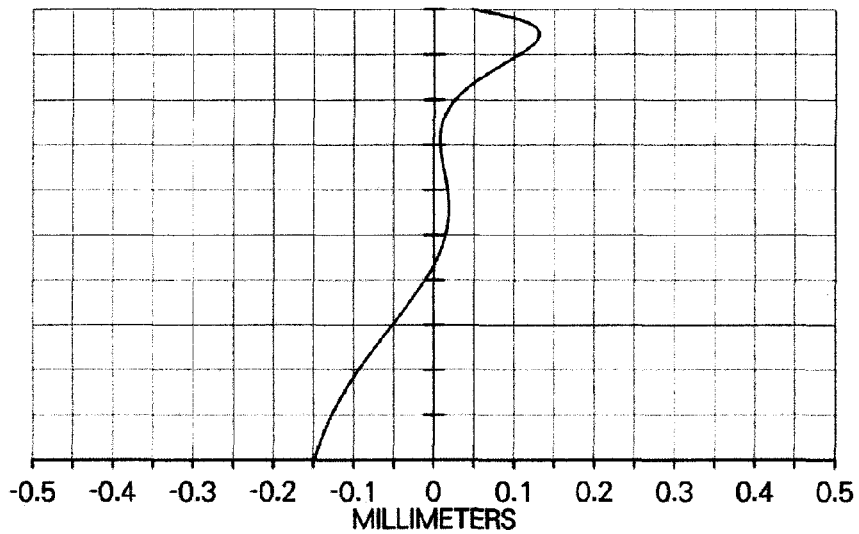
FIG. 10B is a diagram illustrating the spherical aberration of the imaging lens of Example 6.
Figure 10C:
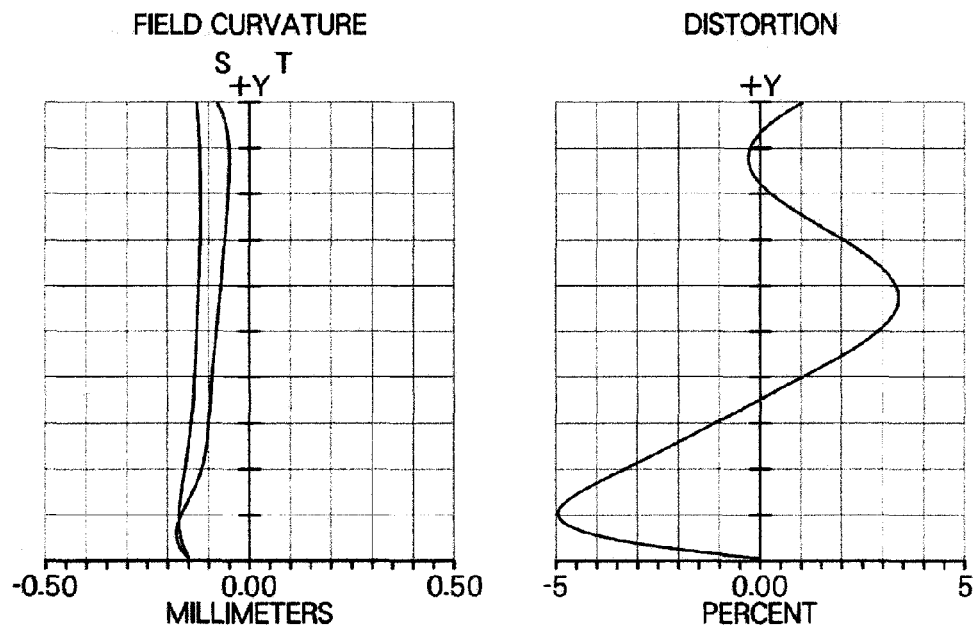
FIG. 10C is a diagram illustrating the astigmatism and distortion of the imaging lens of Example 6.
Figure 10D:
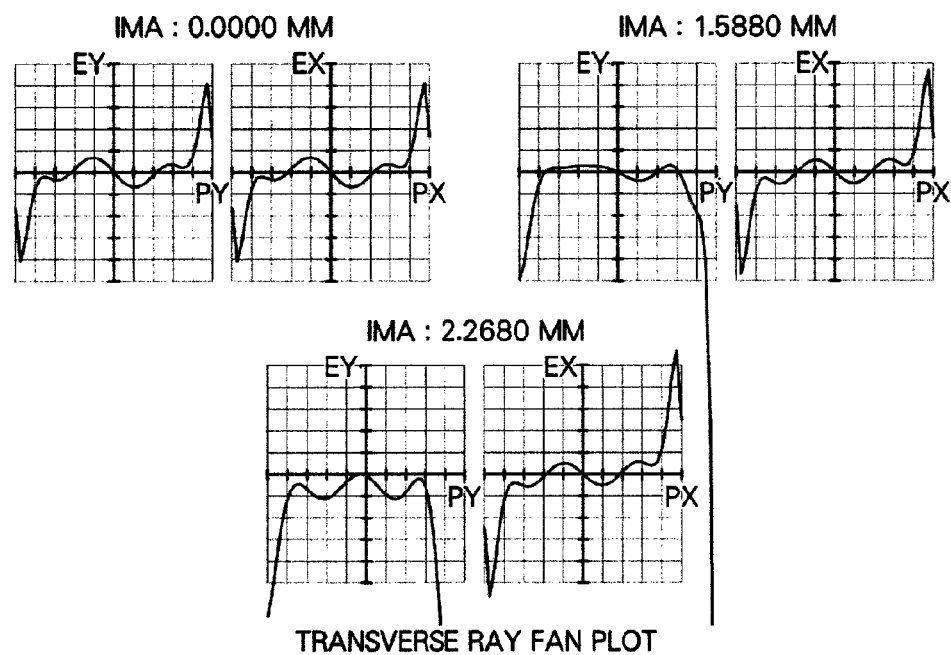
FIG. 10D is a diagram illustrating the coma aberrations of the imaging lens of Example 6.
Figure 10E:
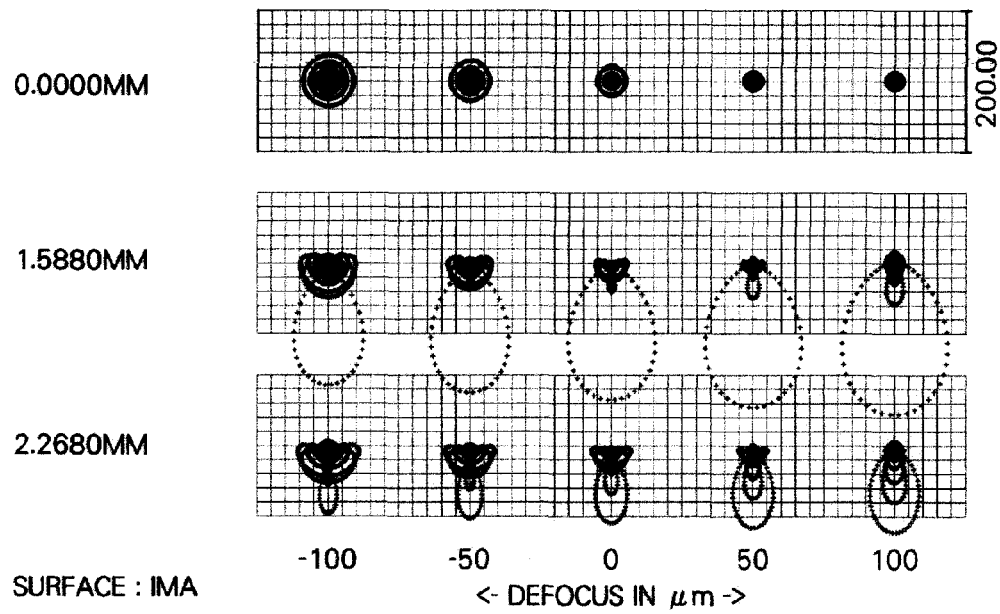
FIG. 10E is a spot diagram of the imaging lens of Example 6.
Figure 10F:
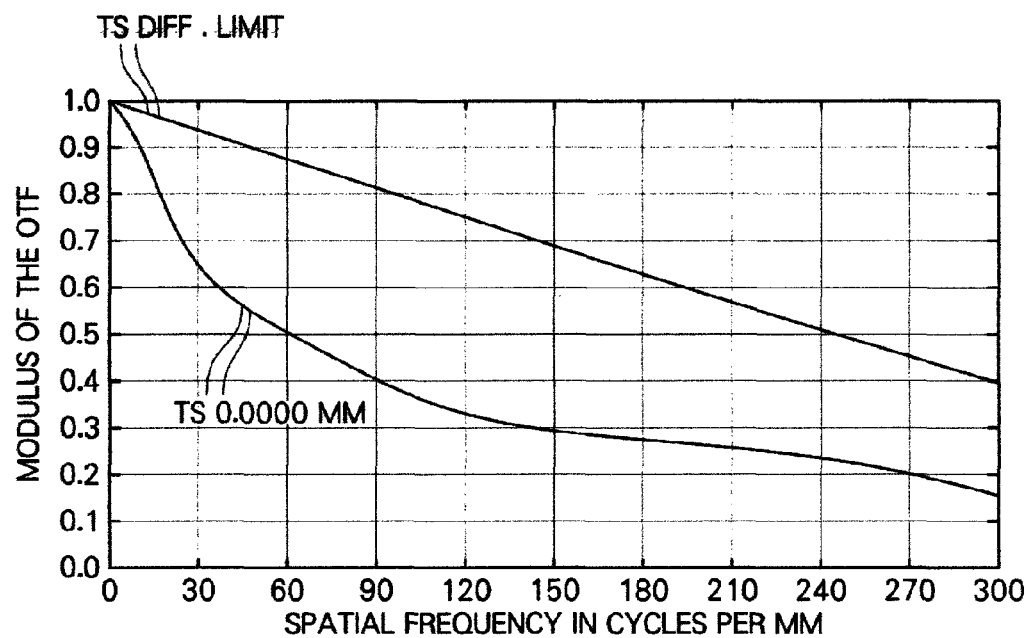
FIG. 10F is a diagram illustrating spatial frequency MTF (incident height=0) of the imaging lens of Example 6.
Figure 10G:
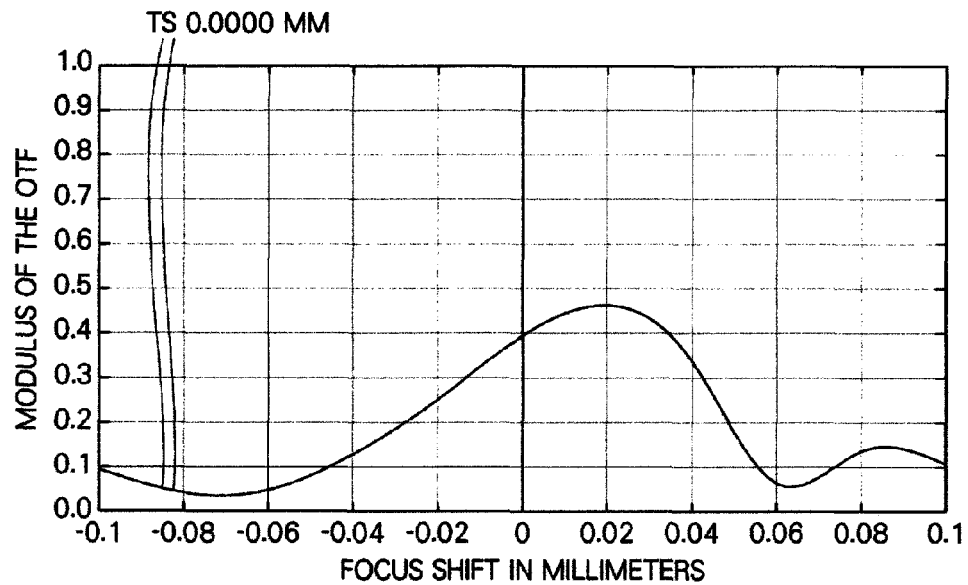
FIG. 10G is a diagram illustrating depth MTF (90 line/mm, incident height=0) of the imaging lens of Example 6.
Figure 10H:
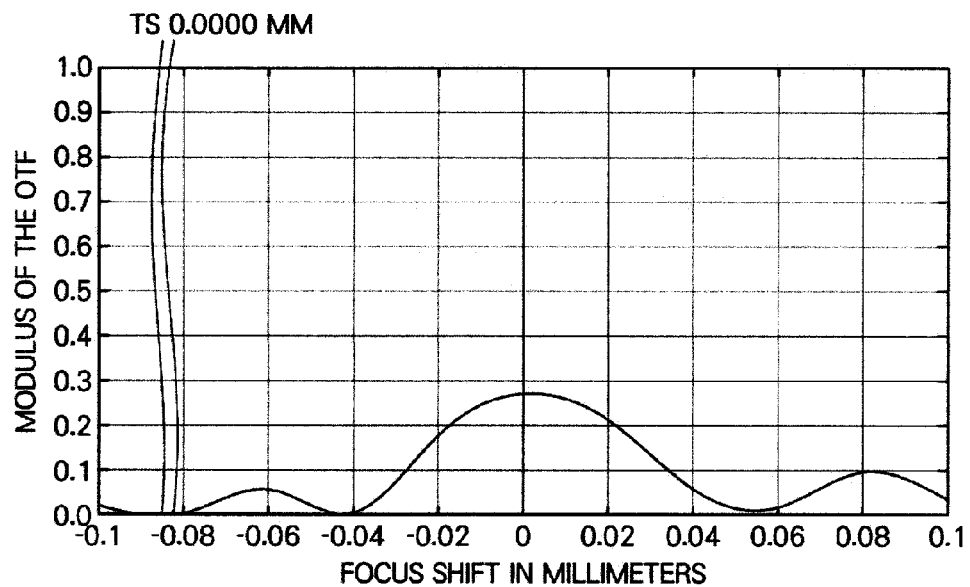
FIG. 10H is a diagram illustrating depth MTF (179 line/mm, incident height=0) of the imaging lens of Example 6.
Figure 10I:
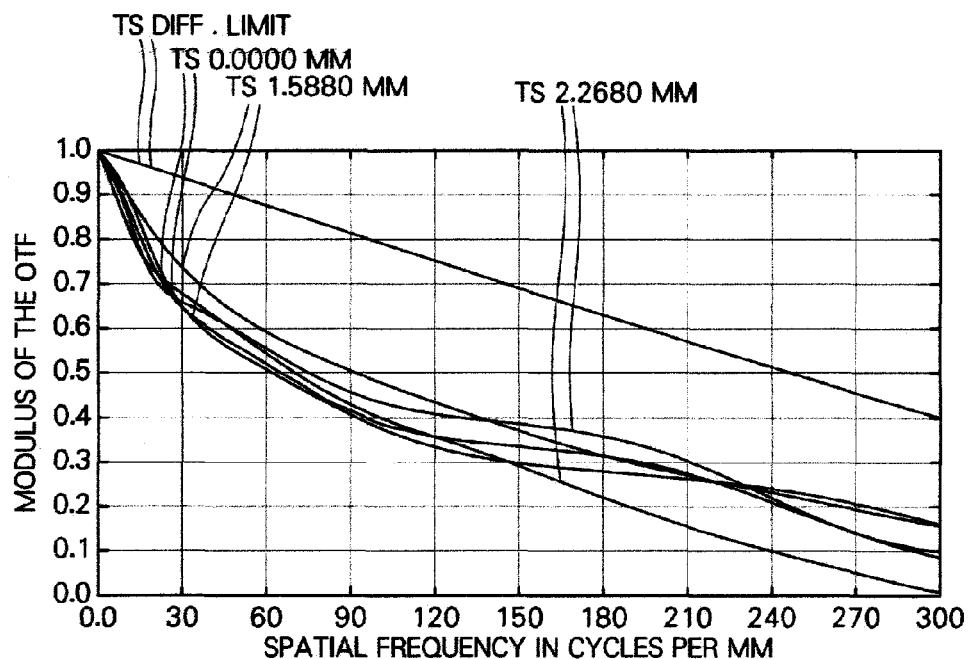
FIG. 10I is a diagram illustrating spatial frequency MTF (plural incident heights) of the imaging lens of Example 6.
Figure 10J:
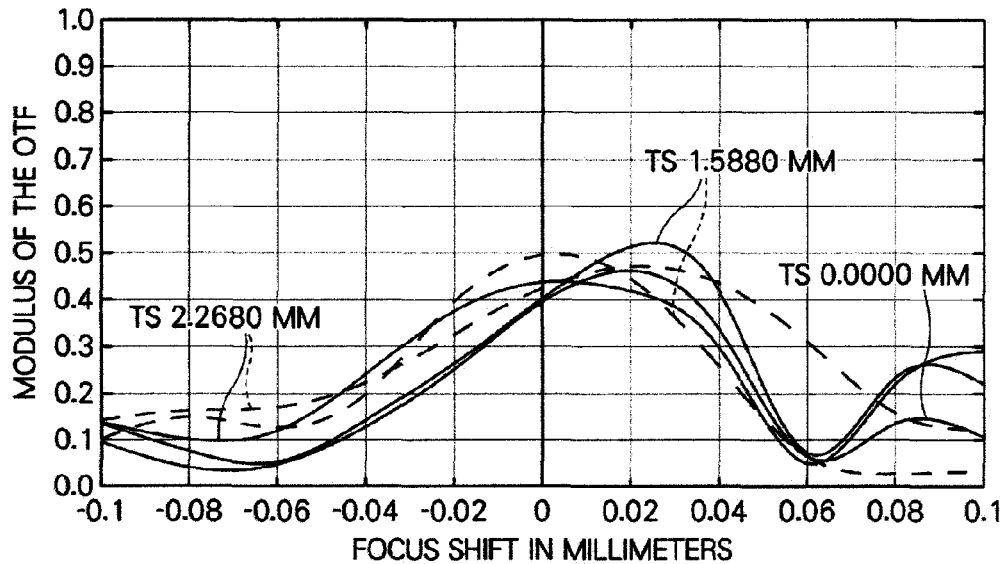
FIG. 10J is a diagram illustrating depth MTF (90 line/mm, plural incident heights) of the imaging lens of Example 6.
Figure 10K:
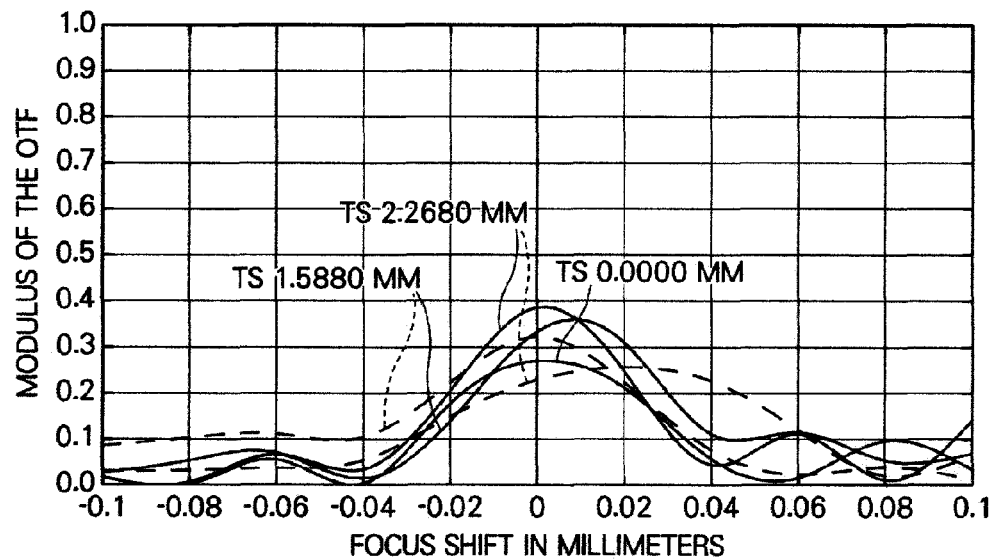
FIG. 10K is a diagram illustrating depth MTF (179 line/mm, plural incident heights) of the imaging lens of Example 6.
Figure 10L:
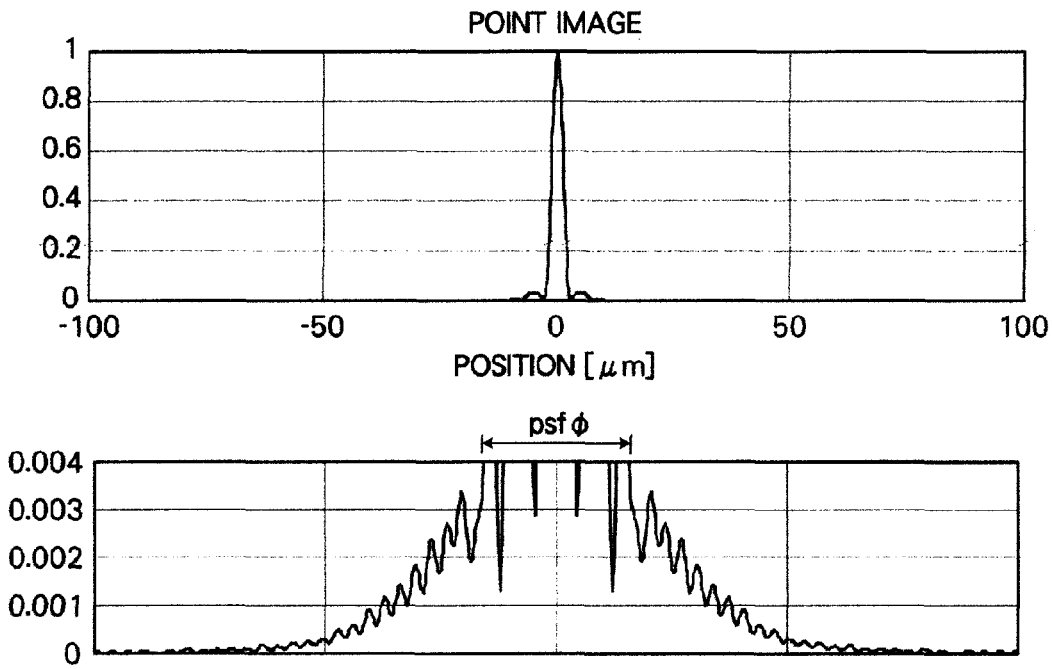
FIG. 10L is a diagram illustrating point images formed through the imaging lens of Example 6.
Figure 10M:
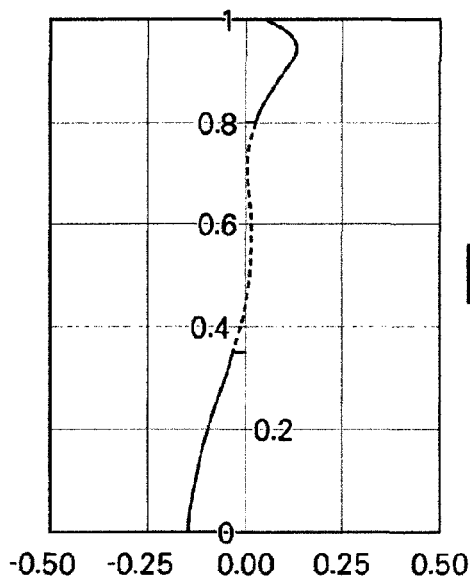
FIG. 10M is a diagram illustrating a spherical aberration minimum region in a spherical aberration curve of the imaging lens of Example 6.

FIGS. 10A through 10N and Tables 6A, 6B show data related to the imaging lens of Example 6.

Figure 11A:
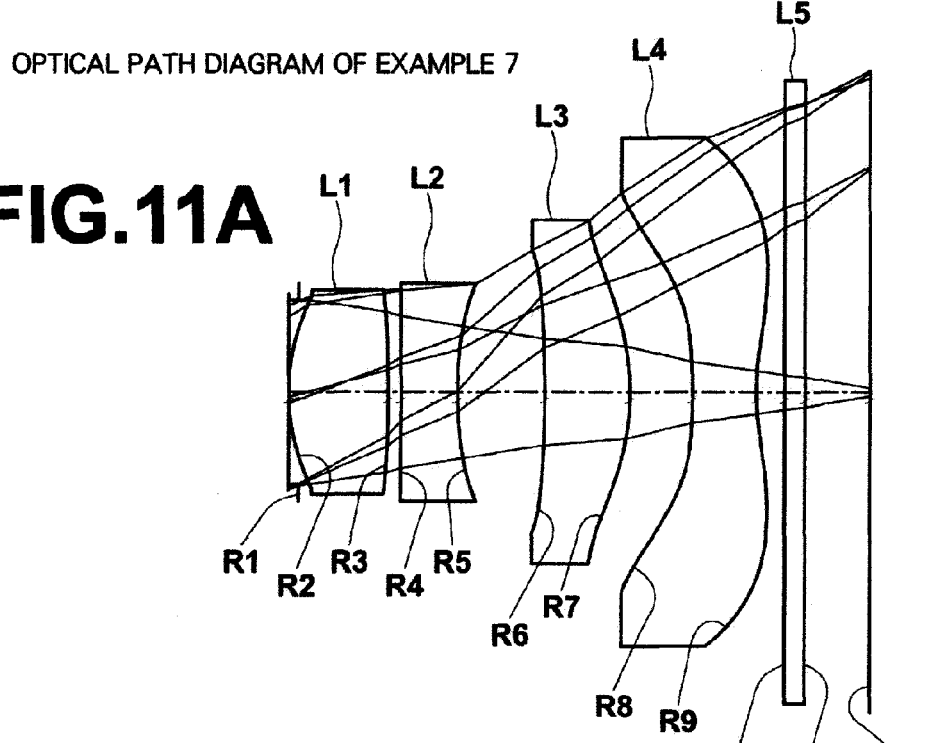
FIG. 11A is a diagram illustrating the structure of an imaging lens of Example 7.
Figure 11B:
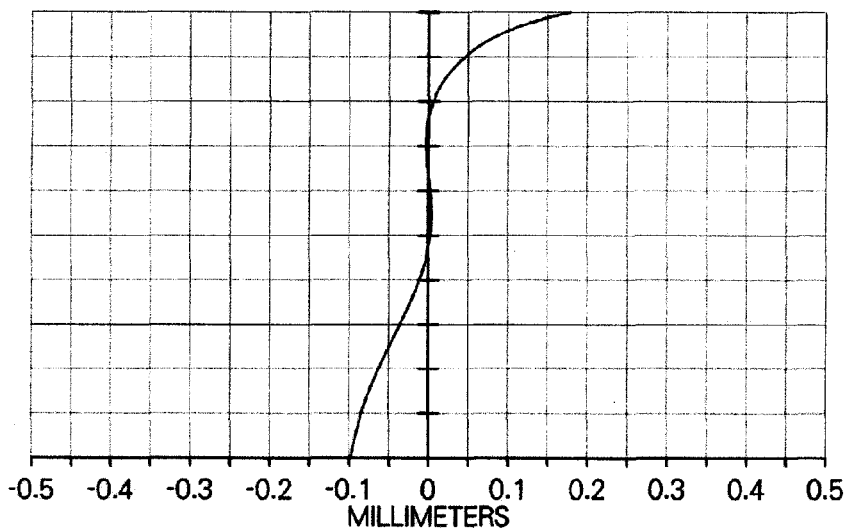
FIG. 11B is a diagram illustrating the spherical aberration of the imaging lens of Example 7.
Figure 11C:
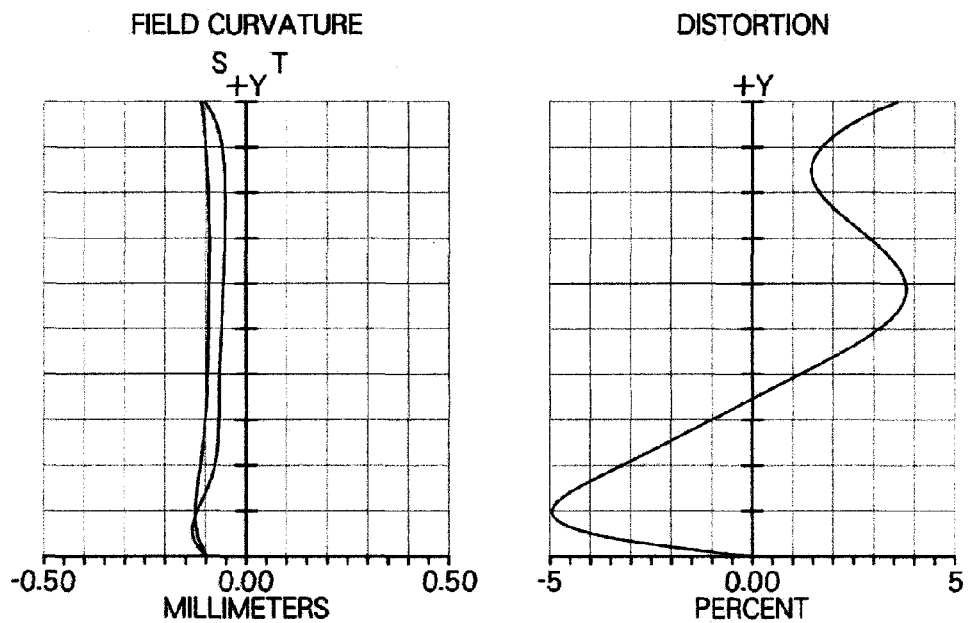
FIG. 11C is a diagram illustrating the astigmatism and distortion of the imaging lens of Example 7.
Figure 11D:
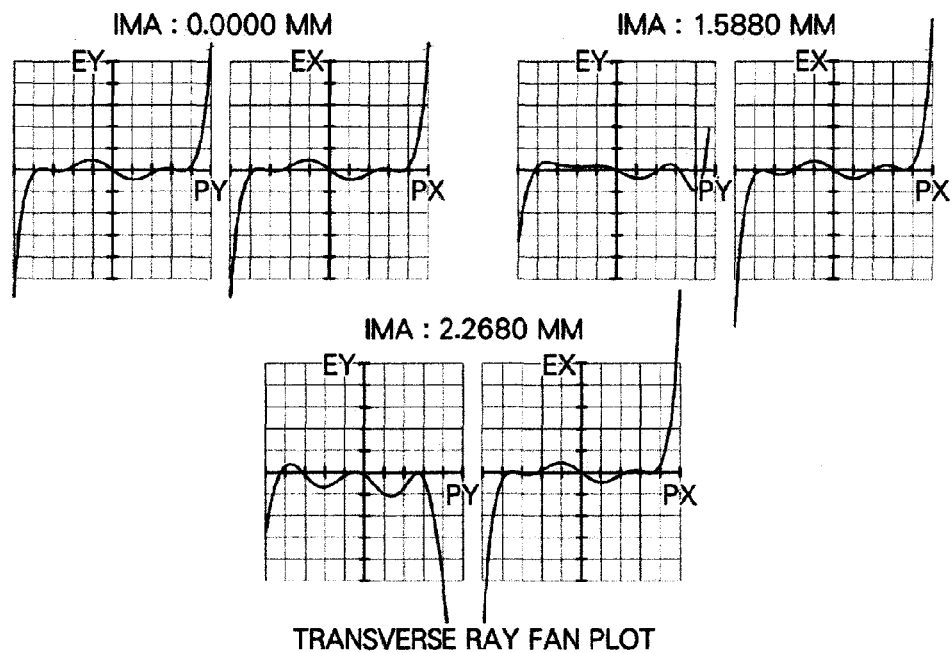
FIG. 11D is a diagram illustrating the coma aberrations of the imaging lens of Example 7.
Figure 11E:
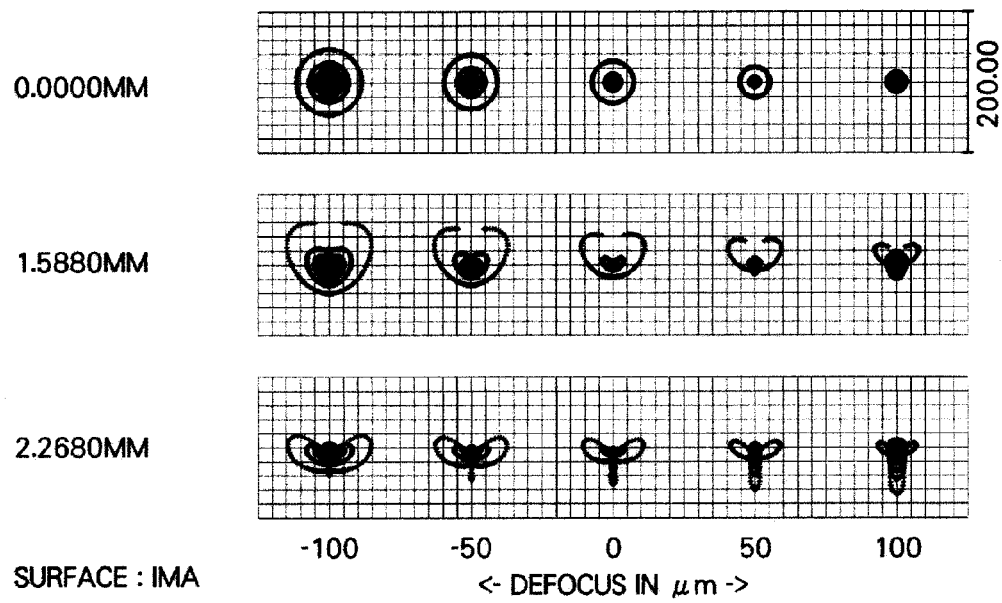
FIG. 11E is a spot diagram of the imaging lens of Example 7.
Figure 11F:
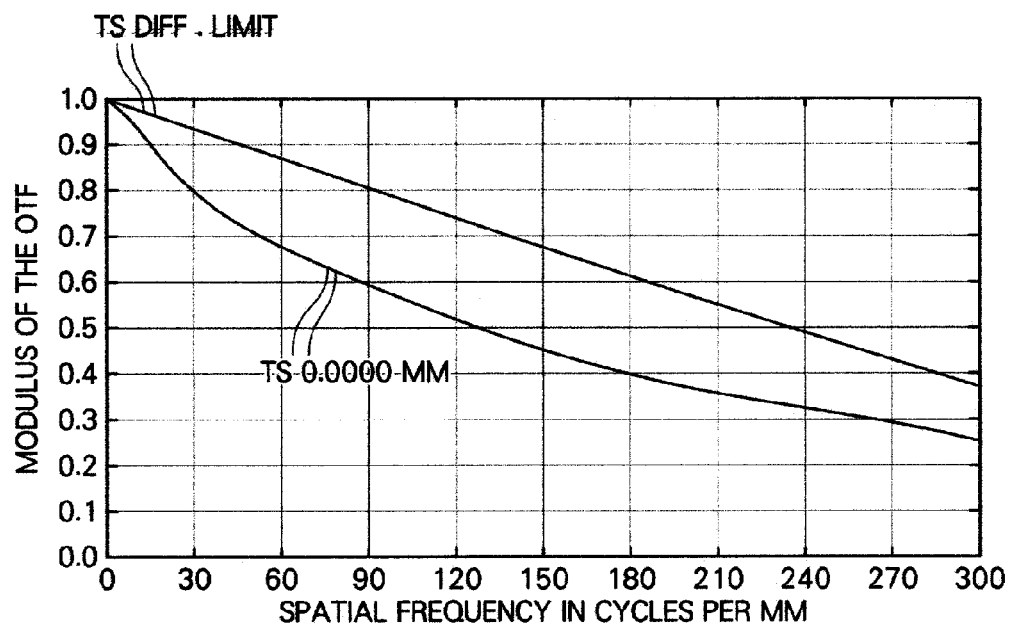
FIG. 11F is a diagram illustrating spatial frequency MTF (incident height=0) of the imaging lens of Example 7.
Figure 11G:
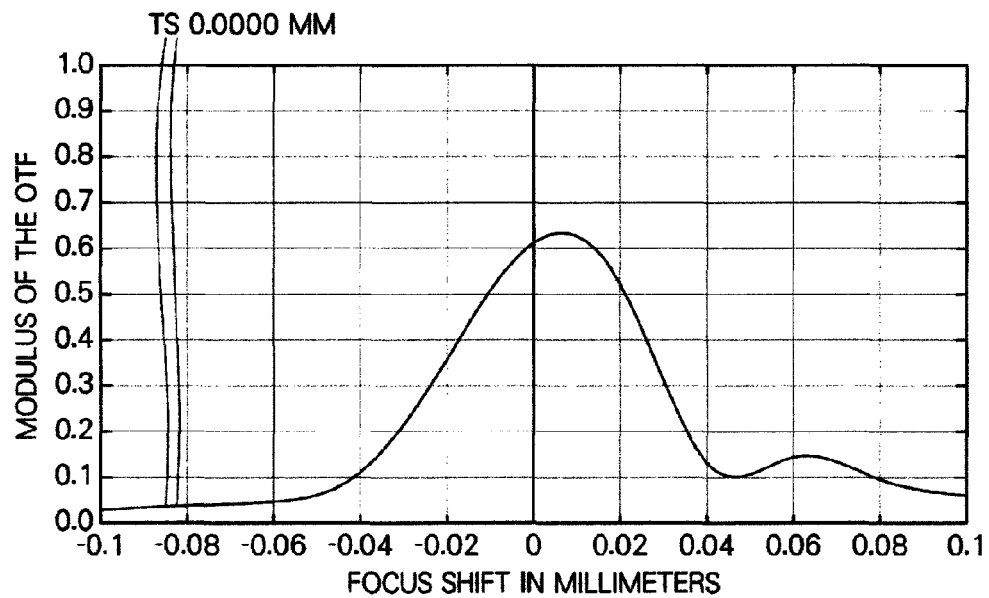
FIG. 11G is a diagram illustrating depth MTF (90 line/mm, incident height=0) of the imaging lens of Example 7.
Figure 11H:
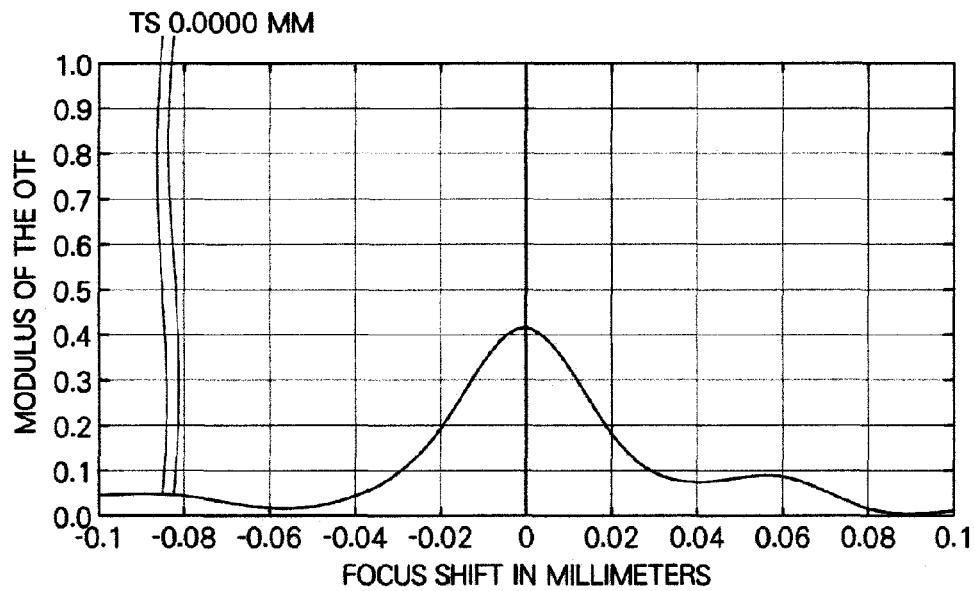
FIG. 11H is a diagram illustrating depth MTF (179 line/mm, incident height=0) of the imaging lens of Example 7.
Figure 11I:
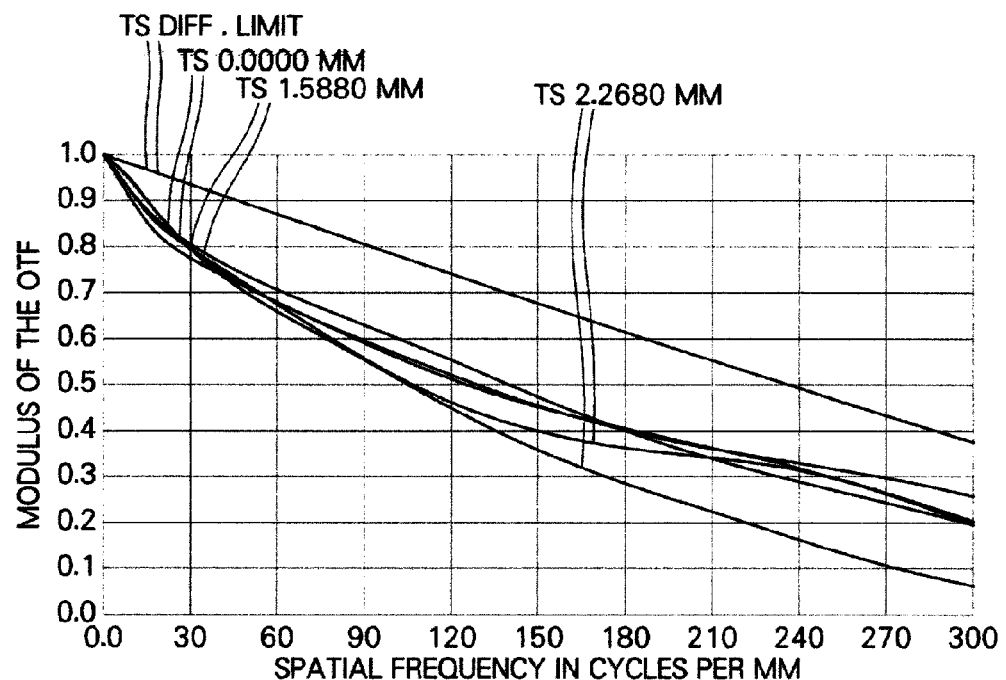
FIG. 11I is a diagram illustrating spatial frequency MTF (plural incident heights) of the imaging lens of Example 7.
Figure 11J:
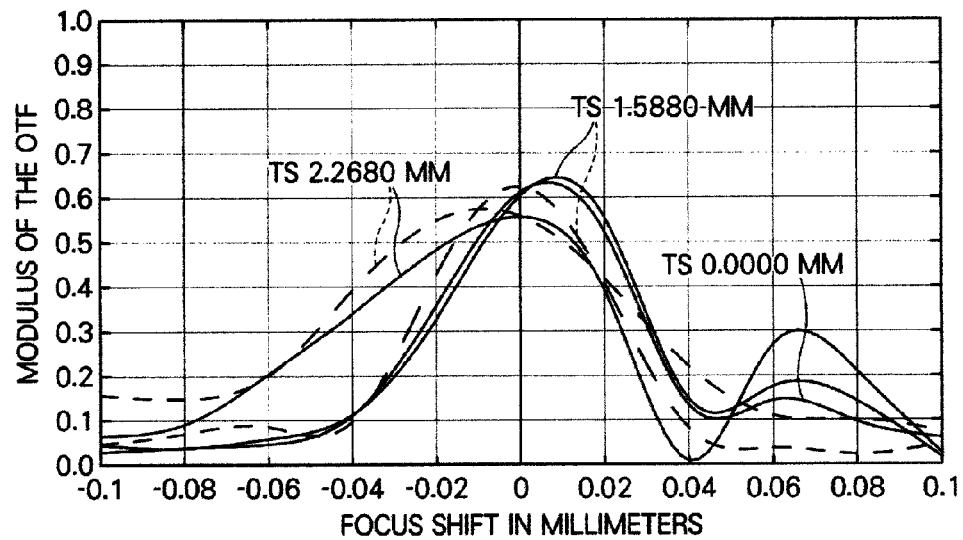
FIG. 11J is a diagram illustrating depth MTF (90 line/mm, plural incident heights) of the imaging lens of Example 7.
Figure 11K:
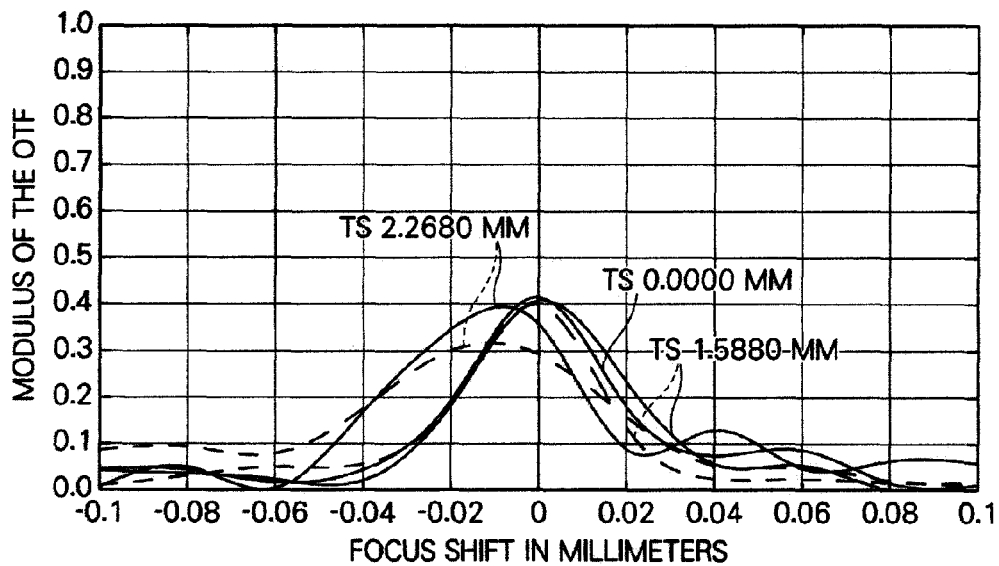
FIG. 11K is a diagram illustrating depth MTF (179 line/mm, plural incident heights) of the imaging lens of Example 7.
Figure 11N:
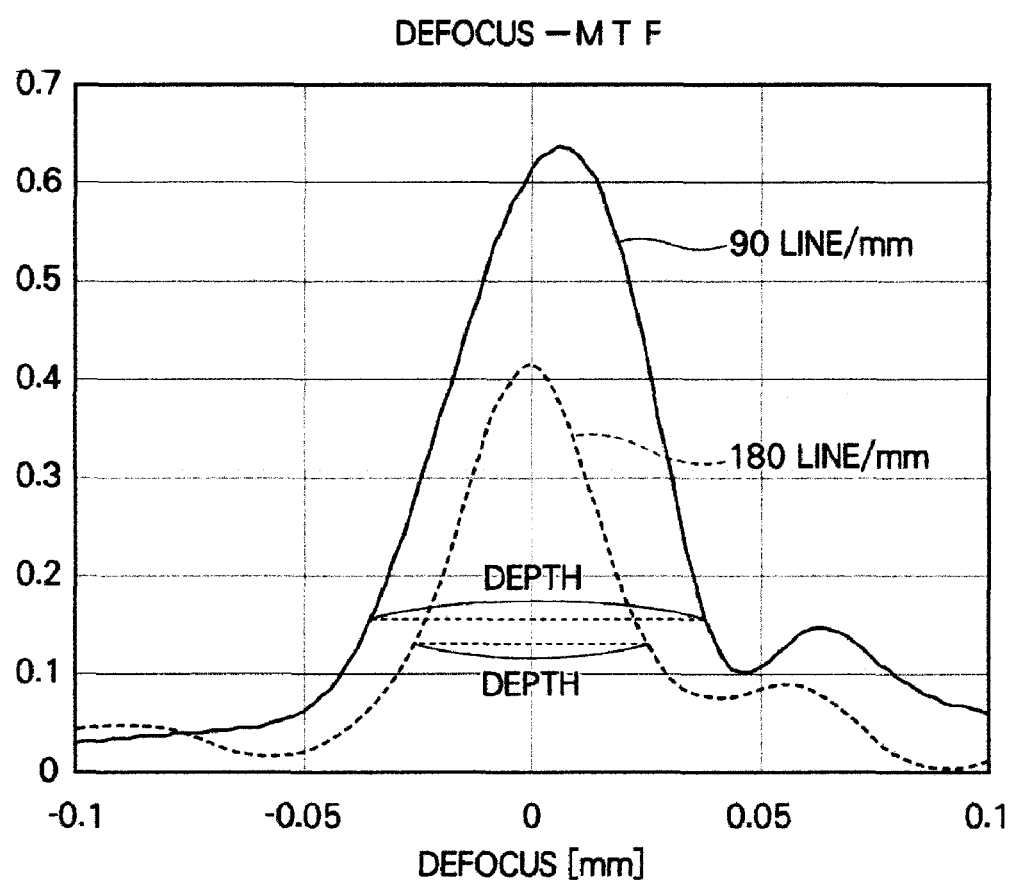
FIG. 11N is a diagram illustrating an extended focal depth in a depth MTF curve showing depth MTF of the imaging lens of Example 7.

FIGS. 11A through 11N and Tables 7A, 7B show data related to the imaging lens of Example 7.

Figure 12A:
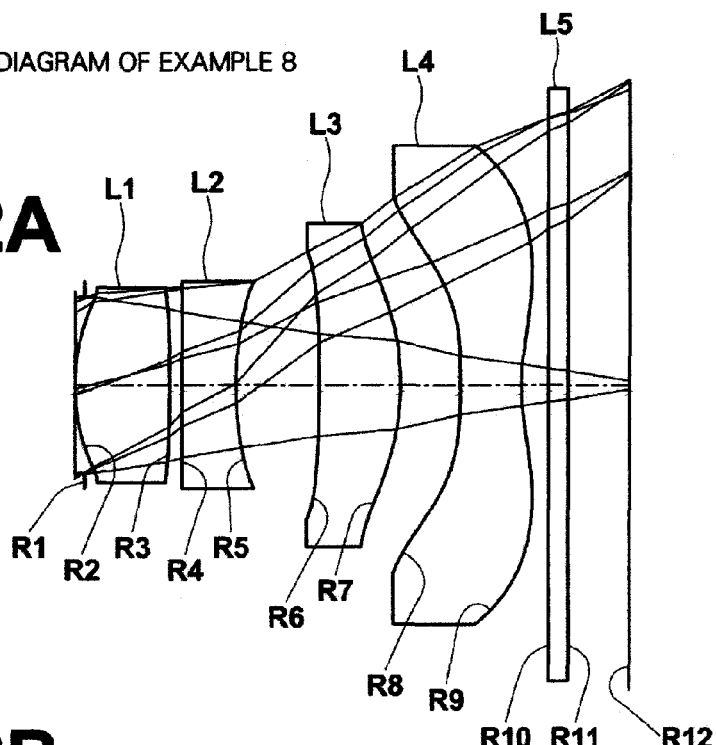
FIG. 12A is a diagram illustrating the structure of an imaging lens of Example 8.
Figure 12B:
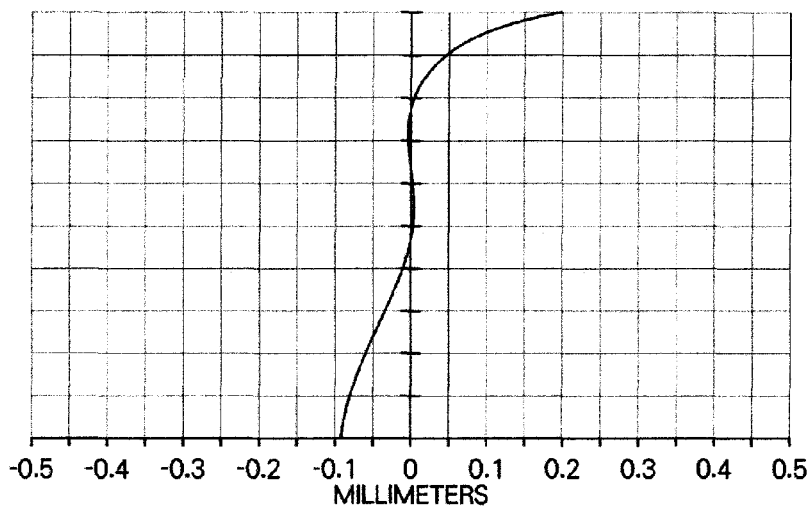
FIG. 12B is a diagram illustrating the spherical aberration of the imaging lens of Example 8.
Figure 12C:
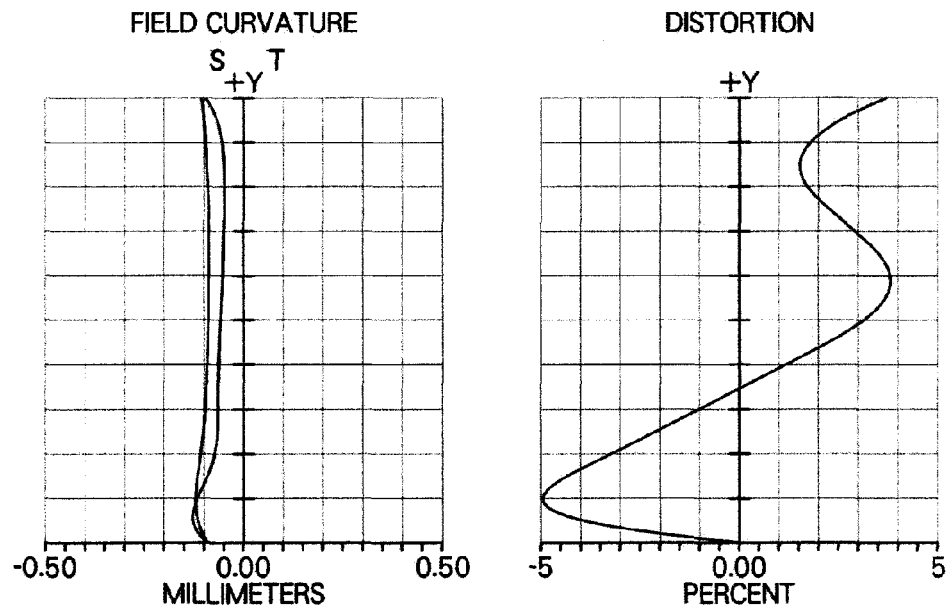
FIG. 12C is a diagram illustrating the astigmatism and distortion of the imaging lens of Example 8.
Figure 12D:
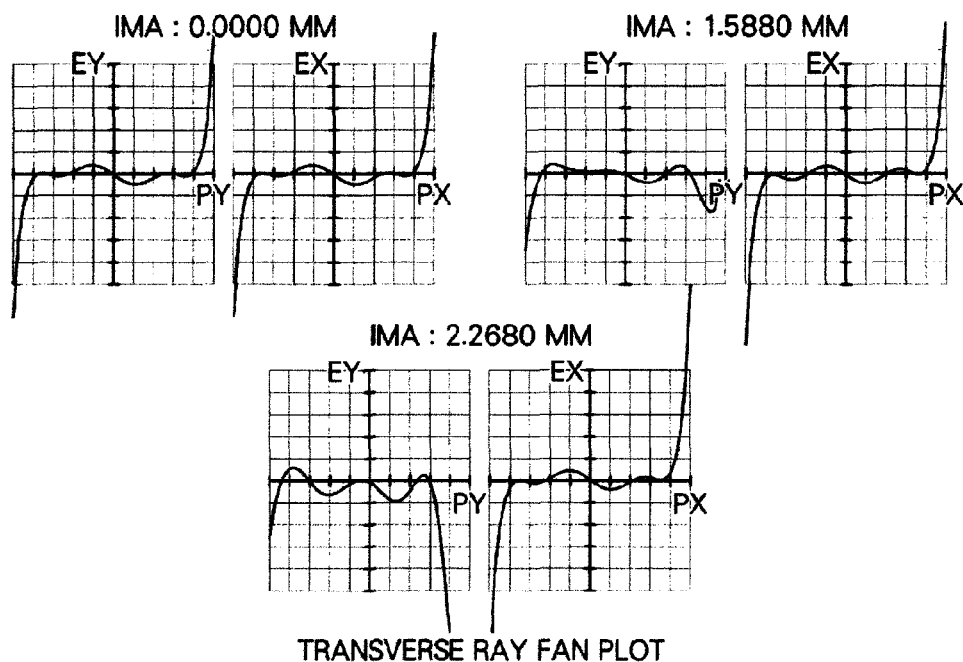
FIG. 12D is a diagram illustrating the coma aberrations of the imaging lens of Example 8.
Figure 12E:
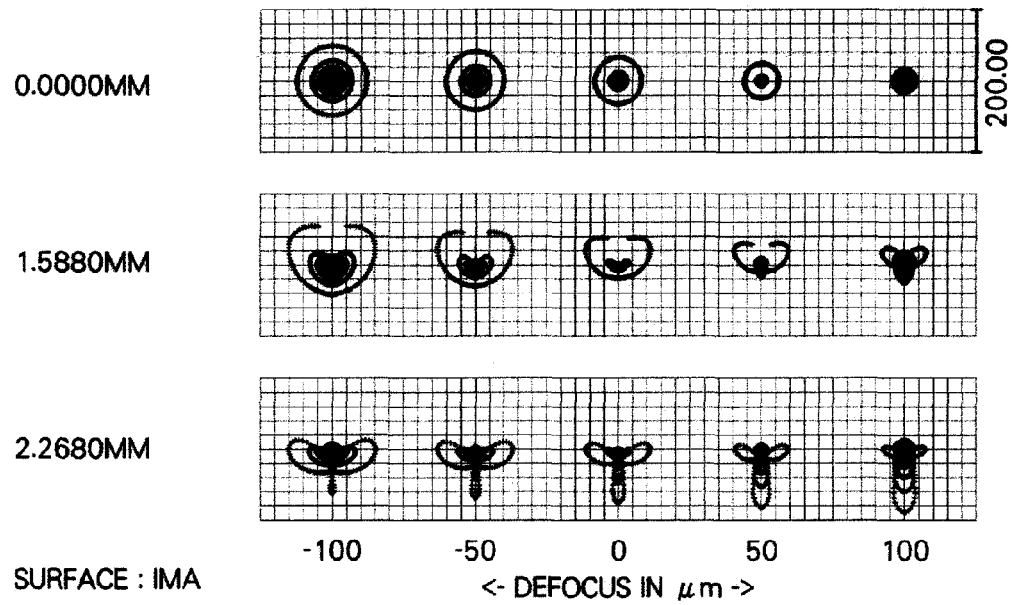
Figure 12F:
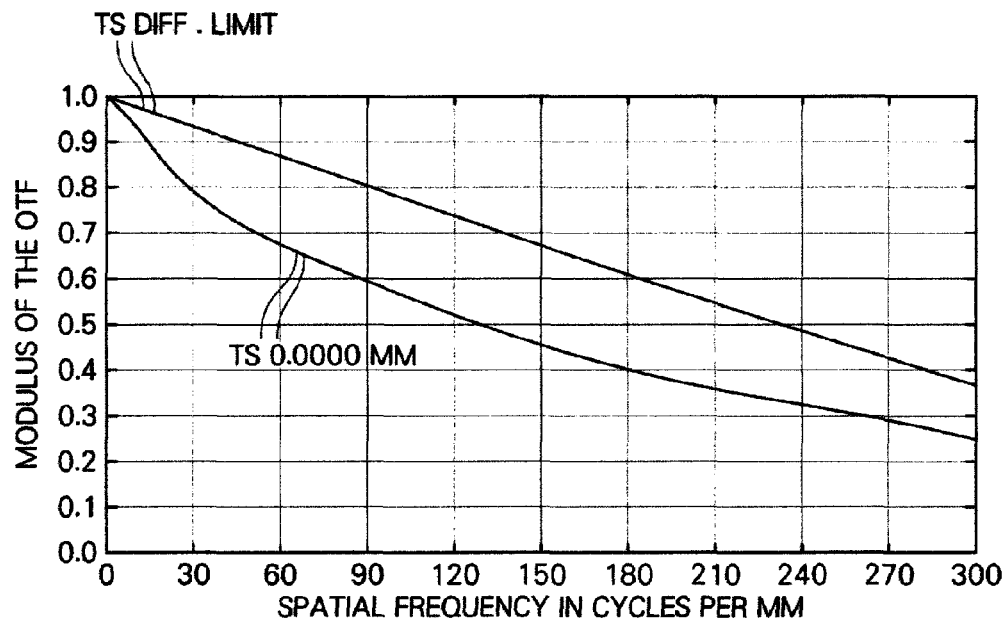
Figure 12G:
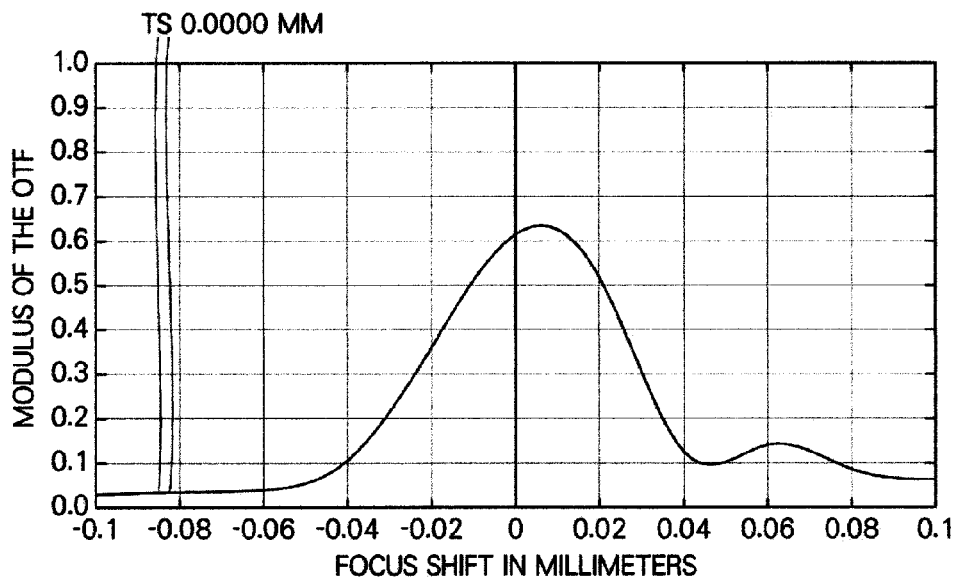
Figure 12H:
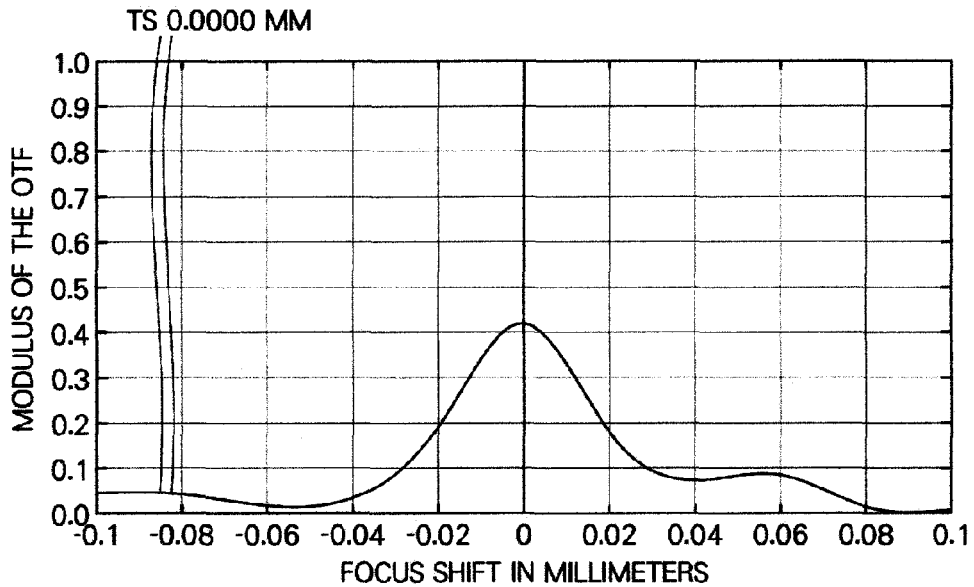
Figure 12I:
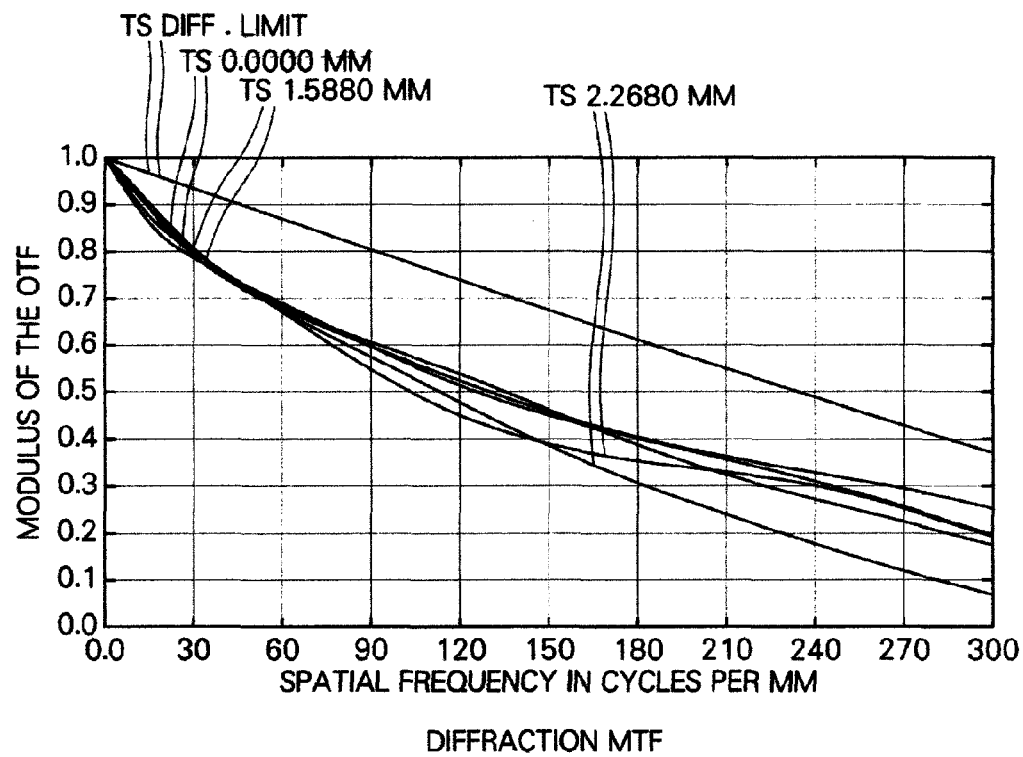
Figure 12J:
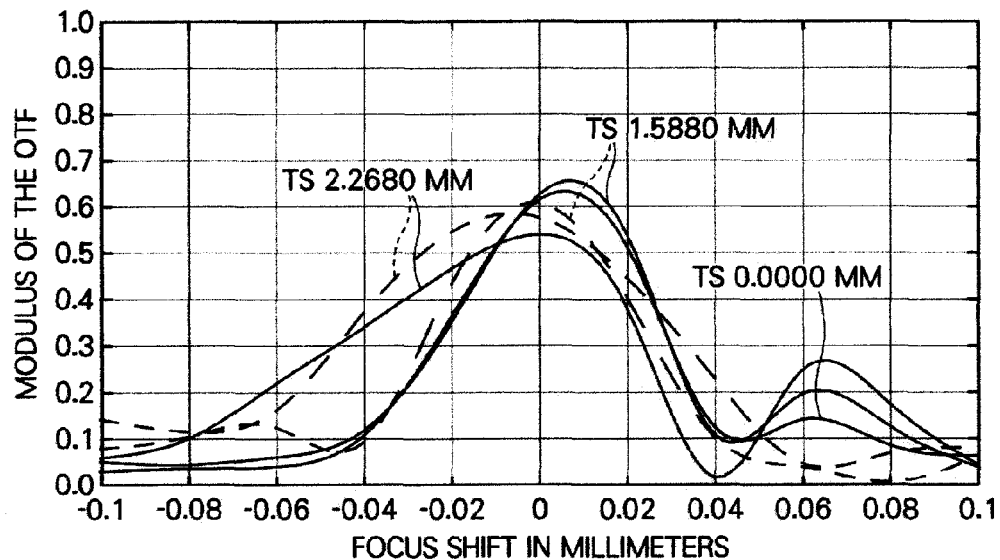
Figure 12K:
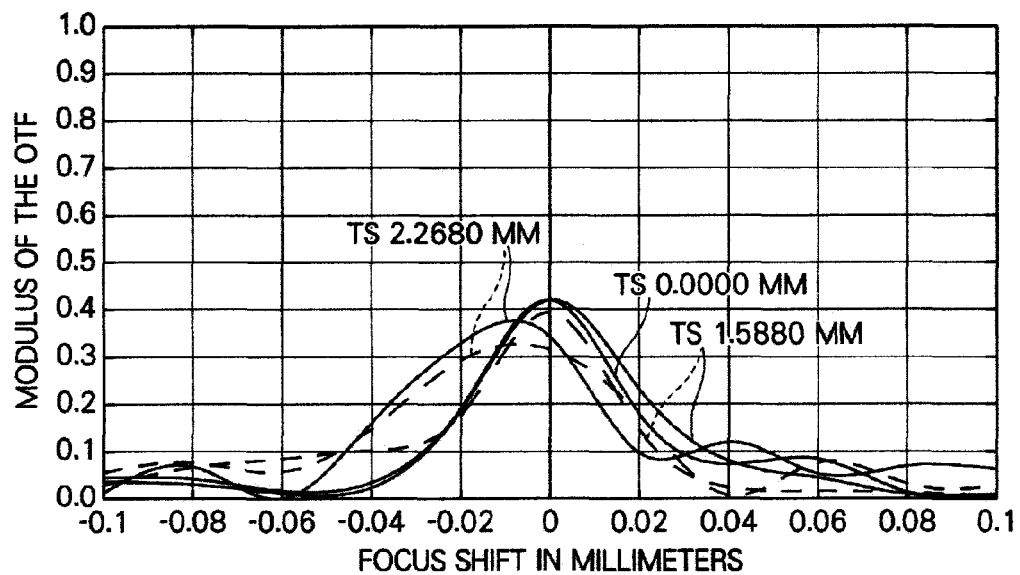
Figure 12L:
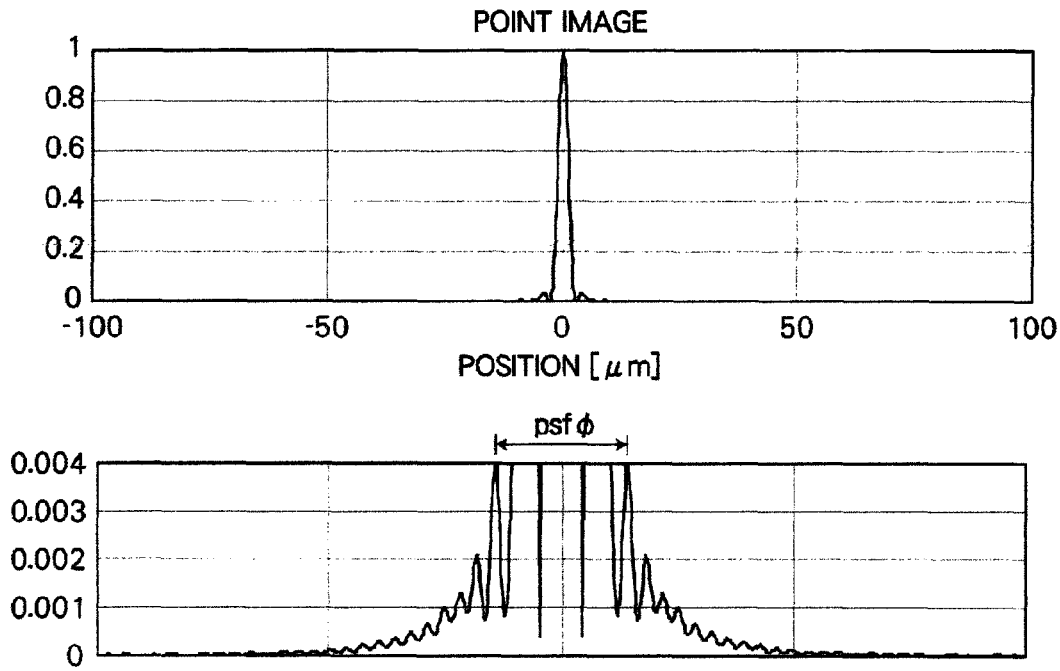
Figure 12M:
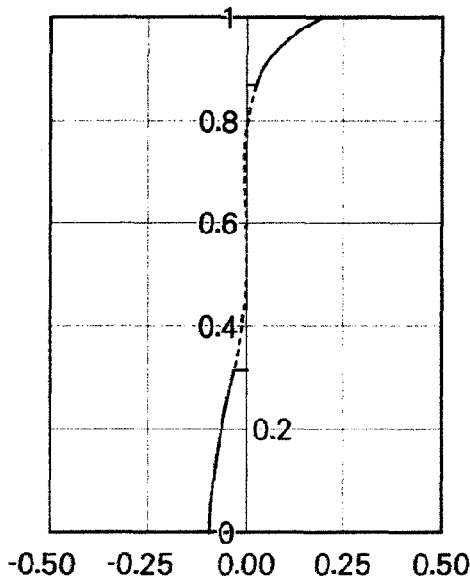
Figure 12N:
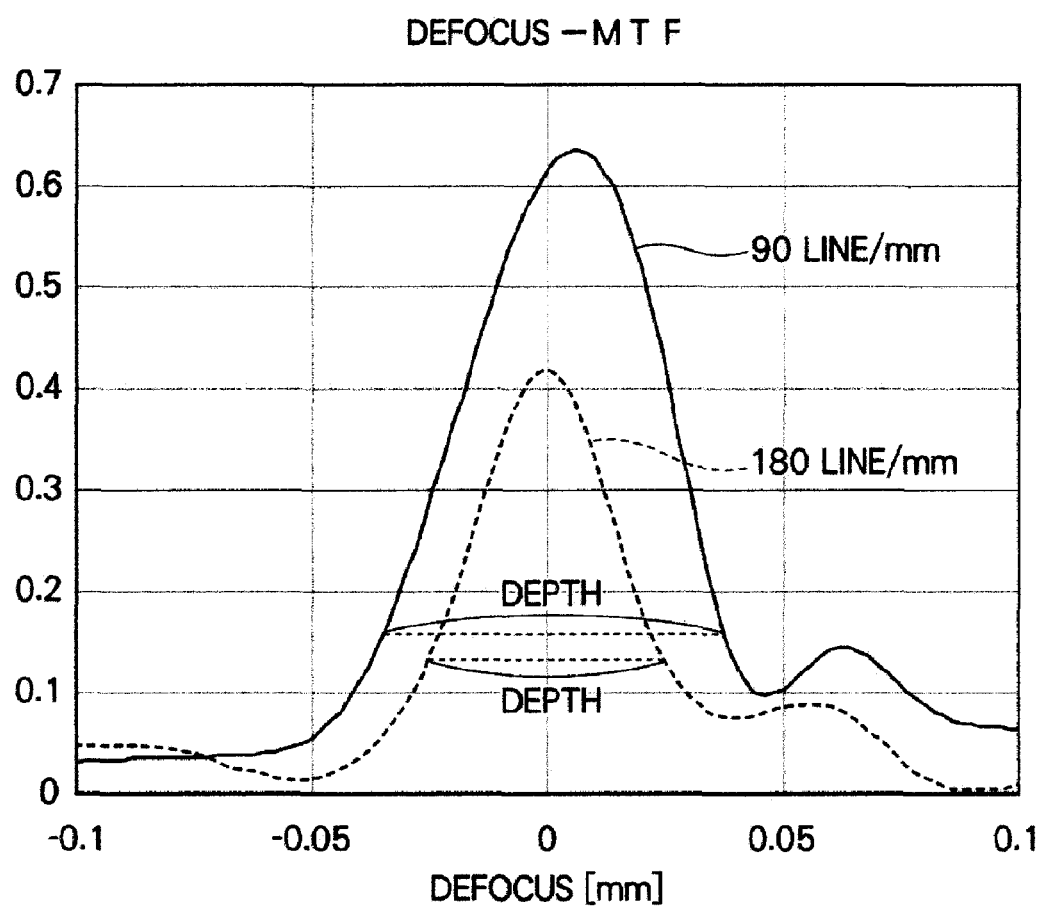

FIGS. 12A through 12N and Tables 8A, 8B show data related to the imaging lens of Example 8.

FIGS. 13A through 13N and Tables 9A, 9B show data related to the imaging lens of Example 9.

FIGS. 14A through 14N and Tables 10A, 10B show data related to the imaging lens of Example 10.

FIGS. 15A through 15N and Tables 11A, 11B show data related to the imaging lens of Example 11.

FIGS. 16A through 16N and Tables 12A, 12B show data related to the imaging lens of Example 12.

FIGS. 17A through 17N and Tables 13A, 13B show data related to the imaging lens of Example 13.

FIGS. 18A through 18N and Tables 14A, 14B show data related to the imaging lens of Example 14.

FIGS. 19A through 19N and Tables 15A, 15B show data related to the imaging lens of Example 15.

FIGS. 20A through 20N and Tables 16A, 163 show data related to the imaging lens of Example 16.

FIGS. 21A through 21N and Tables 17A, 17B show data related to the imaging lens of Example 17.

FIGS. 22A through 22N and Tables 18A, 18B show data related to the imaging lens of Example 18.

FIGS. 23A through 23N and Tables 19, 19B show data related to the imaging lens of Example 19.

FIG. 24 is a diagram illustrating base point image diameter (psfφ) and depth (extended focal depth, and reference focal depth) of the imaging lenses of Examples 1 through 19 together.

Tables 1A, 1B show basic data for designing the lens of Example 1.

Tables 2A, 2B show basic data for designing the lens of Example 2.

Tables 3A, 3B show basic data for designing the lens of Example 3.

Tables 4A, 4B show basic data for designing the lens of Example 4.

Tables 5A, 5B show basic data for designing the lens of Example 5.

Tables 6A, 6B show basic data for designing the lens of Example 6.

Tables 7A, 7B show basic data for designing the lens of Example 7.

Tables 8A, 8B show basic data for designing the lens of Example 8.

Tables 9A, 9B show basic data for designing the lens of Example 9.

Tables 10A, 10B show basic data for designing the lens of Example 10.

Tables 11A, 11B show basic data for designing the lens of Example 11.

Tables 12A, 12B show basic data for designing the lens of Example 12.

Tables 13A, 13B show basic data for designing the lens of Example 13.

Tables 14A, 14B show basic data for designing the lens of Example 14.

Tables 15A, 15B show basic data for designing the lens of Example 15.

Tables 16A, 16B show basic data for designing the lens of Example 16

Tables 17A, 17B show basic data for designing the lens of Example 17.

Tables 18A, 18B show basic data for designing the lens of Example 18.

Tables 19A, 19B show basic data for designing the lens of Example 19.

Table 20A shows spherical aberrations and data about point images formed through the imaging lenses of Examples 1 through 19 together.

Table 20B shows data about depth and depth MTF of the imaging lenses of Examples 1 through 19 together.

<Explanation of Tables 1A Through 19A>

In the lens data about the imaging lenses of Examples 1 through 19, shown in Tables 1A through 19A, the surface numbers of optical members, such as a lens, sequentially increase from the object side toward the image side. The surface number of the i-th surface is i (i=1, 2, 3, ...). The lens data include the surface number of the aperture stop (i=1), the surface numbers of an object-side surface and an image-side surface of a cover glass, which is a parallel flat plate (i=10, 11), the surface number of an imaging plane (i=12), and the like.

In Tables 1A, 2A, ... 19A, the sign "Ri" represents the paraxial curvature radius of the i-th surface. The sign "Di" represents an interval between the i-th surface and (i+1)-th surface on optical axis Z1. Further, sign "Ri" in the lens data corresponds to sign "Ri" representing the lens surface in FIGS. 5A, 6A, ... 23A.

Further, the sign "Ndj" in Tables 1A, 2A, ... 11A represents the refractive index of a j-th optical element with respect to d-line (wavelength is 587.6 nm). The number "j" of the optical element sequentially increases from the object side toward the image side. Further, the sign "vdj" represents the Abbe number of the j-th optical element for d-line.

In the imaging lenses of Examples 1 through 19, the design base wavelength is 546.1 nm.

Further, at the bottom of Tables 1A through 19A, the focal length and the F-number of the imaging lenses of Examples 1 through 19 are provided.

The paraxial curvature radius, surface interval, and focal length are expressed by the unit of mm. The paraxial curvature radius is positive when an object-side surface is convex. The paraxial curvature radius is negative when an image-side surface is convex.

<Explanations of Tables 1B Through 19B>

Tables 1B through 19B show values of coefficients K, A3, A4, A5, ... of an aspheric equation representing aspheric surface Ri constituting each of imaging lenses of Examples 1 through 19.

The aspheric surface of each of the imaging lenses is defined by the following equation:

$$Z = \frac{Y^2/R}{1 + \left(1 - \frac{(1+K)Y^2}{R^2}\right)^{1/2}} + \sum_{i=3}^{n} Ai Y^i, \quad \text{[Equation 1]}$$

where

Y: height (distance from optical axis) (mm),
R: paraxial curvature radius (mm),
Ai: aspheric coefficients (i=3 through n), and
K: conic constant.

<Explanation of FIGS. 5A Through 23A>

FIGS. 5A through 23A are schematic diagrams illustrating cross-sections of imaging lenses of Examples 1 through 19. In each of FIGS. 5A through 23A, optical paths of rays entering imaging planes at three different incident heights (three kinds of height), and the like are illustrated.

Further, signs "R1", "R2", ... represent the following composition elements. "R1" represents an aperture stop (stop). "R2" and "R3" represent an object-side lens surface of first lens L1 and an image-side lens surface of the first lens L1, respectively. "R4" and "R5" represent an object-side lens surface of second lens L2 and an image-side lens surface of the second lens L2, respectively. "R6" and "R7" represent an object-side lens surface of third lens L3 and an image-side lens surface of the third lens L3, respectively. "R8" and "R9" represent an object-side lens surface of fourth lens L4 and an image-side lens surface of the fourth lens L4, respectively. "R10" and "R11" represent an object-side surface of a cover glass that is fifth lens L5 and an image-side surface of the cover glass, respectively. "R12" represents an imaging plane.

<Explanation of FIGS. 5B Through 23B>

FIGS. 5B through 23B are diagrams illustrating spherical aberrations of the imaging lenses of Examples 1 through 19, respectively.

<Explanation of FIGS. 5C Through 23C>

FIGS. 5C through 23C are diagrams illustrating aberrations at design base wavelength (546.1 nm) of the imaging lenses of Examples 1 through 19, respectively. In FIGS. 5C through 23C, astigmatism and distortion are illustrated on the left side and on the right side, respectively.

<Explanation of FIGS. 5D Through 23D>

FIGS. 5D through 23D are diagrams illustrating coma aberrations at design base wavelength of the imaging lenses of Examples 1 through 19, respectively.

<Explanation of FIGS. 5E Through 23E>

FIGS. 5E through 23E are spot diagrams at design base wavelength of the imaging lenses of Examples 1 through 19, respectively. FIGS. 5E through 23E illustrate changes of spots formed at respective positions on an imaging plane through the imaging lenses at the time of defocusing (the spots are formed by rays entering the imaging plane at three different incident heights). Here, the shape of spots formed on the imaging plane when the imaging plane is moved parallel, in the direction of optical axis Z1, by −100 μm, −50 μm, ±0 μm, +50 μm, and +100 μm are illustrated as defocus amounts.

<Explanation of FIGS. 5F Through 23F>

FIGS. 5F through 23F are diagrams illustrating spatial frequency MTF characteristics at design base wavelength of the imaging lenses of Examples 1 through 19, respectively. FIGS. 5F through 23F illustrate spatial frequency MTF characteristics for optical images formed on the optical axis (image height is 0) through the imaging lenses, respectively.

<Explanation of FIGS. 5G Through 23G>

FIGS. 5G through 23G are diagrams illustrating depth (defocus) MTF characteristics at design base wavelength of the imaging lenses of Examples 1 through 19, respectively. FIGS. 5G through 23G illustrate depth (defocus) MTF characteristics for optical images formed on the optical axis (image height is 0) through the imaging lenses, respectively, at 90 line/mm at the time of defocusing.

<Explanation of FIGS. 5H Through 23H>

FIGS. 5H through 23H are diagrams illustrating depth (defocus) MTF characteristics at design base wavelength of the imaging lenses of Examples 1 through 19, respectively. FIGS. 5H through 23H illustrate depth (defocus) MTF characteristics for optical images formed on the optical axis (image height is 0) through the imaging lenses, respectively, at 179 line/mm at the time of defocusing.

<Explanation of FIGS. 5I Through 23I>

FIGS. 5I through 23I are diagrams illustrating spatial frequency MTF characteristics at design base wavelength of the imaging lenses of Examples 1 through 19, respectively. FIGS. 5I through 23I illustrate the spatial frequency MTF characteristics for images (formed by rays entering the imaging plane at three different incident heights).

<Explanation of FIGS. 5J Through 23J>

FIGS. 5J through 23J are diagrams illustrating depth (defocus) MTF characteristics at design base wavelength of the imaging lenses of Examples 1 through 19, respectively. FIGS. 5J through 23J illustrate depth (defocus) MTF characteristics for images (formed by rays entering the imaging plane at three different incident heights) formed at respective positions on the imaging plane through the imaging lenses, respectively, at 90 line/mm at the time of defocusing.

<Explanation of FIGS. 5K Through 23K>

FIGS. 5K through 23K are diagrams illustrating depth (defocus) MTF characteristics at design base wavelength of the imaging lenses of Examples 1 through 19, respectively. FIGS. 5K through 23K illustrate depth (defocus) MTF characteristics for images formed at respective positions on the imaging plane through the imaging lenses, respectively, at 179 line/mm at the time of defocusing.

<Explanation of FIGS. 5L Through 23L>

FIGS. 5L through 23L are diagrams illustrating intensity distribution of point images, at design base wavelength, formed through the imaging lenses of Examples 1 through 19, respectively. In FIGS. 5L through 23L, the entire intensity distribution of a point image formed on the imaging plane and a base point image diameter (psfφ) in enlarged intensity distribution of the point image are illustrated on the upper side and the lower side, respectively.

<Explanation of FIGS. 5M Through 23M>

FIGS. 5M through 23M are diagrams illustrating spherical aberration curves of the imaging lenses of Examples 1 through 19 at design base wavelength, respectively. In FIGS. 5M through 23M, spherical aberration minimum region c, in which the spherical aberration is constant even if the incident height at which a ray enters the pupil varies, is indicated by a broken line. A region other than the spherical aberration minimum region c is indicated by a solid line. In the region other than the spherical aberration minimum region c, the spherical aberration changes when the incident height at which a ray enters the pupil differs.

<Explanation of FIGS. 5N Through 23N>

FIGS. 5N through 23N are diagrams illustrating comparison between depth (defocus) MTF characteristics at 90 line/mm and depth (defocus) MTF characteristics at 180 line/mm at design base wavelengths of the imaging lenses of Examples 1 through 19, respectively. In FIGS. 5N through 23N, depth (defocus) MTF characteristics at 90 line/mm is indicated by a solid line, and depth (defocus) MTF characteristics at 180 line/mm is indicated by a broken line.

The depth indicated in each of FIGS. 5N through 23N is set in such a manner to correspond to the value of base response, which will be described later. For example, in FIG. 5N, which is related to Example 1, the depth at 90 line/mm may be obtained as a defocus range (which is obtained from a depth MTF curve at 90 line/mm) in which the MTF value is 0.2 (20% of the base response value).

Further, for example, in FIG. 6N, which is related to Example 2, the depth at 90 line/mm may be obtained as a defocus range (which is obtained from a depth MTF curve at 90 line/mm) in which the MTF value is 0.171 (17.1% of the base response value).

<Explanation of Table 20A>

Table 20A shows data about the focal length, F-number, point image, spherical aberration, and spherical aberration minimum region of the imaging lenses of Examples 1 through 19 together.

In the column "Point Image" of Table 20A, pixel number corresponding to psfφ is a value obtained by dividing the value of psfφ by the size of a pixel (approximately 1.4 μm). The pixel number corresponding to psfφ represents the number of pixels arranged within base point image diameter psfφ. Further, psfφ/Fa is a normalized value obtained by dividing the value of psfφ by F-number.

In the column "Spherical Aberration" of Table 20A, "a" represents the size (value) of spherical aberration from the image plane base position toward the object point side with respect to spherical aberration affecting a ray entering a central part of the pupil of the imaging lens (maximum spherical aberration). Further, "b" represents the sum of the maximum spherical aberration from the image plane base position toward the object point side and a maximum spherical aberration from the image plane base position toward a side opposite to the object point side. Further, "a/f" and "b/f" are normalized values obtained by dividing the value of "a" and the value of "b" by focal length f.

The central part of the pupil of the imaging lens is a part of the pupil, and the central part has spherical aberration only on the object point side of the image plane base position. The central part of the pupil includes a region in the vicinity of the optical axis of the imaging lens (paraxial region). In other words, the central part of the pupil of the imaging lens is a region of the pupil, and in the region, the spherical aberration of the imaging lens is only on the object point side of the image plane base position. The central part of the pupil is a continuous region including a region on the optical axis.

In the column "Spherical Aberration Constant Region" of Table 20A, tz represents a range of focal depth ±0.03 mm, which is regarded as not being substantially affected by spherical aberration in an ordinary image formation optical system, in which an optical image of a subject is formed on an imaging plane in such a manner that various aberrations are suppressed. Further, Yu(max) is the height of an upper edge of the spherical aberration constant region from the optical axis. Further, Yu(min) is the height of a lower edge of the spherical aberration constant region from the optical axis.

In the column "Spherical Aberration Constant Region" of Table 20A, "c" represents a deviation (shift amount) of spherical aberration from the image plane base position. Further, "die" represents a ratio of the area of the spherical aberration constant region to the area of the entire pupil.

In the column "Spherical Aberration" and the column "Spherical Aberration Constant Region" of Table 20A, data about Example 17 are omitted. In Example 17, the direction of spherical aberration generated as the incident height of rays entering the pupil increases is different from the direction of spherical aberration generated in other examples. Therefore, it is worthless to provide such data, and the data are omitted.

<Explanation of Table 20B>

Table 20B shows data about depth and depth (defocus) MTF of the imaging lenses of Examples 1 through 19 together.

The peak response presented in Table 20B corresponds to the peak value of the value of depth MTF.

Further, the base response presented in Table 20B is set in such a manner to correspond to the response value 0.818 and the base response value 20% in the imaging lens of Example 1. The imaging lens of Example 1 is constituted of an image formation optical system that is designed to reduce aberrations as much as possible. For example, the response of the imaging lens of Example 2 is 0.702, and the value of the base response is 17.1%. The value of the base response of Example 2 may be obtained by using the values of Example 1 as follows:

Value of Base Response of Example 2 (17.1%)=(Value of Response of Example 2 (0.702)/Value of Response of Example 1 (0.818))×Value of Base Response of Example 1 (20%).

Further, the extended focal depth presented in Table 20B is focal depth corresponding to the base response of the imaging lens at each spatial frequency. The base response is the value of the MTF of an original image when the value of MTF can be increased to 0.2 or greater by performing contrast recovery processing on the original image obtained through the imaging lens.

The common extended focal depth presented in Table 20B is a region in which the extended focal depth at a spatial frequency corresponding to 90 line/mm and the extended focal depth at a spatial frequency corresponding to 179 line/mm overlap each other.

Further, the normalized extended focal depth presented in Table 20B is obtained by normalizing the extended focal depth by using effective F-number Fa and focal length f. Further, the normalized common extended focal depth is obtained by normalizing the common extended focal depth by using effective F-number Fa and focal length f.

Explanation of other items of Table 20B will be omitted, because they have been described already.

The present invention is not limited the embodiments and the examples, and various modifications are possible.

TABLE 1A

Lens data of Example 1

| SURFACE NUMBER | SURFACE TYPE | Ri | Di | Ndi | vdj |
|---|---|---|---|---|---|
| OBJECT PLANE | STANDARD | ∞ | 3000.070 | | |
| 1 (APERTURE STOP) | STANDARD | ∞ | −0.070 | | |
| 2 | XOSPHERE | 1.497 | 0.699 | 1.53391 | 55.9 |
| 3 | XOSPHERE | −11.059 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.473 | | |
| 12 (IMAGE PLANE) | STANDARD | ∞ | | | |

| FOCAL LENGTH | 3.736 |
|---|---|
| F-NUMBER | 2.87 |

TABLE 1B

Aspheric Coefficients of Example 1

| SURFACE NUMBER | CONIC CONSTANT K | A3 | A4 | A5 | A6 |
|---|---|---|---|---|---|
| 2 | −0.519140 | −1.647619E−02 | 9.306103E−02 | −1.463554E−01 | −1.189368E−01 |
| 3 | −100.000000 | 9.045281E−04 | −7.247797E−02 | 5.011248E−02 | −7.513890E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 4.932119E−01 | −4.411616E−01 | 1.384831E−01 | 1.559769E−01 | −6.430340E−02 |
| 3 | 8.711940E−02 | −4.044638E−01 | 6.077719E−01 | −3.280371E−01 | 6.560197E−03 |
| 4 | −4.778490E−01 | −1.755639E−01 | 1.290701E+00 | −7.594194E−01 | |

TABLE 1B-continued

Aspheric Coefficients of Example 1

| | | | | |
|---|---|---|---|---|
| 5 | −1.771676E−01 | 2.802425E−01 | 4.844266E−01 | −3.832647E−01 |
| 6 | −3.439371E−01 | −5.983698E−02 | 3.445256E−01 | −1.773895E−01 |
| 7 | −5.828771E−02 | 2.714480E−02 | 4.947630E−02 | −2.849486E−02 |
| 8 | 4.698633E−02 | −1.365640E−02 | −8.582814E−03 | 5.812724E−04 |
| 9 | −6.322718E−02 | 9.844054E−03 | 9.216297E−03 | −3.390525E−03 |

| SURFACE NUMBER | A12 | A13 | A14 | A15 | A16 |
|---|---|---|---|---|---|
| 2 | −2.295471E−01 | −3.678251E−01 | −3.494506E−01 | 1.047597E−01 | 1.407367E+00 |
| 3 | 1.086920E−01 | 2.230539E−01 | 2.612986E−01 | 4.849794E−02 | −7.288709E−01 |
| 4 | | | | | |
| 5 | | | | | |
| 6 | | | | | |
| 7 | | | | | |
| 8 | | | | | |
| 9 | | | | | |

TABLE 2A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.446 | 0.699 | 1.53391 | 55.9 |
| 3 | XOSPHERE | −11.744 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.458 | | |
| IMAGE PLANE | STANDARD | ∞ | | | |

| | |
|---|---|
| FOCAL LENGTH | 3.513 |
| F-NUMBER | 2.70 |

TABLE 2B

| SURFACE NUMBER | CONIC CONSTANT K | A3 | A4 | A5 | A6 |
|---|---|---|---|---|---|
| 2 | −2.838351 | −1.050006E−02 | 7.096682E−02 | −1.131028E−02 | 1.803912E−02 |
| 3 | 158.021500 | 7.201660E−03 | 4.108667E−02 | −1.765300E−01 | −1.050453E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.483953E−01 | −6.690360E−01 | −2.335954E−01 | −2.600855E−02 | −6.322625E−02 |
| 3 | 3.250046E−01 | −2.834693E−02 | 7.350327E−01 | −8.560305E−01 | −7.135803E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −1.167167E−01 | 1.542833E−01 | 1.092156E+00 | 6.358749E−01 | 4.359731E−01 |
| 3 | −8.796575E−01 | 7.584960E−01 | 2.189361E−01 | 5.442891E+00 | 4.723506E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.650114E+00 | −1.756090E−01 | 8.712876E+00 | −1.125222E+01 |
| 3 | −4.413142E+00 | −2.183821E+01 | −3.969440E+00 | 2.471950E+01 |

TABLE 3A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.433 | 0.699 | 1.53391 | 55.9 |
| 3 | XOSPHERE | −13.384 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.462 | | |
| IMAGE PLANE | STANDARD | ∞ | | | |
| FOCAL LENGTH | 3.530 | | | | |
| F-NUMBER | 2.71 | | | | |

TABLE 4A

| SURFACE NUMBER | SURFACE TYPE | Ri | Di | Ndj | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.432 | 0.699 | 1.53391 | 55.9 |
| 3 | XOSPHERE | −13.306 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.481 | | |
| IMAGE PLANE | STANDARD | ∞ | | | |
| FOCAL LENGTH | 3.523 | | | | |
| F-NUMBER | 2.71 | | | | |

TABLE 3B

| SURFACE NUMBER | CONIC CONSTANT K | A3 | A4 | A5 | A6 |
|---|---|---|---|---|---|
| 2 | −2.952623 | −5.201957E−03 | 7.035029E−02 | −1.039990E−02 | 2.155419E−02 |
| 3 | 127.291100 | 9.410459E−03 | 3.642716E−02 | −1.822658E−01 | −1.105947E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.522083E−01 | −6.572401E−01 | −2.179098E−01 | −2.128230E−02 | −1.006675E−01 |
| 3 | 3.272468E−01 | −1.197617E−02 | 7.978892E−01 | −7.561016E−01 | −6.376798E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −2.800402E−01 | 5.469930E−03 | 9.876225E−01 | 7.058160E−01 | 6.576170E−01 |
| 3 | −1.071855E+00 | 3.904822E−01 | −3.481896E−01 | 4.825778E+00 | 4.829302E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −1.912388E+00 | 4.888517E−01 | 8.951105E+00 | −1.041522E+01 |
| 3 | −3.460171E+00 | −2.102166E+01 | −2.976892E+00 | 2.595602E+01 |

TABLE 4B

| SURFACE NUMBER | CONIC CONSTANT K | A3 | A4 | A5 | A6 |
|---|---|---|---|---|---|
| 2 | −2.984257 | −4.594622E−03 | 6.978479E−02 | −1.116530E−02 | 2.065082E−02 |
| 3 | 130.569200 | 1.374835E−02 | 3.897508E−02 | −1.819910E−01 | −1.137501E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.500693E−01 | −6.585136E−01 | −2.210130E−01 | −2.551125E−02 | −1.103944E−01 |
| 3 | 3.189041E−01 | −2.741018E−02 | 7.746225E−01 | −7.791567E−01 | −6.557072E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−01 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −2.894761E−01 | −1.850698E−03 | 9.628579E−01 | 6.594687E−01 | 6.340563E−01 |
| 3 | −1.081600E+00 | 4.151566E−01 | −2.412129E−01 | 5.016767E+00 | 5.095121E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −1.913964E+00 | 4.500755E−01 | 9.233771E+00 | −9.865228E+00 |
| 3 | −3.244277E+00 | −2.099681E+01 | −3.503384E+00 | 2.428457E+01 |

TABLE 5A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.433 | 0.699 | 1.53391 | 55.9 |
| 3 | XOSPHERE | −13.263 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.485 | | |
| IMAGE PLANE | STANDARD | ∞ | | | |

| FOCAL LENGTH | 3.524 |
|---|---|
| F-NUMBER | 2.71 |

TABLE 5B

| SURFACE NUMBER | CONIC CONSTANT K | A3 | A4 | A5 | A6 |
|---|---|---|---|---|---|
| 2 | −2.993370 | −0.005074 | 0.069712 | −0.011199 | 0.020787 |
| 3 | 132.046200 | 0.013981 | 0.038796 | −0.182548 | −0.114713 |
| 4 | −50.045820 | −0.015848 | 0.014805 | −0.080517 | 0.264205 |
| 5 | −3.832904 | 0.032105 | −0.121826 | 0.500346 | −0.458560 |
| 6 | −11.001000 | −0.007255 | −0.103188 | 0.102078 | 0.188567 |
| 7 | −89.176030 | −0.339485 | 0.057276 | 0.217990 | −0.082546 |
| 8 | −100.000000 | −0.271755 | −0.059073 | −0.021668 | 0.061122 |
| 9 | −13.031300 | −0.108380 | 0.000873 | −0.047064 | 0.085218 |

| SURFACE NUMBER | A7 | A8 | A9 | A10 | A11 |
|---|---|---|---|---|---|
| 2 | 0.550088 | −0.658232 | −2.207996E−01 | −2.523037E−02 | −1.115243E−01 |
| 3 | 0.317371 | −0.028855 | 7.743097E−01 | −7.792266E−01 | −6.468620E−01 |
| 4 | −0.477849 | −0.175564 | 1.290701E+00 | −7.594194E−01 | |
| 5 | −0.177168 | 0.280242 | 4.844266E−01 | −3.832647E−01 | |
| 6 | −0.343937 | −0.059837 | 3.445256E−01 | −1.773895E−01 | |
| 7 | −0.058288 | 0.027145 | 4.947630E−02 | −2.849486E−02 | |

TABLE 5B-continued

| | | | | |
|---|---|---|---|---|
| 8 | 0.046986 | −0.013656 | −8.582814E−03 | 5.812724E−04 |
| 9 | −0.063227 | 0.009844 | 9.216297E−03 | −3.390525E−03 |

| SURFACE NUMBER | A12 | A13 | A14 | A15 | A16 |
|---|---|---|---|---|---|
| 2 | −2.936344E−01 | −6.906236E−03 | 9.572052E−01 | 6.449900E−01 | 6.329912E−01 |
| 3 | −1.064679E+00 | 4.441456E−01 | −2.160621E−01 | 5.017512E+00 | 5.036003E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −1.908007E+00 | 4.795069E−01 | 9.266239E+00 | −9.620876E+00 |
| 3 | −3.397421E+00 | −2.110049E+01 | −3.387615E+00 | 2.438657E+01 |

TABLE 6A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.439 | 0.699 | 1.53391 | 55.9 |
| 3 | XOSPHERE | −12.491 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.487 | | |
| IMAGE PLANE | STANDARD | ∞ | | | |

| FOCAL LENGTH | 3.520 |
|---|---|
| F-NUMBER | 2.70 |

TABLE 6B

| SURFACE NUMBER | CONIC CONSTANT K | A3 | A4 | A5 | A6 |
|---|---|---|---|---|---|
| 2 | −3.069342 | −5.519856E−03 | 6.687894E−02 | −1.189973E−02 | 2.524698E−02 |
| 3 | 89.677600 | 1.019017E−02 | 4.407791E−02 | −1.750626E−01 | −1.306240E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.580849E−01 | −6.441161E−01 | −2.183555E−01 | −3.853194E−02 | −1.356457E−01 |
| 3 | 3.073201E−01 | −7.580566E−02 | 7.455285E−01 | −7.345664E−01 | −6.423180E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−01 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −2.629906E−01 | −9.568707E−02 | 6.907749E−01 | 2.824790E−01 | 1.433095E−01 |
| 3 | −8.194128E−01 | 1.536436E+00 | −1.168498E+00 | 4.502744E+00 | 2.893315E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.12240E+00 | 9.30140E−01 | 1.12007E+01 | −5.11628E+00 |
| 3 | −7.17688E−01 | −2.32083E+01 | −4.59270E+00 | 2.85058E+01 |

TABLE 7A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.444 | 0.699 | 1.53391 | 55.9 |
| 3 | XOSPHERE | −12.668 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.457 | | |
| IMAGE PLANE | STANDARD | ∞ | | | |

| FOCAL LENGTH | 3.554 |
|---|---|
| F-NUMBER | 2.73 |

TABLE 8A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.443 | 0.699 | 1.53391 | 55.9 |
| 3 | XOSPHERE | −12.886 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.456 | | |
| IMAGE PLANE | STANDARD | ∞ | | | |

| FOCAL LENGTH | 3.562 |
|---|---|
| F-NUMBER | 2.74 |

TABLE 7B

| SURFACE NUMBER | CONIC CONSTANT K | A3 | A4 | A5 | A6 |
|---|---|---|---|---|---|
| 2 | −2.743232 | −7.47622E−03 | 7.22733E−02 | −1.36754E−02 | 1.06637E−02 |
| 3 | 207.634000 | 3.60320E−04 | 4.30030E−02 | −1.55741E−01 | −8.15058E−02 |
| 4 | −50.045820 | −1.58477E−02 | 1.48050E−02 | −8.05171E−02 | 2.64205E−01 |
| 5 | −3.832904 | 3.21047E−02 | −1.21826E−01 | 5.00346E−01 | −4.58560E−01 |
| 6 | −11.001000 | −7.25475E−03 | −1.03188E−01 | 1.02078E−01 | 1.88567E−01 |
| 7 | −89.176030 | −3.39485E−01 | 5.72765E−02 | 2.17990E−01 | −8.25457E−02 |
| 8 | −100.000000 | −2.71755E−01 | −5.90727E−02 | −2.16683E−02 | 6.11219E−02 |
| 9 | −13.031300 | −1.08380E−01 | 8.72770E−04 | −4.70644E−02 | 8.52184E−02 |

| SURFACE NUMBER | A7 | A8 | A9 | A10 | A11 |
|---|---|---|---|---|---|
| 2 | 5.37385E−01 | −6.80588E−01 | −2.334281E−01 | −3.351223E−02 | 2.619616E−02 |
| 3 | 3.21015E−01 | −4.32388E−02 | 6.164900E−01 | −9.161433E−01 | −6.297210E−01 |
| 4 | −4.77849E−01 | −1.75564E−01 | 1.290701E+00 | −7.594194E−01 | |
| 5 | −1.77168E−01 | 2.80242E−01 | 4.844266E−01 | −3.832647E−01 | |
| 6 | −3.43937E−01 | −5.98370E−02 | 3.445256E−01 | −1.773895E−01 | |
| 7 | −5.82877E−02 | 2.71448E−02 | 4.947630E−02 | −2.849486E−02 | |
| 8 | 4.69863E−02 | −1.36564E−02 | −8.582814E−03 | 5.812724E−04 | |
| 9 | −6.32272E−02 | 9.84405E−03 | 9.216297E−03 | −3.390525E−03 | |

| SURFACE NUMBER | A12 | A13 | A14 | A15 | A16 |
|---|---|---|---|---|---|
| 2 | −5.257967E−02 | 1.822445E−01 | 1.131414E+00 | 7.025891E−01 | 5.798942E−01 |
| 3 | −9.739039E−01 | 3.362140E−01 | 1.221502E+00 | 5.472493E+00 | 5.427446E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.407210E+00 | −8.826059E−01 | 5.303071E+00 | −8.571162E+00 |
| 3 | −2.120788E+00 | −2.288577E+01 | −7.112253E+00 | 2.321990E+01 |

TABLE 8B

| SURFACE NUMBER | CONIC CONSTANT K | A3 | A4 | A5 | A6 |
|---|---|---|---|---|---|
| 2 | −2.729023 | −7.221608E−03 | 7.259968E−02 | −1.350287E−02 | 1.071124E−02 |
| 3 | 100.039800 | −1.176599E−03 | 4.011945E−02 | −1.586207E−01 | −8.327067E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.375736E−01 | −6.798077E−01 | −2.310863E−01 | −2.931131E−02 | 3.168883E−02 |
| 3 | 3.202195E−01 | −4.447500E−02 | 6.131530E−01 | −9.228978E−01 | −6.409945E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −4.752087E−02 | 1.840106E−01 | 1.120722E+00 | 6.659455E−01 | 5.339104E−01 |
| 3 | −9.910911E−01 | 3.114223E−01 | 1.187226E+00 | 5.428819E+00 | 5.379186E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.456382E+00 | −9.730263E−01 | 5.236200E+00 | −8.493809E+00 |
| 3 | −2.160508E+00 | −2.290031E+01 | −6.953575E+00 | 2.356768E+01 |

TABLE 9A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.392 | 0.699 | 1.53391 | 55.9 |
| 3 | XOSPHERE | −16.886 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.424 | | |
| IMAGE PLANE | STANDARD | ∞ | | | |

| FOCAL LENGTH | 3.434 |
|---|---|
| F-NUMBER | 2.64 |

TABLE 9B

| SURFACE NUMBER | CONIC CONSTANT K | A3 | A4 | A5 | A6 |
|---|---|---|---|---|---|
| 2 | −2.826280 | −9.547897E−03 | 7.240991E−02 | −1.631433E−03 | 2.593862E−02 |
| 3 | 132.033300 | 7.708529E−03 | 4.111036E−02 | −1.727260E−01 | −1.010415E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254589E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.555777E−01 | −6.661841E−01 | −2.327477E−01 | −3.575911E−02 | −8.687495E−02 |
| 3 | 3.354706E−01 | −2.356357E−02 | 7.384523E−01 | −8.245143E−01 | −6.802962E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |

TABLE 9B-continued

| | | | | |
|---|---|---|---|---|
| 8 | 4.698633E−02 | −1.365640E−02 | −8.582814E−03 | 5.812724E−04 |
| 9 | −6.322718E−02 | 9.844054E−03 | 9.216297E−03 | −3.390525E−03 |

| SURFACE NUMBER | A12 | A13 | A14 | A15 | A16 |
|---|---|---|---|---|---|
| 2 | −1.772902E−01 | 1.266008E−01 | 1.031405E+00 | 5.585026E−01 | 4.270081E−01 |
| 3 | −9.366986E−01 | 7.013835E−01 | 1.175638E−01 | 5.296822E+00 | 4.547237E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.490004E+00 | 2.505742E−01 | 9.398150E+00 | −9.498178E+00 |
| 3 | −4.546500E+00 | −2.179672E+01 | −3.468904E+00 | 2.618700E+01 |

TABLE 10A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.442 | 0.699 | 1.53391 | 55.9 |
| 3 | XOSPHERE | −12.521 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.462 | | |
| IMAGE PLANE | STANDARD | ∞ | | | |

| FOCAL LENGTH | 3.537 |
|---|---|
| F-NUMBER | 2.72 |

TABLE 10B

| SURFACE NUMBER | CONIC CONSTANT K | A3 | A4 | A5 | A6 |
|---|---|---|---|---|---|
| 2 | −2.766333 | −7.848145E−03 | 7.177425E−02 | −1.371734E−02 | 1.161918E−02 |
| 3 | 202.261000 | 3.249408E−03 | 4.467578E−02 | −1.539322E−01 | −8.316056E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E+00 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.399368E−01 | −6.757562E−01 | −2.258238E−01 | −2.304045E−02 | 4.160634E−02 |
| 3 | 3.132270E−01 | −5.842341E−02 | 5.950895E−01 | −9.384416E−01 | −6.456894E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−01 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −3.465686E−02 | 2.074883E−01 | 1.194680E+00 | 7.502793E−01 | 6.331439E−01 |
| 3 | −9.475841E−01 | 4.279416E−01 | 1.412211E+00 | 5.779677E+00 | 5.861839E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.438961E+00 | −1.167764E+00 | 4.426986E+00 | −1.117275E+01 |
| 3 | −1.710214E+00 | −2.288773E+01 | −8.307003E+00 | 1.904740E+01 |

TABLE 11A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.371 | 0.699 | 1.53391 | 55.9 |
| 3 | XOSPHERE | −16.558 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.410 | | |
| IMAGE PLANE | STANDARD | ∞ | | | |
| FOCAL LENGTH | 3.317 | | | | |
| F-NUMBER | 2.55 | | | | |

TABLE 12A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.387 | 0.699 | 1.53391 | 55.9 |
| 3 | XOSPHERE | −11.209 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.427 | | |
| IMAGE PLANE | STANDARD | ∞ | | | |
| FOCAL LENGTH | 3.195 | | | | |
| F-NUMBER | 2.45 | | | | |

TABLE 11B

| SURFACE NUMBER | CONIC CONSTANT K | A3 | A4 | A5 | A6 |
|---|---|---|---|---|---|
| 2 | −2.678333 | −4.301206E−02 | 8.875756E−02 | 4.356626E−02 | 5.649190E−02 |
| 3 | 2.403799 | −7.806928E−03 | 3.835013E−02 | −1.343717E−01 | −6.910888E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.296938E−01 | −7.519841E−01 | −3.708048E−01 | −1.898690E−01 | −1.532139E−01 |
| 3 | 3.124733E−01 | −9.932326E−02 | 6.447077E−01 | −9.081794E−01 | −6.655147E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −8.126333E−02 | 4.934570E−01 | 1.674951E+00 | 1.607836E+00 | 1.720327E+00 |
| 3 | −8.030733E−01 | 1.112251E+00 | 6.921810E−01 | 5.345026E+00 | 4.543539E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −1.333191E+00 | 2.644944E−01 | 6.534176E+00 | −1.926220E+01 |
| 3 | −5.070813E+00 | −2.289157E+01 | −4.484521E+00 | 2.586094E+01 |

TABLE 12B

| SURFACE NUMBER | CONIC CONSTANT K | A3 | A4 | A5 | A6 |
|---|---|---|---|---|---|
| 2 | −3.029909 | −6.194664E−02 | 9.858018E−02 | 6.712772E−02 | 5.500259E−02 |
| 3 | 168.135200 | −1.276361E−03 | 3.839553E−02 | −1.487634E−01 | −8.204059E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.187436E−01 | −7.922766E−01 | −4.655932E−01 | −2.818860E−01 | −2.779236E−01 |
| 3 | 2.982338E−01 | −7.400853E−02 | 6.480960E−01 | −9.141945E−01 | −6.595409E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −1.532444E−01 | 8.951803E−01 | 2.205832E+00 | 2.444760E+00 | 4.012312E+00 |
| 3 | −7.752726E−01 | 1.308432E+00 | 8.034175E−01 | 5.575548E+00 | 4.768610E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −5.452657E−01 | 1.732042E+00 | −2.448975E−01 | −3.189946E+01 |
| 3 | −5.727168E+00 | −2.307244E+01 | −5.576540E+00 | 2.619418E+01 |

TABLE 13A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.438 | 0.699 | 1.53391 | 55.9 |
| 3 | XOSPHERE | −10.923 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.420 | | |
| IMAGE PLANE | STANDARD | ∞ | | | |

| FOCAL LENGTH | 3.421 |
|---|---|
| F-NUMBER | 2.63 |

TABLE 13B

| SURFACE NUMBER | CONIC CONSTANT K | A3 | A4 | A5 | A6 |
|---|---|---|---|---|---|
| 2 | −0.734282 | −3.060962E−02 | 7.852503E−02 | −1.189555E−01 | −6.889087E−02 |
| 3 | −101.376600 | 1.223468E−02 | −6.037721E−02 | 2.948306E−02 | −9.606406E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.375977E−01 | −4.376599E−01 | 7.258705E−02 | 8.561845E−02 | −2.371142E−01 |
| 3 | 9.574345E−02 | −3.716341E−01 | 6.852480E−01 | −1.719141E−01 | −6.363257E−03 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |

TABLE 13B-continued

| SURFACE NUMBER | | | | |
|---|---|---|---|---|
| 8 | 4.698633E−02 | −1.365640E−02 | −8.582814E−03 | 5.812724E−04 |
| 9 | −6.322718E−02 | 9.844054E−03 | 9.216297E−03 | −3.390525E−03 |

| SURFACE NUMBER | A12 | A13 | A14 | A15 | A16 |
|---|---|---|---|---|---|
| 2 | −5.691142E−01 | −8.996465E−01 | −1.490922E−01 | 1.406123E+00 | 2.419470E+00 |
| 3 | −1.105368E−01 | −3.601425E−02 | −3.048223E−02 | −2.875902E−02 | −2.945518E−01 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | 8.008008E−01 | −1.080043E+00 | 2.080544E+00 | −3.453004E+00 |
| 3 | −1.309023E+00 | 7.840745E−01 | 2.824679E+00 | −1.532602E+00 |

TABLE 14A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.393 | 0.699 | 1.53391 | 55.9 |
| 3 | XOSPHERE | −16.868 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.416 | | |
| IMAGE PLANE | STANDARD | ∞ | | | |

| FOCAL LENGTH | 3.440 |
|---|---|
| F-NUMBER | 2.64 |

TABLE 14B

| SURFACE NUMBER | CONIC CONSTANT K | A3 | A4 | A5 | A6 |
|---|---|---|---|---|---|
| 2 | −2.952275 | −1.364695E−03 | 6.865602E−02 | −2.472187E−02 | 2.202212E−02 |
| 3 | −105.775700 | 3.726599E−04 | 4.620287E−02 | −1.491688E−01 | −1.090835E−01 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.798662E−01 | −6.262240E−01 | −1.932366E−01 | −1.324135E−02 | −1.088123E−01 |
| 3 | 2.975500E−01 | −9.285148E−02 | 6.875464E−01 | −8.168969E−01 | −5.622819E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−01 | 2.714480E−01 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −2.370126E−01 | 1.488646E−02 | 8.624061E−01 | 4.538021E−01 | 4.094663E−01 |
| 3 | −7.485335E−01 | 9.958948E−01 | 5.217602E−01 | 5.513872E+00 | 4.382764E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.399069E+00 | 2.172283E−01 | 9.958053E+00 | −9.566809E+00 |
| 3 | −5.673421E+00 | −2.304806E+01 | −3.284311E+00 | 2.340792E+01 |

TABLE 15A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.383 | 0.699 | 1.53391 | 55.9 |
| 3 | XOSPHERE | −17.099 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.405 | | |
| IMAGE PLANE | STANDARD | ∞ | | | |

| FOCAL LENGTH | 3.395 |
|---|---|
| F-NUMBER | 2.61 |

TABLE 16A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.459 | 0.699 | 1.53391 | 55.9 |
| 3 | XOSPHERE | −12.498 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.502 | | |
| IMAGE PLANE | STANDARD | ∞ | | | |

| FOCAL LENGTH | 3.623 |
|---|---|
| F-NUMBER | 2.78 |

TABLE 15B

| SURFACE NUMBER | CONIC CONSTANT K | A3 | A4 | A5 | A6 |
|---|---|---|---|---|---|
| 2 | −2.842750 | −9.383095E−03 | 7.324969E−02 | 2.679337E−04 | 2.865586E−02 |
| 3 | 73.659160 | 8.679358E−03 | 4.196334E−02 | −1.715731E−01 | −9.976215E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.586735E−01 | −6.638135E−01 | −2.317419E−01 | −3.605210E−02 | −8.748998E−02 |
| 3 | 3.391144E−01 | −1.721617E−02 | 7.486072E−01 | −8.143409E−01 | −6.730441E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −1.754560E−01 | 1.364762E−01 | 1.056395E+00 | 6.040705E−01 | 4.901933E−01 |
| 3 | −9.423738E−01 | 6.724815E−01 | 4.819959E−02 | 5.163755E+00 | 4.355472E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.374616E+00 | 1.767330E−01 | 9.059346E+00 | −1.118454E+01 |
| 3 | −4.776068E+00 | −2.197051E+01 | −3.266604E+00 | 2.727101E+01 |

TABLE 16B

| SURFACE NUMBER | CONIC CONSTANT K | A3 | A4 | A5 | A6 |
|---|---|---|---|---|---|
| 2 | −2.150207 | −6.850258E−03 | 7.260300E−02 | −3.352659E−02 | −2.180448E−02 |
| 3 | 56.018610 | 2.086921E−03 | 4.217910E−01 | −1.281073E−01 | −6.819552E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.140082E−01 | −7.340738E−01 | −1.552386E−01 | 7.099067E−02 | 9.246584E−02 |
| 3 | 1.698022E−01 | −1.110588E−02 | 7.355692E−01 | −1.202933E+00 | −3.664635E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−01 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | 8.685667E−02 | 3.491453E−01 | 1.345423E+00 | 8.926511E−01 | 3.483541E−01 |
| 3 | −3.622359E−01 | 1.370629E+00 | 1.378650E+00 | 5.641248E+00 | 6.561065E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.756487E+00 | −1.702488E+00 | 8.375733E+00 | −1.181215E+01 |
| 3 | −2.141564E+00 | −2.394429E+01 | −1.252815E+01 | 1.431997E+01 |

TABLE 17A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.432 | 0.699 | 1.53391 | 55.9 |
| 3 | XOSPHERE | −19.900 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.454 | | |
| IMAGE PLANE | STANDARD | ∞ | | | |

| FOCAL LENGTH | 3.738 |
|---|---|
| F-NUMBER | 2.87 |

TABLE 17B

| SURFACE NUMBER | CONIC CONSTANT K | A3 | A4 | A5 | A6 |
|---|---|---|---|---|---|
| 2 | −0.480818 | 5.867016E−03 | 9.630695E−02 | −1.628839E−01 | −1.452391E−01 |
| 3 | −41.364650 | 2.175123E−02 | −4.681197E−02 | 4.733277E−02 | −8.434727E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 4.825038E−01 | −4.447604E−01 | 1.822425E−01 | 2.360530E−01 | 7.344336E−02 |
| 3 | 4.399860E−02 | −3.828968E−01 | 6.643778E−01 | −2.960501E−01 | −8.940898E−03 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |

TABLE 17B-continued

| | | | | |
|---|---|---|---|---|
| 7 | −5.828771E−02 | 2.714480E−02 | 4.947630E−02 | −2.849486E−02 |
| 8 | 4.698633E−02 | −1.365640E−02 | −8.582814E−03 | 5.812724E−04 |
| 9 | −6.322718E−02 | 9.844054E−03 | 9.216297E−03 | −3.390525E−03 |

| SURFACE NUMBER | A12 | A13 | A14 | A15 | A16 |
|---|---|---|---|---|---|
| 2 | −3.472226E−02 | −1.572541E−01 | −1.968170E−01 | −1.067851E−01 | 3.539986E−01 |
| 3 | 8.987669E−02 | 2.919822E−01 | 2.694748E−01 | −8.373083E−02 | −1.011207E−02 |
| 4 | | | | | |
| 5 | | | | | |
| 6 | | | | | |
| 7 | | | | | |
| 8 | | | | | |
| 9 | | | | | |

TABLE 18A

| SURFACE NUMBER | SURFACE TYPE | Ri | Di | Ndi | vdj |
|---|---|---|---|---|---|
| OBJECT PLANE | STANDARD | ∞ | ∞ | | |
| APERTURE STOP | STANDARD | ∞ | 0.119 | | |
| 2 | XOSPHERE | 2.070 | 1.110 | 1.47136 | 76.6 |
| 3 | XOSPHERE | −15.959 | 0.800 | | |
| 4 | XOSPHERE | −2.162 | 0.679 | 1.60595 | 27.0 |
| 5 | XOSPHERE | −9.117 | 0.100 | | |
| 6 | XOSPHERE | 6.048 | 1.000 | 1.51007 | 56.2 |
| 7 | XOSPHERE | 29.492 | 0.314 | | |
| 8 | XOSPHERE | 2.160 | 1.100 | 1.51007 | 56.2 |
| 9 | XOSPHERE | 1.782 | 0.700 | | |
| 10 | STANDARD | ∞ | 0.300 | 1.51633 | 64.1 |
| 11 | STANDARD | ∞ | 0.376 | | |
| IMAGE PLANE | STANDARD | ∞ | | | |

| FOCAL LENGTH | 5.278 |
|---|---|
| F-NUMBER | 2.80 |

TABLE 19A

| SURFACE NUMBER | SURFACE TYPE | Ri | Di | Ndi | vdj |
|---|---|---|---|---|---|
| OBJECT PLANE | STANDARD | ∞ | 3000.070 | | |
| APERTURE STOP | STANDARD | ∞ | −0.070 | | |
| 2 | XOSPHERE | 1.473 | 0.699 | 1.53391 | 55.9 |
| 3 | XOSPHERE | −12.015 | 0.090 | | |
| 4 | XOSPHERE | −3410.537 | 0.401 | 1.60733 | 27.3 |
| 5 | XOSPHERE | 2.944 | 0.614 | | |
| 6 | XOSPHERE | −14.564 | 0.600 | 1.53391 | 55.9 |
| 7 | XOSPHERE | −2.248 | 0.440 | | |
| 8 | XOSPHERE | −7936.115 | 0.451 | 1.53391 | 55.9 |
| 9 | XOSPHERE | 1.500 | 0.200 | | |
| 10 | STANDARD | ∞ | 0.145 | 1.51633 | 64.1 |
| 11 | STANDARD | ∞ | 0.465 | | |
| IMAGE PLANE | STANDARD | ∞ | | | |

| FOCAL LENGTH | 3.670 |
|---|---|
| F-NUMBER | 2.820 |

TABLE 18B

| SURFACE NUMBER | CONIC CONSTANT K | A3 | A4 | A5 | A6 |
|---|---|---|---|---|---|
| 2 | 0.211300 | −2.464958E−02 | 5.275897E−02 | −1.202367E−01 | 5.100521E−02 |
| 3 | −11.003430 | −4.759700E−03 | −2.553074E−02 | −1.379899E−02 | −1.198224E−02 |
| 4 | 0.551240 | −1.188100E−03 | −1.326322E−01 | 1.083805E−01 | 2.061480E−03 |
| 5 | −10.278640 | −1.012282E−01 | −1.144718E−01 | 1.266596E−01 | 4.499240E−03 |
| 6 | −51.089630 | −1.304395E−01 | 6.749931E−02 | 3.393000E−03 | −1.076773E−02 |
| 7 | 9.026120 | −1.717648E−02 | −6.005830E−03 | −5.132000E−03 | −9.061600E−04 |
| 8 | −11.069780 | 3.412823E−02 | −7.001306E−02 | −6.636540E−03 | 2.009060E−03 |
| 9 | −5.226530 | 3.095479E−02 | −7.589071E−02 | 2.710552E−02 | −3.549840E−03 |

| SURFACE NUMBER | A7 | A8 | A9 | A10 |
|---|---|---|---|---|
| 2 | 4.176113E−02 | −1.010916E−02 | −4.612620E−02 | 1.953189E−02 |
| 3 | 5.396860E−03 | 1.124139E−02 | −1.613398E−02 | 4.373390E−03 |
| 4 | −4.216384E−02 | 1.985170E−03 | 4.783041E−02 | −2.009110E−02 |
| 5 | −2.944682E−02 | −4.734460E−03 | 9.207990E−03 | 1.411270E−03 |
| 6 | −9.660400E−03 | −1.987000E−04 | 2.844380E−03 | −1.222210E−03 |
| 7 | −1.628710E−03 | −5.724300E−04 | 4.387500E−04 | −4.603000E−05 |
| 8 | 2.398770E−03 | −6.442800E−04 | −7.006000E−05 | 7.089000E−05 |
| 9 | −1.201340E−03 | 4.505800E−04 | 8.157000E−05 | −3.850000E−05 |

TABLE 19B

| SURFACE NUMBER | CONIC CONSTANT K | A3 | A4 | A5 | A6 |
|---|---|---|---|---|---|
| 2 | −2.628417 | 2.454049E−03 | 7.218324E−02 | −2.684124E−02 | −1.090234E−02 |
| 3 | 148.395800 | −6.207767E−03 | 3.855685E−02 | −1.651715E−01 | −8.226920E−02 |
| 4 | −50.045820 | −1.584768E−02 | 1.480497E−02 | −8.051709E−02 | 2.642048E−01 |
| 5 | −3.832904 | 3.210471E−02 | −1.218261E−01 | 5.003462E−01 | −4.585604E−01 |
| 6 | −11.001000 | −7.254753E−03 | −1.031881E−01 | 1.020778E−01 | 1.885665E−01 |
| 7 | −89.176030 | −3.394850E−01 | 5.727648E−02 | 2.179903E−01 | −8.254569E−02 |
| 8 | −100.000000 | −2.717552E−01 | −5.907275E−02 | −2.166835E−02 | 6.112189E−02 |
| 9 | −13.031300 | −1.083800E−01 | 8.727701E−04 | −4.706439E−02 | 8.521842E−02 |

| SURFACE NUMBER | A7 | A8 | A9 | A10 | A11 |
|---|---|---|---|---|---|
| 2 | 5.143009E−01 | −6.965475E−01 | −2.420304E−01 | −3.582076E−03 | 1.761249E−03 |
| 3 | 3.380030E−01 | −3.961912E−02 | 6.954259E−01 | −9.154887E−01 | −7.765200E−01 |
| 4 | −4.778490E−01 | −1.755639E−01 | 1.290701E+00 | −7.594194E−01 | |
| 5 | −1.771676E−01 | 2.802425E−01 | 4.844266E−01 | −3.832647E−01 | |
| 6 | −3.439371E−01 | −5.983698E−02 | 3.445256E−01 | −1.773895E−01 | |
| 7 | −5.828771E−02 | 2.714480E−02 | 4.947630E−02 | −2.849486E−02 | |
| 8 | 4.698633E−02 | −1.365640E−02 | −8.582814E−03 | 5.812724E−04 | |
| 9 | −6.322718E−02 | 9.844054E−03 | 9.216297E−03 | −3.390525E−03 | |

| SURFACE NUMBER | A12 | A13 | A14 | A15 | A16 |
|---|---|---|---|---|---|
| 2 | −3.549315E−03 | 3.073851E−01 | 1.271549E+00 | 7.975504E−01 | 5.371243E−01 |
| 3 | −9.285239E−01 | 7.295223E−01 | 1.809474E−01 | 5.820756E+00 | 5.385713E+00 |
| 4 | | | | | |
| 5 | | | | | |
| 6 | | | | | |
| 7 | | | | | |
| 8 | | | | | |
| 9 | | | | | |

| SURFACE NUMBER | A17 | A18 | A19 | A20 |
|---|---|---|---|---|
| 2 | −2.738124E+00 | −5.743152E−01 | 7.865277E+00 | −1.304464E+01 |
| 3 | −3.657013E+00 | −2.136073E+01 | −4.305191E+00 | 2.096232E+01 |

TABLE 20A

LIST OF DATA RELATED TO SPHERICAL ABERRATION, POINT IMAGE AND THE LIKE OF IMAGING LENSES OF EXAMPLES 1 THROUGH 19

| EXAMPLE NUMBER | FOCAL LENGTH f | F-NUMBER Fa | THRESHOLD OF LIGHT INTENSITY | POINT IMAGE (BASE POINT IMAGE DIAMETER(psfϕ)) | | | | SPHERICAL ABERRATION | | | |
|---|---|---|---|---|---|---|---|---|---|---|---|
| | | | | psfϕ [μm] | PIXEL VALUE CORRESPONDING T0 psfϕ | psfϕ/ Fa | | a | b | a/f | b/f |
| 1 | 3.736 | 2.83 | 0.004 | 8.6 | 6.2 | 3.0 | | 0.018 | 0.030 | 0.005 | 0.008 |
| 2 | 3.513 | 3.04 | 0.004 | 9.7 | 6.9 | 3.2 | | 0.120 | 0.249 | 0.034 | 0.071 |
| 3 | 3.530 | 2.96 | 0.004 | 14.4 | 10.3 | 4.8 | | 0.118 | 0.206 | 0.033 | 0.058 |
| 4 | 3.523 | 3.04 | 0.004 | 16.0 | 11.4 | 5.3 | | 0.142 | 0.276 | 0.040 | 0.078 |
| 5 | 3.524 | 3.03 | 0.004 | 16.3 | 11.6 | 5.4 | | 0.145 | 0.278 | 0.041 | 0.079 |
| 6 | 3.520 | 2.95 | 0.004 | 15.7 | 11.2 | 5.3 | | 0.148 | 0.279 | 0.042 | 0.079 |
| 7 | 3.554 | 3.08 | 0.004 | 14.4 | 10.3 | 4.7 | | 0.097 | 0.251 | 0.027 | 0.071 |
| 8 | 3.562 | 3.11 | 0.004 | 10.8 | 7.7 | 3.5 | | 0.092 | 0.262 | 0.026 | 0.073 |
| 9 | 3.434 | 3.01 | 0.004 | 16.0 | 11.4 | 5.3 | | 0.146 | 0.292 | 0.043 | 0.085 |
| 10 | 3.537 | 3.20 | 0.004 | 19.0 | 13.6 | 5.9 | | 0.135 | 0.301 | 0.038 | 0.085 |
| 11 | 3.317 | 2.95 | 0.004 | 24.2 | 17.3 | 8.2 | | 0.203 | 0.316 | 0.061 | 0.095 |
| 12 | 3.195 | 3.19 | 0.004 | 25.3 | 18.1 | 7.9 | | 0.282 | 0.522 | 0.088 | 0.163 |
| 13 | 3.421 | 2.96 | 0.004 | 23.9 | 17.1 | 8.1 | | 0.135 | 0.265 | 0.039 | 0.077 |
| 14 | 3.440 | 3.03 | 0.004 | 22.0 | 15.7 | 7.3 | | 0.135 | 0.301 | 0.039 | 0.087 |
| 15 | 3.395 | 3.06 | 0.004 | 16.3 | 11.6 | 5.3 | | 0.152 | 0.339 | 0.045 | 0.100 |
| 16 | 3.623 | 3.16 | 0.004 | 43.9 | 31.3 | 13.9 | | 0.099 | 0.265 | 0.027 | 0.073 |
| 17 | 3.738 | 2.63 | 0.004 | 12.4 | 8.9 | 4.7 | | | | | |
| 18 | 5.278 | 2.80 | 0.004 | 45.8 | 32.7 | 16.4 | | 0.149 | 0.317 | 0.028 | 0.060 |
| 19 | 3.670 | 3.21 | 0.004 | 13.0 | 9.3 | 4.0 | | 0.015 | 0.289 | 0.004 | 0.079 |

TABLE 20A-continued

LIST OF DATA RELATED TO SPHERICAL ABERRATION, POINT IMAGE
AND THE LIKE OF IMAGING LENSES OF EXAMPLES 1 THROUGH 19

| | | SPHERICAL ABERRATION CONSTANT REGION | | | |
|---|---|---|---|---|---|
| EXAMPLE NUMBER | tz | MINIMUM VALUE OF CONSTANT REGION Yu(min) | MAXIMUM VALUE OF CONSTANT REGION Yu(max) | LENGTH OF CONSTANT REGION C | RATIO OF AREA OF CONSTANT REGION d/e |
| 1 | 0.023 | 0 | 1 | 1 | 1.000 |
| 2 | 0.026 | 0.32 | 0.9 | 0.58 | 0.708 |
| 3 | 0.025 | 0.34 | 0.86 | 0.52 | 0.624 |
| 4 | 0.026 | 0.36 | 0.8 | 0.44 | 0.510 |
| 5 | 0.026 | 0.37 | 0.8 | 0.43 | 0.503 |
| 6 | 0.025 | 0.37 | 0.8 | 0.43 | 0.503 |
| 7 | 0.026 | 0.34 | 0.87 | 0.53 | 0.641 |
| 8 | 0.026 | 0.34 | 0.87 | 0.53 | 0.641 |
| 9 | 0.026 | 0.37 | 0.81 | 0.44 | 0.519 |
| 10 | 0.027 | 0.4 | 0.77 | 0.37 | 0.433 |
| 11 | 0.027 | 0.35 | 0.76 | 0.41 | 0.455 |
| 12 | 0.030 | 0.37 | 0.76 | 0.39 | 0.441 |
| 13 | 0.026 | 0.38 | 0.73 | 0.35 | 0.389 |
| 14 | 0.026 | 0.4 | 0.77 | 0.37 | 0.433 |
| 15 | 0.027 | 0.37 | 0.81 | 0.44 | 0.519 |
| 16 | 0.026 | 0.39 | 0.6 | 0.21 | 0.208 |
| 17 | 0.021 | | | | |
| 18 | 0.016 | 0.41 | 0.49 | 0.08 | 0.072 |
| 19 | 0.026 | 0 | 0.77 | 0.77 | 0.593 |

TABLE 20B

LIST OF DATA RELATED TO DEPTH MTF OF IMAGING LENSES OF EXAMPLES 1 THROUGH 19

| | | | 90 LINE/mm (SENSOR ¼ Nyquist) | | | | |
|---|---|---|---|---|---|---|---|
| EXAMPLE NUMBER | PEAK RESPONSE | BASE RESPONSE (%) | LEFT EDGE POSITION OF DEPTH (mm) | RIGHT EDGE POSITION OF DEPTH (mm) | PEAK POSITION (mm) | EXTENDED FOCAL DEPTH Zv4 (mm) | NORMALIZED EXTENDED FOCAL DEPTH Zv4 × (Fa/f²) (mm) |
| 1 | 0.818 | (20.0) | −0.034 | 0.034 | 0 | (0.068) | (0.0138) |
| 2 | 0.702 | 17.1 | −0.03 | 0.036 | 0.004 | 0.066 | 0.0162 |
| 3 | 0.644 | 15.7 | −0.034 | 0.04 | 0.006 | 0.074 | 0.0176 |
| 4 | 0.461 | 11.3 | −0.044 | 0.05 | 0.018 | 0.094 | 0.0230 |
| 5 | 0.458 | 11.2 | −0.044 | 0.052 | 0.018 | 0.096 | 0.0235 |
| 6 | 0.462 | 11.3 | −0.042 | 0.054 | 0.02 | 0.096 | 0.0229 |
| 7 | 0.634 | 15.5 | −0.034 | 0.038 | 0.006 | 0.072 | 0.0176 |
| 8 | 0.634 | 15.5 | −0.034 | 0.036 | 0.006 | 0.07 | 0.0171 |
| 9 | 0.458 | 11.2 | −0.042 | 0.05 | 0.016 | 0.092 | 0.0235 |
| 10 | 0.384 | 9.4 | −0.052 | 0.056 | 0.026 | 0.108 | 0.0276 |
| 11 | 0.393 | 9.6 | −0.038 | 0.066 | 0.026 | 0.104 | 0.0279 |
| 12 | 0.338 | 8.3 | −0.036 | 0.054 | 0.026 | 0.09 | 0.0281 |
| 13 | 0.409 | 10.0 | −0.048 | 0.064 | 0.028 | 0.112 | 0.0283 |
| 14 | 0.384 | 9.4 | −0.052 | 0.056 | 0.026 | 0.108 | 0.0277 |
| 15 | 0.449 | 11.0 | −0.04 | 0.05 | 0.014 | 0.09 | 0.0239 |
| 16 | 0.275 | 6.7 | −0.076 | 0.06 | 0.014 | 0.136 | 0.0327 |
| 17 | 0.580 | 14.2 | −0.08 | 0.046 | 0.006 | 0.126 | 0.0237 |
| 18 | 0.190 | 4.7 | −0.1 | 0.1 | 0.02 | 0.2 | 0.0201 |
| 19 | 0.472 | 11.5 | −0.042 | 0.046 | 0.002 | 0.088 | 0.0210 |

| | | | 179 LINE/mm (SENSOR ½ Nyquist) | | | | |
|---|---|---|---|---|---|---|---|
| EXAMPLE NUMBER | PEAK RESPONSE | BASE RESPONSE (%) | LEFT EDGE POSITION OF DEPTH (mm) | RIGHT EDGE POSITION OF DEPTH (mm) | PEAK POSITION (mm) | EXTENDED FOCAL DEPTH Zv2 (mm) | NORMALIZED EXTENDED FOCAL DEPTH Zv2 × (Fa/f²) (mm) |
| 1 | 0.648 | (20.0) | −0.02 | 0.018 | 0 | (0.038) | (0.0077) |
| 2 | 0.513 | 15.8 | −0.018 | 0.024 | 0 | 0.042 | 0.0103 |
| 3 | 0.436 | 13.5 | −0.024 | 0.028 | 0 | 0.052 | 0.0124 |
| 4 | 0.268 | 8.3 | −0.03 | 0.032 | 0.002 | 0.062 | 0.0152 |
| 5 | 0.264 | 8.1 | −0.03 | 0.034 | 0.002 | 0.064 | 0.0156 |
| 6 | 0.271 | 8.4 | −0.028 | 0.036 | 0.002 | 0.064 | 0.0152 |
| 7 | 0.415 | 12.8 | −0.024 | 0.024 | 0 | 0.048 | 0.0117 |
| 8 | 0.419 | 12.9 | −0.024 | 0.024 | 0 | 0.048 | 0.0117 |
| 9 | 0.259 | 8.0 | −0.028 | 0.032 | 0.002 | 0.06 | 0.0153 |
| 10 | 0.182 | 5.6 | −0.034 | 0.048 | 0 | 0.082 | 0.0210 |

TABLE 20B-continued

LIST OF DATA RELATED TO DEPTH MTF OF IMAGING LENSES OF EXAMPLES 1 THROUGH 19

| 11 | 0.249 | 7.7  | −0.024 | 0.044 | 0.002  | 0.068 | 0.0182 |
| 12 | 0.179 | 5.5  | −0.032 | 0.062 | 0      | 0.094 | 0.0294 |
| 13 | 0.225 | 6.9  | −0.03  | 0.04  | 0.002  | 0.07  | 0.0177 |
| 14 | 0.182 | 5.6  | −0.034 | 0.048 | 0      | 0.082 | 0.0210 |
| 15 | 0.252 | 7.8  | −0.03  | 0.03  | 0      | 0.06  | 0.0159 |
| 16 | 0.156 | 4.8  | −0.048 | 0.036 | 0.014  | 0.084 | 0.0202 |
| 17 | 0.441 | 13.6 | −0.024 | 0.022 | 0      | 0.046 | 0.0086 |
| 18 | 0.126 | 3.9  | −0.06  | 0.048 | −0.002 | 0.108 | 0.0109 |
| 19 | 0.331 | 10.2 | −0.026 | 0.028 | 0      | 0.054 | 0.0129 |

COMMON TO 90 LINE/mm AND 179 LINE/mm

| EXAMPLE NUMBER | COMMON LEFT EDGE POSITION | COMMON RIGHT EDGE POSITION | DIFFERENCE IN PEAK | COMMON EXTENDED FOCAL DEPTH Zw | NORMALIZED COMMON EXTENDED FOCAL DEPTH Zw × (Fa/f$^2$) (mm) |
|---|---|---|---|---|---|
| 1  | −0.02   | 0.018 | 0     | (0.038) | (0.0077) |
| 2  | −0.018  | 0.024 | 0.004 | 0.042   | 0.0103 |
| 3  | −0.024  | 0.028 | 0.006 | 0.052   | 0.0124 |
| 4  | −0.03   | 0.032 | 0.016 | 0.062   | 0.0152 |
| 5  | −0.03   | 0.034 | 0.016 | 0.064   | 0.0156 |
| 6  | −0.028  | 0.036 | 0.018 | 0.064   | 0.0152 |
| 7  | −0.024  | 0.024 | 0.006 | 0.048   | 0.0117 |
| 8  | −0.024  | 0.024 | 0.006 | 0.048   | 0.0117 |
| 9  | −0.028  | 0.032 | 0.014 | 0.06    | 0.0153 |
| 10 | −0.034  | 0.048 | 0.026 | 0.082   | 0.0210 |
| 11 | −0.024  | 0.044 | 0.024 | 0.068   | 0.0182 |
| 12 | −0.032  | 0.054 | 0.026 | 0.086   | 0.0269 |
| 13 | −0.03   | 0.04  | 0.026 | 0.07    | 0.0177 |
| 14 | −0.034  | 0.048 | 0.026 | 0.082   | 0.0210 |
| 15 | −0.03   | 0.03  | 0.014 | 0.06    | 0.0159 |
| 16 | −0.048  | 0.036 | 0     | 0.084   | 0.0202 |
| 17 | −0.024  | 0.022 | 0.006 | 0.046   | 0.0086 |
| 18 | −0.06   | 0.048 | 0.022 | 0.108   | 0.0109 |
| 19 | −0.026  | 0.028 | 0.002 | 0.054   | 0.0129 |

What is claimed is:

1. An imaging lens used in an imaging apparatus that corrects a blur in an image by performing contrast recovery processing on original image data obtained by imaging, wherein the spherical aberration of the imaging lens changes from an object point side of an image plane base position toward the other side of the image plane base position as a distance from the optical axis of the imaging lens increases, and
wherein the following formulas (1) and (2) are satisfied:

$$0.02 < a/f < 0.10 \quad (1); \text{ and}$$

$$0.02 < b/f \quad (2), \text{ where}$$

a: the magnitude of spherical aberration from the image plane base position toward the object point side thereof, the spherical aberration affecting a ray passing through a central part of the pupil of the imaging lens,
b: a sum of a maximum spherical aberration from the image plane base position toward the object point side thereof and a maximum spherical aberration from the image plane base position toward the other side of the image plane base position, and
f: the focal length of the imaging lens.

2. An imaging lens, as defined in claim 1, wherein when the radius of the pupil of the imaging lens is 1, the following formula (3) is satisfied:

$$0.1 < c < 1.0 \quad (3), \text{ where}$$

c: a length of a region in a direction perpendicular to the optical axis, the region in which a deviation from the image plane base position by spherical aberration is less than or equal to 0.03×Fa/f, and
Fa: the effective F-number of the imaging lens.

3. An imaging lens, as defined in claim 2, wherein the ratio of the area of the region to the area of the entire region of the pupil is greater than 0.20 and less than 0.75.

4. An imaging lens, as defined in claim 2, wherein all of the following formulas (4) through (6) are satisfied:

$$0.02 < a/f < 0.10 \quad (4),$$

$$0.02 < b/f < 0.2 \quad (5), \text{ and}$$

$$0.1 < c < 0.6 \quad (6).$$

5. An imaging lens, as defined in claim 2, wherein the following formula (7) is satisfied:

$$0.30 < Yu < 0.90 \quad (7), \text{ where}$$

Yu: the range of the region in a direction perpendicular to the optical axis, the region in which a deviation from the image plane base position by spherical aberration is less than or equal to 0.03×Fa/f, and
Fa: the effective F-number of the imaging lens.

6. An imaging lens, as defined in claim 1, wherein the following formula (8) is satisfied:

$$3 < psf\phi/Fa < 15 \quad (8), \text{ where}$$

psfφ: base point image diameter, and
Fa: the effective F-number of the imaging lens.

7. An imaging lens, as defined in claim 1, comprising:
a first lens group composed of at least one lens, and which has positive power; and
a second lens group composed of at least one lens, the first lens group and the second lens group being sequentially arranged from the object side of the imaging lens, wherein the most-image-side lens of the second lens group has negative power on the optical axis thereof, and includes a region in which negative power becomes weaker from an optical axis side of the region toward a peripheral side thereof.

8. An imaging lens, as defined in claim 7, wherein a first lens having positive power, a second lens having negative power, a third lens having positive power, and a fourth lens having negative power are sequentially arranged from the object side of the imaging lens.

9. An imaging lens, as defined in claim 8, wherein an image-plane-side surface of the fourth lens is aspheric, and has an inflection point.

10. An imaging lens, as defined in claim 8, wherein an image-plane-side surface of the fourth lens is aspheric, and has an extreme point in a region other than the center of the optical axis.

11. An imaging system comprising:
an imaging lens as defined in claim 1;
an imaging device that images an optical image formed through the imaging lens; and
an image processing means that performs contrast recovery processing on the original image data obtained by imaging the optical image by the imaging device,
wherein the image processing means performs, as the contrast recovery processing, image restoration processing using Fourier transformation.

12. An imaging lens used in an imaging apparatus that corrects a blur in an image by performing contrast recovery processing on original image data obtained by imaging, wherein the following formula (1') is satisfied:

$$0.015 < Zw \times Fa/f^2 < 0.030 \quad (1'), \text{ where,}$$

Zw: common extended focal depth,
Fa: the effective F-number of the imaging lens, and
f: the focal length of the imaging lens.

13. An imaging lens, as defined in claim 12, wherein the following formula (2') is satisfied:

$$0.015 < Zv4 \times Fa/f^2 < 0.035 \quad (2'), \text{ where,}$$

Zv4: ¼ Nyquist extended focal depth.

14. An imaging lens, as defined in claim 12, wherein the following formula (3') is satisfied:

$$0.011 < Zv2 \times Fa/f^2 < 0.030 \quad (3'), \text{ where}$$

Zv2: ½ Nyquist extended focal depth.

15. An imaging lens, as defined in claim 12, wherein the following formula (4') is satisfied:

$$Pi \times 7 \leq psf\phi \leq Pi \times 30 \quad (4'), \text{ where}$$

psfφ: base point image diameter, and
Pi: pixel pitch of an imaging device applied to the imaging apparatus.

16. An imaging lens, as defined in claim 12, comprising:
a first lens group composed of at least one lens, and which has positive power; and
a second lens group composed of at least one lens, the first lens group and the second lens group being sequentially arranged from the object side of the imaging lens,
wherein the most-image-side lens of the second lens group has negative power on the optical axis thereof, and includes a region in which negative power becomes weaker from an optical axis side of the region toward a peripheral side thereof.

17. An imaging lens, as defined in claim 16, wherein a first lens having positive power, a second lens having negative power, a third lens having positive power, and a fourth lens having negative power are sequentially arranged from the object side of the imaging lens.

18. An imaging lens, as defined in claim 17, wherein an image-plane-side surface of the fourth lens is aspheric, and has an inflection point.

19. An imaging lens, as defined in claim 17, wherein an image-plane-side surface of the fourth lens is aspheric, and has an extreme point in a region other than the center of the optical axis.

20. An imaging system comprising:
an imaging lens as defined in claim 12;
an imaging device that images an optical image formed through the imaging lens; and
an image processing means that performs contrast recovery processing on the original image data obtained by imaging the optical image by the imaging device,
wherein the image processing means performs, as the contrast recovery processing, image restoration processing using Fourier transformation.

\* \* \* \* \*